US012781376B2

(12) United States Patent
Werner et al.

(10) Patent No.: US 12,781,376 B2
(45) Date of Patent: Nov. 3, 2026

(54) CONTROLLED AND TUNABLE FABRICATION OF POLYMER THIN FILMS

(71) Applicant: Trustees of Boston University, Boston, MA (US)

(72) Inventors: Joerg Gerd Werner, Medford, MA (US); Wenlu Wang, Brighton, MA (US); Zhaoyi Zheng, Boston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 19/340,407

(22) Filed: Sep. 25, 2025

(65) Prior Publication Data

US 2026/0085440 A1 Mar. 26, 2026

Related U.S. Application Data

(60) Provisional application No. 63/699,461, filed on Sep. 26, 2024.

(51) Int. Cl.
*C25D 9/02* (2006.01)
*C08J 3/24* (2006.01)

(52) U.S. Cl.
CPC ................ *C25D 9/02* (2013.01); *C08J 3/246* (2013.01)

(58) Field of Classification Search
CPC .......... C09D 5/002; C09D 5/24; C09D 5/004; C09D 7/61; C09D 5/448; C09D 5/44; C08K 3/22; C08K 3/36; C08K 2003/08; C08K 9/02; C08J 3/246
USPC .......................................................... 524/457
See application file for complete search history.

(56) References Cited

U.S. PATENT DOCUMENTS

| | | | | |
|---|---|---|---|---|
| 3,689,810 | A * | 9/1972 | Walles | H01G 4/008 252/500 |
| 8,807,350 | B2 | 8/2014 | Linder et al. | |
| 9,058,916 | B2 | 6/2015 | Meguro et al. | |
| 9,299,476 | B2 | 3/2016 | Green et al. | |
| 2018/0237632 | A1 * | 8/2018 | Shull | C09D 139/00 |

FOREIGN PATENT DOCUMENTS

WO 2016/129428 A1 8/2016

OTHER PUBLICATIONS

Deheryan, et al., 2015. "Self-limiting electropolymerization of ultrathin, pinhole-free poly(phenylene oxide) films on carbon nanosheets" Carbon, 88, pp. 42-50.
Fischer, et al., 2009. "Characterization of ultrathin electroactive films synthesized via the self-limiting electropolymerization of o-methoxyaniline" Electrochimica Acta, 54(11), pp. 2962-2970.
Koizumi, et al., "Electropolymerization on wireless electrodes towards conducting polymer microfibre networks" Nat Commun 7, 10404 (2016). https://doi.org/10.1038/ncomms10404.
Wang et al., "Conformal Electrodeposition of Ultrathin Polymeric Films with Tunable Properties from Dual-Functional Monomers" Mol. Syst. Des. Eng., 2023, 8, 624-631.
Wang et al., "Electrodeposition of Polymer Networks as Conformal and Uniform Ultrathin Coatings" Adv. Mater. 2024, 36, 2409826. https://doi.org/10.1002/adma.202409826.
Wang et al., "Electrodeposition of reactive polymer networks for conformal ultrathin coatings amenable to post-deposition functionalization" J. Mater. Chem. A. 2025, 13, 29050-29059.
Zheng et al., "Cathodic electrodeposition of polymer networks as ultrathin films on 3-D micro-architected electrodes" RSC Appl. Polym., 2024, 2, 1139-1146.

* cited by examiner

*Primary Examiner* — Hannah J Pak
(74) *Attorney, Agent, or Firm* — Hamilton, Brook, Smith & Reynolds, P.C.

(57) ABSTRACT

Polymers and methods for electrodeposition conformal thin film and articles associated therewith are disclosed herein. An example polymer includes a non-conductive polymer backbone and plural electrochemically active crosslinker groups covalently attached to the polymer backbone. An example method of forming a conformal polymer thin film on a conductive substrate includes dissolving a polymer in an electrolytic solution to form a deposition solution. The conductive substrate is immersed in the deposition solution and an electrochemical potential is applied to the conductive substrate to induce electrochemical activation of the crosslinker groups. Electrochemical activation of the crosslinker groups results in surface-confined crosslinking and self-limiting deposition of the polymer to form the conformal polymer thin film on the surfaces of the conductive substrate. The polymers, methods, and articles may be useful for applications using functional coatings, for example, interfaces in batteries, catalytic activity in thermo- and electrocatalytic conversions, or sorption for purification.

30 Claims, 76 Drawing Sheets

Oxidative:

Reductive:

Two-component 616-1 616-2 616-3

616-4 616-5 616-6 616-7 616-8

814-1

814-2

814-3

814-4

814-5

R = H, alkyl, aryl 814-6

814-7

814-7

$R^1$ = H, alkyl, aryl; $R^2$ = H, methyl 914-1 914-2 914-3 916 908-1

926-1 926-2 908-2 916 908-1

1114a

FIG. 23D
Uncoated
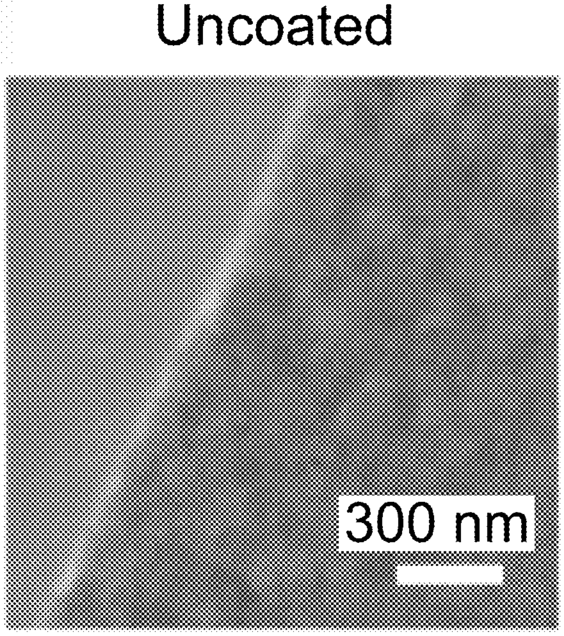
FIG. 23E
End
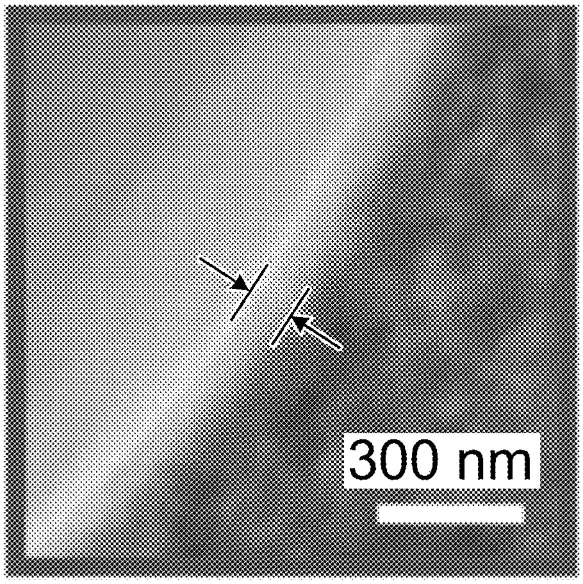
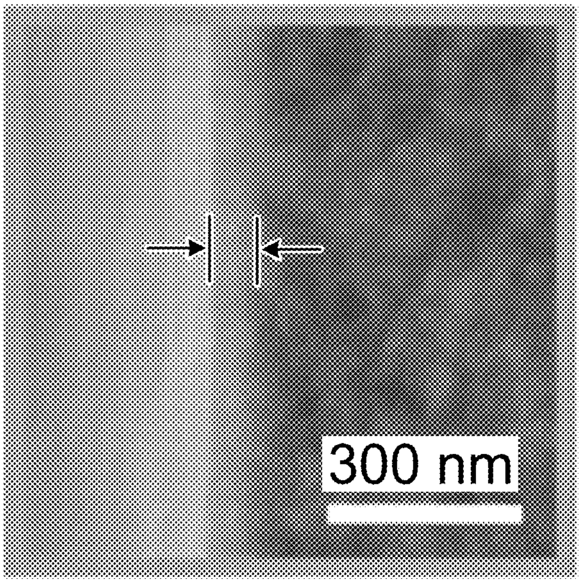
Middle
FIG. 23F
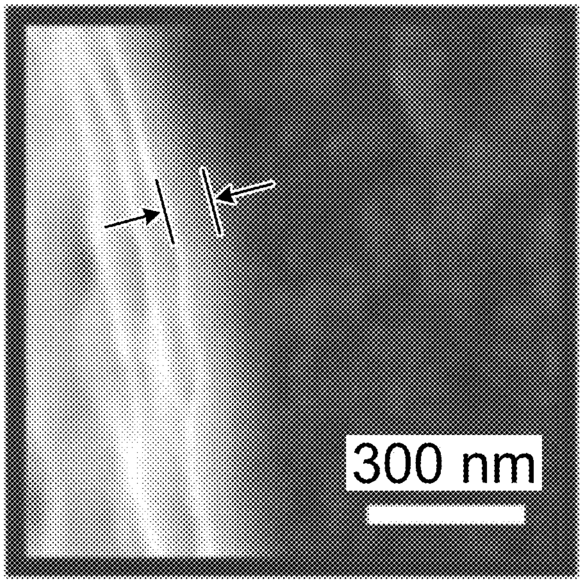
Entrance
FIG. 23G EPoN x-linked PI-x%Ph film 3018a

PFDT

3042

3044

Bromoisobutyrate (bib)

Acrylate

PEG-2bib 4f-acrylate 5026-1 + 5026-2

5014

5016

5008

5018

5116

5124

5122

CONTROLLED AND TUNABLE FABRICATION OF POLYMER THIN FILMS

RELATED APPLICATION

This application claims the benefit of U.S. Provisional Application No. 63/699,461, filed on Sep. 26, 2024. The entire teachings of the above application are incorporated herein by reference.

GOVERNMENT SUPPORT

This invention was made with government support under CBET-2146597 from the National Science Foundation. The government has certain rights in the invention.

BACKGROUND

While polymeric coatings and thin films on planar materials and "outside" surfaces are well established and widely adopted, the prevalence and importance of porosity and 3-D architecture in advanced materials, including metamaterials, demand a new coating paradigm for precise and scalable fabrication of polymer thin films on "interior" 3-D surfaces. Thus far, polymer thin film deposition in porous and/or 3-D materials tend to be limited by challenges of heterogeneous mass transport and non-uniform surface reactivity that cause over-deposition in some and insufficient coverage in hard-to-reach areas, leading to non-uniform and incomplete coatings. Additionally, the deposition mechanism is often tightly connected to the polymer property, which may limit the design space and achievable functionality.

SUMMARY

Compositions, methods, and devices described herein relate to Electrodeposition of Polymer Networks (EPoN). Controlled and tunable fabrication of 3-dimensional (3-D) thin films, particularly with regard to non-planar, porous, or 3-D materials, that combine the functional versatility of polymers with the high surface area of 3-D mesoscale architectures can enable unprecedented advances in, as non-limiting examples, energy storage, catalysis, purification, or carbon capture.

Disclosed herein are polymers, which may include polymer systems, that are amenable to electrodeposition following a surface-confined and self-limiting film-growth mechanism that separates deposition chemistry from polymer coating functionality. Such polymers are capable of electrodeposition due to a small fraction of electrochemically active comonomers or end groups that undergo crosslinking upon electrochemical activation, for example, oxidation or reduction, at a surface of a non-planar material that is to be coated. Using this strategy, conformal coatings of functional polymers, e.g., poly(ethers) or poly(acrylates), with tunable thickness of tens to hundreds of nanometers on conductive and porous 3-D materials can be fabricated. Such functional coatings can be used to, for example, stabilize interfaces in batteries for longer lifetimes, enable ultra-fast charging thin-film batteries and high-energy supercapacitors, enhance catalytic activity in thermo- and electro-catalytic conversions, boost sorption capacity and selectivity by orders of magnitude in air and water purification, including carbon capture, or enhance charge storage capabilities if redox-active.

Polymers, polymer compositions, methods, apparatuses, or a combination thereof as described herein are useful, among other things, for (1) deposition of insulating polymers of arbitrary functionality and molecular architecture as sub-micron thin films and (2) coating of non-planar/porous conductive substrates with polymer thin films of arbitrary functionality.

An example embodiment is directed to a polymer for electrodeposition as a conformal thin film. The polymer includes a non-conductive polymer backbone plural electrochemically active crosslinker groups covalently attached to the polymer backbone.

The non-conductive polymer backbone can include poly (ethylene oxide), poly(propylene oxide), poly(butadiene), poly(glycidyl methacrylate), poly(methacrylate), poly(acrylate), poly(isoprene), poly(styrene), poly(acrylamide), poly (vinyl pyridine), poly(ethylene), poly(propylene), or poly (vinyl alcohol), precursors or derivatives thereof, or a combination thereof.

The non-conductive polymer backbone can be a block polymer and includes a hydrogen-bonding block, a hydrophobic block, a thermally responsive block, an ionically conductive block, a charged block, a Zwitter ionic block, or a combination thereof.

The electrochemically active crosslinker groups can include phenol, phenolate, amine, pyridinium, bromoisobutyrate, bromo-propionate, phenyl halogenide, phenyl dihalogenide, phenyl tri-halogenide, phenyl diazonium, or acrylate groups, precursors or derivatives thereof, or a combination thereof.

The electrochemically active crosslinker groups can include 4-vinylpyridine, 2-vinylpyridine, pyridine, or hydroxystyrene The electrochemically active crosslinker groups can be covalently attached to the polymer backbone as end groups, co-monomers, or block segments.

A crosslinker fraction of the electrochemically active crosslinker groups with respect to the polymer backbone can be sufficient to enable cross-linking of the polymer upon application of an electrochemical potential to form the conformal thin film. The crosslinker fraction can be between 1% to 50% of the molecular weight of the polymer. A given crosslinker group of the electrochemically active crosslinker groups can be separated from another crosslinker group of the crosslinker groups by a portion of the polymer backbone, the portion of molecular mass greater than 500 g/mol. The crosslinker fraction can be optimized to achieve a thickness of the conformal thin film between 10 nm and 1,000 nm. The crosslinker fraction ca be selected to provide a mesh size smaller than 10 nm. The tunable properties of the conformal thin film can include thickness of a deposited film, electronic resistance, sorption, swelling degree in liquids, molecular permeability, hydrophobicity, mesh size, catalytic efficiency, catalytic selectivity, or ionic conductivity. The tunable properties can be determined by parameters of the polymer, the parameters including the non-conductive backbone, side groups of the polymer, sizes of the polymer, fractions of the electrochemically active crosslinker groups with respect to the non-conductive backbone, types of the electrochemically active crosslinker groups. The conformal thin film can be a hybrid organic-inorganic film including a metal, metal oxide, or semiconductor deposited on at least a portion of the polymer. The conformal thin film is configured to provide antimicrobial properties or antibiofouling properties. The conformal thin film is configured to provide water or oil repellency, or both.

A polymer composition can include the polymer described hereinabove and a solvent. The solvent of the deposition solution can include. acetonitrile, dimethylformamide, tetrahydrofuran, water, or toluene mixtures. The polymer composition can further include one or more electrolytes, the one or more electrolytes including cations such as lithium, sodium, potassium, tetraethylammonium, tetrabutyl ammonium, or tetralkyl ammonium; anions such as perchlorate, para-toluenesulfonate, hexafluorophosphate, bis(trifluoromethanesulfonyl)imide, chloride, or bromide; or a combination thereof. The polymer position can further include a complementary polymer or crosslinker.

The electrochemically active crosslinker groups can be present at a fraction of at least 1% molecular weight and up to 50% molecular weight of the polymer.

The polymer further can include a homopolymer or a small molecule additive attached to at least one block of the polymer backbone.

The non-conductive polymer backbone can include poly (ethylene oxide) with a molecular weight between 1,000 and 100,000 g/mol.

The non-conductive polymer backbone includes poly (glycidyl methacrylate) and the electrochemically active crosslinker groups include phenolic groups or mercaptophenolic groups or aminophenolic groups.

Another example embodiment is directed to a method of forming a conformal polymer thin film on a conductive substrate. The method includes dissolving a polymer in an electrolytic solution to form a deposition solution. The polymer includes a non-conductive backbone and plural electrochemically active crosslinker groups covalently attached to the non-conductive backbone. The method further includes immersing the conductive substrate in the deposition solution and applying an electrochemical potential to the conductive substrate to induce electrochemical activation of the crosslinker groups at a surface of the conductive substrate. The electrochemical activation of the crosslinker groups result in surface-confined crosslinking and self-limiting deposition of the polymer to form the conformal polymer thin film on the surfaces of the conductive substrate The method can further include synthesizing the polymer by covalently attaching the crosslinker groups to the non-conductive backbone. Synthesizing the polymer can include a thiol-epoxy addition reaction, amine-epoxy addition reaction, or thiol-ene addition reaction.

Deposition of the polymer to form the conformal polymer thin film can inhibit further electrochemical activation of the crosslinker groups of additional dissolved polymers.

The method can further include modifying the non-conductive backbone of the polymer. The modifying the non-conductive backbone can include addition of functional groups such as amines, oligoethers, fluorocarbons, hydrocarbons, cations, anions, Zwitter ions, acids, bases, alcohols, heterocycles, electrochemically active molecules, or metal-ion-coordinating ligands. The modifying the non-conductive backbone of the polymer can be performed after the deposition of the polymer to form the conformal polymer thin film.

Another example embodiment is directed to a method of electrodepositing a polymeric thin film with tunable properties on a conductive substrate. The method includes dissolving a polymer in an electrolytic solution to form a deposition solution, wherein the polymer includes a non-conductive backbone and plural electrochemically active crosslinker groups covalently attached to the non-conductive backbone. The method further includes immersing the conductive substrate in the deposition solution and applying an electrochemical potential to the conductive substrate to induce electrochemical crosslinking and deposition of the polymer as the conformal polymeric thin film. The method further includes controlling one or more deposition parameters to tune the tunable properties of the polymeric thin film.

The tunable properties can include thickness of a deposited film, electronic resistance, sorption, hydrophobicity, mesh size, catalytic efficiency, catalytic selectivity, or ionic conductivity.

The deposition parameters can include one or more of an applied electrochemical potential, a concentration of the polymer, the non-conductive backbone, side groups of the polymer, sizes of the polymer, fractions of the electrochemically active crosslinker groups with respect to the non-conductive backbone, types of the electrochemically active crosslinker groups, a solvent of the electrolytic solution, an electrolyte, deposition time, or deposition protocol.

The controlling the one or more deposition parameters can include pulsing the electrochemical potential applied.

Another example embodiment is directed to an article including a conductive substrate having a non-planar, porous, or three-dimensional architecture. The article further includes a polymer network deposited as a conformal thin film on surfaces of the conductive substrate. The polymer network is formed from polymers including a non-conductive backbone and plural electrochemically active crosslinker groups.

The conductive substrate can include gold, copper, carbon, indium tin oxide, or stainless steel.

A thickness of the polymer network can be between 10 nm and 1,000 nm.

A given crosslinker group of the electrochemically active crosslinker groups can be crosslinked to another crosslinker group of the electrochemically active crosslinker group, a co-monomer of the non-conductive backbone, a complementary polymer, or a complementary crosslinker.

A mesh size of the polymer network can allow permeation of molecules smaller than 10 nm.

The polymer network can have an electronic resistivity greater than 10 GΩ·cm and a dielectric breakdown strength of at least 0.1 MV/cm. The electrochemically active crosslinker groups can include phenolic groups configured to promote oxidation with water to increase the electronic resistance and dielectric breakdown strength.

The polymer can be electronically insulating and ionically conductive, and wherein the polymer network is configured to provide dissolution, dissociation, mobility, or a combination thereof to ions to and from the conductive substrate. An ionic conductivity of the polymer network is greater than $10^{-7}$ S/cm at 20° C. and greater than $10^{-5}$ S/cm at or above 50° C.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 23D-23G illustrate SEM images of the 3-D carbon electrode of FIG. 23A before electrodeposition of a conformal thin film (FIG. 23D), and after the electrodeposition at an end (FIG. 23E), middle (FIG. 23F), and entrance (FIG. 23G) of a pore of the electrode.

DETAILED DESCRIPTION

Figure 1:
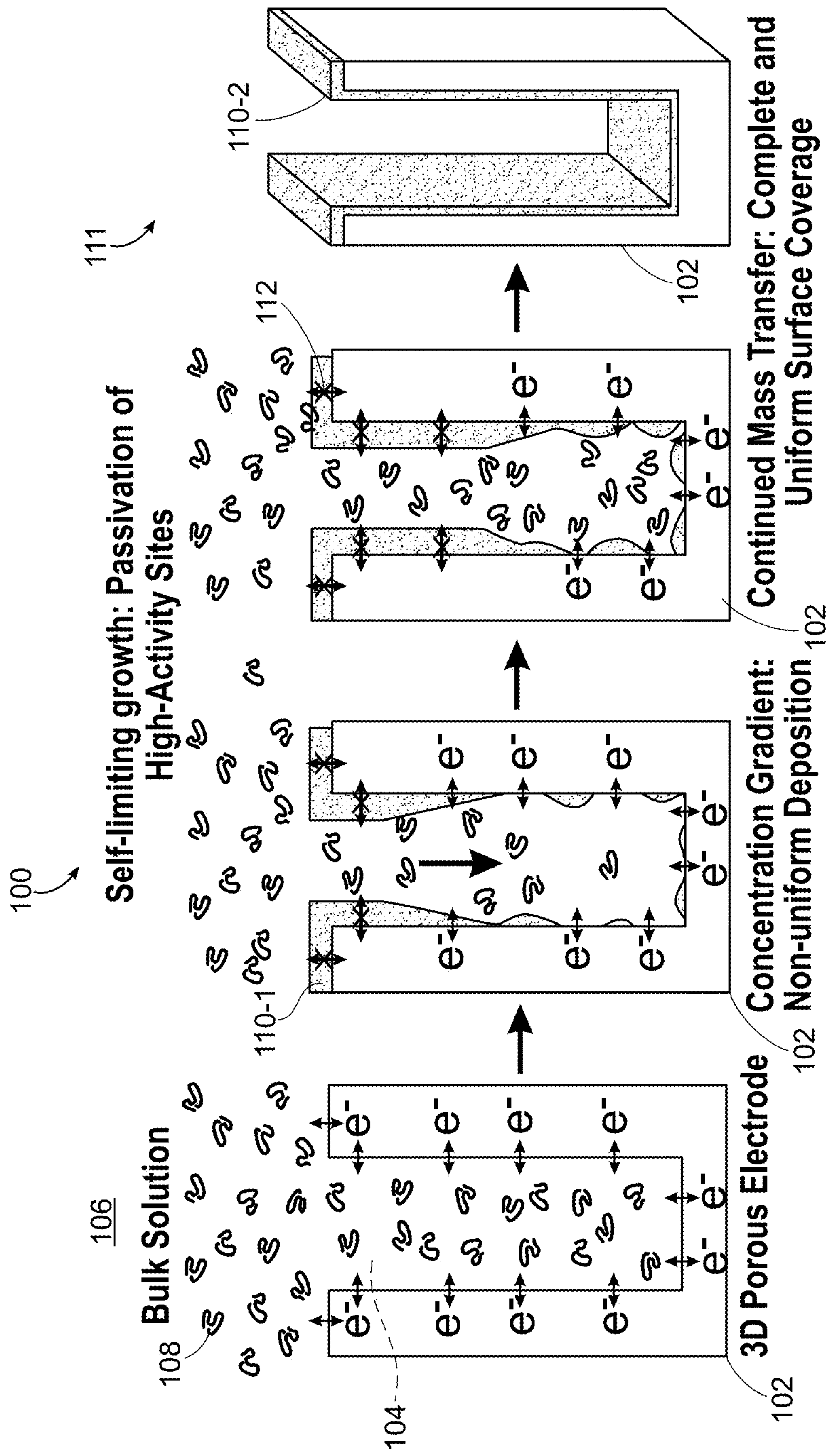
FIG. 1 illustrates schematically self-limiting electrodeposition of polymer networks as a conformal thin film on a substrate according to an example embodiment.

A description of example embodiments follows.

Coating materials with polymer thin films of tunable functionality can endow their surfaces with functionalities beyond interfacial properties as chemically distinct layers of finite thickness. Polymeric thin films are already ubiquitous and enabling in technologies such as, as non-limiting examples, electronics, structural composites, touch screens, and sunglasses. However, polymer thin film fabrication may only be well established for planar and "outside" surfaces. The prevalence of porous materials in engineering applications and the emergence of 3-D printing and non-planar device architectures may demand fabrication paradigms for polymer coatings and interphases on "interior" surfaces.

Polymer networks may be of particular interest as functional coatings and interphases due to their mechanical integrity, insolubility, and tunable physicochemical properties. Polymer networks may consist of crosslinked polymer chains whose chemical activity is defined by side groups along the chain while physical properties such as molecular permeability, thermal properties, and mechanical properties are dominated by the network's crosslink density, backbone stiffness, and polarity. If applied as ultrathin coatings, polymer networks may be useful for controlling interactions of a surface with its surrounding liquids, solutes, or gases through processes such as absorption and permeation, endowing high surface area materials with new and useful attributes. Thus, such coatings may enable tuning of not only interfacial properties but also tailoring of a near-surface environment and apparent bulk properties of porous materials.

The polymers (which can be copolymers) described herein may enable such a transformative and versatile method to fabricate uniform polymeric coatings and interphases with tunable functionalities that may lead to new discoveries and advances in applications such as energy storage, (electro)catalysis, water purification, and sensing. Hydrophobic coatings on electrocatalysts, for example, may block water and prevent electrolysis thereof but allow less polar reagents such as carbon dioxide to reach a surface of the electrocatalysts, enabling electrochemical conversion processes under aqueous conditions that may be otherwise impossible or suffer from low efficiency due to undesired factors such as hydrogen evolution. Additionally, a polymer network coating that exhibits specific absorption of reagents and co-operative/catalytic functionalities may lead to their surface enrichment and decreased activation barriers, respectively, which may be useful for providing unprecedented control over heterogeneous (electro)catalytic reactions with increased conversion rates and selectivity. However, the systems described hereinabove utilize non-planar and porous electrodes in practice, which, to date, may be almost impossible to coat with functional polymer networks of choice.

Conventional coating methods, including spin-coating, vapor deposition, and layer-by-layer assembly, may be limited in their ability to uniformly coat complex, porous, or three-dimensional substrates. These limitations may result in non-uniform coverage, incomplete coatings, and restricted material choices. Atomic layer deposition (ALD) and initiated chemical vapor deposition (iCVD) may enable conformal coatings of inorganic and some polymeric materials, respectively, but are constrained by pore size, aspect ratio, and a need for charged or specific functional groups. As such, there remains a need for a universal, scalable, and tunable method for the conformal deposition of functional polymer thin films on arbitrarily shaped conductive substrates.

To that end, described herein are polymers, methods, polymer compounds, and apparatuses that may be useful for achieving such designer coatings and interphases. According to an embodiment, a method can include Electrodeposition of Polymer Networks (EPoN) from copolymers containing electrochemically activated crosslinkers (eX-Linkers) and optionally reactive co-monomers for post-deposition functionalization. EPoN is based on the principle that formation of conformal and uniform polymer network coatings requires a surface-confined and self-limiting film-growth mechanism. EPoN may achieve this requirement by electron transfer with a surface mediating each crosslinking reaction. Electron transfer occurring at the surface may confine the polymer network growth exclusively to a nanoscale vicinity of the surface.

According to an example embodiment, small fractions of electrochemically activated crosslinkers (eX-Linker) may be introduced to polymers, e.g., copolymers, that enable surface-confined crosslinking of the copolymers. Self-limiting deposition may be achieved because a growing thin film is insulating and impermeable towards the copolymers once a critical thickness and network density is reached. Small fractions of eX-Linker may be used or required (as low as 1%), which may render the processes as described as a versatile material and fabrication platform for functional coatings. Notably, reactive copolymers may contain both the eX-linker and, optionally, reactive co-monomers in the same polymer, which may be easily modified through click chemistry with functional side groups even after electrodeposition. Tuning the electrochemically mediated crosslinking may enable controlling and tailoring of thin film properties such as thickness and permeability through electrochemical processing controls and molecular architecture.

Formation of molecular networks using electrochemically active crosslinker groups with small molecules has previously been reported by Wang et al. in a journal article entitled, "Conformal Electrodeposition of Ultrathin Polymeric Films with Tunable Properties from Dual-Functional Monomers," published in Molecular Systems Design and Engineering on Feb. 3, 2023, and incorporated herein in its entirety. While Wang et al. describe deposition of small molecules coupled to electrochemically active crosslinker groups, electrodeposition of polymers (as opposed to small molecules) is advantageous for forming conformal thin films having desirable properties. For example, polymer networks including polymers coupled together using crosslinker groups may provide larger and controllable mesh sizes, which may be useful for selective permeability of specific compounds, e.g., ions or water. Such conformal thin films comprising the polymer networks may be developed to, for example, repel water, repel oil, provide antimicrobial or antibiofouling properties, stabilize interfaces in batteries for longer lifetimes, enable ultra-fast charging thin-film batteries and high-energy supercapacitors, enhance catalytic activity in thermo- and electro-catalytic conversions, boost sorption capacity and selectivity by orders of magnitude in air and water purification, including carbon capture, enhance charge storage capabilities if redox-active, or a combination thereof.

As used herein, a conformal coating (or conformal thin film) may refer to a thin film that covers all accessible surfaces of a substrate, including within pores and complex geometries An electrochemically active crosslinker may include functional groups capable of undergoing a crosslinking or coupling reaction upon electrochemical activation (oxidation or reduction).

A multi-functional module may be a small or polymeric molecule with at least two groups that are either an electrochemically active crosslinker or a complementary coupling partner to the electrochemically active crosslinkers.

A polymer may be a molecule wherein a small change in a size of the molecule does not significantly change properties of the molecule.

A polymeric network may include a network wherein crosslinker groups of the network interspersed by polymers, for example, polymers of molecular weight greater than 500 g/mol or greater than 1000 g/mol.

A high aspect ratio pore may include a pore whose depth is much greater than its width, for example, at least 5 times greater.

Surface-confined crosslinking means that the crosslinking occurs within a microenvironment, for example, within a micrometer or less, of a surface of a substrate and is not limited to occurring right on or immediately at the surface.

FIG. 1 illustrates schematically self-limiting electrodeposition 100 of polymer networks as a conformal thin film on a substrate according to an example embodiment. A conductive substrate, for example, a 3-D porous electrode 102, may define a 3-D architecture, e.g., a pore 104. The pore 104 may be a high aspect ratio pore, as described herein. A bulk solution 106 having polymers 108 dissolved therein, the polymers 108 including a non-conductive polymer backbone and plural electrochemically active crosslinker groups (further described herein with reference to FIGS. 3A and 3B), is introduced to the conductive substrate 102. Activation of the crosslinker groups, e.g., applying an electrochemical potential using the conductive substrate (indicated by a flow of electrons $e^-$), induce crosslinking of the polymers 108 and deposition of the crosslinked polymer as a thin film 110-1 on the conductive substrate 102. The thin film may grow differentially in different regions of the pore, e.g., the thin film may grow faster at an entrance to the pore due to greater exposure to polymers (restated, a concentration gradient may result in non-uniform deposition). However, upon the thin film 110-1 reaching a desired thickness, the thin film 110-1 provides passivation 112 by preventing the electrochemically active crosslinker groups from reaching the electrode. Restated, the growing thin film may be insulating and impermeable towards the polymers upon reaching a critical thickness and network density. Preventing the polymer from reaching the conductive substrate may in turn prevent electrochemical activation of the crosslinker groups. Mass transfer may enable the polymers to come into contact with all regions of the pore, enabling conformal coverage of the surface of the conductive substrate by the thin film. A conformal thin film 110-2 formed through electrodeposition may also be of substantially uniform thickness due to the thin film being self-limited to the critical thickness for the electrochemical activation of the crosslinker groups.

According to some embodiments, an article 111 may comprise a conductive substrate, e.g. the 3-D porous electrode 102, having a non-planar, porous, or three-dimensional architecture, e.g., the pore 104. The article may further include a polymer network deposited as a conformal thin film 110-2 on surfaces of the conductive substrate 102. The polymer network can be formed from polymers, e.g., the polymers 108, including a non-conductive backbone and plural electrochemically active crosslinker groups.

Figure 2A:
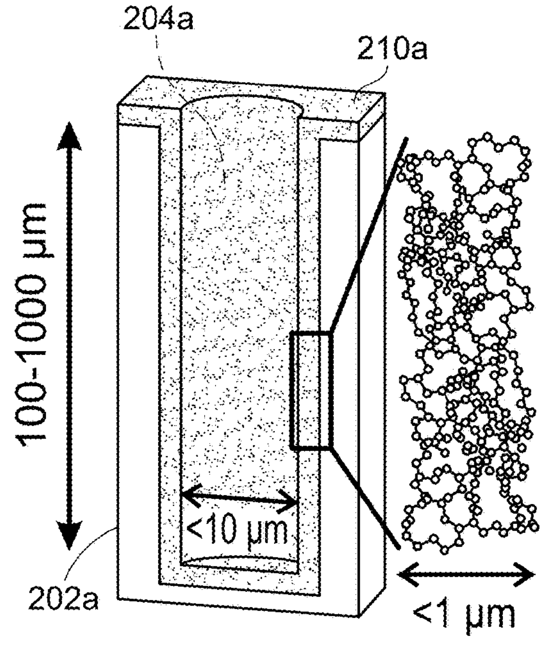
FIGS. 2A-2C illustrate example polymer thin film and substrate materials including non-planar, porous, or 3-D architectures, according to example embodiments.
Figure 2B:
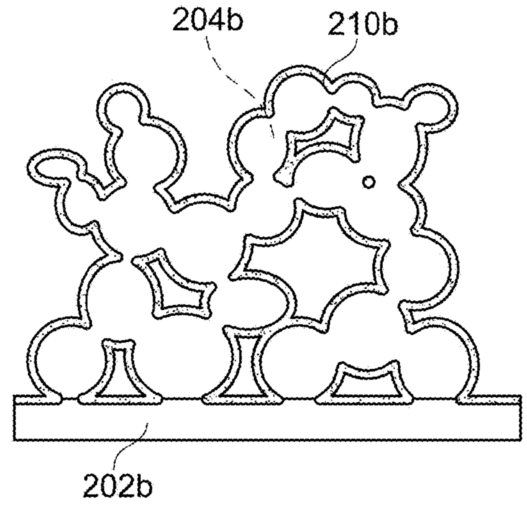
Figure 2C:
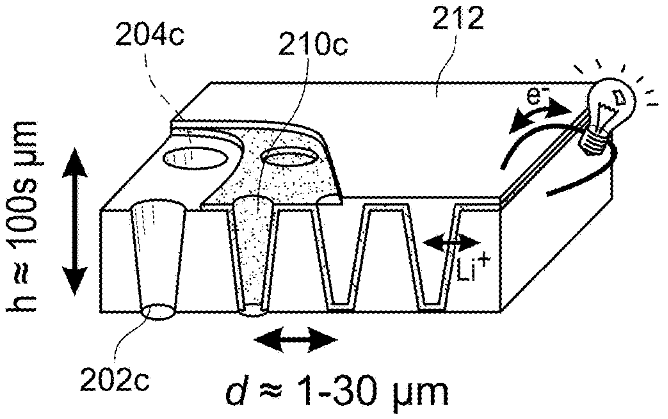

FIGS. 2A-2C illustrate example polymer thin film and substrate materials including non-planar, porous, or 3-D architectures, according to example embodiments. FIG. 2A illustrates a substrate 202*a* defining a pore 204*a* similar to the pore 104 of FIG. 1. The pore 204*a* may have a high aspect ratio, wherein a depth of the pore is significantly greater than that of a width of the pore. FIG. 2A further illustrates a conformal thin film 210*a* deposited on surfaces of the pore. The inset of FIG. 2A illustrates schematically a polymer network of the conformal thin film 210*a*. FIG. 2B illustrates substrate 202*b* defining interconnected internal volumes 204*b*, for example, a sponge-like material. The methods and polymers described herein may be useful for creating a conformal thin film 210*b* on internal surfaces of the sponge-like material 204*b*. FIG. 2C illustrates another example substate 202*c* defining pores 204*c*. Conformal thin films 210*c* deposited on the substrate 202*c* may be configured to be permeable to ions, e.g., Lithium ions ($Li^+$) in a solution 212, which may be useful for applications such as batteries. The materials of FIGS. 2A-2C may example embodiments of articles similar to the article 111 of FIG. 1.

Figure 2D:
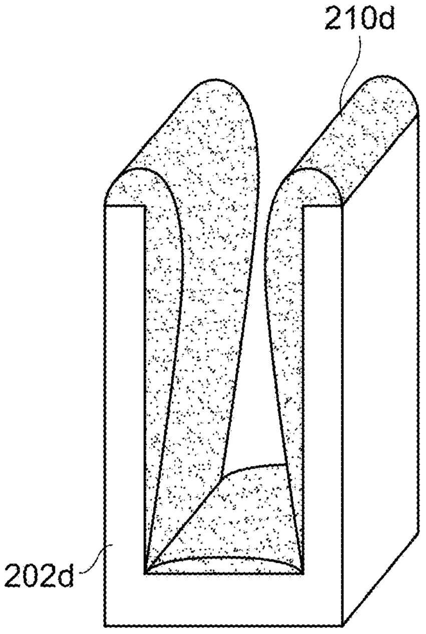
FIG. 2D illustrates an example of a substrate with a non-uniform thin film deposited thereon.

FIG. 2D illustrates an example substrate 202*d* with a non-uniform thin film 210*d* deposited thereon. Unlike the thin films 210*a*, 210*b*, 210*c* of FIGS. 2A-2C, the thin film 210*d* may include substantially variable thicknesses. For example, thin films generated using conventional deposition techniques, such as spin-coating, may be limited in their ability to uniformly coat a surface with complex 3-D architecture. The polymers may preferentially deposit in regions, for example, an entrance of a pore defined by the substrate 202*d*.

As described herein, a polymer for electrodeposition of a conformal thin film may include a polymer backbone (or a polymer chain), which may be non-conductive, and electrochemically active crosslinker groups. When oxidized or reduced, the electrochemically active crosslinker groups may undergo inter-molecular coupling reactions in a one-component or two-component reaction. These electrochemical crosslinkers may be attached to polymers at fractions as low as one electrochemical crosslinker per polymer chain, or more. The electrochemical crosslinkers may be attached to an end of the polymer chains ("end groups"), as co-monomers or side groups along the polymer chain ("copolymers"), or as blocks along the polymer chain ("block copolymers") at any non-zero fraction. The rest of the polymer, e.g., the polymer backbone, may be of any composition and functionality.

Figure 3A:
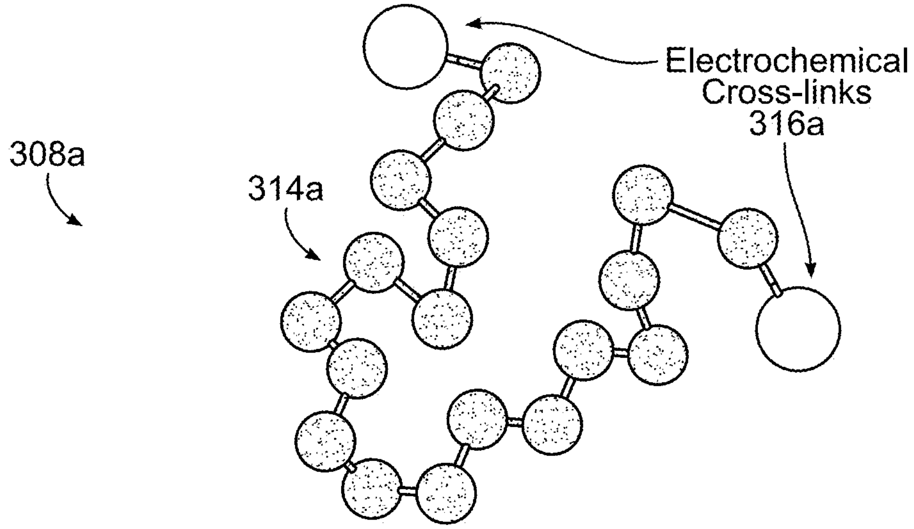
FIG. 3A illustrates schematically an example embodiment of a polymer suitable for electrodeposition as a conformal thin film.

FIG. 3A illustrates schematically an example embodiment of a polymer 308*a* suitable for electrodeposition as a conformal thin film, e.g., the conformal thin film 110-2. The polymer 308*a* includes a non-conductive polymer backbone 314*a*, which may be selected for based on a desired functionality, e.g., ion conductivity or sorption, of the conformal thin film. The polymer 308*a* further includes electrochemically active crosslinker groups 314*a* attached to the polymer backbone 314*a* as end groups.

Figure 3B:
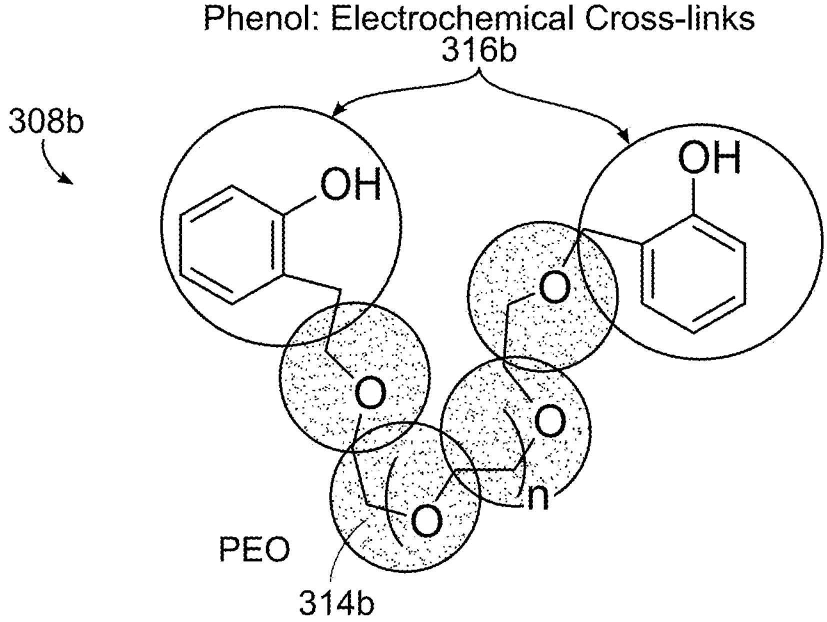
FIG. 3B illustrates an example embodiment of a polymer based on the polymer schematically illustrated in FIG. 3A.

FIG. 3B illustrates an example embodiment of a polymer 308*b* based on the polymer 308*a* schematically illustrated in FIG. 3A. The polymer 308*b* includes a polymer backbone 314*b* comprising of polyethylene oxide (PEO), which may be useful for forming a polymer network supporting ion conductivity. The polymer 308*b* further includes phenol groups as electrochemically active crosslinker groups 316*b*. Further information regarding activation of the electrochemically active crosslinker groups is described herein with reference to FIG. 6.

Figure 3C:
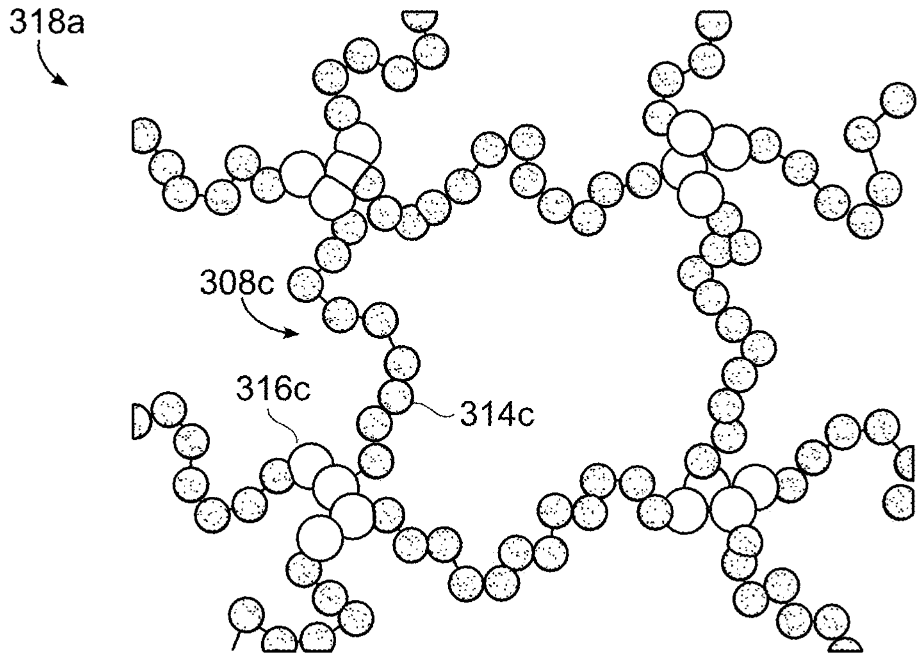
FIG. 3C illustrates schematically an example embodiment of a polymer network formed using the polymer of FIG. 3A.

FIG. 3C illustrates schematically an example embodiment of a polymer network 318*a* formed using the polymer 308*a* of FIG. 3A. Electrochemically active crosslinker groups 316*c*, upon activation by oxidation or reduction, may form crosslinks with polymers 308*c*, e.g., the electrochemically active crosslinker groups of other polymers, or to complementary polymers or complementary molecules. The polymer network 318*a* of FIG. 3C includes the electrochemically active crosslinker groups 316*c*, which are attached as end groups of a polymer backbone 314*c* of the polymers 308*c*, crosslinked to other electrochemically active crosslinker groups of other polymers. The polymer network 316*a* may deposit and aggregate at a surface of a substrate to form a thin film, for example, the thin film 110-2 described herein with reference to FIG. 1.

Figure 3D:
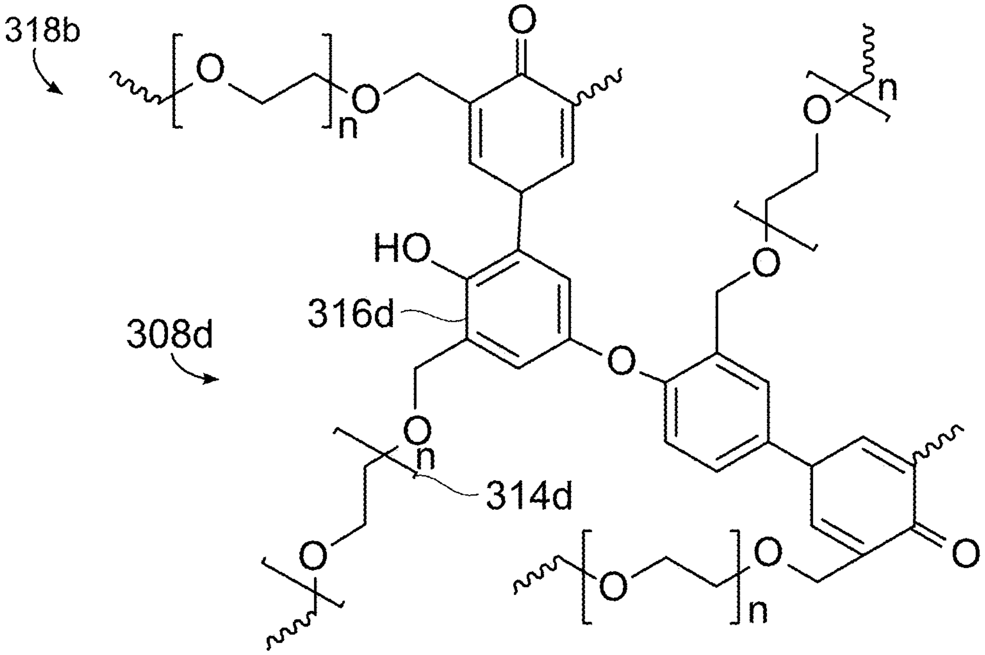
FIG. 3D illustrates an example embodiment of a polymer network based on the polymer network schematically illustrated in FIG. 3C.

FIG. 3D illustrates an example embodiment of a polymer network 318*b* based on the polymer network 318*a* schematically illustrated in FIG. 3C. The polymer network 318*b* includes polymers 308*d* comprising a PEO polymer backbone 314*d* and phenol groups as electrochemically active crosslinker groups 316*d*, which is similar to the polymer 308*b* of FIG. 3B. The electrochemically activated phenol groups form inter-molecular cross-links to form the polymer network.

Figure 4:
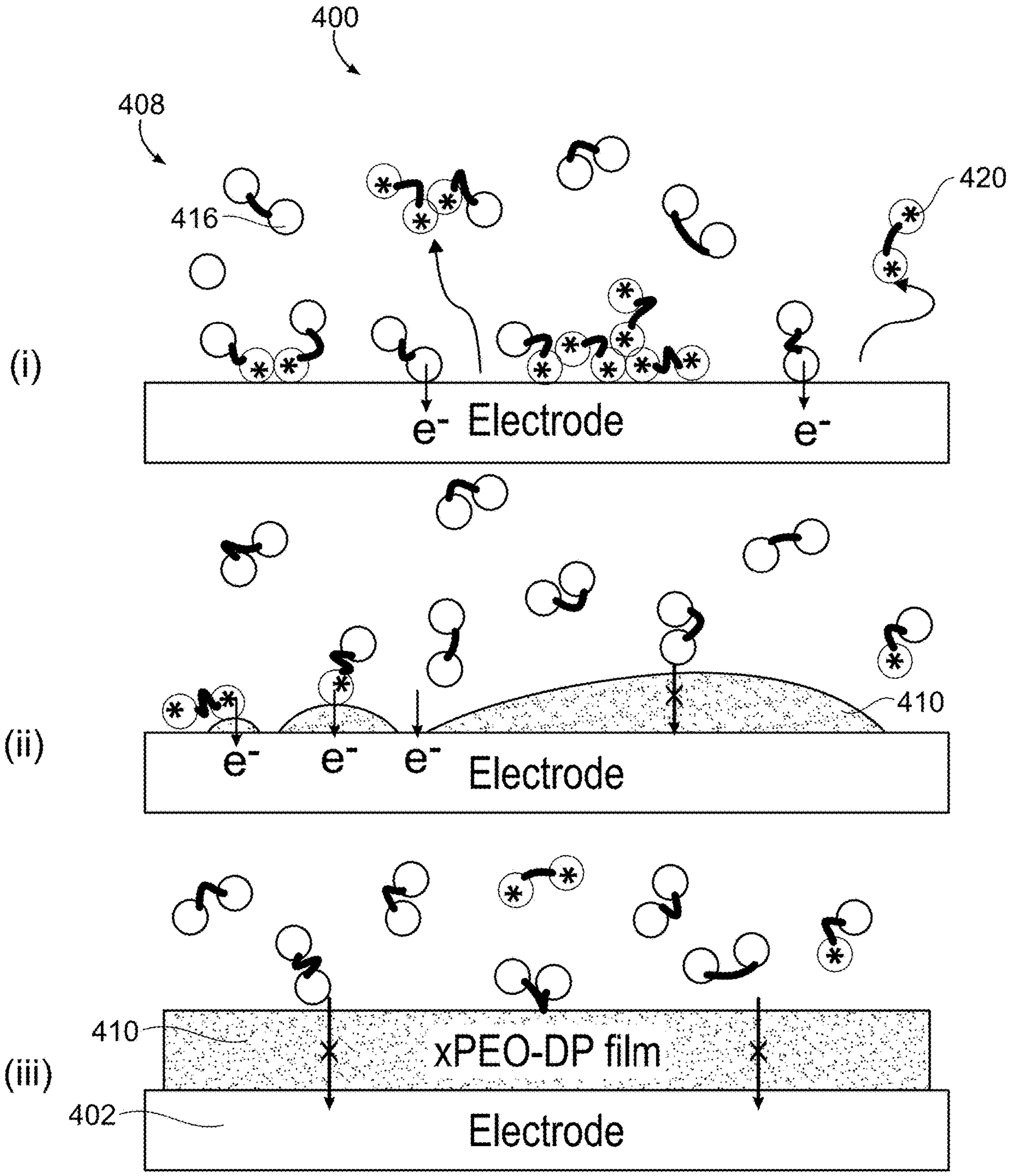
FIG. 4 illustrates schematically a method of electrodeposition of a polymer as a conformal thin film on a conductive substrate according to an example embodiment.

FIG. 4 illustrates schematically a method of electrodeposition 400 of a polymer 408 as a conformal thin film 410 on a conductive substrate 402, according to an example embodiment. The method can include (i) dissolving a polymer 408, which may be similar to the polymer 308*a*, 308*b* described herein with reference to FIGS. 3A and 3B, in an electrolytic solution to form a deposition solution. The method further includes immersing the conductive substrate 402, e.g., an electrode, in the deposition solution and applying an electrical potential to the conductive substrate 402 to induce electrochemical activation of crosslinker groups 416 of the polymers 408 at a surface of the conductive substrate 402. Activated crosslinker groups 420 may crosslink with other crosslinker groups (ii) to form the conformal thin film 402 (which may be a polymer network) at the surface of the conductive substrate 410. The crosslinking of the activated crosslinker groups 420 (*iii*) may be surface-confined due to activation of the electrochemically active crosslinker groups 416 occurring near the surface of the conductive substrate 402. Deposition of the conformal thin film 410 up to a critical thickness may thus be self-limiting.

Figure 5:
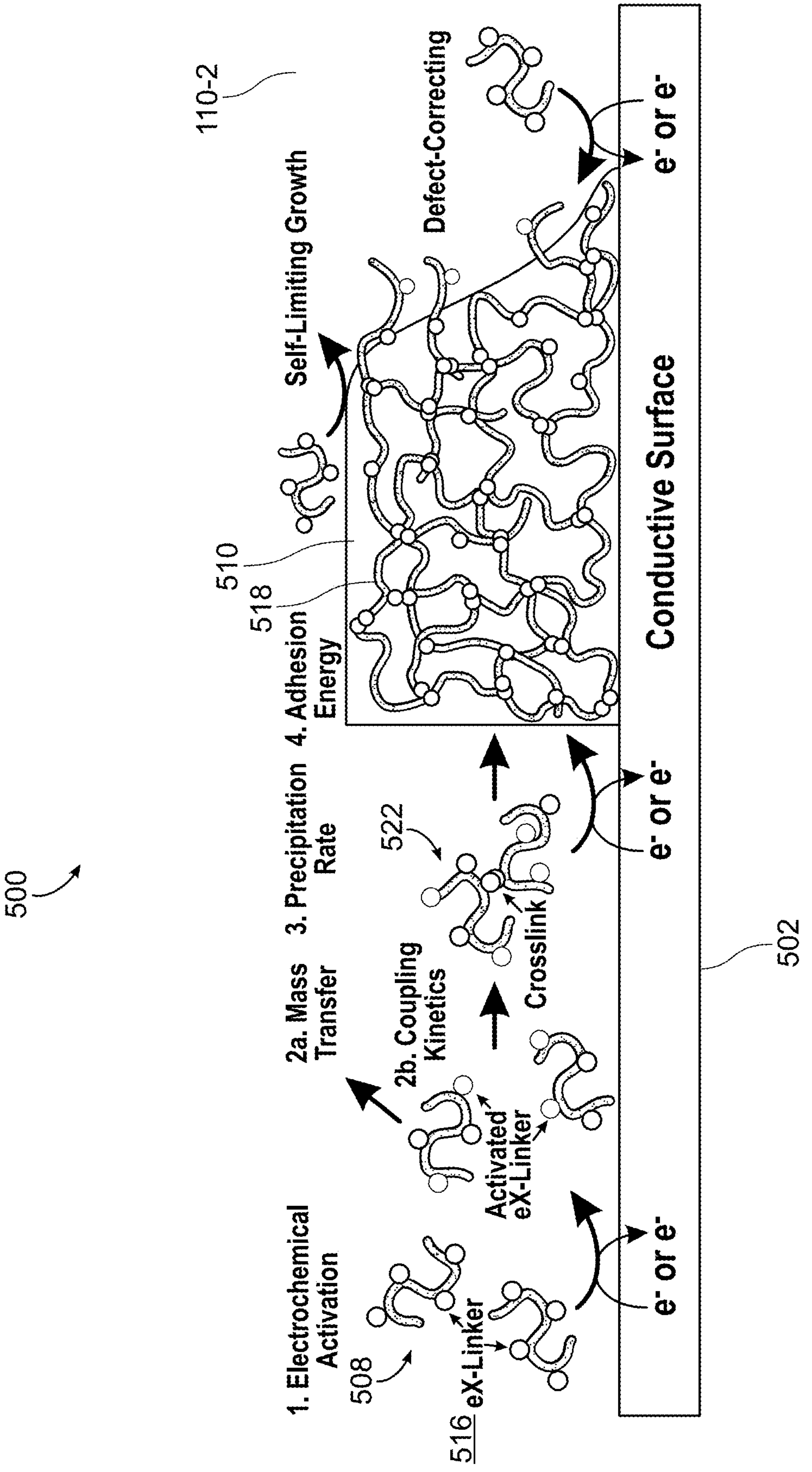
FIG. 5 illustrates schematically a mechanism of forming a conformal thin film on a conductive substrate, according to an example embodiment.

FIG. 5 illustrates schematically a mechanism of forming 500 a conformal thin film 510 on a conductive substrate 502, according to an example embodiment. Film growth in EPoN may follow multiple distinct but interrelated steps. Crosslinker groups (eX-Linkers) 516 on copolymers 508 may be activated by electron transfer [Step 1—Electrochemical Activation] at a surface of a conductive substrate 502, which may be followed by coupling of the ex-Linkers 516 to dimers 522 and crosslinking to form higher order oligomers (for example, in the thin film 510) upon continued surface-confined electrochemical activation [Step 2*a*-Mass Transfer and Step 2*b*-Coupling Kinetics]. Once a sufficiently large size of a crosslinked polymer network 518 is reached near the surface, the polymer network 518 may deposit onto the surface by van-der-Walls adhesion as the conformal thin film 510 [Step 3—Precipitation Rate and Step 4—Adhesion Energy]. The deposited aggregates may grow and densify through continued addition of more copolymers 508 until further polymer permeation through the surface-adhered polymer network 518 or film 510 is blocked and electrochemical passivation is achieved. Continued deposition and densification may correct defects in regions where, for example, the film 510 is thinner and may be under a threshold for preventing activation of the crosslinker groups 516.

Figure 6:
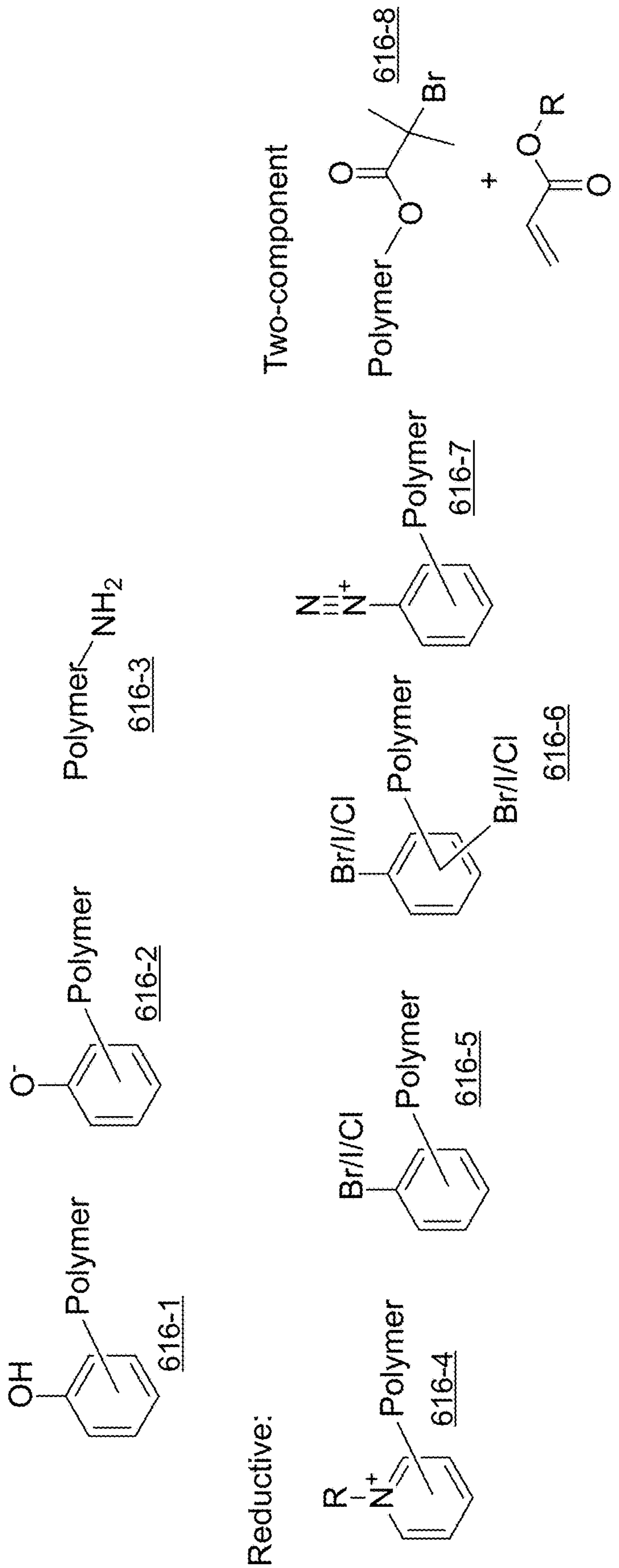
FIG. 6 illustrates example electrochemically active crosslinker groups of a polymer for deposition as a conformal thin film, according to example embodiments.

FIG. 6 illustrates example electrochemically active crosslinker groups of a polymer for deposition as a conformal thin film, according to example embodiments. The crosslinker groups may be active through oxidation (oxidative groups) or through reduction (reductive groups). Example oxidative groups may include phenols 616-1, phenolates 616-2, or amines 616-3, or derivatives or precursors thereof. Example reductive groups may include pyridines 616-4, phenyl halogenides 616-5 (including phenyl di-halogenides 616-6 or phenyl tri-halogenides), phenyl diazoniums 616-7, acrylates 616-8, or precursors or derivatives thereof. Examples provided are not intended to be an exhaustive list and one of ordinary skill in the art may reasonably incorporate other crosslinker groups that may be electrochemically activated. Two component systems, which may include the acrylates and alkyl halogenides are further described herein with reference to FIG. 34 and FIG. 35. Lines through a center of a benzyl ring indicate optional connectivity to a number of ring carbons.

Figure 7:
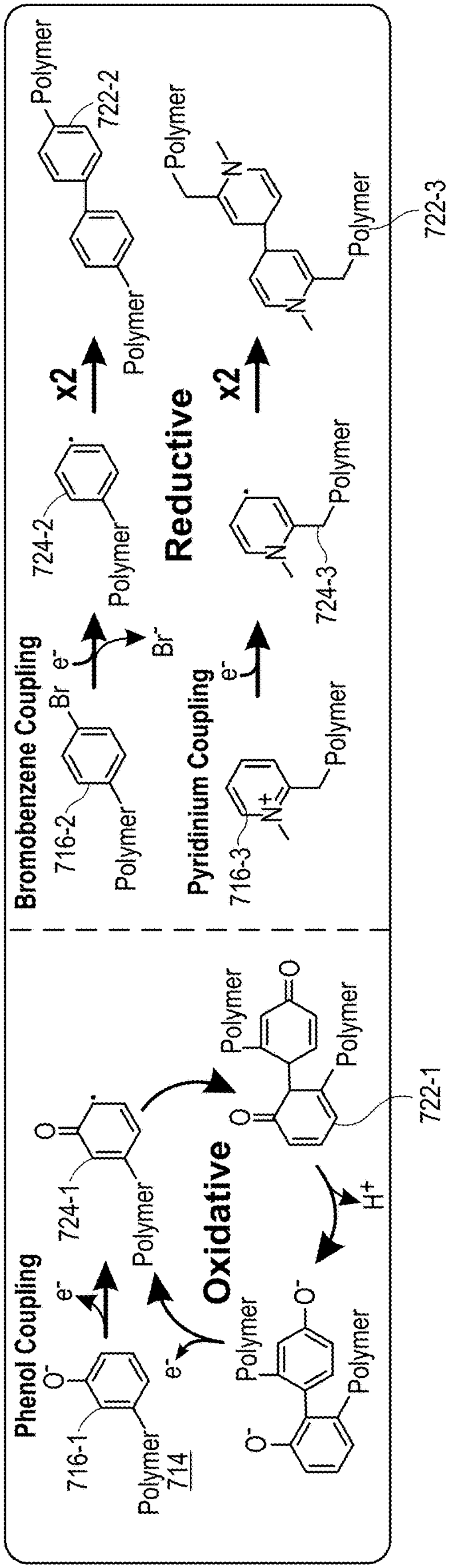
FIG. 7 illustrates example mechanisms of electrochemical coupling reactions of electrochemically active crosslinker groups.

FIG. 7 illustrates example mechanisms of chemical coupling reactions of electrochemically active crosslinker groups. A phenol group 716-1, as described herein with reference to FIG. 6, may be activated via oxidation. A phenol radical 724-1 subsequently couple to, for example, another phenol group to form a dimer 722-1. Each respective phenol group may be attached to, e.g., covalently bonded to, a polymer 714 and the dimer further comprises the respective polymers. The dimers 722-1 may further undergo oxidation and coupling reactions. Bromobenzene 716-2 and pyridinium 716-3, which may similarly be bonded to respective polymers, may be activated via reduction. The respective bromobenzene radical 724-2 and pyridinium radical 724-3 may undergo crosslinking with other crosslinker groups to form respective dimers 722-2, 722-3. In some embodiments, different crosslinker groups may be used on a given polymer.

Figure 8:
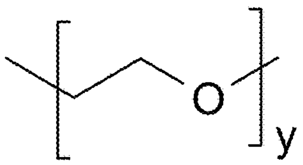
FIG. 8 illustrates example polymers suitable to form a polymer backbone of a polymer for deposition as a conformal thin film, according to example embodiments.
Figure 8:
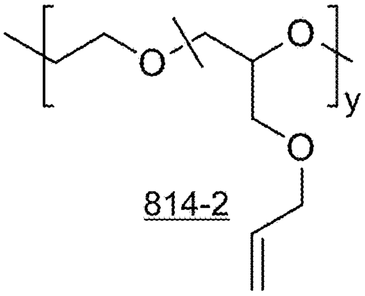
Figure 8:
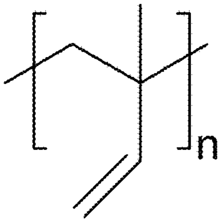
Figure 8:
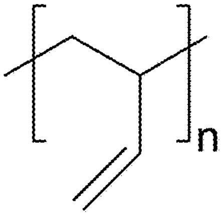
Figure 8:
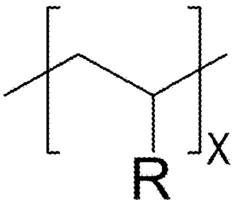
Figure 8:
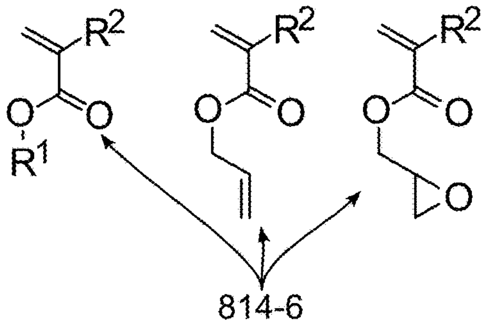
Figure 8:
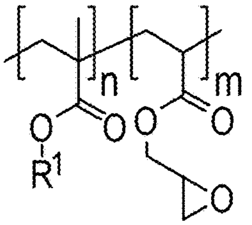
Figure 8:
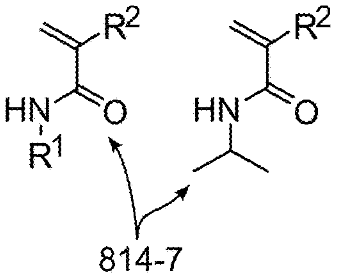

FIG. 8 illustrates example polymers suitable to form a polymer backbone of a polymer for deposition as a conformal thin film, according to an example embodiment. The polymers may include poly(ethers), for example, poly(ethylene oxide) 814-1, poly(ethylene glycol), or poly(propylene oxide) 814-2. The polymers may further include poly (olefines), for example, poly(isoprene) 814-3 and poly (butadiene) 814-4. The polymers may still further include poly(acrylates) 814-5, poly(methacrylates) 814-6, or poly (acrylamides) 814-7. The polymers may be copolymers or block polymers containing one or more of the polymers described hereinabove. Examples provided are not intended to be an exhaustive list and one of ordinary skill in the art may reasonably incorporate other polymers as part of the polymer backbone. The polymers may be synthesized with free radical polymerization (FRP) or similar methods, as well as controlled radical, catalytic, and ionic methods, rendering them accessible, scalable, and economic, as well as tailorable to application needs. The polymers may further include derivatives or precursors of those described hereinabove, or combinations thereof.

Polymers, which may include copolymers, may allow for incorporation of eX-Linkers at tunable fractions. Suitable eX-Linkers may form highly reactive intermediates after oxidation or reduction (activated eX-Linkers), as described herein with reference to FIG. 7, such as organic radicals for fast coupling kinetics, which may ensure successful electrodeposition of polymer networks. Electrochemically mediated coupling reactions using the crosslinkers of FIG. 7 may be previously described, but use of the crosslinkers for surface-confined EPoN is being disclosed herein.

Figure 9:
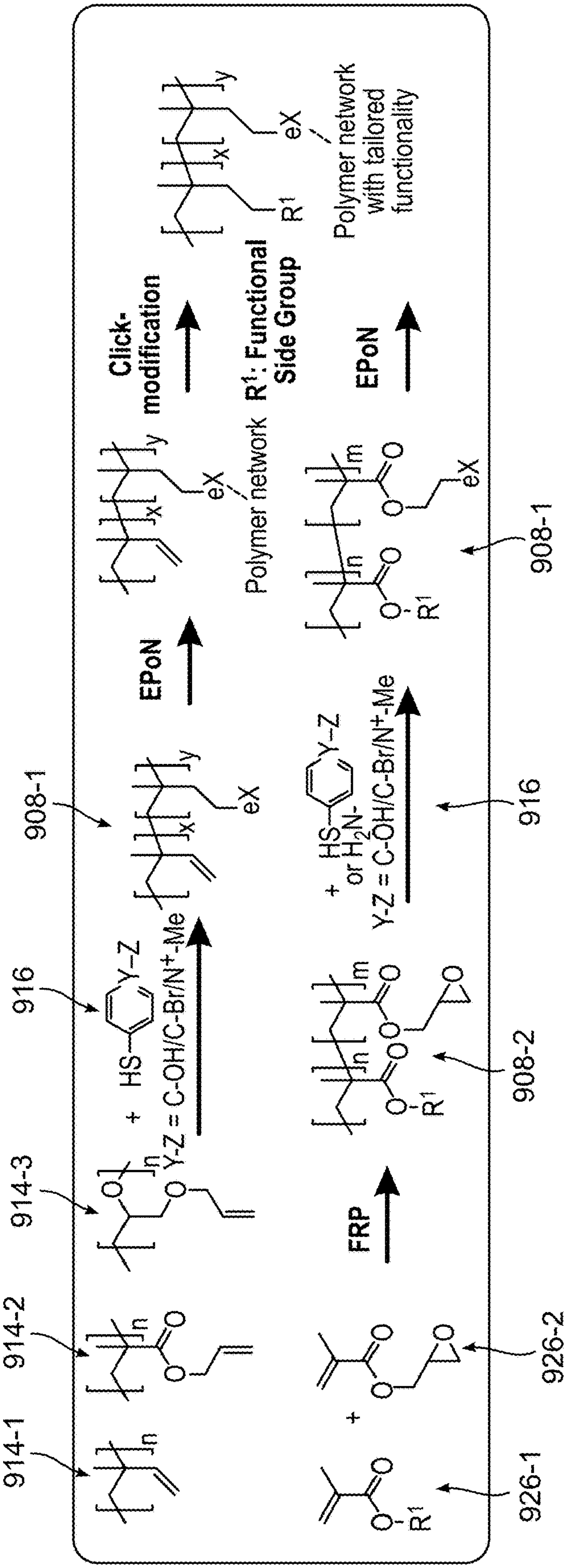
FIG. 9 illustrates schematically example chemical mechanisms of synthesizing, electrodepositing, and functionalizing reactive polymers methacrylate copolymers (top) containing the reactive glycidyl methacrylate (GMA) co-monomers (bottom) for eX-Linker attachment and post-deposition functionalization, according to an example embodiment.

FIG. 9 illustrates schematically example chemical mechanisms of synthesizing, electrodepositing, and functionalizing reactive methacrylate copolymers 914-1, 914-2, 914-3 (top) containing the reactive glycidyl methacrylate (GMA) co-monomers 926-1, 926-2 (bottom) for eX-Linker attachment and post-deposition functionalization, according to an example embodiment. Copolymers 908 with controlled eX-Linker fractions may be obtained from: (1, FIG. 9 top) reactive homo-, co-, or block polymers that are deterministically functionalized with a controlled fraction (1-100%) of eX-Linkers 916 after polymerization or (2, FIG. 9 bottom) random or controlled copolymerization of functional monomers, e.g., the co-monomers 926-1, 926-2 to from copolymer 908-2, with the eX-Linker co-monomers 916 that are coupled before or after polymerization (e.g., FRP).

Examples of attachment reactions of eX-Linkers to reactive (co)polymers or monomers may include: (1) Thiol-epoxy addition: for example, addition of 2-, 3-, or 4-mercaptophenol or 2- or 4-bromothiophenol to poly(glycidyl methacrylate) (PGMA) (FIG. 9 bottom); (2) Amine-epoxy addition: for example, addition of 2- or 4-aminophenol, 2-(aminomethyl)phenol, or 3,5-Dibromo-4-methylaniline to poly(glycidyl methacrylate) (PGMA) (FIG. 9 bottom); or (3) Thiol-ene addition: for example, the addition of 2-, 3-, or 4-mercaptophenol or 2- or 4-bromothiophenol to poly(isoprene) (PI), poly(allyl methacrylate) (PAMA), or poly(allyl glycidyl ether) (PAGE) (FIG. 9 top).

Figure 10A:
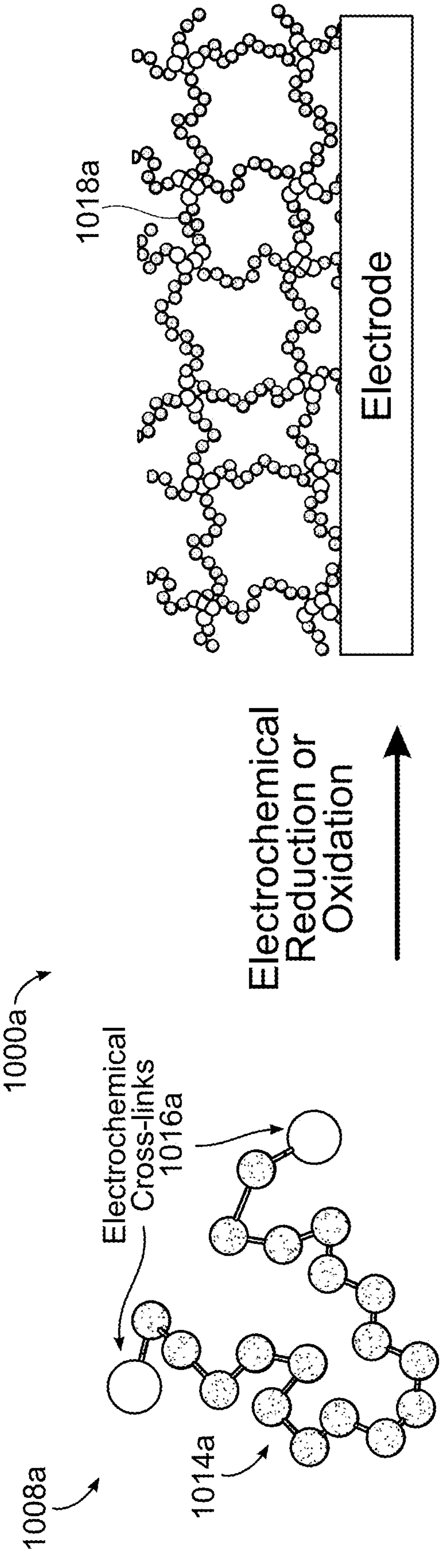
FIGS. 10A-10C illustrate example paradigms for electrodeposition of a conformal thin film on a conductive substrate.
Figure 10B:
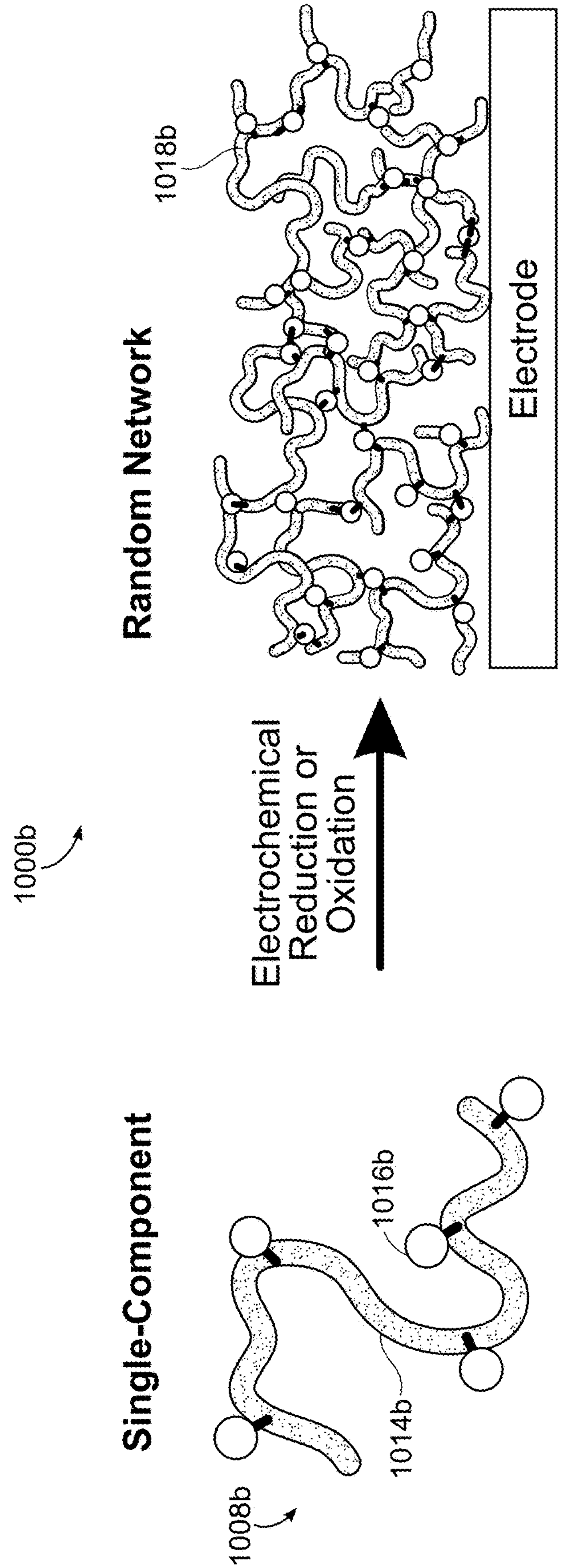
Figure 10C:
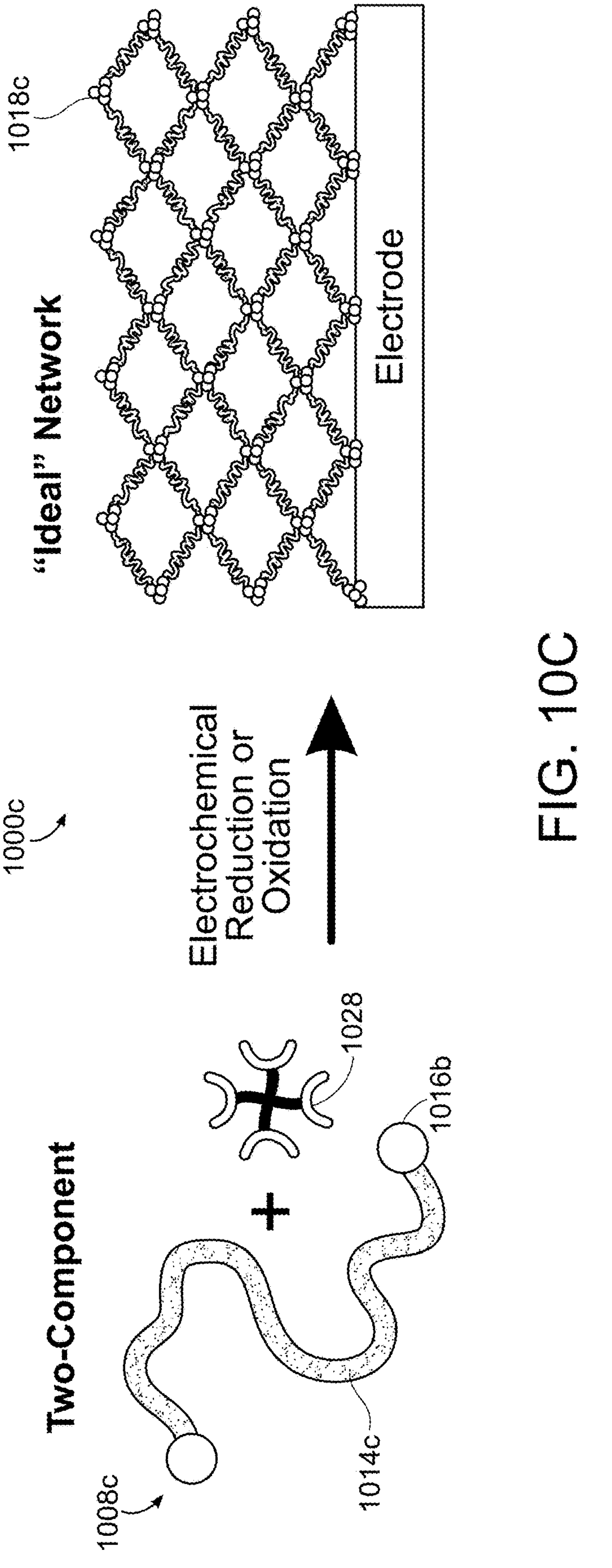

FIGS. 10A-10C illustrates example paradigms for electrodeposition of a conformal thin film on a conductive substrate. As illustrated, various combinations and architectures of polymers and electrochemically active crosslinker groups may be used.

FIG. 10A illustrates an example paradigm that may be similar to the polymer 308 of FIG. 3A, wherein a polymer 1008*a* includes a polymer backbone 1014*a* and electrochemically active crosslinker groups 1016*a* attached to the polymer backbone 1014*a* as end groups. Upon activation (electrochemical reduction or oxidation), the end groups crosslink to form a polymer network 1018*a*.

FIG. 10B illustrates an example paradigm 1000*b* wherein a polymer 1008*b* includes a polymer backbone 1014*b* and electrochemically active crosslinker groups 1016*b* attached to the polymer backbone 1014*b* as co-monomers or blocks along the polymer backbone 1014*b* or chain. In such a paradigm 1000*b*, the polymer 1008*b* may comprise further binding points, which may be useful for tuning properties of a deposited thin film or polymer network 1018*b*, for example, mesh size.

FIG. 10C illustrates an example paradigm 1000*c* wherein a polymer 1008*c*, which includes a polymer backbone 1014*c* and electrochemically active crosslinker groups 1016*c* attached thereon, is configured to couple with a complementary crosslinker 1028 or complementary polymer. A deposited polymer network 1018*c* may comprise interconnected polymers 1008*c* and complementary crosslinkers/polymers 1028.

The paradigms of FIGS. 10A-10C will be further described with reference to the example embodiments provided hereinbelow. While specific embodiments of polymers, crosslinkers, and methods for electrodeposition of electrodeposition of conformal thin films are described herein, the example embodiments are not limiting and it should be evident to one of ordinary skill in the art other polymers and crosslinkers may be applicable.

Examples of suitable electrochemical crosslinkers are phenol or phenolate (oxidative, one-component, demonstrated), pyridinium (reductive, one-component, demonstrated), electron-poor alkenes+organic halogenide (reductive, two-component, demonstrated). To form conformal coatings, the polymers containing electrochemical crosslinkers are dissolved in electrolytic solutions (with a complementary polymer/crosslinker for two-component systems), and the conductive substrate of arbitrary shape (porous, non-planar, 3-D) is immersed in the solution. Upon application of a sufficiently positive (oxidative) or negative (reductive) electrical potential (voltage) to the to-be-coated material, the conformal polymer film deposits within minutes on all accessible surface of the conductive substrate material. This procedure resembles standard electrodeposition, and can be done in potentiostatic, galvanostatic, or varying potential mode. Demonstrated embodiments include at least poly(ethylene oxide), a standard battery electrolyte in lithium polymer batteries, and poly(glycidyl methacrylate).

Example 1—Electrodeposition of Ion-Conducting Polyether Networks as Conformal and Uniform Ultrathin Polymer Electrolyte Coatings Example polymers, compositions, methods, and apparatuses including electrodeposition of a conformal thin film on a conductive substrate have been described in an article by Wenlu Wang et al., entitled, "Electrodeposition of Polymer Networks as Conformal and Uniform Ultrathin Coatings." Adv. Mater. 2024 November; 36(48): e2409826.doi: 10.1002/adma.202409826. The article includes Supplemental Materials available online at: https://advanced.onlinelibrary.wiley.com/action/downloadSupplement?doi=10.1002%2Fadma.20 2409826&file=adma202409826-sup-0001-SuppMat.pdf. The entire teachings of the article and Supplemental Materials are incorporated herein by reference.

Polymers, thin films, and methods described herein may be similar at least with respect to the paradigm 1000*a* described herein with reference to FIG. 10A.

Ultrathin interphases and coatings may be widespread in both natural and synthetic systems, and may play an outsized role by controlling mass and energy transfer between segregated phases, defining surface properties, providing strength, and protecting materials that are otherwise unstable or incompatible with each other. For example, biological cell membranes that are less than 10 nm thick may control the transport between the extracellular space and the cytoplasm. Synthetic submicron thin films on planar substrates have been employed for decades as gate dielectrics in field-effect transistors that have enabled our modern society, though emerging transistor technologies may demand non-planar, multi-layer architectures. The properties of especially porous materials may be determined by their large surface areas and interphases with a profound and enabling effect in diverse fields like catalysis, photonics, energy storage or conversion, and separation technologies. In batteries, for example, the solid electrolyte interphase (SEI) may ensure ionic connectivity between the ion-containing electrolyte and the electrochemically active electrode, while simultaneously providing electrochemical stability of the interface through electronic insulation. Thus, creating ultrathin interphases with controlled ionic and molecular permeability as well as chemical activity may be helpful for exploring unprecedented co-operative phenomena in selective sorption and separation, (electro)catalysis, or energy storage and, conversion. While some interphases such as the SEI may form naturally, challenges may remain in the deterministic coating of non-planar substrates and porous materials with submicron interphases and precise control over their physico-chemical properties.

Polymer networks may offer both a large degree of chemical tunability through monomer functionality and tailorable physical properties through network topology and backbone constituents, but their conformal deposition on non-planar surfaces or inside porous materials presents fundamental challenges. On planar substrates, uniform thin films of polymer networks may be easily obtained by spin-coating solutions of (macro)molecular precursors and subsequent thermal or photo-induced crosslinking. On non-planar surfaces and porous materials, deposition techniques for uniform sub-micron thin films may require more sophisticated methods: inorganic coatings are obtained from gas/vapor deposition methods, including chemical vapor deposition (CVD) for architectures with low aspect ratios or atomic layer deposition (ALD) for larger aspect ratios. The emergence of initiated or oxidative CVD (i/o-CVD) has recently enabled the deposition of ultrathin conformal polymeric coatings from a variety of monomers, though only on non-planar substrates with low aspect ratios. This technique's limited uniformity on three-dimensional (3-D) features may stem from the non-self-limiting CVD deposition mechanism, resulting in thicker coatings on the outside of features and thinner ones at less exposed sites due to differences in accessibility and mass transfer. Additionally, vapor phase depositions may require sensitive vacuum equipment, limiting their accessibility and widespread use. For precision polymeric coatings with high conformality, layer-by-layer (LbL) deposition of sequential alternating layers of positively and negatively charged polyelectrolytes, or hydrogen-bond donors and acceptors, has been widely and successfully used on polar surfaces. While the LbL method may offer unmatched uniformity and tunability of film thickness combined with ease of application, the deposition method may be limited to polymers with high charge density or protonic activity. This coupling of deposition mechanism and polymer functionality renders the LbL coating approach prohibitive for depositing most polymers. Electrochemical polymerization methods may appear like a reasonable approach to coat non-planar conductive materials since, in principle, the associated charge transfer is surface confined. However, electropolymerization may be restricted to electrochemically active monomers and suffers non-uniformities due to inhomogeneous mass transfer to various surface sites, similar to i/o-CVD, while electrochemically initiated polymerization leads to material formation and precipitation in the bulk solution due to continued and unrestricted chain-growth polymerization and chain transfer.

Described herein are end-group-mediated Electrodeposition of Polymer Networks (EPoN) as a widely applicable method to synthesize ultrathin, functional coatings that may be uniform and conformal on planar, non-planar, and porous conductive materials alike. In EPoN, pre-synthesized insulating polymers of arbitrary chemical functionality, backbone type, molecular weight and architecture may be functionalized with electrochemical crosslinkers (eX-linker) at their chain ends. The eX-linkers may be designed so that each coupling event requires a charge transfer, preventing runaway reactions and material deposition outside the immediate vicinity of the charge transfer surface. This feature of EPoN may nano-confine the end-group-mediated network formation and parallel thin-film deposition exclusively to the material surface where charge transfer happens. Importantly, the insulating nature of the depositing polymer network and its eventual impermeability to further macromers may render the deposition self-limiting, leading to uniform and conformal coatings on substrates of arbitrary shapes over large areas. Example embodiments of EPoN described herein may include of poly(ethylene oxide) (PEO) with various architectures and molecular weights (1-20 kg mol 1).

Dual-Function Polymer Design Allows for Self-Limiting Electrodeposition

Conceptually, EPoN may utilize a dual-function polymer design that combines the electro-coupling chemistry of an eX-Linker end group with the functionality of the chosen polymer core motif, which determines the post-deposition properties of the thin film.

Figure 11A:
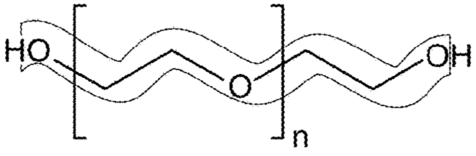
FIG. 11A illustrates an example non-conductive polymer backbone that can form part of a polymer for deposition as a conformal thin film, according to an example embodiment.

FIG. 11A illustrates an example non-conductive polymer backbone 1114*a* that may form part of a polymer for deposition as a conformal thin film, according to an example embodiment. The polymer backbone, poly(ethylene oxide), may be similar to the polymer backbone of FIG. 3B and may include repeating ethylene blocks.

Figure 11B:
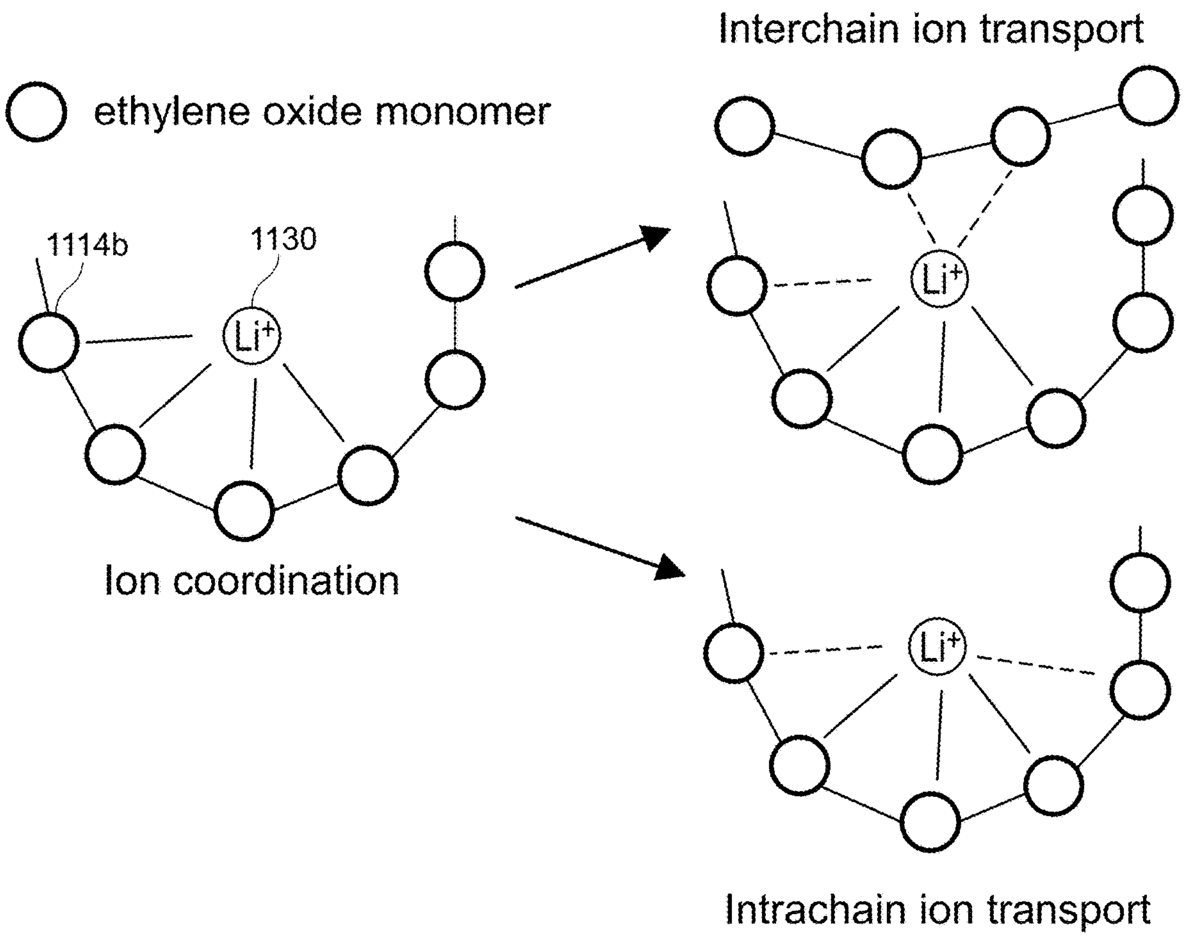
FIG. 11B illustrates schematically a mechanism for ion conduction by a polymer such as the polymer of FIG. 11A.

FIG. 11B illustrates schematically a mechanism for ion conduction by a polymer such as the polymer 1114*a* of FIG. 11A. PEO 1114*b* may be capable of ion conduction based on coordination of ether oxygen atoms (EO, indicated as circles) with cations 1130, e.g., Li+. The coordination is indicated by the lines between the EO and Li+. This may enable interchain transport of Li+, for example, between a mesh formed by polymers of a polymer network.

Figure 12:
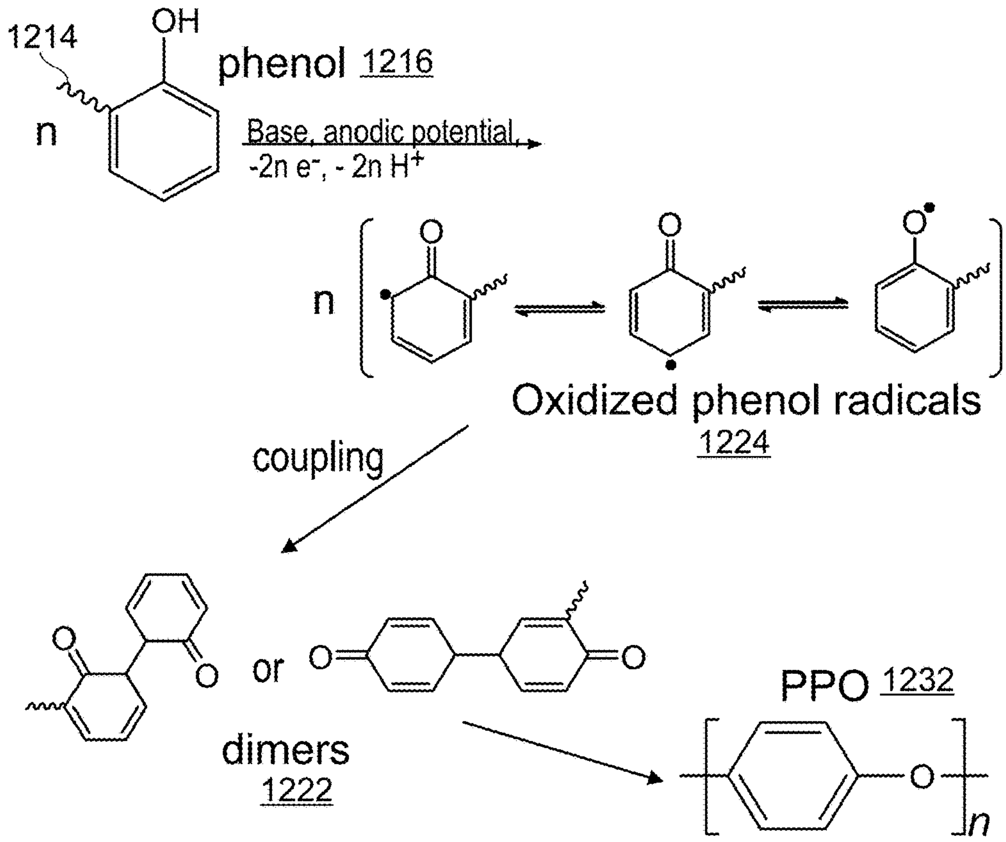
FIG. 12 illustrates an example electrochemically active crosslinker group that can form part of a polymer for deposition as a conformal thin film, according to an example embodiment.

FIG. 12 illustrates an example electrochemically active crosslinker group that can form part of a polymer for deposition as a conformal thin film, according to an example embodiment. An example electrochemically active crosslinker group may include a phenol group 1216. The phenol group 1216 may be covalently attached to a polymer backbone 1214, for example, at a non-alcohol carbon of the ring carbons. The phenol group 1216 may be electrochemically activated by under to form phenol radicals 1224. The phenol radicals may subsequently couple or crosslink to other crosslinker groups, e.g., other phenol groups, to form phenol-phenol complexes, e.g., dimers 1222. Further coupling of phenol groups may occur, which may result in generation of poly(phenylene oxide) (PPO) 1232.

Phenol is well known to undergo oxidative coupling and crosslinking at electrode surfaces upon application of an anodic potential, resulting in the formation of an ultrathin (<10 nm), insulating, and impermeable coating of poly (phenylene oxide). As such, electrochemical coupling of a polymer backbone to a phenol group may yield polymer network formation and deposition when phenol is employed as the polymer end group. According to an example embodiment, formation of a self-limiting film growth mechanism may involve four steps, a process which may be similar to the electrodeposition described with reference to FIGS. 4 and 5: (1) The phenolate end groups of the macromer undergo electron transfer at a conductive substrate to form phenoxy radicals, which (2) couple to dimers and higher order oligomers upon continued surface-confined electrochemical oxidation. (3) The crosslinked polymer network precipitates and deposits onto the substrate surface by van-der-Walls adhesion. (4) The film grows and densifies through the addition of more macromers until further polymer permeation through the surface-adhered network is blocked. Following the EPoN mechanism described hereinabove, any polymers with oxidized phenoxy radical end groups that diffuse away from the surface and do not incorporate into the thin film also may not couple further, which may prevent their precipitation from the bulk solution or deposition at already passivated sites, collectively rendering EPoN truly surface confined.

Polymers including PEO as the core motif with phenolic end groups are disclosed. Such macromers may be named hereafter as m-PEO-nP with m=molecular weight of the PEO core motif in g/mol$^{-1}$ and n=number of phenol end groups or, equivalently, the number of chain ends. PEO is chosen for its lithium-ion conducting property as a potential ultrathin solid electrolyte interphase/separator in advanced batteries, though EPoN is not limited to PEO and many non-conducting polymers that are stable under the applied mild electrochemical conditions may be compatible. Functionalization of polymers with phenolic end groups may be achieved in a variety of ways: for example, m-PEO-nP can be synthesized by UV-initiated thiol-ene coupling between a thiol terminated polymer and 2-allylphenol, or through coupling of hydroxy-terminated polymers and o-acetylsalicyloyl chloride followed by a selective deprotection. Methods for synthesizing m-PEO-nP may be found in the article by Wang et al. Both methods may require only standard synthetic equipment to yield m-PEO-nP.

For electrodeposition, a conductive substrate (electrode) may be immersed in a solution of m-PEO-nP, a stoichiometric amount of a base, and a supporting electrolyte salt. Upon application of an anodic (oxidizing) potential, a crosslinked polymer network may be formed and deposited on the electrode surface, as demonstrated by observed surface passivation during the oxidation of a 20k-PEO-4P (20 kg mol$^{-1}$ 4-arm PEO-tetraphenol) by cyclic voltammetry (CV).

Figure 13:
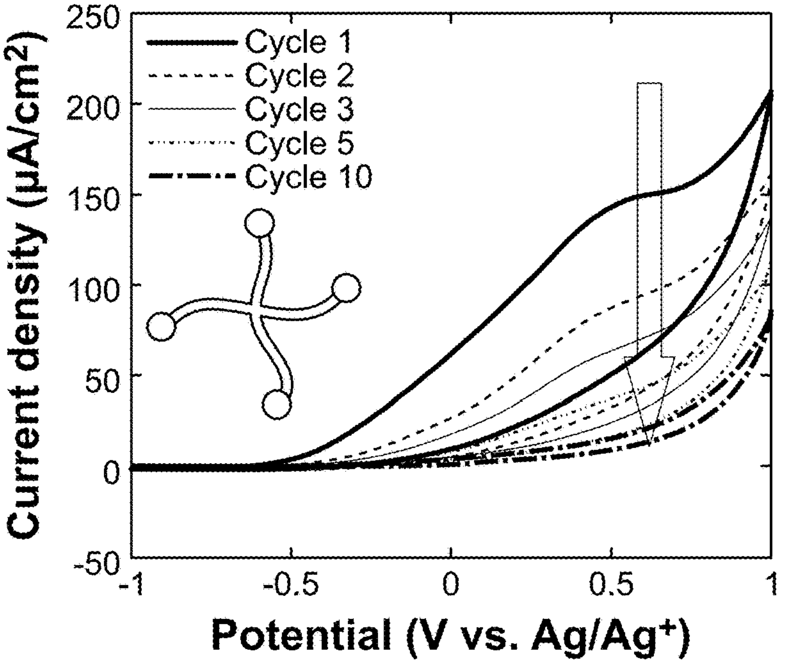
FIG. 13 illustrates plots of cyclic voltammetry measurements of a polymer, i.e., a 20k-PEO-4P polymer, on a conductive substrate, e.g., a planar indium tin oxide (ITO)-coated glass, demonstrating its passivating oxidative deposition.

FIG. 13 illustrates plots of cyclic voltammetry measurements of a polymer, i.e., a 20k-PEO-4P polymer, on a conductive substrate, e.g., a planar indium tin oxide (ITO)-coated glass, demonstrating its passivating oxidative deposition, according to an example embodiment. The CV measurements reveal the oxidation onset potential of the phenolic end group at −0.5 V vs. Ag/Ag+. The successive decrease in oxidation current with each cycle is commensurate with the proposed gradual blockage of the 20k-PEO-4P transfer to the conductive surface by the growing polymer network thin film.

Figure 14A:
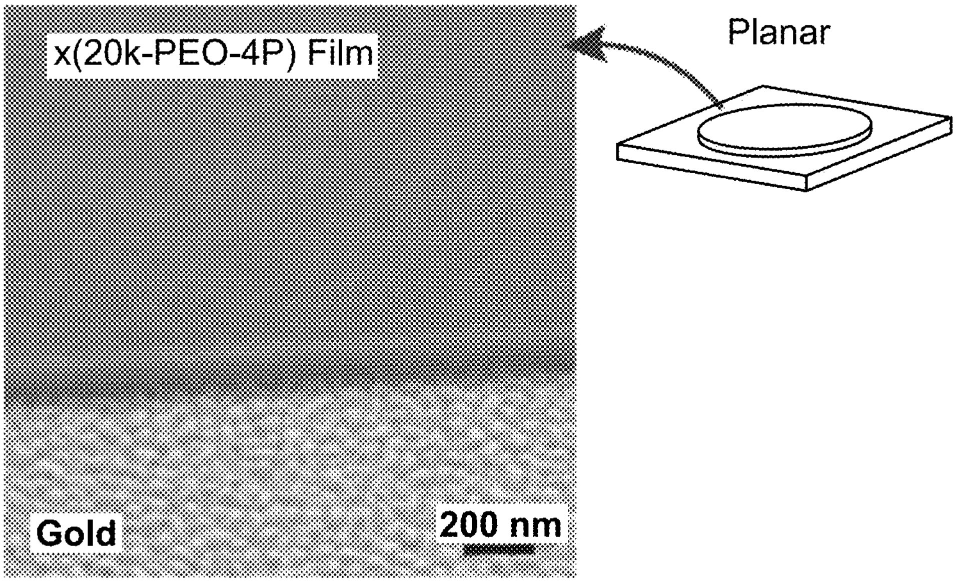
FIG. 14A illustrates a scanning electron microscopy (SEM) image of an EPoN-derived x(20k-PEO-4P) thin film on a planar gold substrate, according to an example embodiment. An inset illustrates schematically the film deposited on the substrate via electrodeposition of polymer networks (EPoN).
Figure 14B:
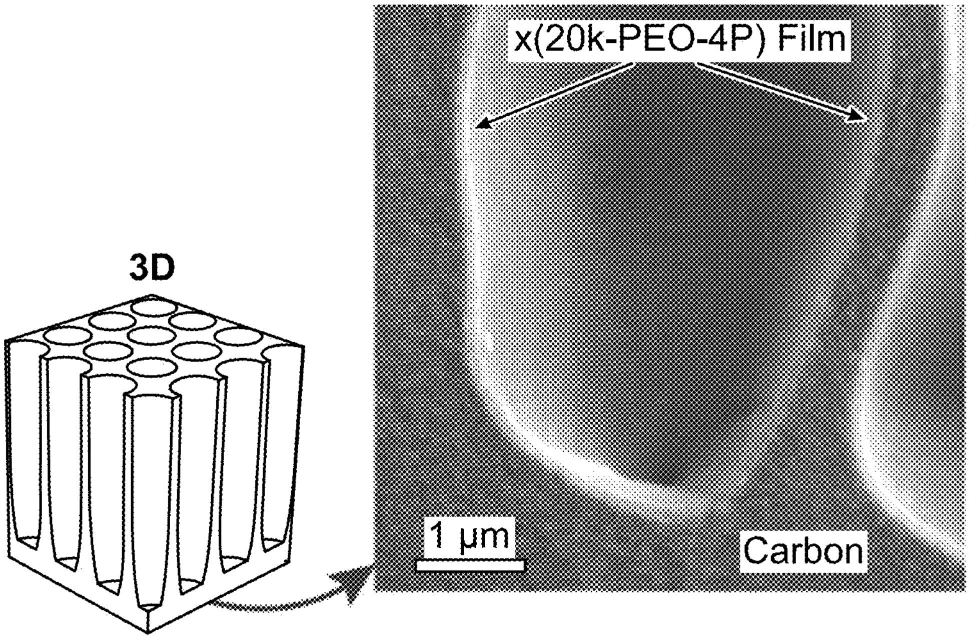
FIG. 14B illustrates an SEM image of an EPoN-derived x(20k-PEO-4P) thin film on a 3-D carbon electrode, according to an example embodiment. An inset illustrates schematically the film deposited on the substrate.

FIG. 14A illustrates scanning electron microscopy (SEM) images of an EPoN-derived x(20k-PEO-4P) thin film on a planar gold substrate, according to an example embodiment. EPoN of 20k-PEO-4P at a constant oxidation potential of 1 V vs. Ag/Ag+ may yield a smooth thin film with a thickness of 167 nm on a planar gold substrate FIG. 14B illustrates scanning electron microscopy (SEM) images of an EPoN-derived x(20k-PEO-4P) thin film on a 3-D carbon electrode. Electrodeposition of the polymers described herein may provide a self-limiting growth mechanism that may further ensure a conformal and substantially uniform coating on non-planar and porous materials, as demonstrated on a carbon substrate with micron-sized pores.

It may be noted that EPoN-derived thin films are not grafted to a surface and may adhere primarily or only through van-der-Walls forces, removing a need for specialized surface treatment and rendering EPoN applicable to many conductive materials.

Figure 15:
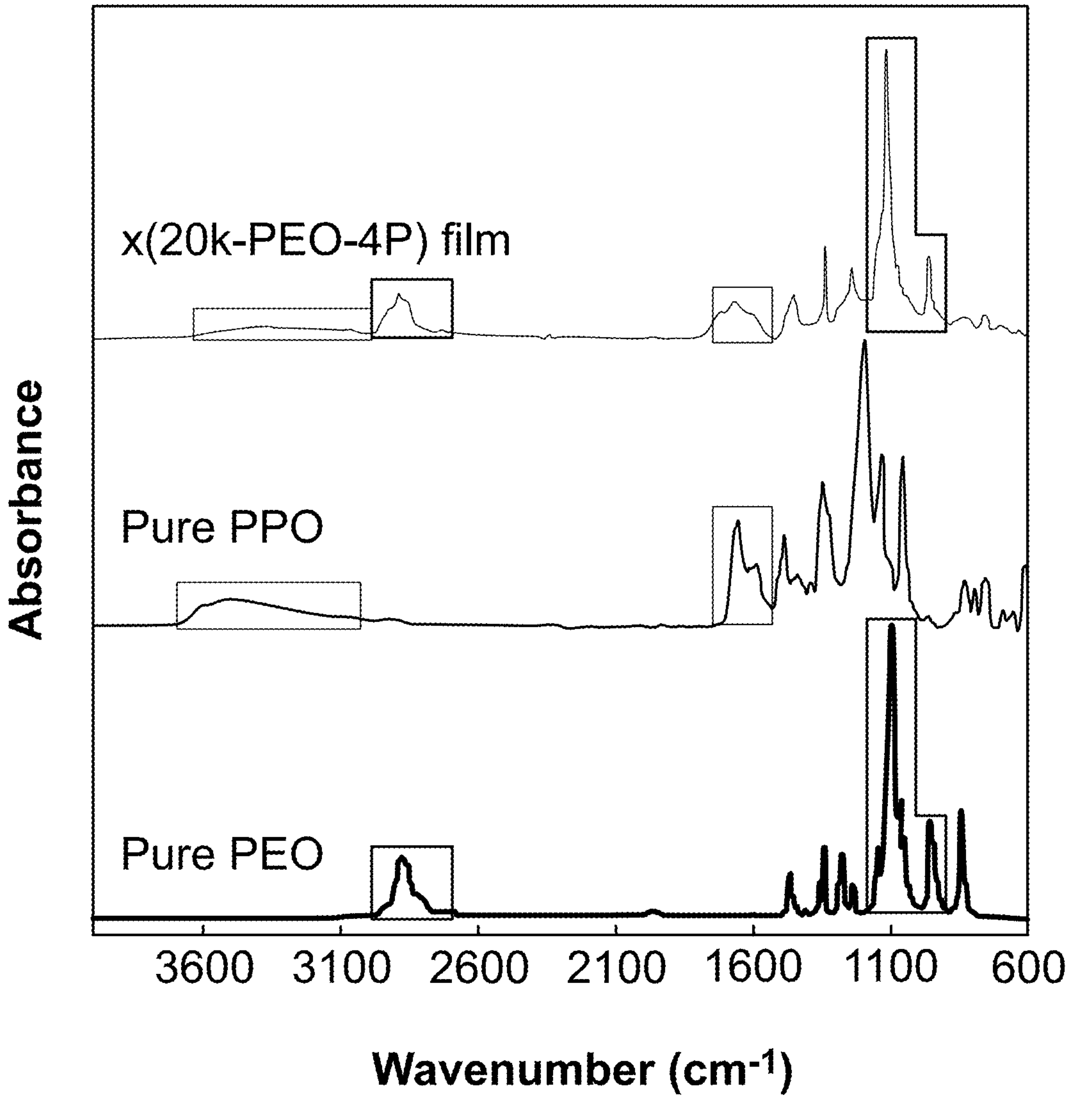
FIG. 15 illustrates attenuated total reflectance Fourier transform infrared (ATR_FTIR) spectra of a bulk 20k-PEO polymer ("Pure PEO"), an electrodeposited poly(phenylene oxide) (PPO) polymer film ("Pure PPO"), and an EPoN-derived x(20k-PEO-4P) polymer film, according to an example embodiment.

FIG. 15 illustrates attenuated total reflectance Fourier transform infrared (ATR_FTIR) spectra of a bulk 20k-PEO, an electrodeposited poly(phenylene oxide) (PPO) film, and an EPoN-derived x(20k-PEO-4P) film, according to an example embodiment. Shaded areas indicate characteristic absorption bands of PPO (blue) and PEO (yellow). The ATR_FTIR spectra may be helpful for confirming that the coatings obtained from EPoN contain both PEO and coupled phenylene oxide crosslinks. The spectrum of the EPoN-derived film exhibits absorption bands arising from PEO located at 1120 $cm^{-1}$ (C—O—C absorption), 1240 $cm^{-1}$ ($CH_2$ twisting), 1452 $cm^{-1}$ (C—H bending), and 2879 $cm^{-1}$ (C—H stretching), as well as characteristic absorption of PPO including the broad —OH band at 3100-3700 $cm^{-1}$, C═O and C═C stretching absorption at 1592, 1653, and 1710 $cm^{-1}$, confirming the phenol-mediated electrodeposition of a PEO network. While an overall composition of the coating may be pre-determined by the telechelic polymer itself, hyperlocal density and connectivity of PEO and phenolic crosslinks can vary throughout the film thickness.

Figure 16B:
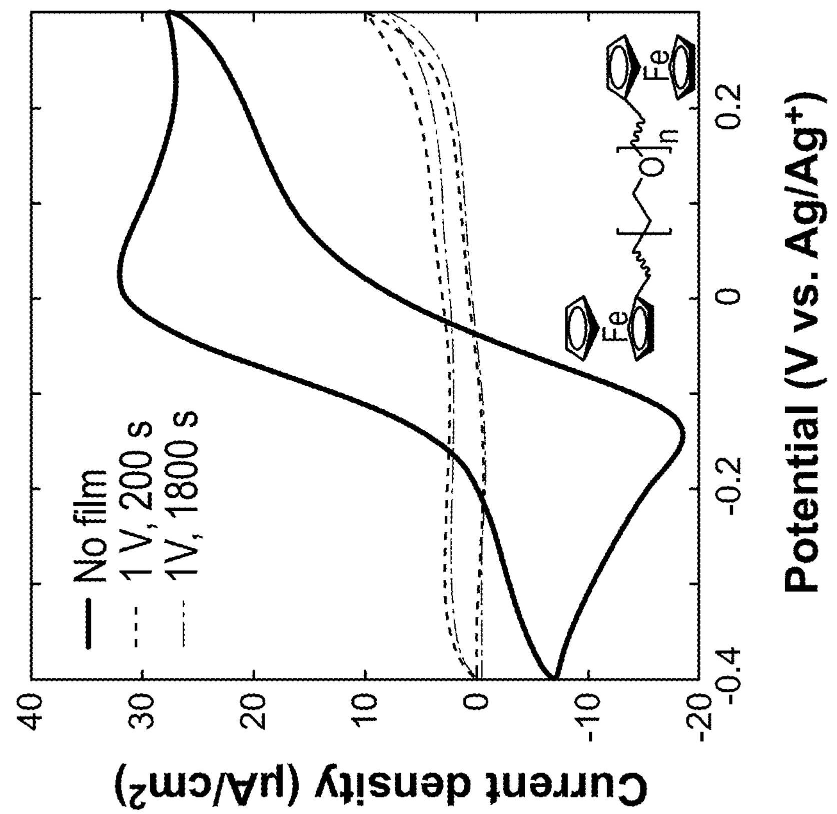
FIGS. 16A and 16B illustrate plots of cyclic voltammograms of Ferrocene and 3.4k-PEO-2Fc (3.4k) polymer, respectively, before and after electrodeposition of 20k-PEO-4P polymer on a gold substrate, according to an example embodiment. Molecular structures of the molecules (Ferrocene and 3.4k-PEO-2Fc) are illustrated as insets in the respective plots.
Figure 16A:
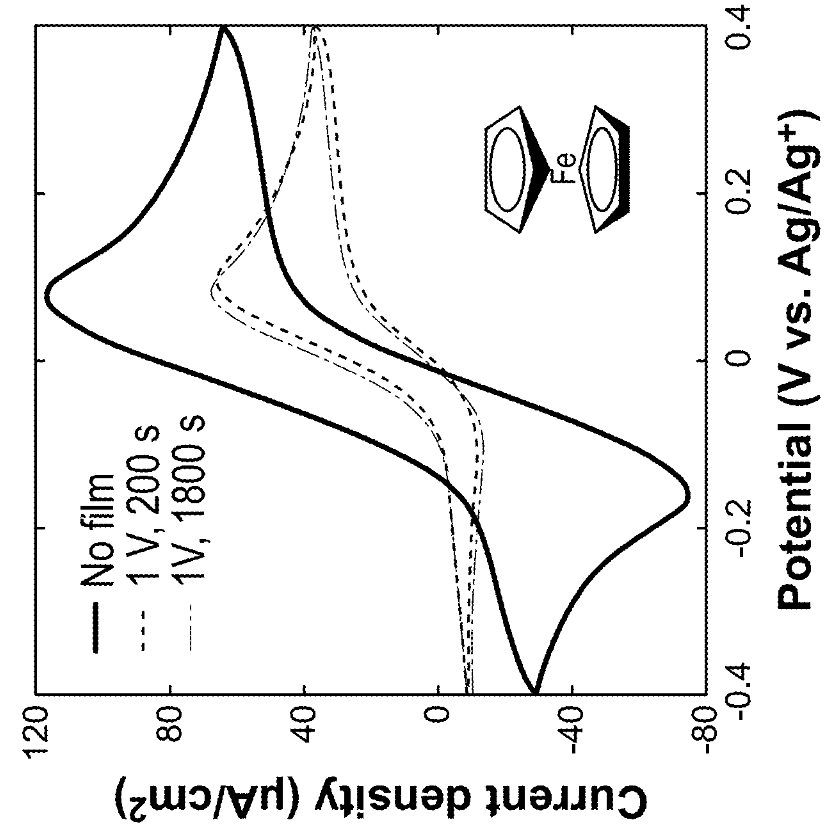

FIGS. 16A and 16B illustrate cyclic voltammograms of Ferrocene (Fc) and 3.4k-PEO-2Fc (3.4 kg $mol^{-1}$), respectively, before and after electrodeposition of 20k-PEO-4P on a gold substrate, according to an example embodiment. Because the EPoN mechanism described herein may be self-limiting and defect-correcting in its formation of polymer networks as uniform thin films, the coatings should be free of pin holes down to the nanoscale. At the same time, polymer networks may be permeable to small molecules, especially when swollen in solvents, in stark contrast to dense inorganic or pure PPO coatings.

EPoN-coated electrodes may be tested with electrochemical probe (macro)molecules of different sizes. Molecules that permeate through the polymer network coating may exhibit oxidation and reduction peaks in their CV even on coated electrodes, as is observed for the small molecule ferrocene ("Fc", 186 g/mol) with a decrease in oxidation current to about half after coating a gold electrode with a x(20k-PEO-4P) thin film (FIG. 16A). In contrast, the oxidation of an electroactive 3.4 kg $mol^{-1}$ PEO with two ferrocene end groups (3.4k-PEO-2Fc) vanishes after EPoN coating, suggesting a defect-free topography within the electrochemical detection limit (FIG. 16B). Furthermore, this measured impermeability of the coating to macromolecules may agree with disclosed deposition mechanisms wherein polymer diffusion through the coating eventually seizes during electrodeposition, rendering EPoN self-limiting by preventing further growth once it reaches a critical density and thickness.

Polymer Size Determines Self-Limiting Film Thickness in EPoN

A dual-function macromolecular design may allow for a variety of polymeric core motifs, molecular weights, and architectures to be electrodeposited through electrochemical crosslinking of corresponding end groups. To explore this generality, six m-PEO-nP are electrodeposited, including four linear m-PEO-2P (m=1k, 1.5k, 3.4k, and 5k) and two 4-arm m-PEO-4P (m=10k and 20k). All polymers are electrodeposited on glass substrates coated with indium tin oxide (ITO) under the same conditions, namely a polymer concentration of 25 mM in dimethyl formamide at 1 V vs. $Ag/Ag^+$ for one hour.

Figure 17:
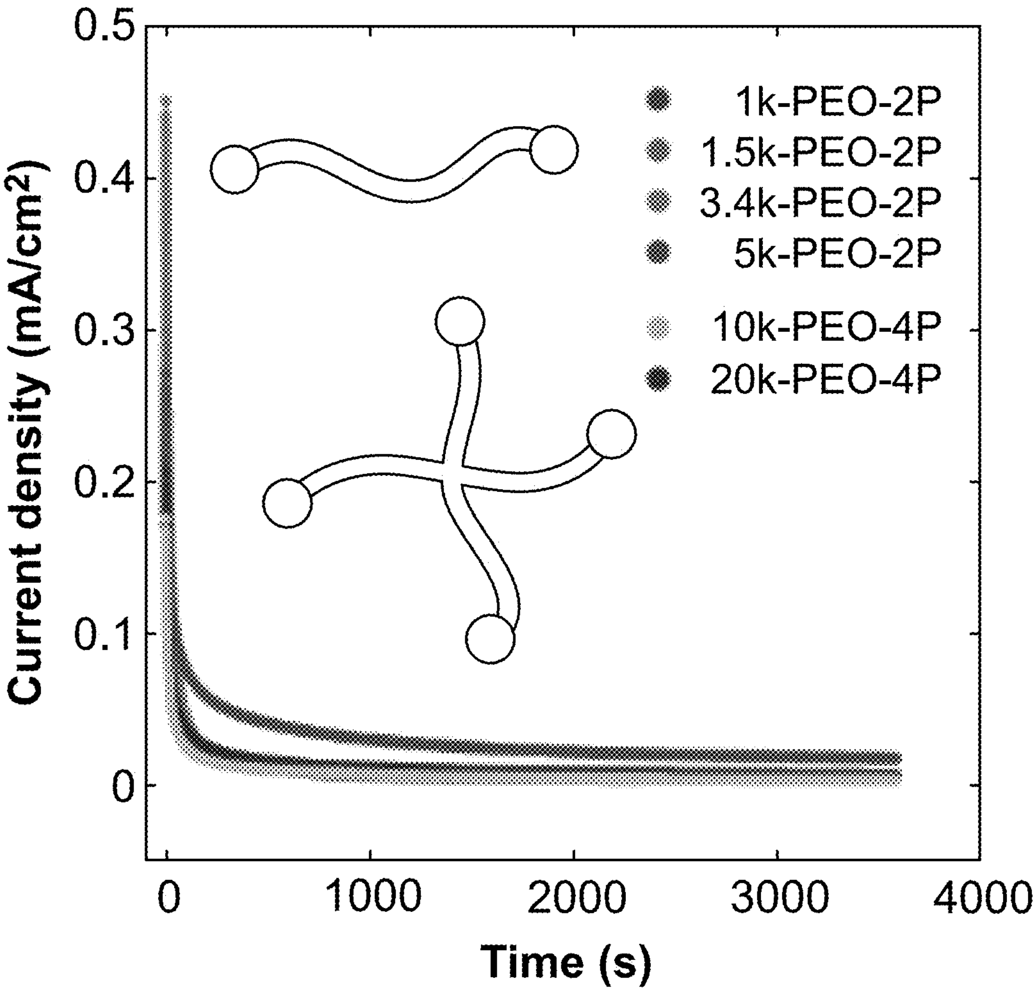
FIG. 17 illustrates a plot of chronoamperometry (CA) measurements of the electrodeposition of various m-PEO-nP polymers at 1 V vs. $Ag/Ag^{+}$ on ITO-coated glass, according to example embodiments.

FIG. 17 illustrates a plot of chronoamperometry (CA) measurements of the electrodeposition of various m-PEO-nP at 1 V vs. $Ag/Ag^+$ on ITO-coated glass, according to an example embodiment. The CA measurements reveal a substantial decrease in current density within a few minutes during potentiostatic EPoN of m-PEO-nP macromers, which may be indicative of quick surface passivation against further oxidation and film growth. As described hereinabove, the polymers include linear m-PEO-2P polymers and 4-arm m-PEO-4P polymers.

Figure 18:
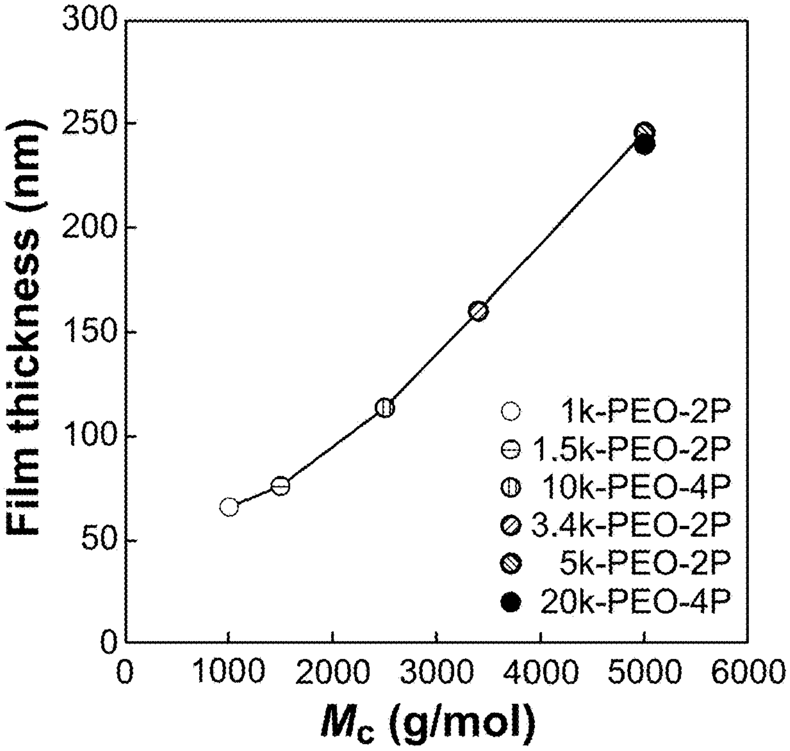
FIG. 18 illustrates film thickness of EPoN-derived polymer films with respect to chain length ($M_c$) between neighboring crosslinks, according to an example embodiment.

FIG. 18 illustrates film thickness of EPoN-derived films with respect to chain length ($M_c$) between neighboring crosslinks, according to an example embodiment. The film thickness may be measured for dried films using an ellipsometer, for example, with a wavelength range of 300-1200 nm and incidence angles of 65°, 70°, 75°. The thickness values may be extracted from fitting the results to a Cauchy model. The film thickness measurements indicate that chain length between neighboring crosslinks ($M_c$) may exhibit a linear relationship to the film thickness from 65 nm for 1k-PEO-2P to 241 and 246 nm for 20k-PEO-4P and 5k-PEO-2P, respectively.

It should be noted that for linear m-PEO-2P, the $M_c$ is the same as the molecular weight of the parent polymer, while for the star-shaped m-PEO-4P, the molecules contain one inherent crosslink and $M_c$ represents the length of each arm or a quarter of the molecular weight of the parent polymer. Thus, the thickest films may be obtained with an $M_c$ of 5 kg $mol^{-1}$ for 20k-PEO-4P and 5k-PEO-2P that have the smallest phenolic content of 3.8 and 1.9 wt %, respectively. This may provide a tunability knob for coating thickness in EPoN through sizes and architectures of a parent polymer. It may be noted that the electrodeposited polymer network thin films may be over 50 times thicker than a hydrodynamic radius ($R_h$) of the parent m-PEO-nP macromers ($R_h$<5 nm), which may be in stark contrast to surface-grafted polymers.

In addition to polymer size and architecture, other EPoN parameters that may influence a thickness of thin films may include macromer concentration and a substrate, e.g., the conductive substrate on which the film is deposited. For example, 20k-PEO-4P electrodeposited at 10 mM may grow to a thickness of 54 nm compared to 241 nm at 25 mM. EPoN-derived thin films on gold are thinner than those on ITO, which may be related to better PEO wetting on non-polar surfaces such as gold or carbon.

Figure 19:
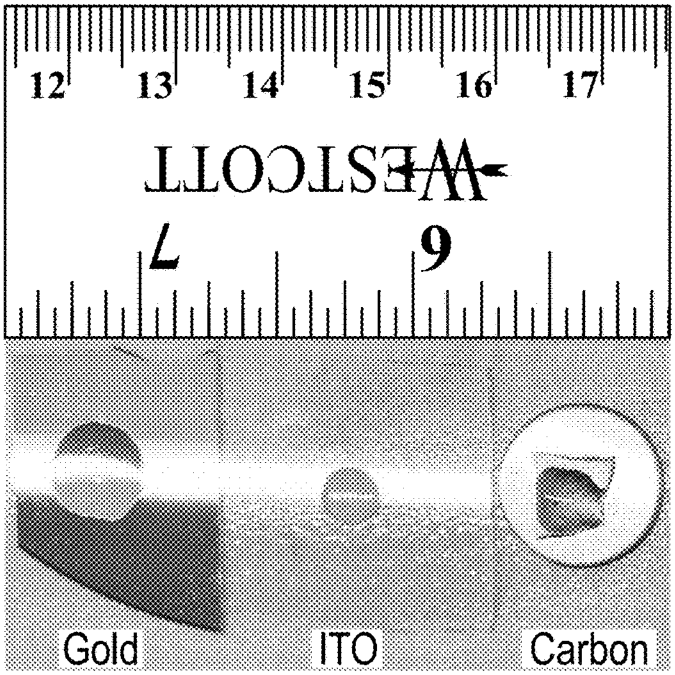
FIG. 19 illustrates a drop of 20k-PEO polymer deposited at 100° C. on gold, ITO, and flat carbon, according to an example embodiment.

FIG. 19 illustrates a drop of 20k-PEO polymer deposited at 100° C. on gold, ITO, and flat carbon, according to an example embodiment. The weight of each drop is the same, which may demonstrate higher spreading of PEO on non-polar gold and carbon electrodes as compared to polar ITO surfaces.

Figure 20A:
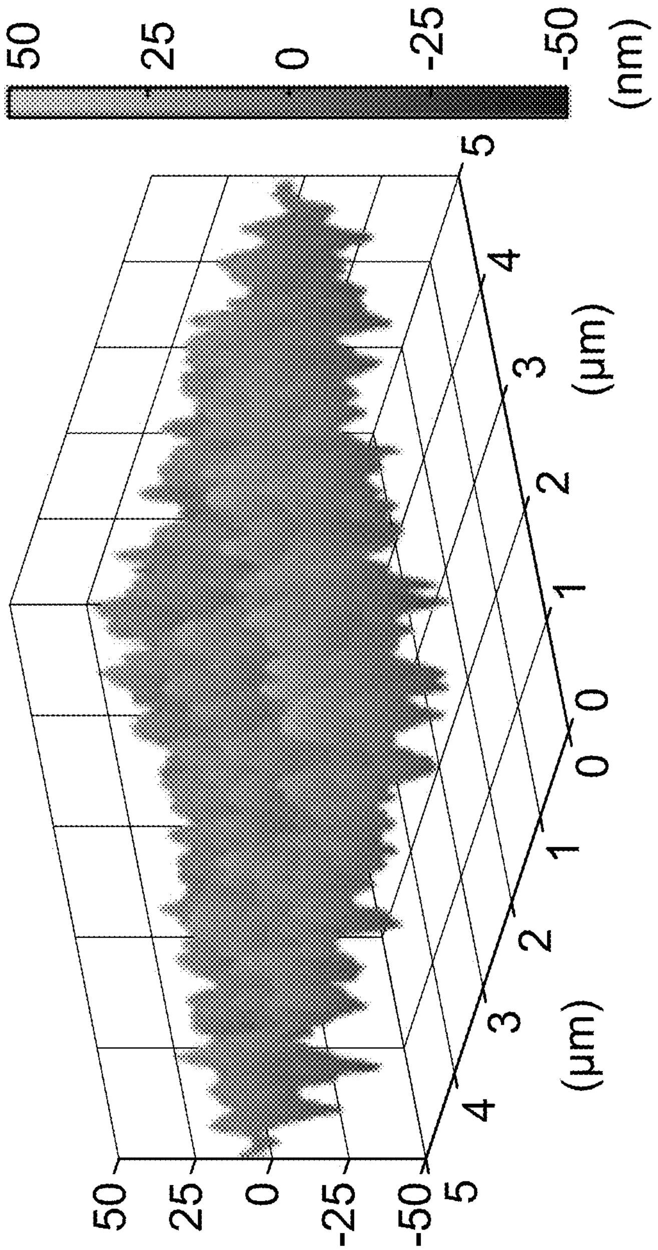
FIGS. 20A and 20B illustrate measurements of uniformity and thickness obtained from atomic force microscopy (AFM) and interferometry, respectively, of an example conformal thin film electrodeposited on an ITO-coated glass substrate, according to an example embodiment.
Figure 20B:
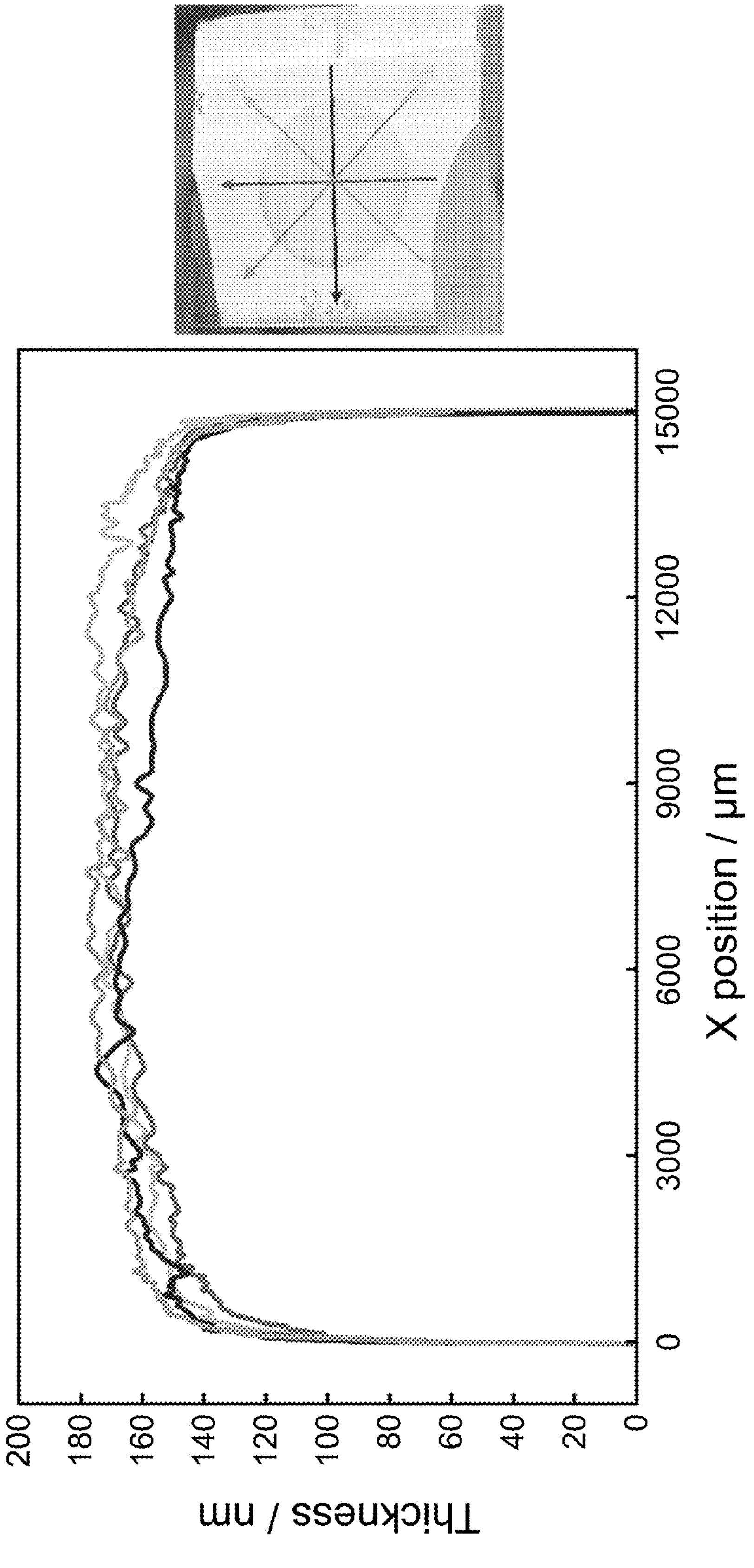

FIGS. 20A and 20B illustrate measurements of uniformity and thickness ined from atomic force microscopy (AFM) and interferometry, respectively, of an example conformal thin film electrodeposited on an ITO-coated glass substrate, according to an example embodiment. EPoN-derived thin films may be macroscopically uniform; a 1.5 $cm^2$ electrodeposited x(3.4k-PEO-2P) thin film on an ITO-coated glass substrate may exhibit, for example, a maximum difference in thickness of 2.4 nm per lateral mm, which is less than 2% of its thickness FIG. 20A illustrates an atomic force microscopy (AFM) image of an EPoN-derived film on ITO-coated glass. AFM is performed over a 5×5 $\mu m^2$ area of the film center and reveals a nanometer-scale roughness of $R_a$=7 nm (FIG. 2*f*), which may be commensurate with $R_h$ of the macromer. Adhesion of the coating may vary based on the substrate surface such as differences in polymer wetting or possible specific interactions/bonding occurring during the EPoN process.

FIG. 20B illustrates cross-sectional thickness profiles across the film of FIG. 20A. The thickness profile may be acquired of a dry film measured using an interferometer, with thickness values extracted from fitting results to a polymer model with initial refractive index guess of 1.5. Thickness profiles (left) are illustrated along 4 different angles, as illustrated by the arrows on the (right).

EPoN Film Growth

In-situ Electrochemical-Quartz Crystal Microbalance with Dissipation (E-QCM-D) during the electrodeposition of a polymer, for example, a 3.4k-PEO-2P polymer, may be used to study film growth during EPoN.

Figure 21A:
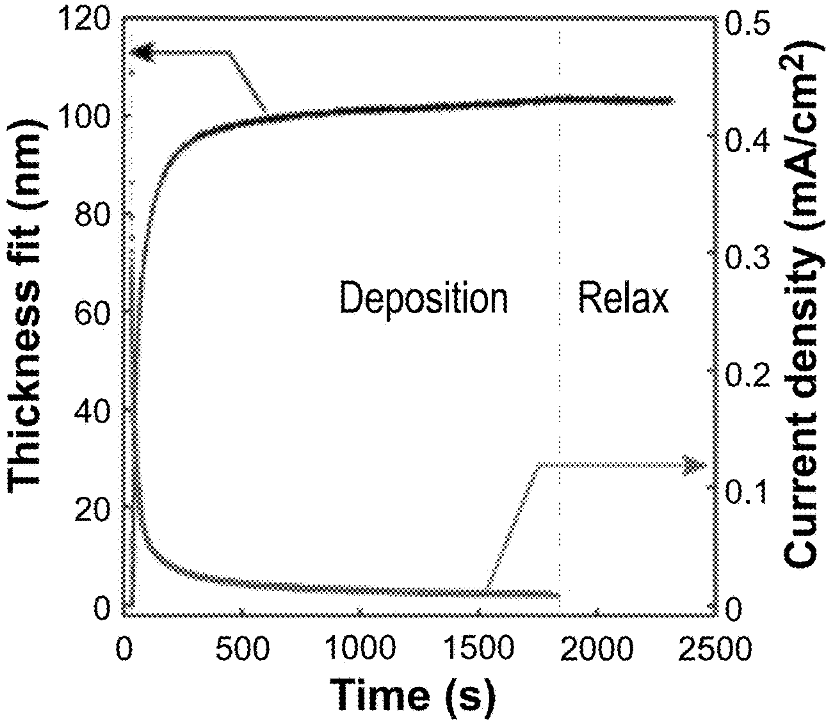
FIG. 21A illustrates a plot of current density and in-situ film thickness, as measured using E-QCM-D, during electrodeposition of a polymer, according to an example embodiment.

FIG. 21A illustrates a plot of current density and in-situ film thickness, as measured using E-QCM-D, during electrodeposition of a polymer, according to an example embodiment. The polymer may include 3.4kPEO-2P deposited at a deposition potential of 0.8 V vs. a silver quasi reference electrode (AgQRE) AgQRE (which may be equivalent to 0.35 V vs. $Ag/Ag^+$). The plot illustrates a rapid drop in current density and increase in thickness (which may be fit for using E-QCM-D measurements), which may occur over an approximately first 200 s of electrodeposition. The plot further includes a relaxation period after the deposition, as indicated by the dotted line.

Figure 21B:
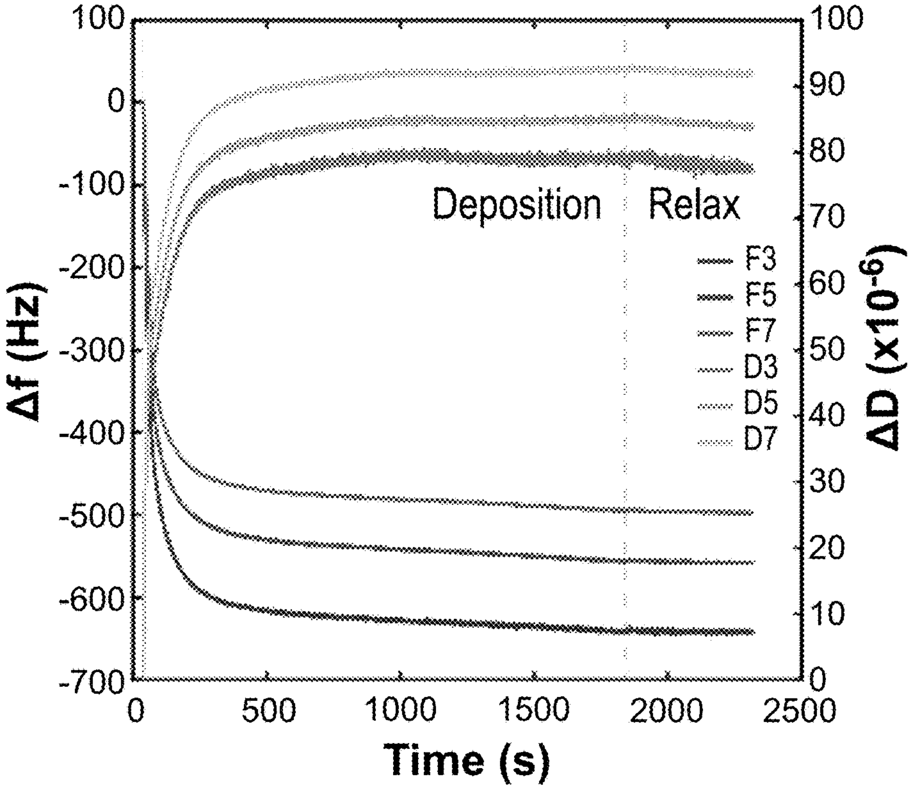
FIG. 21B illustrates a plot of responses of selected electrochemical quartz crystal microbalance with dissipation (E-QCM-D) overtones (n=3,5,7) during the electrodeposition of FIG. 21A.

FIG. 21B illustrates a plot of responses of selected E-QCM-D overtones (n=3,5,7) during the electrodeposition of the polymer of FIG. 21A. The plot indicates a fast drop in frequency (Δf) and increase in dissipation (ΔD) in parallel with a substantial decrease in oxidation current over the first 200 s of electrodeposition, which may be in agreement with postulated passivating and self-limiting film growth.

Figure 21C:
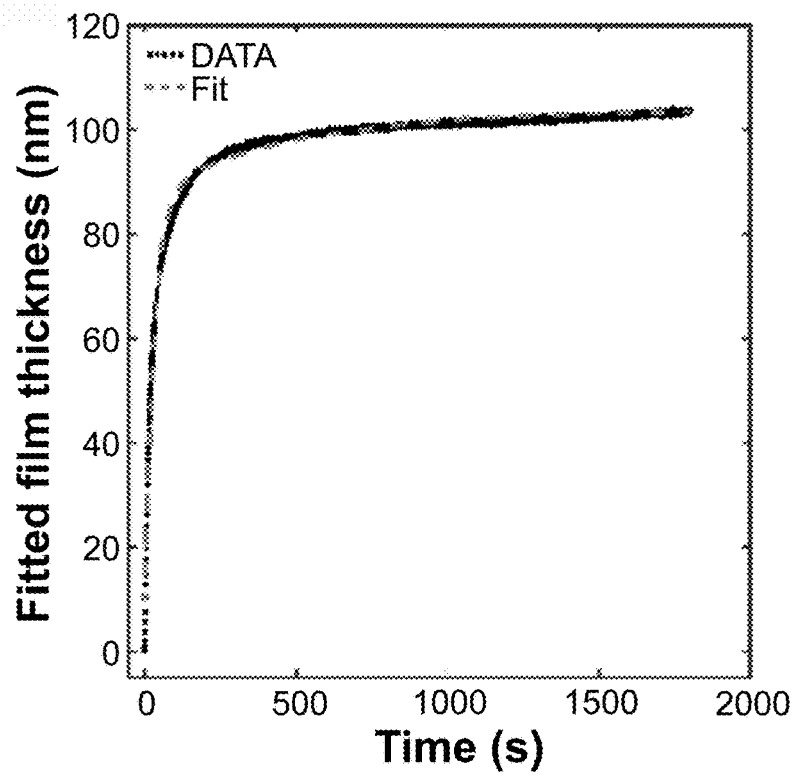
FIG. 21C illustrates a plot of in-situ film thickness obtained by fitting electrodeposition of FIGS. 21A and 21B with a viscoelastic model, with an overlaid fit of a two-stage exponentially decelerating growth function.

FIG. 21C illustrates a plot of in-situ film thickness obtained by fitting electrodeposition of FIGS. 21A and 21B with a viscoelastic model, with an overlaid fit of a two-stage exponentially decelerating growth function. Since the growing film on the quartz crystal microbalance (QCM) crystal electrode (gold coated quartz) is a swollen polymer network, a viscoelastic model is fitted to the E-QCM-D response, which reveals a rapid initial film deposition followed by a slower second growth stage. The in-situ obtained transient film thickness is fitted to a two-stage exponentially decelerating growth model with characteristic times of 33 s and 490 s for the two stages, respectively. The first stage may correspond to a fast initial polymer network formation and deposition onto the electrode surface that passivates it against direct access of the macromers from solution (e.g., Steps 1-3 described herein), while the slower second growth stage may be defined by macromer permeation through the initially deposited film (step 4), resulting in slowly increasing film thickness and densification until permeation seizes.

Figure 21D:
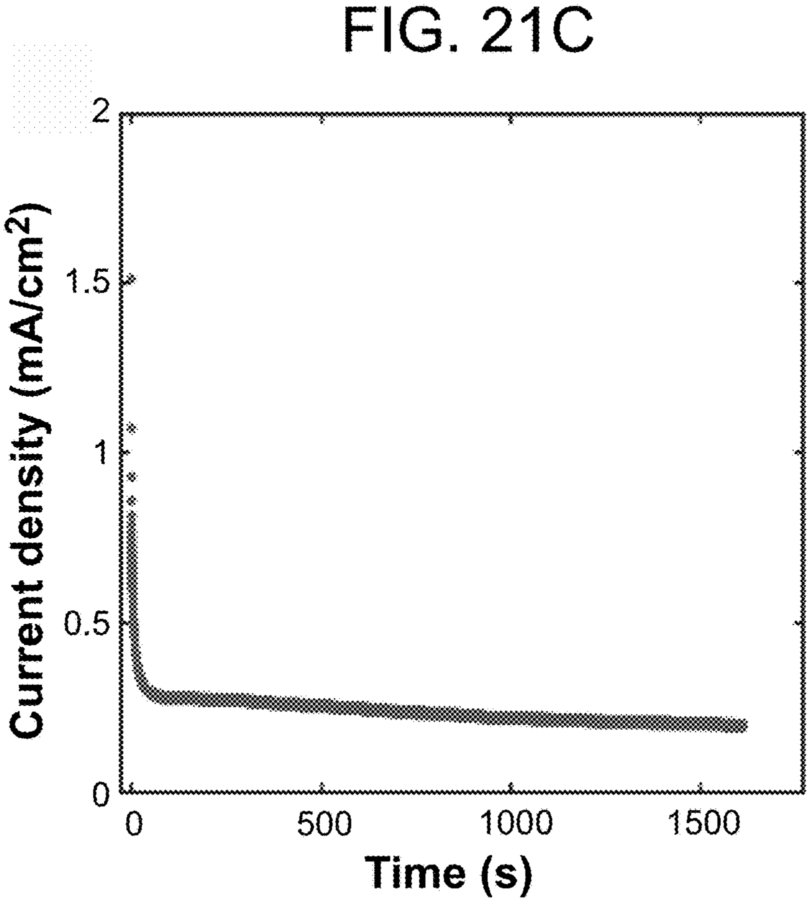
FIG. 21D illustrates a plot of chronoamperometry measurements of potentiostatic deposition of the polymer of FIG. 21A at a higher applied potential of 1.5 V vs. a silver quasi reference electrode (AgQRE).

FIG. 21D illustrates a plot of chronoamperometry measurements of potentiostatic deposition of the polymer of FIG. 21A at a higher applied potential of 1.5 V vs. AgQRE.

Figure 21E:
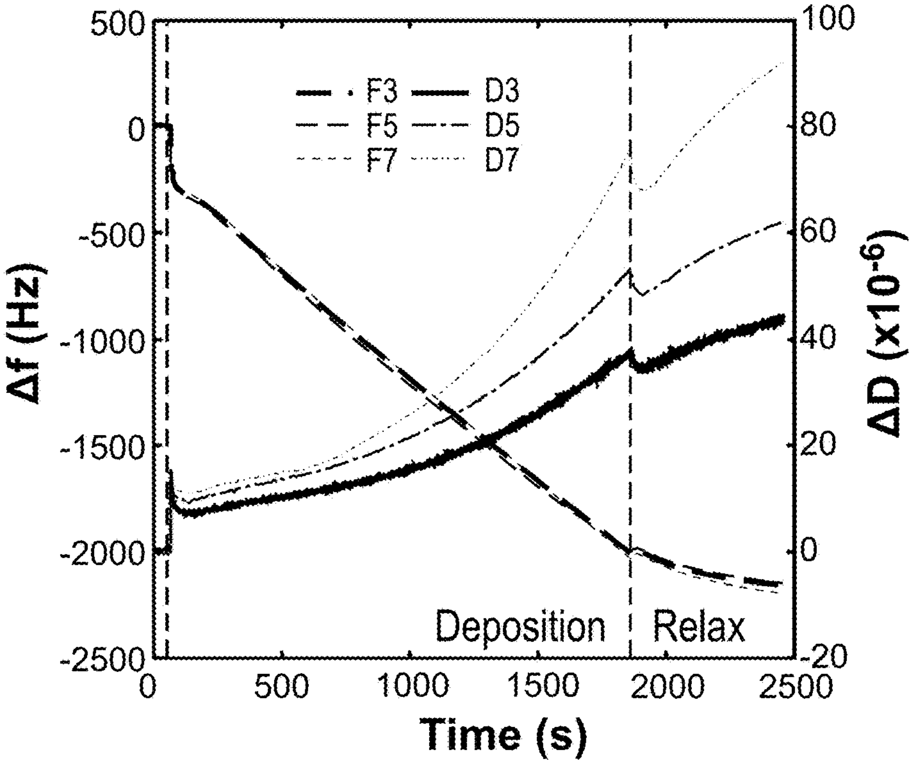
FIG. 21E illustrates a plot of an E-QCM-D response of selected overtones during the potentiostatic deposition of FIG. 21D.

FIG. 21E illustrates a plot of an E-QCM-D response of selected overtones during the potentiostatic deposition of FIG. 21D.

At the higher deposition potential (which may be equivalent to 1.05 V vs. $Ag/Ag^+$), the two stages of FIG. 21C may appear even more distinct in the response of the E-QCM-D and in transient current during electrodeposition. After a rapid initial film deposition that may be similar to that observed at lower potentials, an appreciable and slowly decaying current density that remains above 0.2 mA $cm^{-2}$ may be observed (FIG. 21D), while a change in QCM frequency reaches an inflection point and drops linearly over a subsequent 1600 s (FIG. 21E). Simultaneously, dissipation increases with a splitting observed between various QCM crystal overtones, which may suggest formation of a softer viscoelastic coating after its initial deposition.

Figure 22:
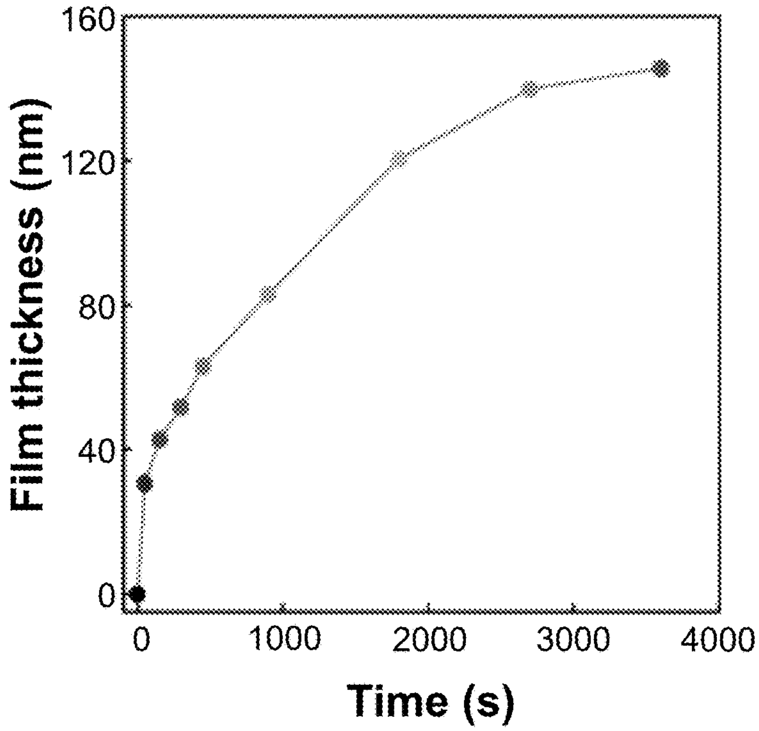
FIG. 22 illustrates a plot of deposition thicknesses of polymer networks as thin films electrodeposited for different periods of time, according to example embodiments.

As demonstrated previously, at highly oxidizing potentials (≥0.5 V vs. $Ag/Ag^+$) and in the presence of trace water, oligo(phenylene oxide) may undergo an irreversible electrochemical oxidation reaction to form benzoquinone-like structures. While FTIR spectra (available in the article by Wang et al.) for x(20k-PEO-4P) films deposited for 90 s and 1800 s may be almost identical, a slight increase in the absorption at 1653 $cm^{-1}$ due to C═O stretching may be observed which could indicate the formation of more quinone-like structures in the film at longer deposition times and high potentials. This additional observed oxidation of the phenolic crosslinks may lead to continued changes in film polarity and polymer-solvent interaction, resulting in an increased viscoelasticity of the film due to gradual swelling in certain solvents, for example, dimethylformamide (DMF). This oxidation-induced swelling increases the macromolecular permeability of the deposited polymer network and results in an extended but slowing secondary film growth stage FIG. 22 illustrates a plot of deposition thicknesses of polymer networks as thin films electrodeposited for different periods of time, according to an example embodiment. A 3.4k-PEO-2P polymer is electrodeposited at 1V vs. $Ag/Ag^+$ for nine time intervals ranging from 50 s to 3600 s and thicknesses of dried films are measured. As illustrated in the plot, over half of the thickness of deposited films is accumulated during the first 1000 s and, subsequently, growth gradually slows until the film approaches a self-limiting thickness after 3000s.

EPoN on Porous Non-Planar Substrates

Many coating processes may suffer from inhomogeneities when applied to non-planar or porous substrates due to mass transfer heterogeneities or line-of-sight deposition. EPoN, which may follow a self-limiting and defect-correcting film growth mechanism, may enable conformal and uniform coating of non-planar and porous substrates, as long as the conductive surface is accessible to the polymer solution and deposition is allowed to proceed to completion. Restated, even if surfaces at an entrance of a pore are coated first, comparatively more diffusion-limited surfaces deeper into the pore may eventually be coated due to the self-limiting deposition mechanism of EPoN that may prevent overgrowth at the pore entrance.

Figure 23A:
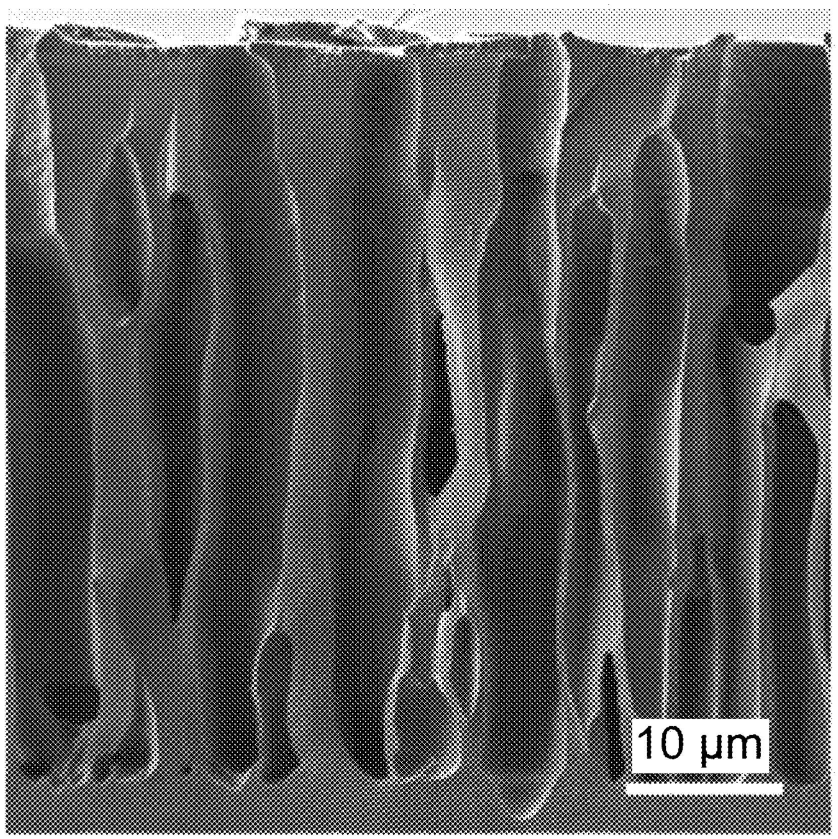
FIG. 23A illustrates an SEM image of a 3-D carbon electrode, according to an example embodiment.

FIG. 23A illustrates an SEM image of a 3-D carbon electrode, according to an example embodiment. The carbon electrode may be a conductive substrate on which conformal thin films are deposited and may include channel-like pores, which may be on the order of 5-8 μm in diameter, with a high aspect ratio, e.g., approximately 11, in the example embodiment.

Figure 23B:
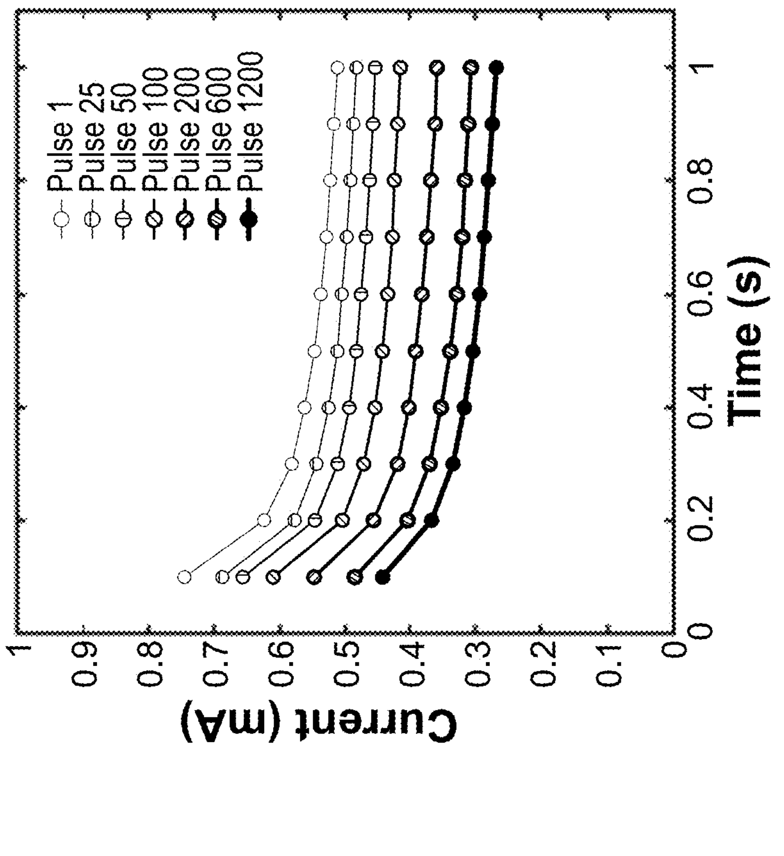
FIG. 23B illustrates a plot of transient current of chosen 1 s pulses from electrodeposition of a polymer on the 3-D carbon electrode of FIG. 23A.

FIG. 23B illustrates a plot of transient current of chosen 1 s pulses from electrodeposition of a polymer on the 3-D carbon electrode of FIG. 23A. Repeating potentiostatic pulses of 1 s duration, which may be separated by 9 s of rest time, are applied to the 3-D carbon substrate in contact with a 20k-PEO-4P polymer solution. The rest time may be implemented to ensure uniform macromer concentration throughout the pores during oxidative deposition due to the concentration-dependent thickness (vide supra). The current gradually decreases as pulses proceed, which may indicate passivation of porous electrode surface.

Figure 23C:
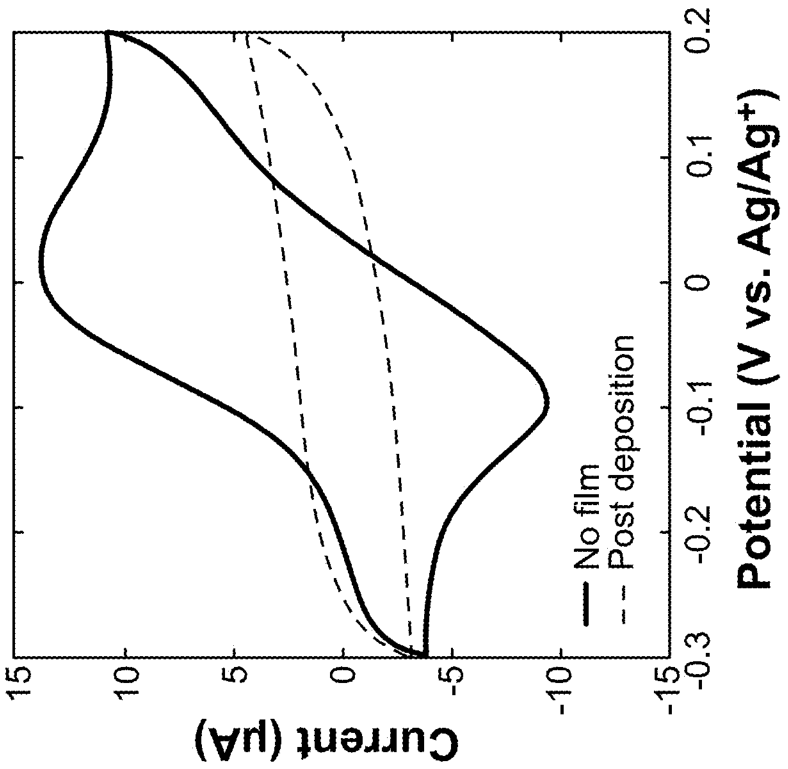
FIG. 23C illustrates a plot of current density as a function of volage (CV) measurements of 3.4k-PEO-2Fc polymer before and after electrodeposition of 20k-PEO-4P polymer on the 3-D carbon electrode of FIG. 23A.

FIG. 23C illustrates a plot of current density as a function of CV measurements of 3.4k-PEO-2Fc before (black) and after (red) electrodeposition of 20k-PEO-4P on the 3-D carbon electrode of FIG. 23A. The plot of FIG. 23 indicates that a defect-free coating may be obtained. Which may be demonstrated by the absence of oxidation/reduction peaks in the CV of a 3.4k-PEO-2Fc after EPoN coating with a x(20k-PEO-4P) thin film. In some embodiments, the CV measurements after electrodeposition may occur after 1,200 pulses.

Figure 23H:
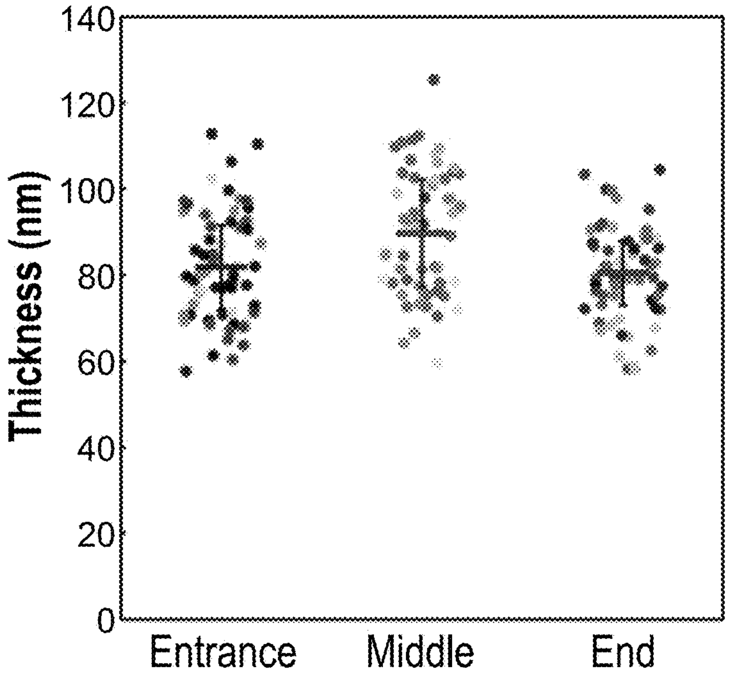
FIG. 23H illustrates film thickness at entrance, middle, and end of 12 randomly selected pores at 5 positions each.
Figure 23I:
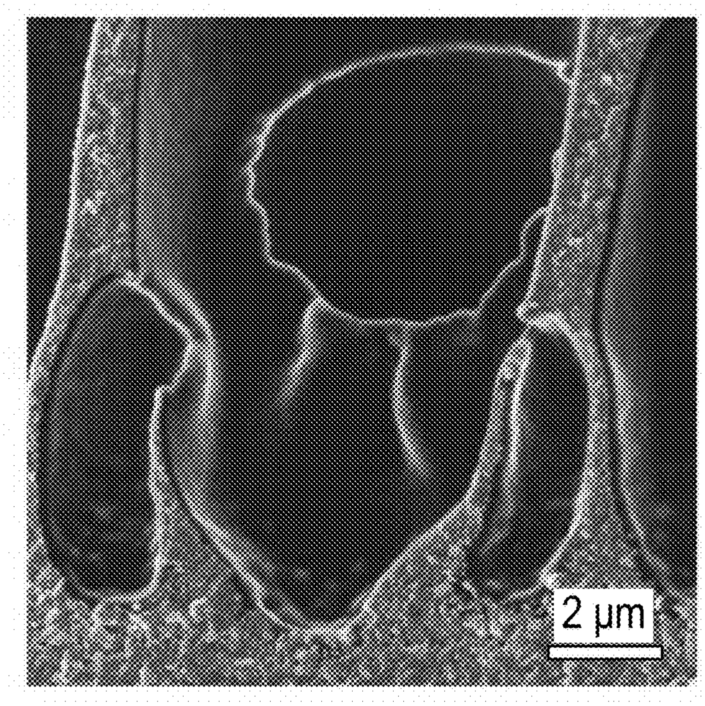
FIG. 23I illustrates a cross-sectional SEM image of a 3-D carbon electrode including a split pore end coated with a conformal film using EPoN, according to an example embodiment.

FIGS. 23D-23G illustrate SEM images of the 3-D carbon electrode of FIG. 23A before electrodeposition of a conformal thin film (FIG. 23D), and after the electrodeposition at an end (FIG. 23E), middle (FIG. 23F), and entrance (FIG. 23G) of a pore of the electrode. Arrows indicate thicknesses of deposited thin films. The cross-sectional SEM images show a conformal coating of uniform thickness over an entire 3-D carbon surface area FIG. 23H illustrates film thickness at entrance, middle, and end of 12 randomly selected pores at 5 positions each. Film thicknesses may be determined using SEM image analysis, for example, using SEM images similar to those of FIG. 23D-23G. Lateral markers and adjacent error bars represent the average thickness and standard deviation (SD) of the x(20k-PEO-4P) film coated on pores (n=12) with five randomly chosen measurement spots per pore and position. Analysis indicates an average thickness of 84 nm with no statistical difference along the pore length or between pores. It should be noted that while determination of the film thickness inside the 3-D carbon pores using SEM image analysis is imprecise, and it may be difficult to distinguish if observed random variability is due to a measurements of film thickness itself or real variations in film thickness, it is apparent that EPoN results in a homogeneous and conformal polymer network coating throughout the pore space of the 3-D electrode FIG. 23I illustrates a cross-sectional SEM image of a 3-D carbon electrode including a split pore end coated with a conformal film using EPoN, according to an example embodiment. The electrodeposited thin film may conform tightly to complex surface topology without observable variations in thickness or defects. This level of uniformity and conformality of EPoN-derived polymeric coatings on high-aspect-ratio porous materials may precedented and matched by the fidelity of the LbL deposition of polyelectrolytes. However, EPoN may be advantageous and distinguish itself in yielding covalently crosslinked polymer networks with arbitrary functionality and, thus, may represent a complementary and highly promising concept for conformal polymeric coatings on conductive non-planar and porous substrates Polymer Electrolyte Functionality of EPoN-Derived xPEO Thin Films PEO may be chosen for its well-known solid-state lithium-ion conductivity. Applied as a conformal ultrathin coating, x(m-PEO-nP) may function as a compatibilizing artificial interphase in liquid- and solid-electrolyte batteries, or as a solid electrolyte and separator in advanced 3-D interdigitated batteries. Therefore, it is important that ion-conducting PEO properties are not altered or diminished due to the EPoN process. To this end, electrochemical properties of the electrodeposited x(m-PEO-nP) thin films may be determined by solid-state electrochemical impedance spectroscopy (EIS).

Figure 24A:
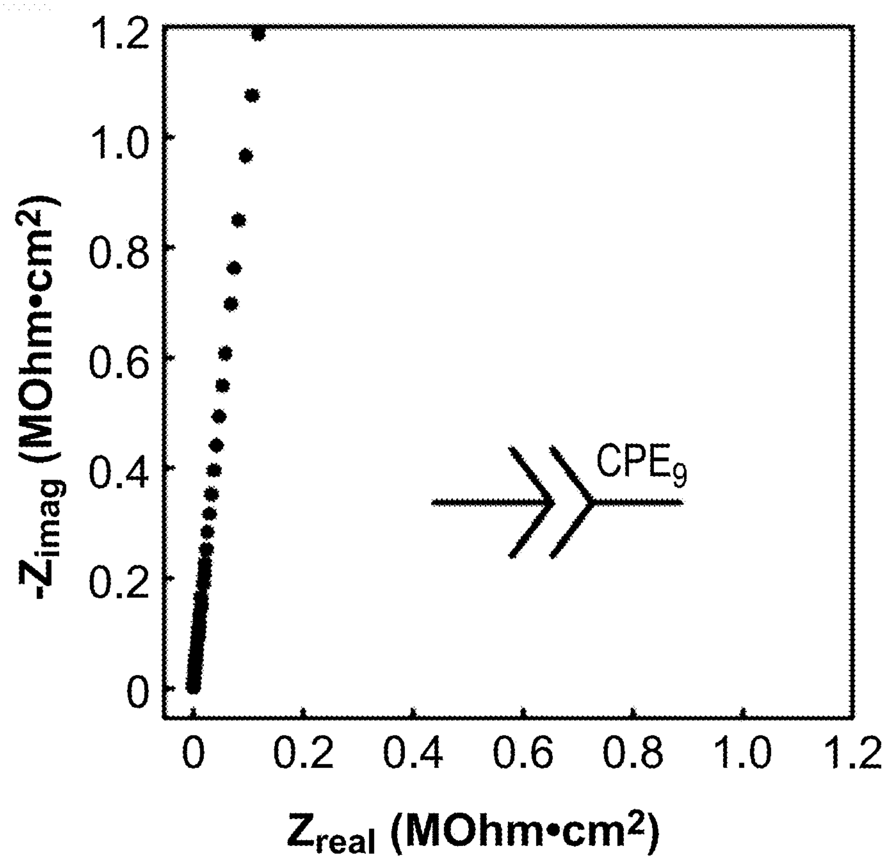
FIG. 24A illustrates an electrical impedance spectroscopy (EIS) Nyquist plot of an electrodeposited x(20k-PEO-4P) polymer film, according to an example embodiment.

FIG. 24A illustrates an EIS Nyquist plot of an electrodeposited x(20k-PEO-4P) film, according to an example embodiment. The plot indicates that, at room temperature, the EIS of the EPoN-derived x(20k-PEO-4P) thin film exhibits purely capacitive behavior, indicating its functionality as an insulating dielectric between the metal contacts forming a metal-insulator-metal (MIM) capacitor, which is described further herein with reference to FIG. 24B. The inset shows a capacitor which indicates that the capacitive behavior measured may correspond with the MIM plate capacitance ($CPE_g$) element of the equivalent circuit of FIG. 24B.

According to an example embodiment, for EIS, thin films are infused with a controlled amount of lithium bis(trifluoromethane)sulfonimide (LiTFSI) solution and subsequently dried. The thin films completely imbibe the LiTFSI solution and no salt crystals are observed on the films after drying, indicating successful dissolution of the LiTFSI within the x(20k-PEO-4P) thin film. The amount of lithium-salt needed may be calculated based on volume of the films (diameter× thickness) and a targeted ethylene oxide:lithium ion (EO:Li+) ratio. A controlled amount may be introduced into the film by applying 0.5 μL of lithium bis(trifluoromethane) sulfonimide (LiTFSI) solution with varying concentrations (10 mM, 20 mM, 40 mM calculated for EO:Li+=12:1, 6:1, 3:1 respectively) to the top of the x(20k-PEO-4P) film. Since the films swell in the solvent (DMF), the LiTFSI solution completely imbibed into the film. The swollen films were dried at room temperature in ambient atmosphere to obtain Li-infused x(20k-PEO-4P).

Figure 24B:
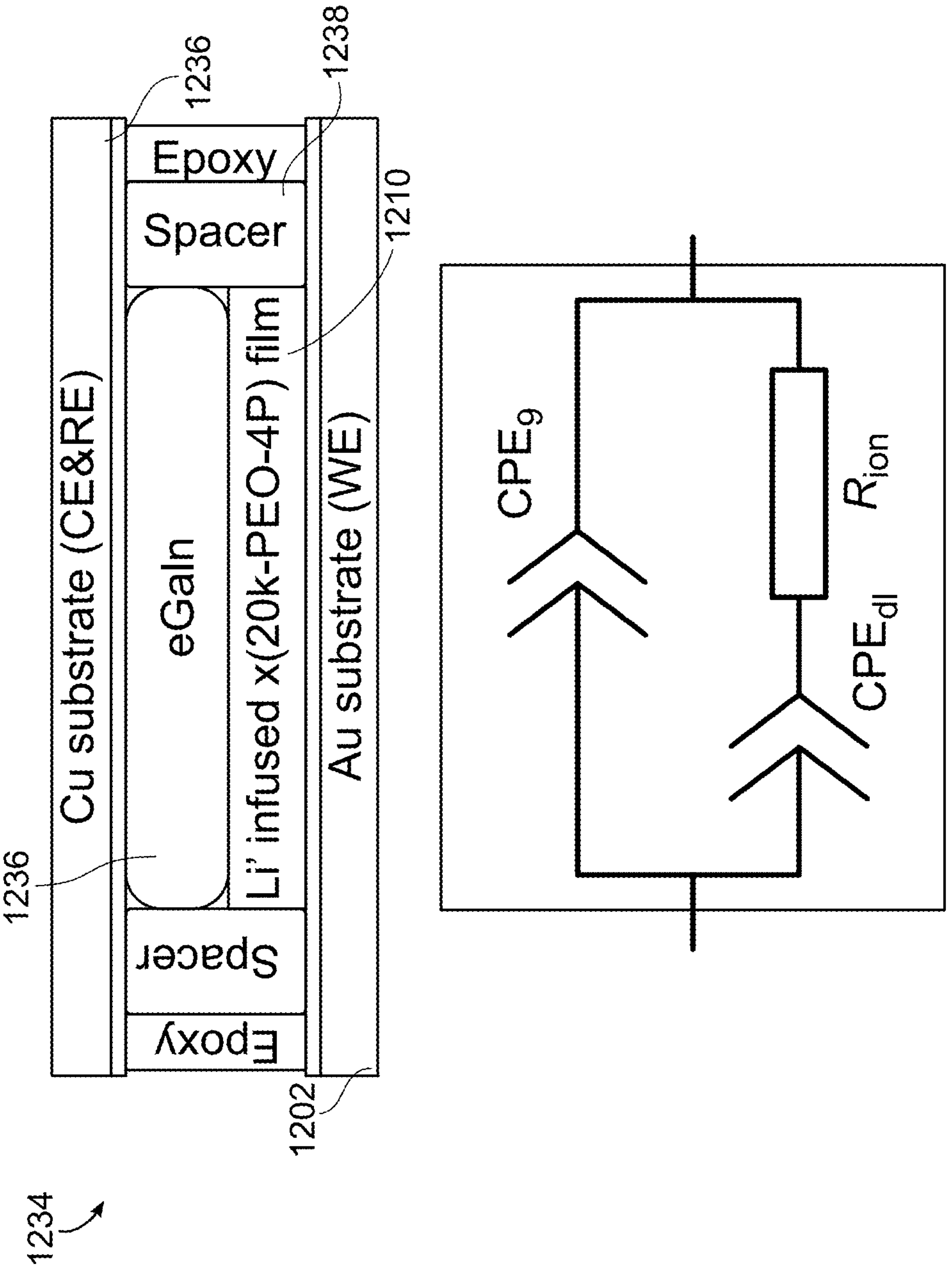
FIG. 24B illustrates schematically a system (top) for two-electrode EIS measurements and an equivalent circuit thereof (bottom).

FIG. 24B illustrates schematically a system 1234 for two-electrode EIS measurements and an equivalent circuit thereof, according to an example embodiment. The two-electrode electrochemical impedance spectroscopy (EIS) measurements were performed on a potentiostat using a gallium-indium eutectic (eGaIn) drop 1236 sandwiched between an x(20k-PEO-4P) film 1210 coated on a gold substrate 1202 (working electrode (WE)) and a copper foil 1236 (counter and reference electrode (CE&RE)) separated by a 1 mm silicone rubber spacer 1238 resulting in a known contact area of 3.14 $mm^2$. The setup may be assembled in an argon-filled glovebox and sealed with epoxy. The sealed setup may be placed on a hotplate with a thermocouple contacting the gold substrate. Once the targe temperature was reached and stabilized, EIS spectra with a signal amplitude of 10 mV around the open circuit potential over the frequency range of [500 Hz, 5 MHz]. The EIS data were then fitted to an equivalent circuit to extract the ionic resistance of the films. Also illustrated (bottom) is an equivalent circuit for the film used for fitting the EIS spectra. Elements of the equivalent circuit include two parallel capacitor-like elements, which physically represent the MIM plate capacitance ($CPE_g$) and an ionic double layer capacitance ($CPE_{dl}$) in series with the ionic resistance ($R_{ion}$).

The acquired EIS spectra for lithium-infused films exhibits a half semi-circle at high frequencies in the Nyquist plot representation with a steep, almost vertical rise in the negative imaginary contribution to the impedance at low frequencies. This EIS response may be typical for an equivalent electrical circuit with two parallel capacitor-like elements. The radius of the semi-circle may reflect the value of $R_{ion}$ from which the thin film's conductivity ($\sigma_{ion}$) may be obtained by:

$$\sigma_{ion} = \frac{1}{R_{ion}} \cdot \frac{l}{A}$$

where l and A represent film thickness and electrode contact area, respectively.

Figure 24C:
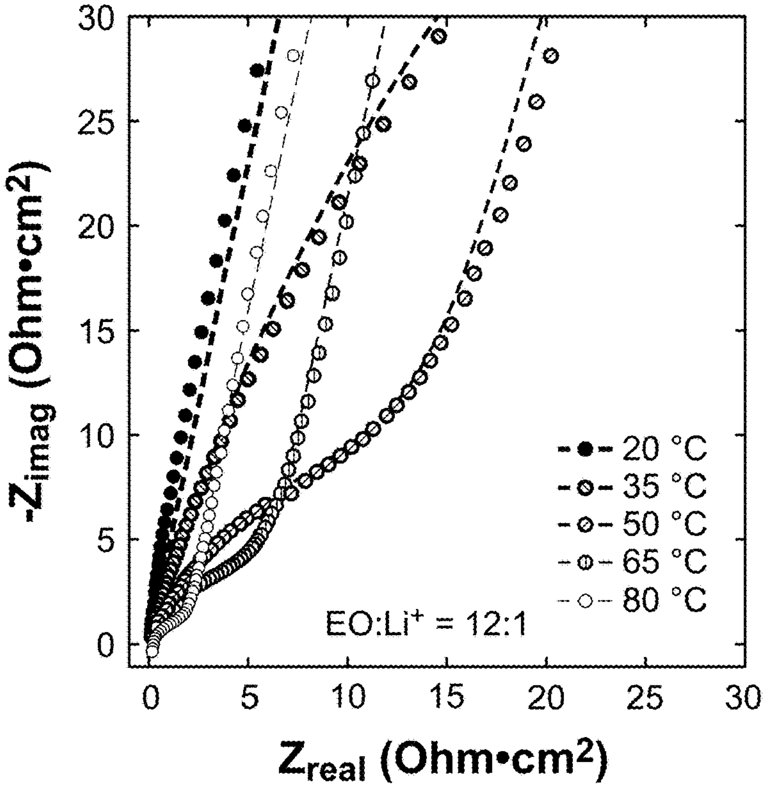
FIG. 24C illustrates EIS Nyquist plots acquired using the system of FIG. 23B.

FIG. 24C illustrates EIS Nyquist plots acquired using the system of FIG. 23B. The Nyquist plots may be acquired at varying temperatures of a Li-infused x(20k-PEO-4P) film with an EO:$Li^+$ ratio of 12:1, with dashed lines showing corresponding equivalent circuit fits. A decrease of the semi-circle radius is observed at increased temperatures in agreement to expected increases in ionic conductivity by 3-4 orders of magnitude between room temperature and 80° C.

Figure 24D:
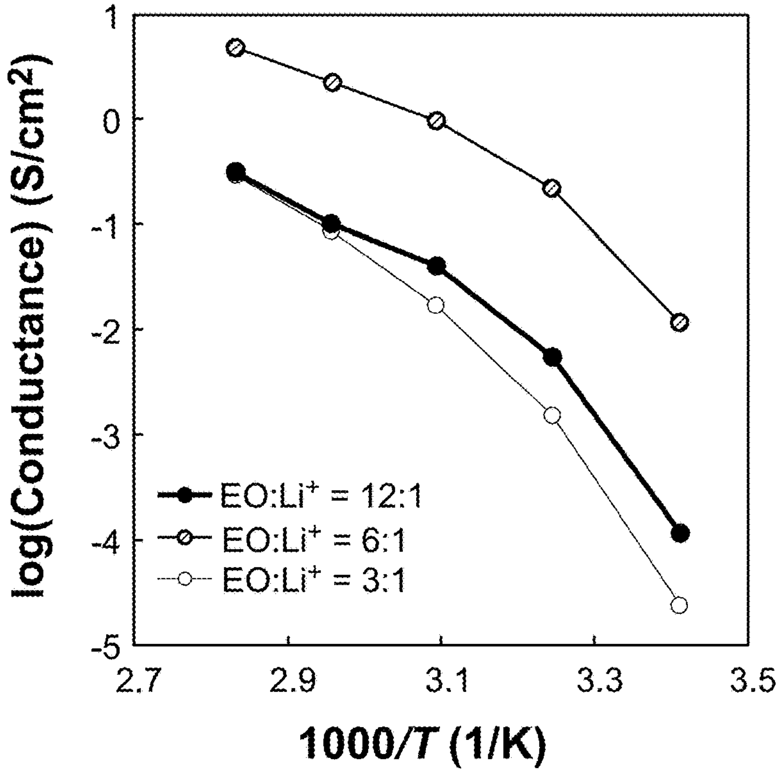
FIG. 24D illustrates an Arrhenius plot of ionic conductance of x(20k-PEO-4P) polymer films with varying EO:Li ratios measured using the system of FIG. 23B.

FIG. 24D illustrates an Arrhenius plot of ionic conductance of x(20k-PEO-4P) polymer films with varying EO:Li ratios measured using the system of FIG. 23B. The highest ionic conductivities of $10^{-4}$S $cm^{-1}$ at 80° C. and $10^{-7}$ S $cm^{-1}$ at room temperature may be observed at an EO:Li ratio of 6:1, which may be comparable to conductivities of bulk PEO-based solid electrolytes. Due to the ultrathin nature of the lithium-infused x(20k-PEO-4P) solid electrolyte (on the order of 166 nm), its areal resistance may be less than 10 $\Omega cm^2$ at 35° C. It may be of interest that the optimum EO:Li ratio is higher for the EPoN-derived xPEO thin film than the ~18:1 ratio found in bulk, which may indicate potential effects from the thin-film confinement or the non-traditional crosslinker.

Electrochemical stability and dielectric breakdown strength may be important properties for solid polymer electrolytes, especially for thin films. To this end, solid-state cyclic voltammetry performed in the same setup as the EIS, as described herein with reference to in FIG. 24B, reveals that the EPoN-derived thin films from 20k-PEO-4P are stable up to at least 5 V, corresponding to a breakdown strength over 32 MV $m^{-1}$, which may be sufficient for lithium-ion battery chemistry. Solid-state cyclic voltammetry (CV) is carried out on a Gamry 600+ potentiostat using a gallium-indium eutectic drop sandwiched between the x(3.4k-PEO-2P) and x(20k-PEO-4P) film coated on an ITO substrate (working electrode) and another ITO substrate (counter and reference electrode) separated by a 1 mm silicone rubber spacer resulting in a contact area of 3.14 $mm^2$. The setup and measurements were assembled and operated at room temperature and in ambient conditions. CVs were performed in range between 0 V to 5 V bias voltage for x(3.4k-PEO-2P) film and 0 V to 10 V bias voltage for x(20k-PEO-4P) at a scan rate of 50 mV $s^{-1}$.

Importantly, the coating does not irreversibly break down below 10 V, but passes measurable current between 5 and 10 V. Interestingly, EPoN-derived thin films from the smaller polymers, e.g., 3.4k-PEO-2P, break down at 3 V, corresponding to a breakdown strength over 20 MV $m^{-1}$. This result indicates that smaller fractions of phenol may be beneficial for higher electrochemical stability and breakdown strength, revealing a benefit of EPoN that produces thin films which can comprise over 98 wt % of PEO.

EPoN represents a widely applicable approach to obtain conformal and uniform thin films of polymer networks on conductive materials, independent of their microscale topography and macroscopic shape. The dual-functional molecule design in EPoN can separate its phenol-derived capability for conformal electrodeposition from the core polymer functionality that determines the film properties. The controllable film thickness of 50-250 nm is over an order of magnitude larger than the macromer size, though it is found to be strongly corelated to the polymeric chain length and concentration, and weakly related to polymer-substrate-solvent interactions. The results presented herein further reveal a surface passivating and self-limiting two-stage film growth mechanism during EPoN, which renders it successful in the conformal and uniform coating of planar and 3-D porous substrates. The results presented herein further demonstrate that the film functionality is preserved during EPoN both for the ion-conducting PEO, which implies that this method is compatible with a broad range of core molecular motifs for targeted functional coatings on many conductive materials.

Such a deposition method may have broad implications and applications in soft matter, composite, and surface science and engineering, due to its experimental accessibility, large library of applicable polymers, and uniform outcome, rendering EPoN unique and complementary to other deposition methods such as grafting, electropolymerization, LbL, i/o-CVD, and self-assembled monolayers. Notably, its synthetic and conceptual simplicity can allow even non-experts to obtain unprecedented designer coatings with tailored properties, while simultaneously motivating further systematic and targeted experimental and computational research on the underlying film growth mechanism by experts in polymer chemistry and electrochemistry alike. For example, a new theoretical framework needs to be established for the thin film formation that takes into account interrelated and partially parallel steps of charge transfer, chemical crosslinking kinetics, diffusion of dormant and activated macromers, precipitation kinetics, and solvent-substrate-polymer interactions.

Future developments and iterations of EPoN may include reductive eX-Linkers to enable coating of non-noble metals and oxidatively labile materials. Additionally, EPoN is conceptually not limited to polymer architectures with eX-Linkers as end groups, but copolymers that contain the eX-Linkers as co-monomers are amenable to this electrodeposition paradigm. Thus, we anticipate that a new field of polymer network electrodeposition will grow and combine the diverse flavors of organic electrochemistry with polymer chemistry to create application-tailored precision coatings for a variety of substrates and functions ranging from energy to biological to nanomanufacturing applications. For example, EPoN-derived ultrathin coatings could boost the capacity and selectivity of sorbent materials, or molecularly define the microenvironment at (electro)catalytic or sensor surfaces to enhance activity, efficiency, and selectivity or suppress noise levels, respectively. Additionally, the polymer electrolyte coatings reported here may enable high-power 3-D micro-interdigitated batteries or organic pseudo-capacitors.

Methods

Synthesis method 1—Thiol-ene coupling: The dual-function macromers modified with phenol end groups were synthesized by UV-initiated thiol-ene coupling between thiol end groups and allyl phenol. For all molecular weights and structures, 0.5 g thiol-terminated PEOs, 1 mL 2-allylphenol, and 0.5 mL Darocur 1173 ® were added to 2 mL of dimethylformamide (DMF) and mixed. The mixture was then transferred to a 4 mL UV transparent cuvette with a stir bar and exposed to 302 nm UV (8 W, 3-4 cm distance) for 48 hours. The solution was then precipitated in cold diethyl ether, the solid was separated by centrifugation at 4000 g for 5 min, redissolved in 2 mL chloroform, and precipitated again in cold diethyl ether to remove excess 2-allylphenol and UV initiator. After centrifugation, the solid product was dried in a glass desiccator under vacuum for 16 hours.

Synthesis Method 2—Hydroxy-terminated polymers: Dual-function macromers with phenolic end groups are also obtainable from the benzoyl-alcohol esterification between O-acetylsalicyloyl chloride and hydroxy-terminated polymers, such as m-PEO-nP from HO-PEO-OH. To this end, 25 g (1.25 mmol) of linear 20k poly(ethylene oxide) were dissolved in 15 mL toluene inside a nitrogen-filled glovebox, followed by the drop-wise addition of 0.993 g (5 mmol) o-acetylsalicyloyl chloride and 0.697 mL (5 mmol) triethylamine (TEA) while stirring. The mixture was left to react for 16 hours at room temperature during which a solid precipitate (triethylammonium chloride) forms. The solid was removed by filtration followed by rotary evaporation to remove unreacted TEA. The O-acetylsalicyloyl modified PEO was precipitated from toluene into cold diethyl ether, filtered and washed with clean diethyl ether. After drying in the desiccator under vacuum for 16 hours, the powder was mixed with 0.275 g (5 mmol) 2-amino thiophenol and 0.173 g (0.125 mmol) $K_2CO_3$ in 2.5 mL DMF. The solution was heated to 110° C. for 18 hours inside a nitrogen-filled glovebox. The final product was obtained by precipitation in cold diethyl ether, washing with diethyl ether two times and drying overnight under vacuum. Finally, to remove excess 2-amino thiophenol, the sample was mixed with water, filtered, and extracted with diethyl ether. The ether phase was dried by rotary evaporation to yield the phenol-modified PEO.

Polymer Characterization: To confirm the purity and estimate conversion efficiency, 15 mg of m-PEO-nP was dissolved in 0.6 mL deuterated chloroform for proton-nuclear magnetic resonance ($^1$H-NMR) spectroscopy. The aryl proton peaks that appear in range of 6.75-8.0 ppm confirm the successful modification of PEO with phenolic end groups. The ratio between the aryl protons and PEO protons at 3.6 ppm are used to estimate the end-group conversion, assuming the indicated molecular weight to be its number average $M_N$.

3-D carbon electrodes were prepared using non-solvent induced phase inversion of a polymer solution (81.9 wt % dimethyl sulfoxide (DMSO)/N-Methyl-2-pyrrolidone (NMP), 10.2 wt % poly(acrylonitrile) (PAN), 7.9 wt % water) coated on a solvent swollen gel and immersed in a bath of water and 2-propanol. This was followed by PAN cross-linking at 250° C. in air for 2 hours and carbonization in argon at 750° C. for 1 hour. The resulting carbon electrodes have low-tortuosity cylindrical pores of 5-20 μm in diameter, thickness of 40-120 m and a footprint area of 0.385 $cm^2$. For EPoN, the 3-D carbon electrode was attached to a stainless-steel disc using an aqueous conductive glue of PVA and carbon black.

Electrodepositions were performed with a potentiostat. Solutions of m-PEO-nP macromers in DMF were prepared at 25 mM or 10 mM, with LiOH at stoichiometric ratio to the phenol end group. Deposition solutions further contained the supporting electrolyte LiTFSI at a concentration of 0.1 M and deionized water at 1 M, or 0.5 M. For electrodeposition, gold-coated silicon wafers, ITO-coated glass slides, or carbon electrodes were clamped together with a cylindrical glass cell using an O-ring, confining the deposition area to a circle of 15 mm in diameter. The deposition cells were filled with 1 mL of macromer solution. A platinum wire counter electrode and a $Ag/Ag^+$ reference electrode were submerged in the solution.

Example 2—Electrodeposition of Thermally Responsive Polymer Networks as Conformal and Uniform Ultrathin Coatings Example embodiments have been described in the article by Wang et al. 2024. Polymers, thin films, and methods described herein may be similar at least with respect to the paradigm 1000*b* described herein with reference to FIG. 10B.

As a further proof-of-concept, phenolic eX-Linkers may be applied as end groups to thermally responsive poly(N-isopropylacrylamide) (PNIPAM). Electrodeposition of thin films using PNIPAM may follow a generally similar protocol to the one described for m-PEO-nP. Polymers including PNIPAM may be named using a similar convention of m-PNIPAM-nP, wherein m indicates molecular mass of the polymer backbone and n indicates a number of electrochemically active crosslinker groups attached onto the polymer backbone. Polymers for potentiostatic deposition including PNIPAM may be synthesized through, for example, thiol-ene coupling.

Figure 25A:
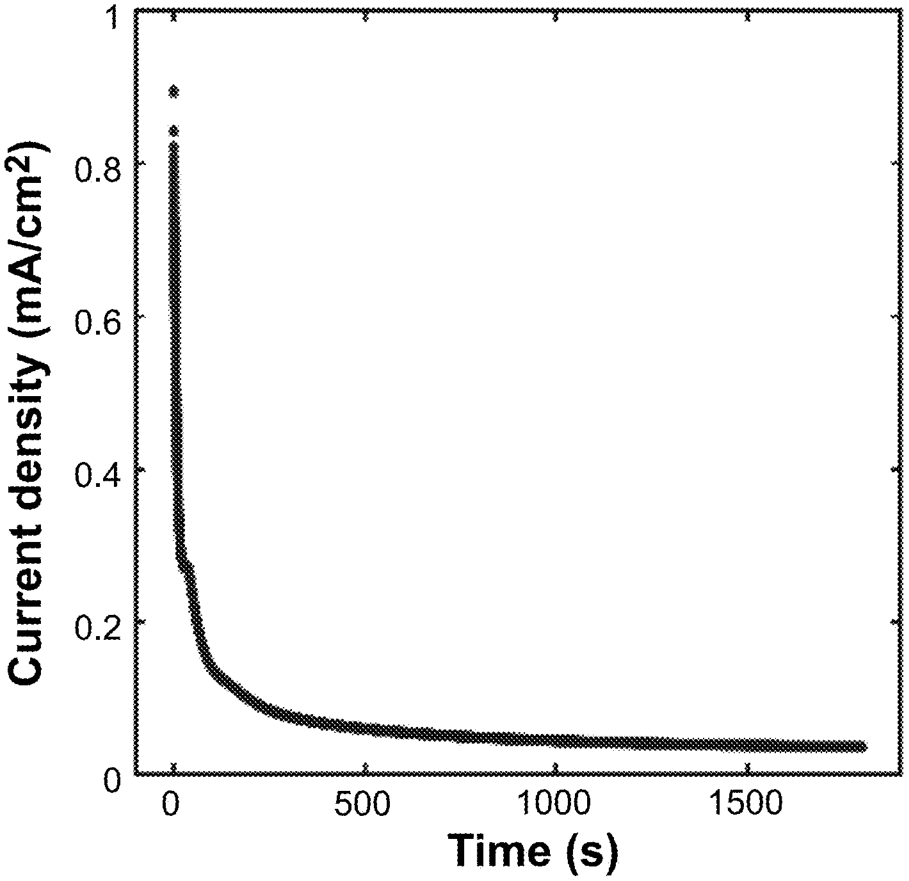
FIG. 25A illustrates a plot of chronoamperometry during potentiostatic deposition of 4k-PNIPAM-2P polymers, according to an example embodiment.

FIG. 25A illustrates a plot of chronoamperometry during potentiostatic deposition of 4k-PNIPAM-2P polymers, according to an example embodiment. The deposition, which may be performed under an applied potential of 1 V vs. Ag/Ag+ on a gold substrate, may exhibit the same or similar passivating behavior as those of m-PEO-nP, with a substantial decrease in current by more than 90% within approximately 200 s.

Figure 25B:
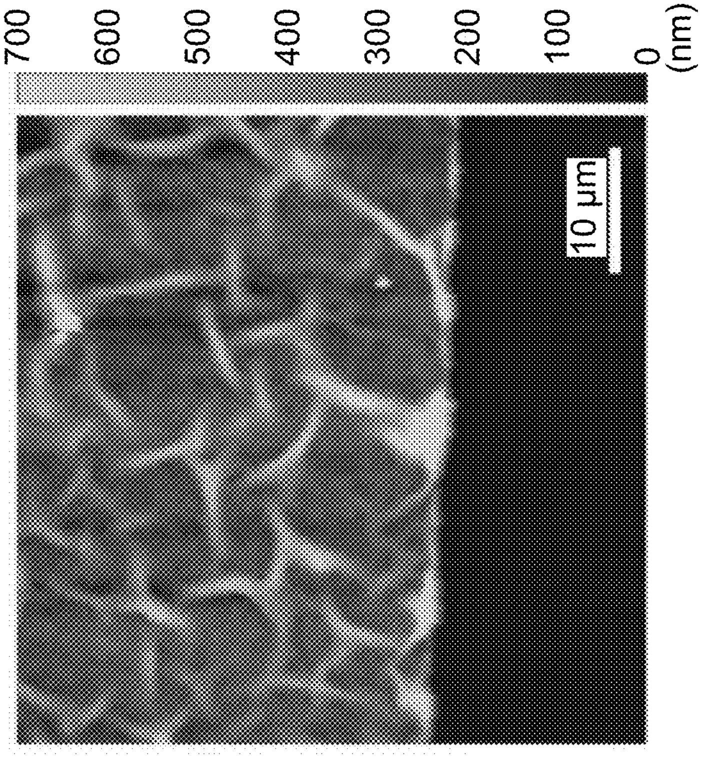
FIGS. 25B and 25C illustrate AFM and SEM, respectively, imaging of electrodeposited thin films including 4k-PNIPAM-2P polymers, according to example embodiments.
Figure 25C:
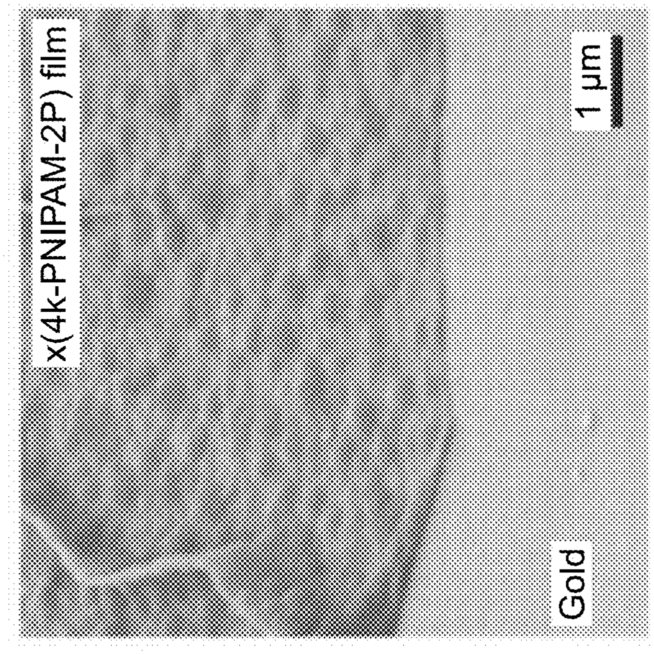

FIGS. 25B and 25C illustrate AFM and SEM, respectively, imaging of electrodeposited thin films including 4k-PNIPAM-2P, according to example embodiments. The images reveal an existence of micron-size wrinkles and nanoscale bumps in the thin films, which may be of approximately 225 nm thickness. The inhomogeneities (the wrinkles and the bumps) may be a result of swelling and/or poor adhesion of the PNIPAM thin film to the substrate and partial delamination during rinsing or drying after electrodeposition (e.g., upon exposure to air and moisture).

Figure 25D:
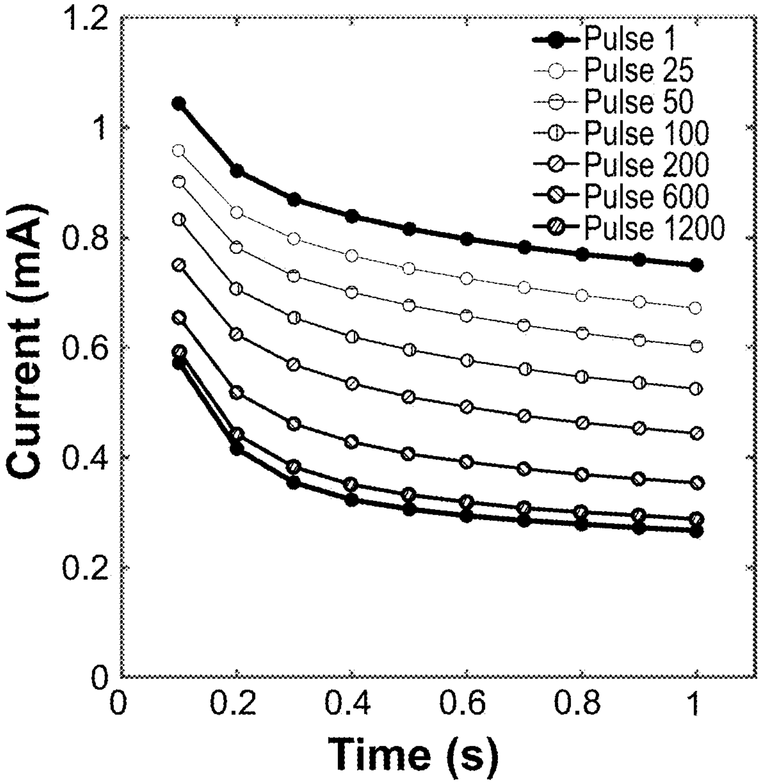
FIG. 25D illustrates a plot of chronoamperometry traces of chosen deposition pulses from the repeating potentiostatic electrodeposition of 4k-PINPAM-2P polymer on a 3-D carbon electrode, according to an example embodiment.

FIG. 25D illustrates a plot of chronoamperometry traces of chosen deposition pulses from the repeating potentiostatic electrodeposition of 4k-PINPAM-2P on a 3-D carbon electrode, according to an example embodiment. Surface passivation may be observed, wherein a measured current gradually decreases as the pulses progress.

Figure 25E:
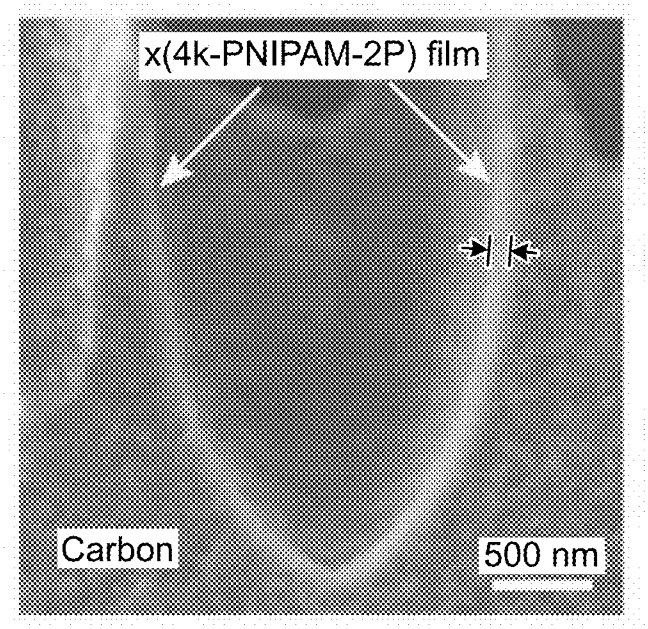
FIG. 25E illustrates a cross-sectional SEM image of a thin film including x(4k-PNIPAM-2P) polymer deposited on a surface of a pore.

FIG. 25E illustrates a cross-sectional SEM image of a thin film including x(4k-PNIPAM-2P) polymer deposited on a surface of a pore. Notably, the deposited thin film demonstrates conformal coverage of the pore without wrinkling.

Thus, EPoN may be useful as a general approach to deposit polymer networks as thin films on conductive substrates of arbitrary shape, but tailored optimization of the deposition and work-up conditions may be required to prevent factors such as wrinkling or delamination.

To confirm that thermal responsive functionalities of PNIPAM are retained after EPoN, cyclic linear temperature sweeps may be applied to an EPoN-derived film. For example, temperature sweeps between 25° C. to 40° C. may be applied to an x(4k-PNIPAM-2P) thin film deposited on a QCM-D sensor while it is exposed to water. Below the lower critical solution temperature (LCST), PNIPAM chains may be swollen while above the LCST, water may be expelled from the polymer network.

Figure 26A:
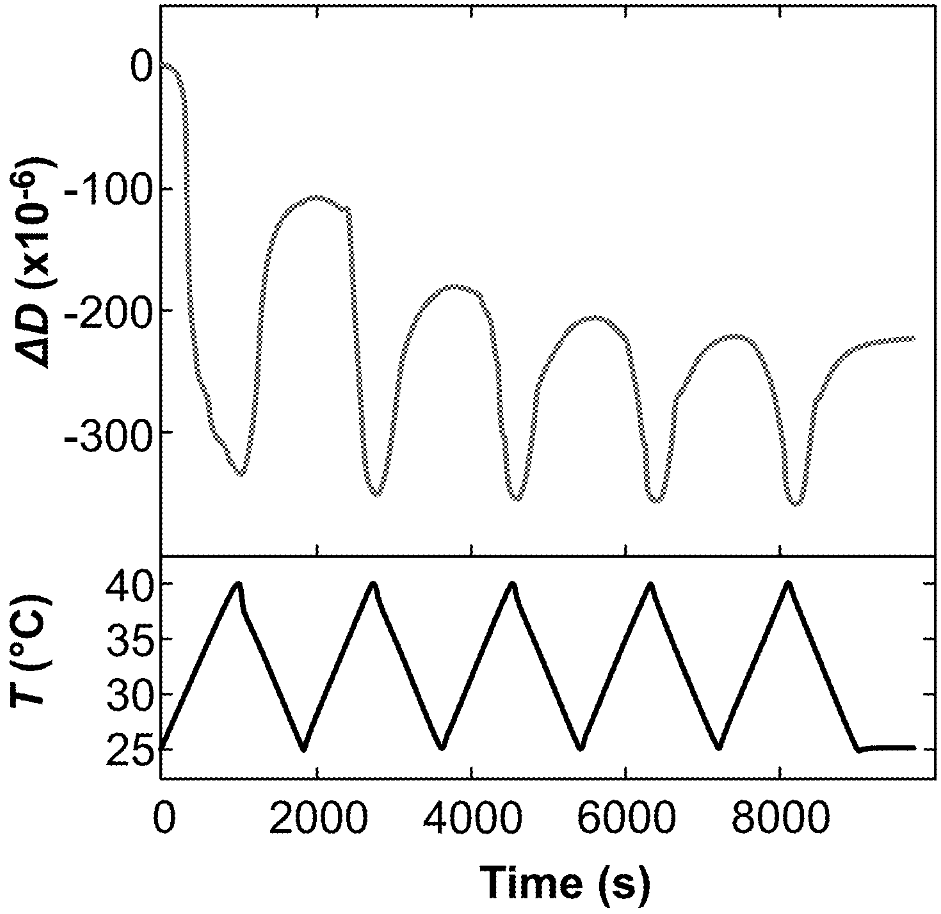
FIG. 26A illustrates a plot of in situ QCM dissipation response (AD) of an electrodeposited thin film in de-ionized (DI) water over 5 heating-cooling cycles, according to an example embodiment.

FIG. 26A illustrates a plot of in situ QCM dissipation response (ΔD) of an electrodeposited thin film in de-ionized (DI) water over 5 heating-cooling cycles, according to an example embodiment. The electrodeposited thin film, which comprises x(4k-PNIPAM-2P), undergoes a phase transition to a more rigid film around 32° C., which may be indicated by a continuous decrease of the QCM-D dissipation (ΔD) as temperature increases.

Figure 26C:
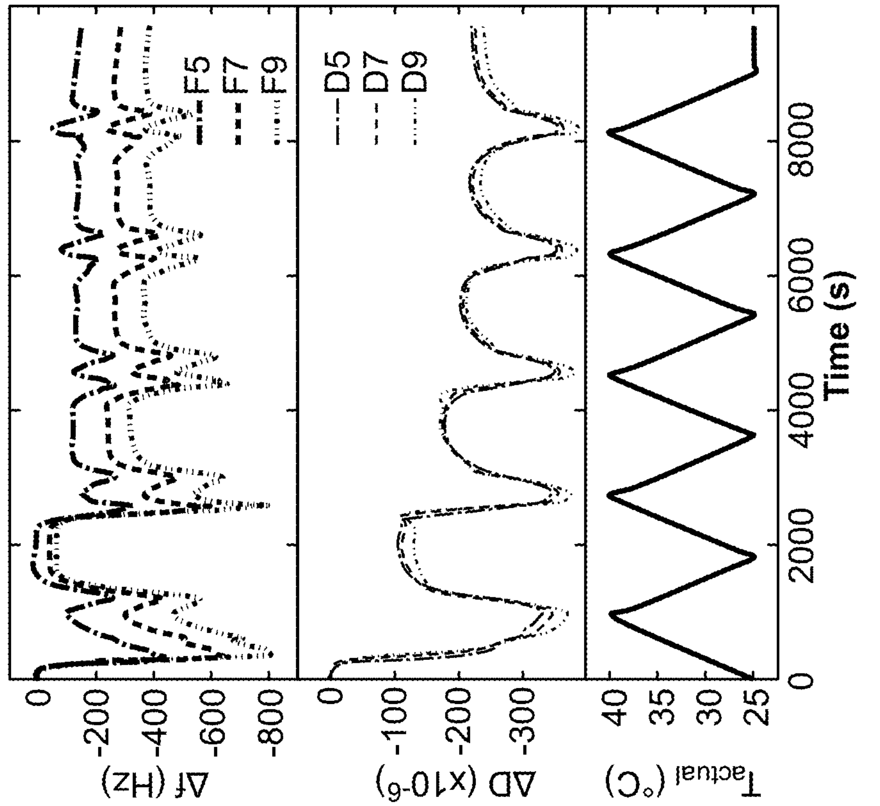
FIGS. 26B and 26C illustrate plots of in-situ QCM-D measurement in DI-water over five heating-cooling cycles of a blank gold quartz crystal sensor and a thin film coated on the gold QCM-D sensor, respectively, according to example embodiments.
Figure 26B:
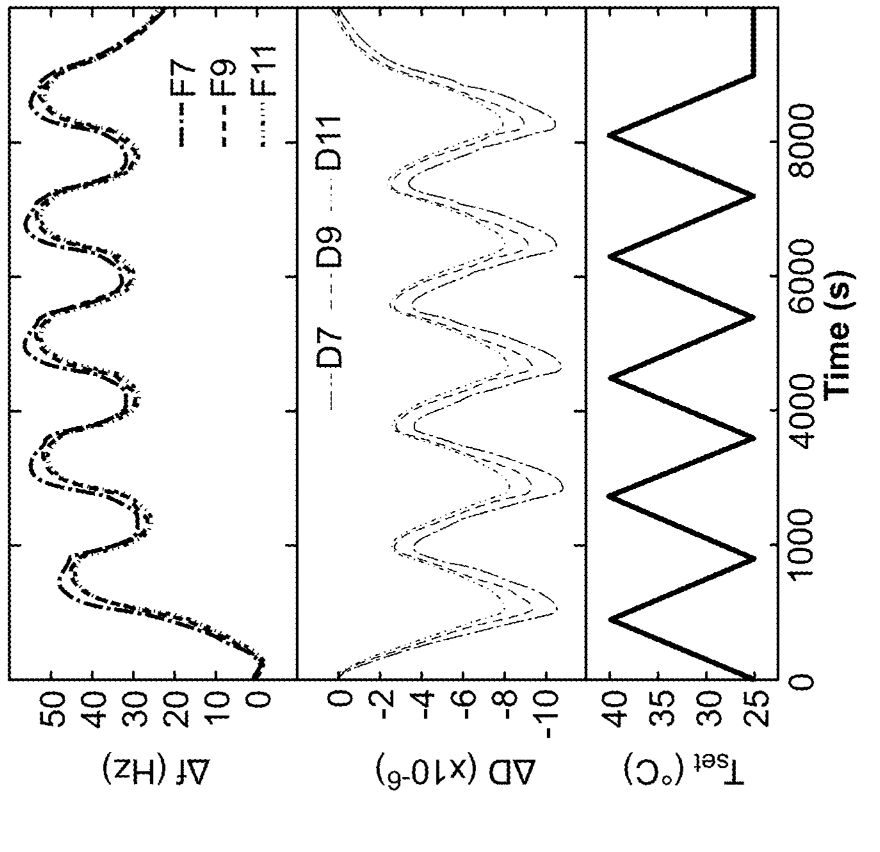

FIGS. 26B and 26C illustrate plots of in-situ QCM-D measurement in DI-water over five heating-cooling cycles of a blank gold quartz crystal sensor and a thin film coated on the gold QCM-D sensor, respectively, according to an example embodiment. A change in frequency (Δf) exhibits a sharp inflection to negative Δf around the LCST and subsequently returns to zero at the upper temperature limit of 40° C. (FIG. 26C). The complex temperature-dependent ΔD and Δf responses, as illustrated are in agreement with prior measurements on surface-grafted PNIPAM on QCM-D sensors. Since the temperature-dependent response of the uncoated QCM-D sensor is an order of magnitude smaller and different than what is observed for the electrode with a thin film comprising x(4k-PNIPAM-2P), the results demonstrate retention of PNIPAM's thermo-responsive functionality upon EPoN.

Example 3—Electrodeposition of Reactive Poly(Isoprene) Networks for Conformal Ultrathin Polyolefin Coatings Amenable to Post-Deposition Functionalization for Hydrophobic Surface Modification Example polymers, compositions, methods, and apparatuses including electrodeposition of a conformal thin film on a conductive substrate have been described in an article by Wenlu Wang et al. (referred to hereinafter as Wang 2025), entitled, "Electrodeposition of Reactive Poly(isoprene) Networks for Conformal Ultrathin Polyolefin Coatings Amenable to Post-Deposition Functionalization for Hydrophobic Surface Modification." J. Mater. Chem. A. 2025, 13, 29050-29059. The article includes Supplemental Materials available online at: https://www.rsc.org/suppdata/d5/ta/d5ta03811a/d5ta03811a1.pdf. The entire teachings of the article and Supplemental Materials are incorporated herein by reference.

As described herein, EPoN may be realized by a dual-functional molecular design: non-reactive polymers with desired functionalities are modified by electrochemically active crosslinkers (eX-linkers) as chain-end groups. Importantly, EPoN film deposition may be self-limiting in its mechanism: for example, phenolate as the eX-linker end group forms radicals upon application of an oxidative potential to the substrate surface, which couple to form oligomeric crosslinks upon continued oxidation, forming a polymer network in the immediate vicinity of the conducting surface. The polymer network may precipitate and adheres onto the surface as a coating and due to its electronically insulating properties and eventual impermeability to the polymeric precursor. This may result in stoppage of charge transfer and crosslinking reactions, ceasing film growth at a condition-dependent characteristic thickness. The self-limiting deposition mechanism may enable a conformal and defect-free deposition of ultrathin polymer network coatings on both planar and porous 3-D substrates with a decoupling of the deposition chemistry from the polymer functionality.

To expand upon the modularity and applicability of EPoN, 'reactive' polymers appended with eX-linker side groups may be introduced. In contrast to end-group functionalized non-polymers, the eX-linker side groups may allow for their incorporation at tunable fractions independent of polymer size. Additionally, using reactive polymers may mean that each monomer contains a chemical group that may be appended by a variety of functional side-groups with efficient chemical click-reactions before or after deposition. Such an approach may introduce modularity to EPoN-derived coatings since neither their function nor crosslink density is pre-determined by the original polymer. Thus, a reactive EPoN introduced herein may be beneficial for functional coatings that either cannot be synthesized as soluble polymers or are not stable under the oxidative electrodeposition conditions. Additionally, eX-linker introduced as a randomly distributed side group may endow EPoN with broader accessibility by circumventing synthetically challenging end-group attachment of eX-linkers demonstrated in prior studies that may not be feasible with many polymers. As a proof of concept, electrodeposition and functionalization of reactive polymer networks is demonstrated with polyisoprene (PI), which contains one available alkene group (C═C double bond) in each repeating unit for various modification schemes including the thiol-ene reaction to achieve desired film properties. PI may be endowed with the ability to be electrodeposited by modifying it with a small fraction of phenol side groups, demonstrating feasibility of the post-EPoN functionalization of the resulting ultrathin PI network coatings using fluorinated alkyl thiols.

Figure 27:
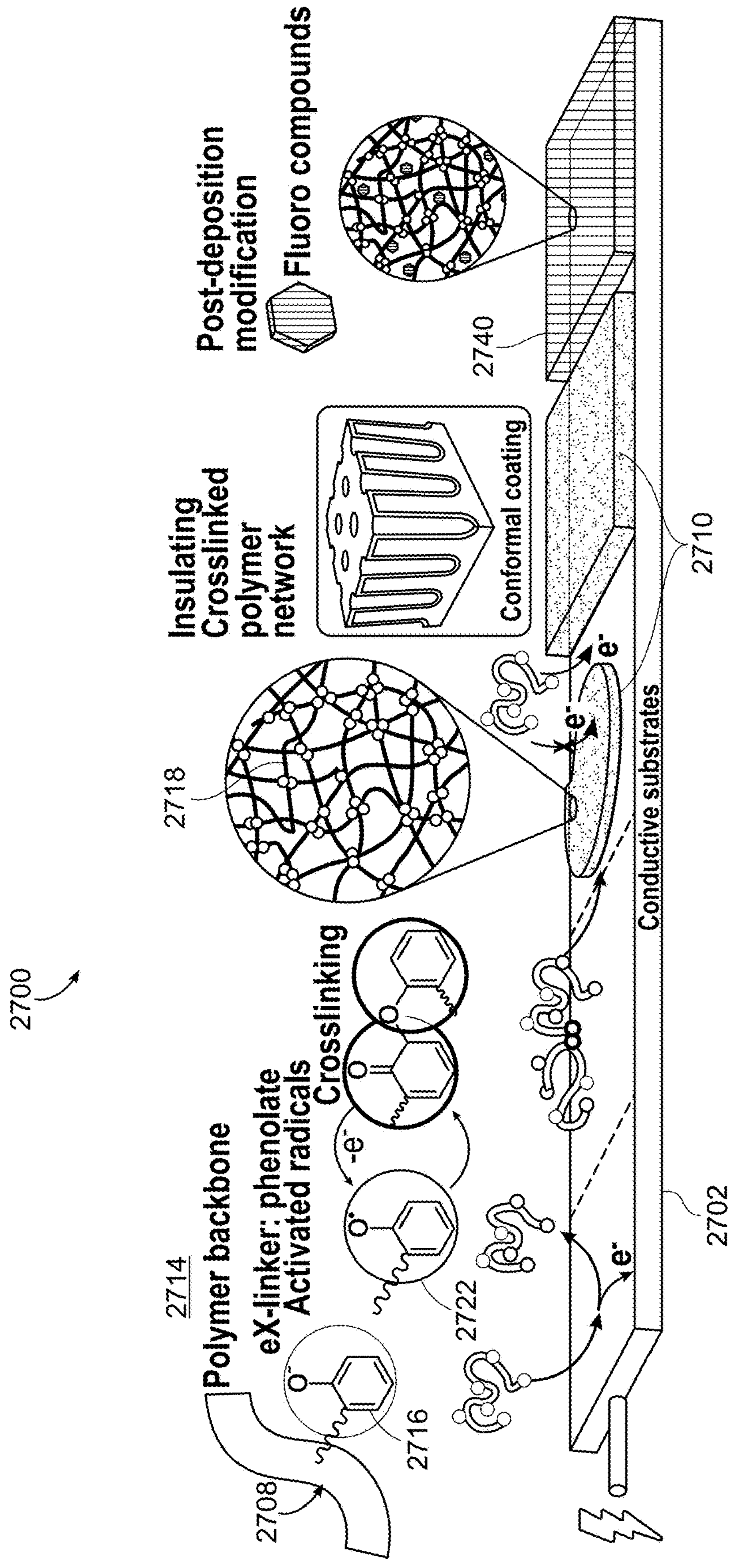
FIG. 27 illustrates an example embodiment of a scheme of a self-limiting EPoN mechanism and post-deposition modification of reactive polymers appended with electrochemically activated crosslinking side groups.

FIG. 27 illustrates an example embodiment of a scheme 2700 of a self-limiting EPoN mechanism and post-deposition modification of reactive polymers 2708 comprising polymer backbone 2714 appended with electrochemically activated crosslinking side groups 2716. For example, phenolate side groups are oxidized at a conductive substrate 2702 to generate radicals 2722 which couple via crosslinking, forming a polymer network 2718 on a surface of the conductive substrate 2702. Subsequently, a functional side group is attached to the polymer network 2718, such as a fluorocarbon-thiol to the double bond of a polyisoprene coating to form a modified polymer network 2740.

End-group modification of polymers, as described herein with reference to Example Embodiments 1 and 2, may exhibit various limitations. For example, eX-linker fraction and mesh-size may be pre-determined by polymer molecular weight and architecture, and many polymers may be challenging to synthesize with desired end groups. A more widely accessible and modular fabrication method for polymeric coatings may be achieved for EPoN with chemically reactive polymer backbones that are modified with a small fraction of the eX-linker phenol attached as side groups (for example, co-monomers). Self-limiting film growth may be mediated with an anodic potential, under which phenolate side groups are oxidized into phenoxy radicals. The radicals couple to dimers and further continue the oxidation-coupling cycle to form oligomers. The insulating crosslinked polymer network may adhere onto the electrode surface and continue densifying, which may reduce and eventually eliminate macromer permeation to the surface and stop the charge transfer reaction. Since a small fraction (<5 mol %) of eX-linker is required for film formation, the deposited polymer network thin film may retain most of its original chemical reactivity and may be amenable to modification with other functional side groups after EPoN to attain the desired film functionality.

PI may be selected as an example embodiment of a reactive polymer due to its carbon-carbon double bond (C═C) in each isoprene repeating unit, which may support a wide range of reaction chemistries, including, for example, thiol-ene click chemistry. Example embodiments of PI used here may have a molecular weight of 20 kg $mol^{-1}$ and may be 1,4-PI dominant with 7% of 3,4-isoprene units and a dispersity of 1.05. The PI may be modified with a small portion of 4-mercaptophenol by UV-initiated thiol-ene coupling. The phenol-modified PI macromers may be named PI-xPh hereafter with x being the monomeric fraction of the phenol side group. Phenol attachment and PI-xPh composition may be confirmed by $^1$H-NMR, for example, based on existence of peaks at 6.7 ppm and 7.2 ppm indicating successful incorporation of phenol and its fraction x determined by comparing the integral of phenol and backbone $sp^2$-protons of the 1,4-PI backbone as well as the vinyl group protons of 3,4-PI. The substitution x may be set below 5%, which may be sufficient for EPoN film formation and while leaving ample C═C double bonds in the polymer for post-deposition functionalization.

For electrodeposition, ITO-coated glass may be used as a planar conductive substrate and immersed in a solution of PI-xPh with a stoichiometric amount of base to deprotonate the phenol groups that facilitates its oxidation. In cyclic voltammetry (CV), the phenolic side groups may oxidize at a potential above −0.6 V vs. $Ag/Ag^+$, which may cause polymer crosslinking and deposition on the electrode surface.

Figure 28A:
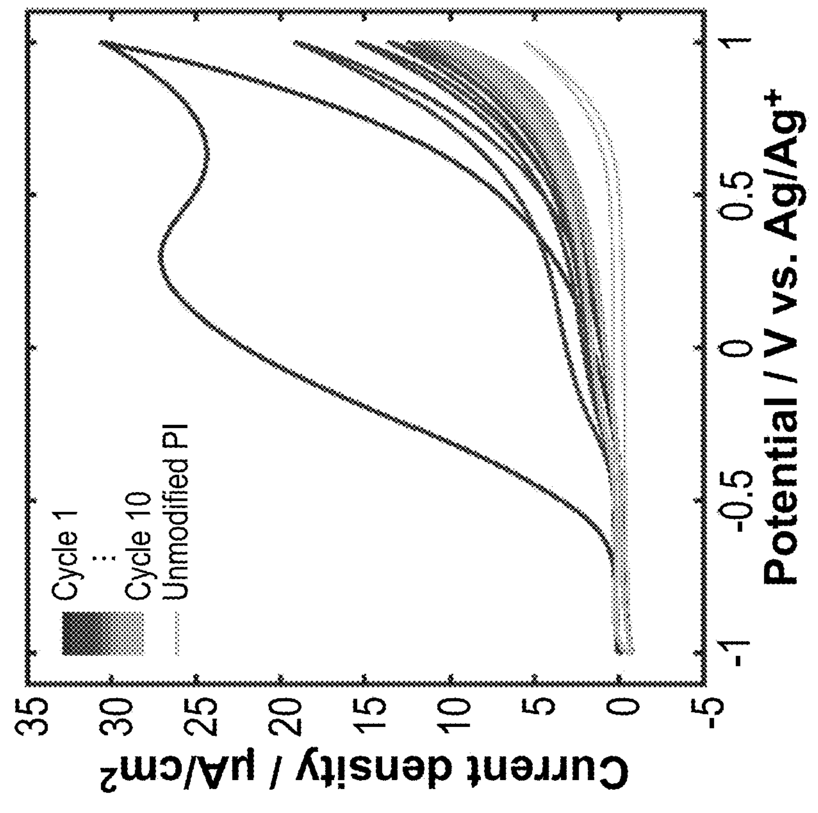
FIG. 28A illustrates CV measurements of a thin film comprising polymers of PI-2.7% Ph on an ITO-coated glass substrate, according to an example embodiment.

FIG. 28A illustrates CV measurements of a thin film comprising polymers of PI-2.7% Ph on an ITO-coated glass substrate, according to an example embodiment. Cycles of measurements are overlayed with a control CV of the same PI without phenol modification, which may demonstrate surface passivation caused by irreversible phenol oxidation.

Figure 28B:
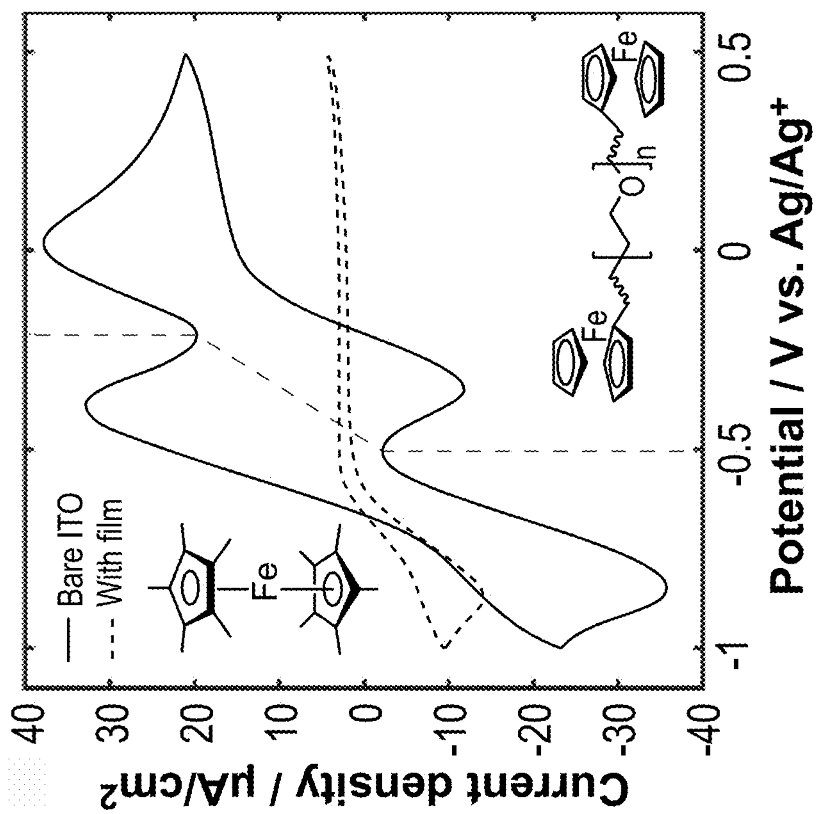
FIG. 28B illustrates CV measurements of a solution with two distinct ferrocene-type molecules of different sizes before and after deposition of a thin film comprising PI-2.7% Ph polymers, according to an example embodiment.

FIG. 28B illustrates CV measurements of a solution with two distinct ferrocene-type molecules of different sizes before and after CV-deposition of a thin film comprising PI-2.7% Ph polymers, according to an example embodiment. The dashed line visually separates oxidation/reduction peaks of decamethylferrocene (topleft) and 3.4 kDa poly (ethylene oxide)-diferrocene (bottom right). An absence of oxidation current above −0.25 V and reduction current above −0.5 V vs. $Ag/Ag^+$ may reveal that molecules of size similar or larger than 3.4 kg $mol^{-1}$ PEO may be unable to reach the ITO surface, demonstrating the thin film is free of defects or pinholes down to a nanoscale within the electrochemical detection limit. This observation may support a mechanism wherein self-limiting deposition is dominated by the hindrance of PI-xPh diffusion through the thin film at a critical thickness and density. An appreciable remaining redox current for decamethylferrocene (326 g $mol^{-1}$) in the range of −1 V and −0.25 V may suggest that the polymer network allows small molecules to permeate through the polymer-network thin film.

Figure 28C:
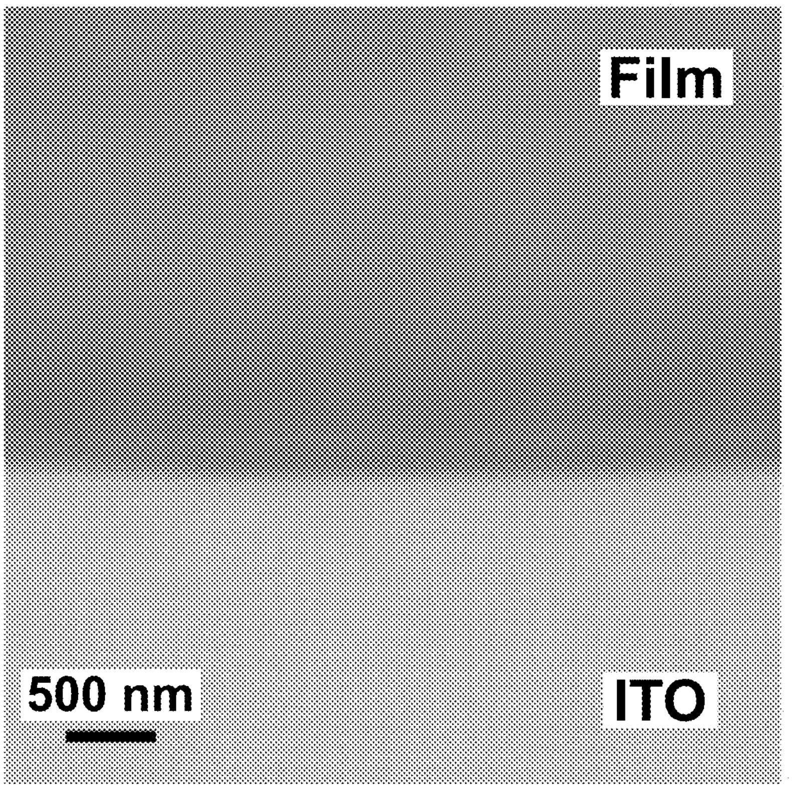
FIG. 28C illustrates an SEM image of a thin film comprising polymers of PI-2.7% Ph ("Film") on a conductive substrate ("ITO"), according to an example embodiment.

FIG. 28C illustrates an SEM image of a thin film comprising polymers of PI-2.7% Ph a conductive substrate, according to an example embodiment. The image may indicate that the thin film formed on an ITO-coated glass substrate, which is acquired at a 45-degree angle, appear smooth on the ITO substrate, and the wrinkles and delamination at the film edge may provide evidence that the film is not covalently bonded to the surface but adhered by Van-der-Waals forces. This distinction of EPoN with respect to grafting of polymer brushes may be beneficial for electrode coatings that require molecular permeability and access to the electrode surface, for example, which is demonstrated here with the electrochemical accessibility of decamethylferrocene even after coating of the electrode.

Since the eX-linkers may be attached as side groups, phenolic fractions may have an influence on the film properties, especially thickness, in addition to deposition potential. To test these correlations, PI with different phenol fractions of 2.3% to 3.5% may be prepared as identical solutions and deposited on ITO-coated glass at 1 V and 0.5 V vs. $Ag/Ag^+$.

Figure 28D:
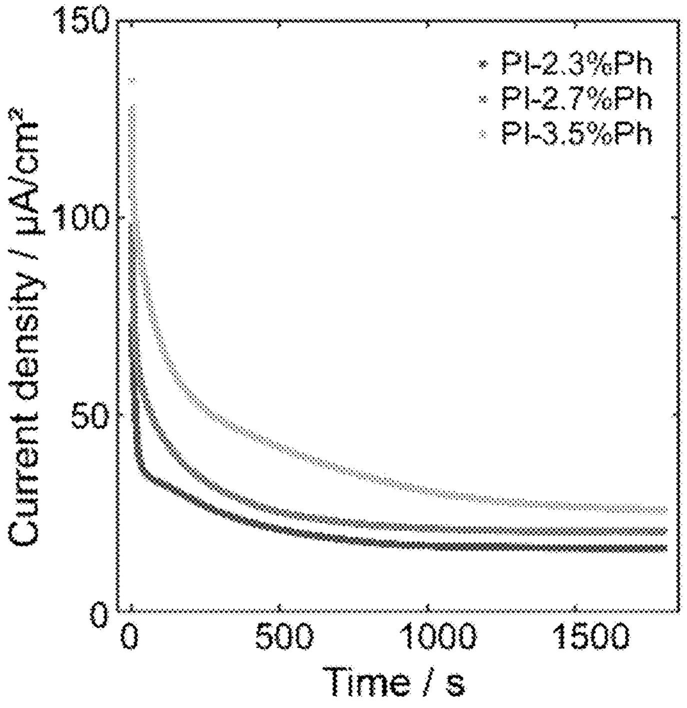
FIG. 28D illustrates a plot of chronoamperometry (CA) measurements of the potentiostatic deposition of various PI-xPh polymers at 1 V vs $Ag/Ag^+$, according to example embodiments.

FIG. 28D illustrates a plot of chronoamperometry (CA) measurements of the potentiostatic deposition of various PI-xPh at 1 V vs $Ag/Ag^+$, according to the example embodiment. The chronoamperometry (CA) measurements of all PI-xPh indicate a rapid current decrease over the first minute and then gradually reach a steady state current over a 30-min deposition span, indicating a fast surface passivation creating a barrier to further diffusion of unreacted PI-xPh from a bulk solution. As may be expected from higher concentrations of electrochemically active phenol groups, both the initial and the steady state current are higher for PI-3.5% Ph compared to PI-2.3% Ph. EPoN at different applied potentials may similarly result thin films with different properties, as disclosed hereinabove.

Figure 28E:
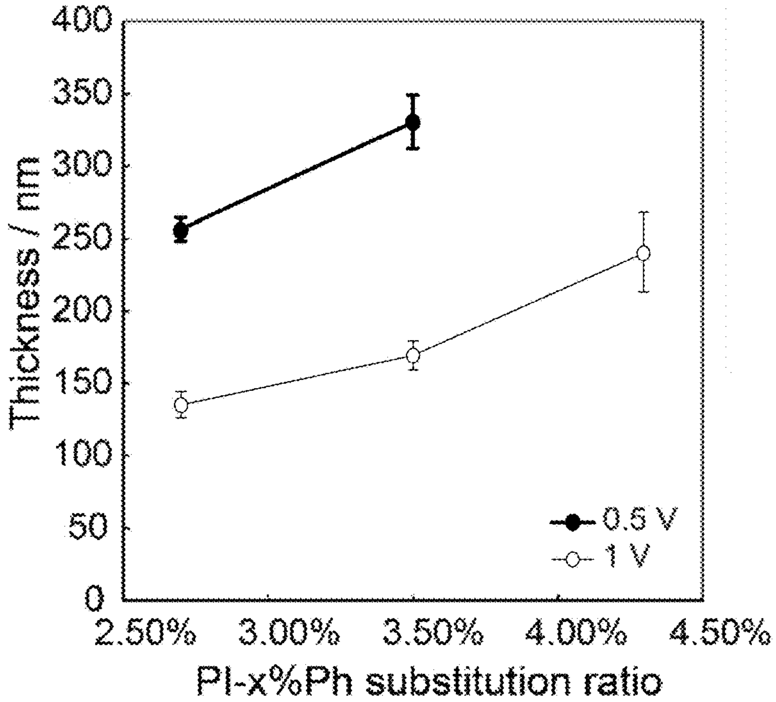
FIG. 28E illustrates a plot of film thicknesses of various PI-xPh (x=2.7%, 3.5%, and 4.3%) polymers deposited at 1 V and 0.5 V vs. $Ag/Ag^+$, according to an example embodiment.

FIG. 28E illustrates a plot of film thicknesses of various PI-xPh (x=2.7%, 3.5%, and 4.3%) deposited at 1 V and 0.5 V vs. $Ag/Ag^+$, according to an example embodiment. Spatially resolved film thickness is measured by interferometry and results of the plot indicate that higher phenol fractions may lead to thicker film. Error bars correspond to standard deviations of five independent thickness measurements on a same film taken at a center and in the four principal directions at a distance of 4-5 mm from the center, respectively.

It may be noted that, at the same phenol fraction, EPoN at 0.5 V yields significantly thicker films: a PI-2.7% Ph film from 1-V EPoN is 135 nm thick while at 0.5 V, the self-limiting film thickness is 256 nm, almost two times thicker. The same trend may be observed for PI-3.5% Ph films. It may further be noted that (macro)molecular permeability tests with decamethylferrocene and 3.4 kDa-PEO-2Fc show no substantial difference, indicating similar crosslink density of the final films. A potential justification may include that potential-dependent thickness may be due to transient differences during film growth. EPoN may exhibit a balance between crosslinking kinetics and diffusion of both non-activated and activated (with oxidized phenolic eX-linkers) polymers to and from the surface, respectively. At a lower potential of 0.5 V vs. $Ag/Ag^+$, oxidation of the phenolate groups may be slower yielding initially less activated radicals per chain. Therefore, the initial crosslinked polymer network may be less dense, allowing more PI-x % Ph to permeate through, react at an electrode surface, and continue to grow and densify the coating until the crosslink density is reached that inhibits further polymer permeation. At 1 V vs. $Ag/Ag^+$, on the other hand, phenolate oxidation may be faster and more phenolate groups may be activated on each polymer leading to faster crosslinking and densification of the network, resulting in a thinner film.

Figure 29:
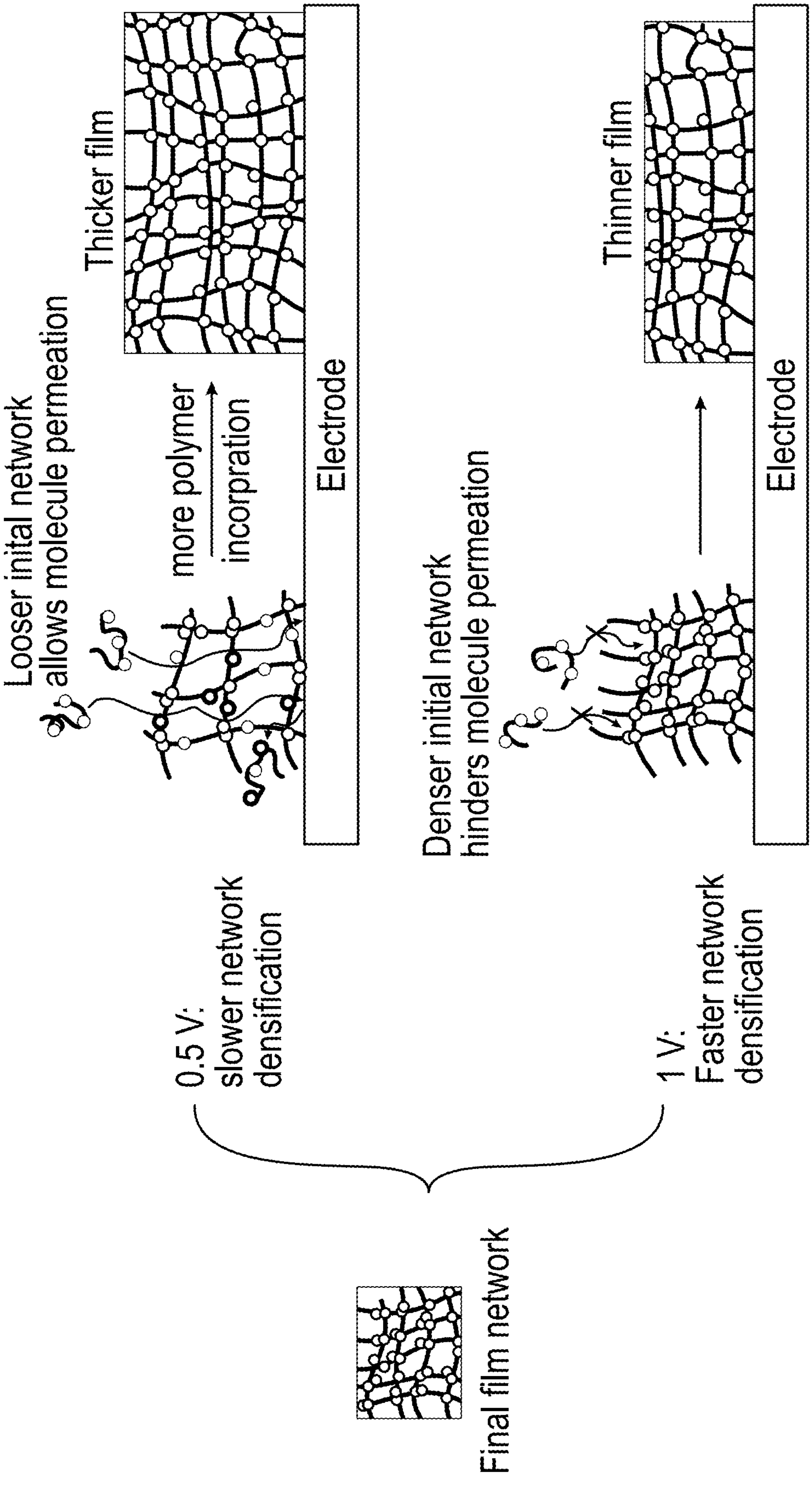
FIG. 29 illustrates schematically an example transient mechanism of EPoN film formation at different deposition potentials, according to an example embodiment.

FIG. 29 illustrates schematically an example transient mechanism of EPoN film formation at different deposition potentials, according to an example embodiment. Higher deposition potentials (e.g., 1 V) may cause faster charge transfer with more phenolic side groups being oxidized, which may in turn lead to faster densification of the polymer network and ceasing of film growth. Lower deposition potentials (e.g., 0.5 V) with slower charge-transfer rates may initially lead to transient coatings with lower crosslink-density, which may allow for longer and more polymer activation before the network is sufficiently dense to stop film growth.

As described herein, polymer networks of conformal thin films may be functionalized following deposition. As an example embodiment, PI-xPh coatings may be functionalized with a fluorine-rich molecule with a thiol group since C—F bonds may be quantitatively detected by X-ray photoelectron spectroscopy (XPS).

Figure 30A:
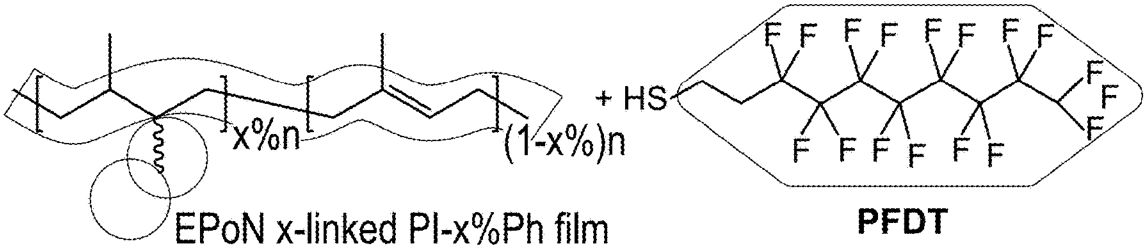
FIGS. 30A and 30B illustrates schematically an example mechanism of post-EPoN functionalization of a conformal thin film, according to an example embodiment.
Figure 30B:
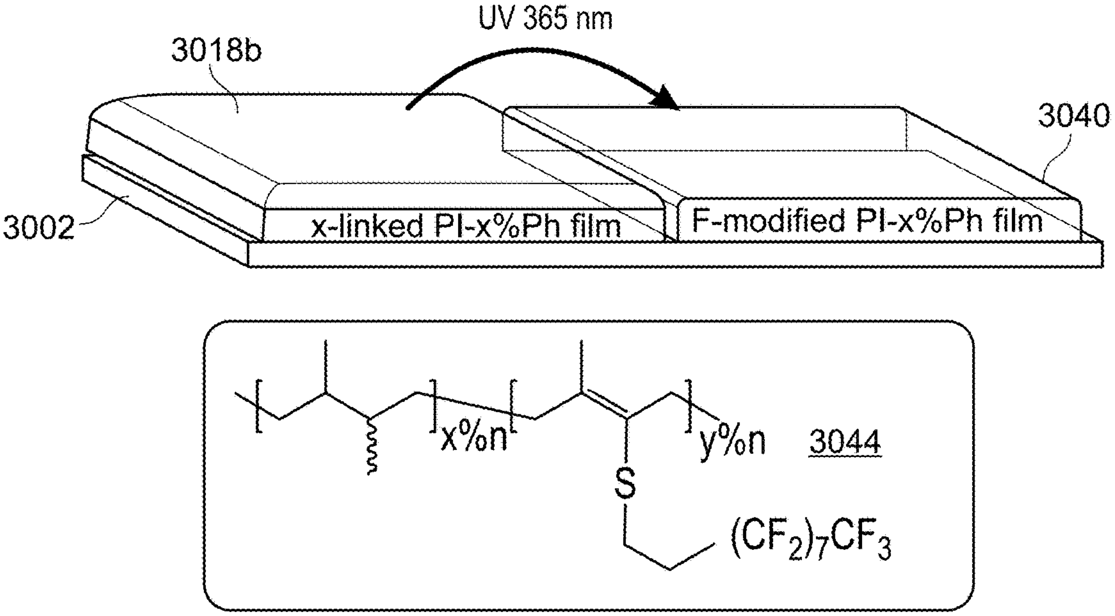

FIGS. 30A and 30B illustrates schematically an example mechanism of post-EPoN functionalization of a conformal thin film, according to an example embodiment. The functionalization process using the thiol-ene reaction between the conformal thin film, e.g., a PI coating, and a fluorocarbon thiol, e.g., 1H,1H,2H,2H-perfluorodecanethiol (PFDT). Chemical modification of the PI coating may be realized by UV-initiated thiol-ene coupling (FIG. 30B) between PFDT and an EPoN-derived PI-x % Ph, e.g., PI-3.5% Ph, ultrathin film (FIG. 30A) on ITO-coated glass. The modified film may be thoroughly cleaned with dimethyl formamide and chloroform, both good solvents for PFDT.

Figure 31:
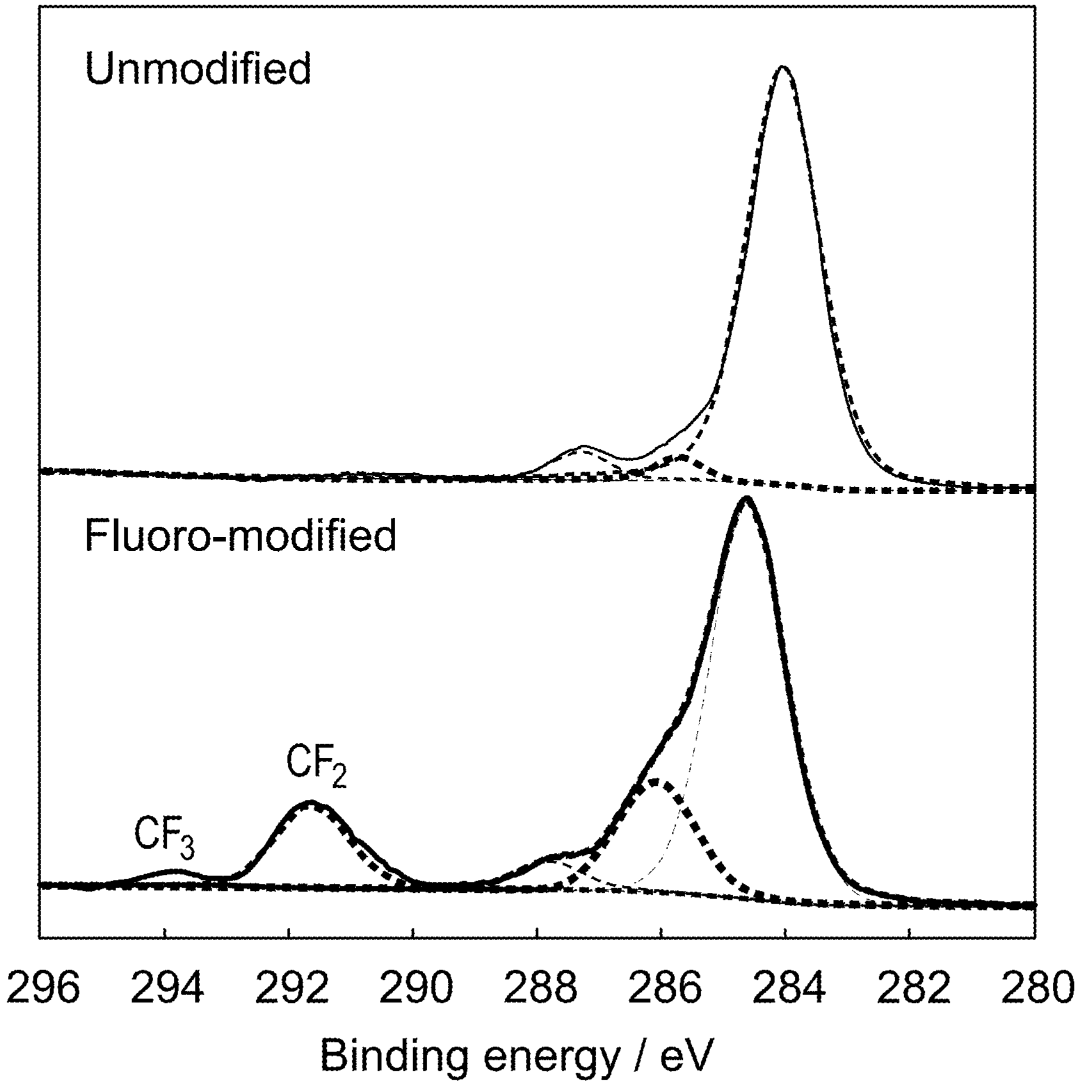
FIG. 31 illustrates a plot of a high resolution C1s spectra acquired using X-ray photoelectron spectroscopy (XPS) scans of an EPoN-derived PI-3.5% Ph ultrathin film before (top) and after (bottom) fluorocarbon functionalization based on the scheme of FIGS. 30A and 30B.

FIG. 31 illustrates a plot of a high resolution C1s spectra acquired using X-ray photoelectron spectroscopy (XPS) scans of an EPoN-derived PI-3.5% Ph ultrathin film before (top) and after (bottom) fluorocarbon functionalization based on the scheme of FIGS. 30A and 30B. Emergence of C—F3 and C—F2 peaks at 291.5 and 294 eV in the high-resolution CIs spectrum suggests the successful incorporation of the fluorinated side group after a short 90-*s* UV exposure. An integral of fitted peaks occupies 16 atomic percentage (atom %) which corresponds to a conversion of 12.5% of the crosslinked polymer (PI) network's double bonds.

Figure 32C:
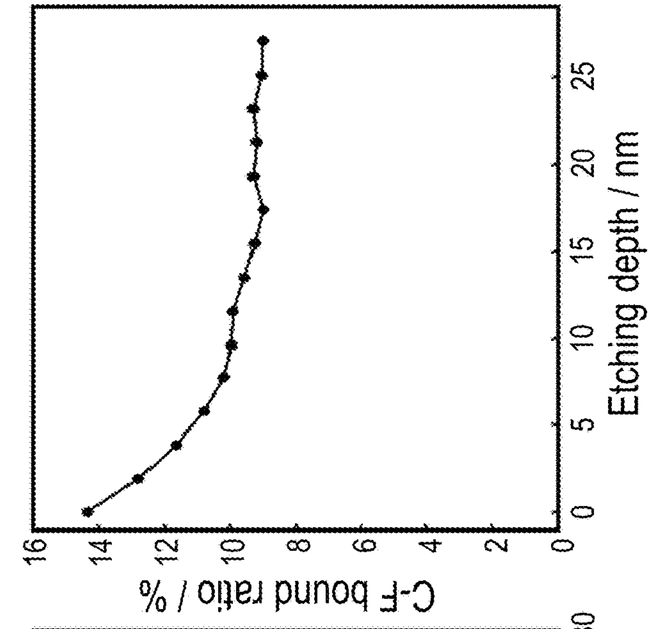
FIG. 32C illustrates a plot of C—F bond ratio with respect to overall carbon content versus etching depth, which may correspond to the depth profiles of FIGS. 32A and 32B.
Figure 32B:
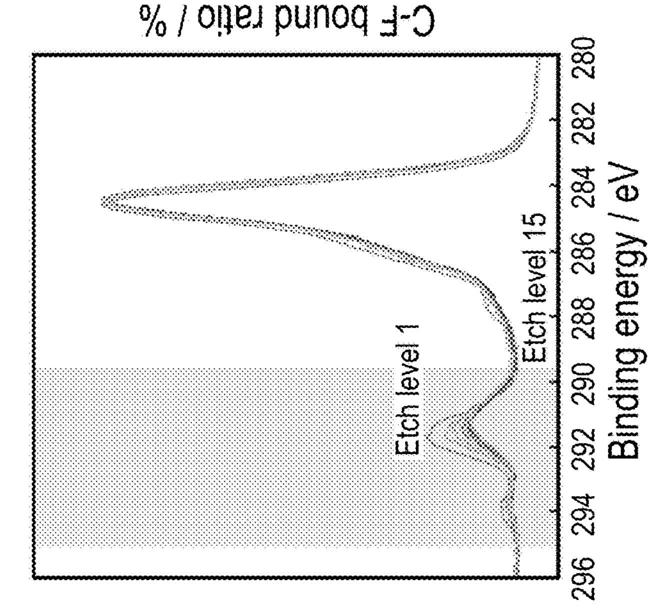
FIGS. 32A and 32B illustrate plots of stacked and overlaid, respectively, XPS C1s depth profiles of the ultrathin film after fluorocarbon functionalization following the scheme of FIGS. 30A and 30B.
Figure 32A:
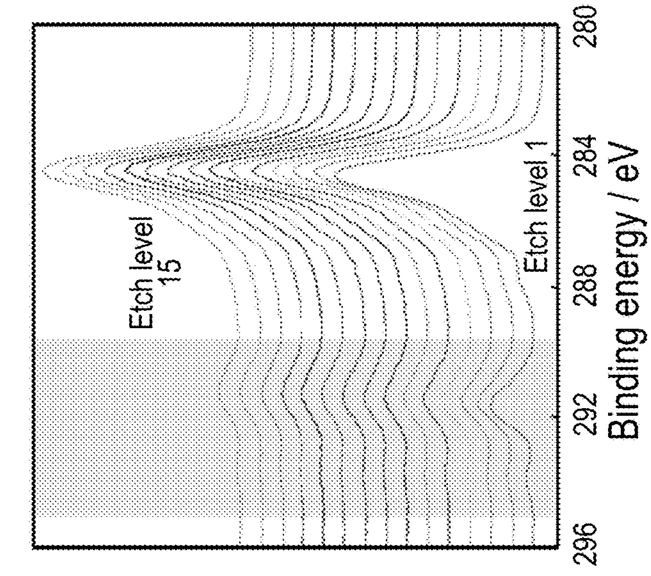

FIGS. 32A and 32B illustrate plots of stacked and overlaid, respectively, XPS CIs depth profiles of the ultrathin film after fluorocarbon functionalization via the scheme of FIGS. 30A and 30B. To evaluate the uniformity of the modification through the thickness of the EPoN-derived ultrathin film, depth profiling using ion cluster etching may be employed, showing a slight decrease in the atomic percentage of C—F with depth reaching a constant value deeper into the film. The plots may demonstrate that efficiency of post-deposition modification reduces somewhat with depth, which may be caused by limited penetration of PFDT molecules into the film.

FIG. 32C illustrates a plot of C—F bond ratio with respect to overall carbon content versus etching depth, which may correspond to the depth profiles of FIGS. 32A and 32B.

It may be noted that the polyisoprene used herein obtained from anionic polymerization is composed of 93% of 1,4-PI and 7% of 3,4-PI, which may contribute to lower conversion efficiency. Thiol-ene reactivity of in-chain 1,4-units may be up to ten times lower than pendant terminal double bonds, while in-chain double bonds may also have increased propensity to inter-chain crosslink under thiol-ene conditions even in solution, an effect that may be likely amplified in already crosslinked EPoN-derived films.

Further, it may be noted that a thickness of modified film areas decreases from 206 nm to 99 nm while a thickness of the same film outside the modification area decreases by 13 nm. UV irradiation-induced double-bond cleavage, a process that is promoted by thiyl radicals, may be a potential reason or mechanism for the loss in film thickness. This hypothesis may be further supported by complete film removal observed after pro-longed UV exposure of 10 minutes, while a slower decrease in film thickness accompanied by increased propensity to swelling may be observed upon UV exposure of an EPoN-derived PI-3.5% Ph film soaked in pure DMF and exposed to UV. Thus, under the modification conditions employed here, 12.5% of double bond conversion may be a limit, but future application of PI-based post-EPoN functionalization may be improved by increasing the fraction of 3,4-PI to yield higher conversion, combined with milder protocols that avoid UV-induced chain scission, such as thermally induced thiol-ene reactions.

Figure 33A:
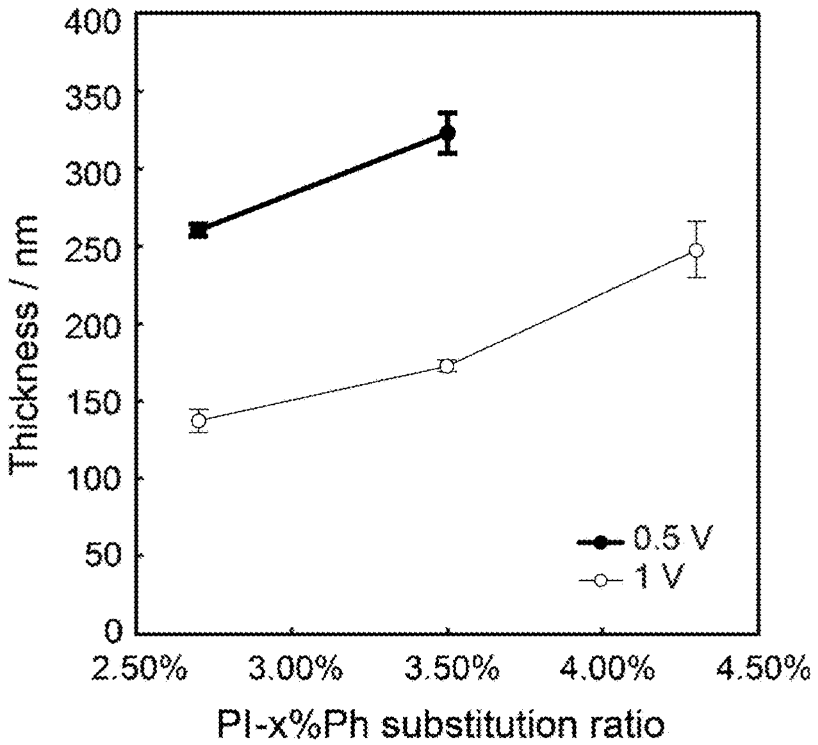
FIGS. 33A and 33B illustrate plots of film thickness and fluorocarbon functionalization after storage of electrodeposited conformal thin films under ambient conditions for 120 days, according to an example embodiment.
Figure 33B:
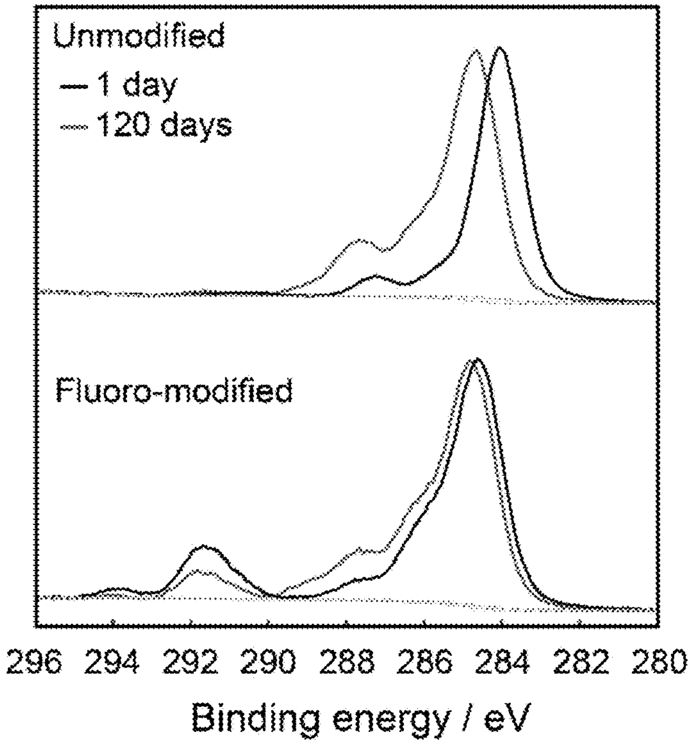

FIGS. 33A and 33B illustrate plots of film thickness and fluorocarbon functionalization after storage of electrodeposited conformal thin films under ambient conditions for 120 days, according to an example embedment. The plots of FIGS. 33A and 33B may indicate stability of the reactive EPoN-derived PI-x % Ph thin films and fluoro-modified coatings. The thickness plots of FIG. 33A may indicate negligible difference over the 120-day period. The fluorocarbon functionalization plots of FIG. 33B, which are acquired using XPS, reveals a shift to and increase in intensity at higher binding energies, which may suggest a presence of more oxidized carbon-carbon and carbon-oxygen bonds. This may indicate that the films undergo slow oxidation in ambient air over a 120-day period, which may be expected for unsaturated organic thin films without stabilizers such as radical or oxygen scavengers.

As disclosed herein EPoN may be useful as a general fabrication method to coat conductive materials of arbitrary shape with ultrathin polymer films Specifically, EPoN of reactive polymers appended with electrochemical crosslinkers as side groups that enable size-independent tuning of crosslink density and deposition-independent functionalization of the resulting coatings after their deposition are introduced. This concept is exemplified with polyisoprene containing less than 5% phenolic side groups that exhibits the EPoN-defining surface passivation and self-limiting growth behavior resulting in conformal coatings on both planar and 3-D conductive substrates. The coating thickness can be tunable on the sub-micron length scale through deposition potential and phenol fraction. Importantly, the preservation of the alkene group of the PI during EPoN enables its facile post-deposition functionalization demonstrated by the emergence of the prominent C—F bond after 90 s of UV-induced thio-ene modification with a fluorinated mercaptan. This reactive EPoN method substantially expands the applicability of this method by increasing accessible functionalities for conformal ultrathin polymeric coatings through facile small-molecule modification after film deposition. Importantly, the attachment of the electrochemically activated crosslinker unit as a side group follows the same facile reaction type, rendering the full process accessible to a wide range of scenarios. General concepts and methods of EPoN with reactive polymers can expand to other reactive polymer choices and copolymer architectures. The versatility of this reactive EPoN has great potential in numerous applications fields including protective surface coatings, sensors, or energy storage, but also for accelerated polymer material discovery.

Methods

Polyisoprene homopolymer (PI), was synthesized via living anionic polymerization. Briefly, the monomer isoprene was purified with n-butyllithium after removal of its cyclohexane solvent, freeze-pump-thawed three times, and distilled using a high-vacuum Schlenk line prior to use. Polymerization of PI was performed in benzene (purified with n-butyllithium/1,1-diphenyl ethylene and distilled) in a Schlenk flask under nitrogen atmosphere, initiated by sec-butyllithium at predetermined molar ratios to the isoprene monomer. The benzene/sec-butyllithium mixture was stirred for several hours before the isoprene was added and then continuously stirred overnight at room temperature. Freeze-pump-thawed methanol was added to terminate the polymerization. Subsequently, the solvents were removed from the mixture via rotary evaporator and the resulting colorless solid was redissolved in chloroform at approximately 20 wt % followed by two cycles of precipitation into cold methanol, filtration, and redissolving. The purified products were dried in a vacuum oven at 50° C. for 3 days to yield PI as colorless and rubbery solid Free-standing porous 3-D carbon electrodes were prepared by non-solvent induced phase separation (phase inversion) of PAN followed by carbonization similar to previous reports. Briefly, polymer dope solutions of PAN, dimethyl sulfoxide (DMSO), and water at a mass ratio of 1.4:10.3:1 for dense low-tortuosity 3-D carbon electrodes and of PAN, polyvinyl pyrrolidone (PVP), DMSO, and Dimethylformamide DMF at a mass ratio of 1:1:4:4 for hierarchically porous 3-D carbon were prepared and thoroughly stirred at 70° C. until fully dissolved and homogeneous. The polymer dope solutions were cast on an organogel substrate to ensure open and accessible low-tortuosity pores. The organogel was prepared by mixing 2,2'-(ethylenedioxy)diethanethiol, pentaerythritol tetrakis(3-mercaptopropionate), tri(ethylene glycol) divinyl ether at a mass ratio of 13.78:1:16.12, respectively, resulting in a 1:1 stoichiometric ratio of thiol to vinyl end groups. Darocur 1173 ® was added at 1.4 wt. % as a photoinitiator. 0.8 mL of the solution was then pipetted on a glass microscope slide to coat it. Then the solution was exposed to 365 nm UV for 3 min to form the organogel. The polymer dope solutions were spread with a doctor blade onto a glass slide coated with the cross-linked organogel and subsequently submerged in a nonsolvent bath of either deionized water (hierarchically porous carbon) or 1:1 water: isopropanol mixture (dense low-tortuosity 3-D carbon) at 21° C. for 10 minutes to induce phase inversion by non-solvent/solvent exchange. The resulting porous polymer films were transferred to room temperature deionized water overnight to ensure completion of the solvent extraction. Afterwards, the films were placed between two sheets of paper towel and dried in a vacuum oven at 70° C. for 12 hours. For carbonization, the polymer films were sandwiched between graphite plates and placed in a tubular furnace first held between 250-280° C. under air for cyclization of the PAN backbone and then heated to 1100° C. under Argon flow to carbonize.

The PI-xPh was dissolved at 100 mg $mL^{-1}$ in tetrahydrofuran (THF) with tetramethylammonium hydroxide pentahydrate (TMAH×$5H_2O$) at a 1:1 molar ratio to phenol groups and 0.1 M of supporting electrolyte tetrabutylammonium perchlorate (TBAP). Platinum wire was used as the counter electrode, and silver wire as the frit-separated reference electrode immersed in a silver reference solution composed of 0.05 M of silver perchlorate ($AgClO_4$) and 0.1 M of TBAP in THF. All electrochemical experiments were carried out on a Gamry Reference 600+ potentiostat. Cyclic voltammetry (CV) of PI-xPh on planar ITO substrates was performed between −1 V and +1 V vs. Ag/Ag+ at 50 mV $s^{-1}$ for 10 cycles while 3 cycles were applied for unmodified PI as a control. Potentiostatic electrodeposition with chronoamperometry (CA) was conducted at +1 V vs Ag/Ag+ for all PI-xPh on ITO substrates. All electrodeposited films were rinsed with THF three times and blow-dried with air.

Reductive EPoN was performed with PI-xArBr in 0.1 M TBAP in THF. CV deposition was performed at 100 mg $mL^{-1}$ polymer in a range between −2.5 V and −0.5 V vs Ag/Ag+. For potentiostatic deposition, PI-xArBr concentration was elevated to 300 mg $mL^{-1}$ and −3 V was used in chronoamperometry for 8 hours duration.

For the electrodeposition on 3-D porous carbon electrodes, repeating potentiostatic chronoamperometry was performed with 10-s deposition at +1 V vs Ag/Ag+ followed by a 50-s rest at open circuit voltage to allow for polymer to diffuse from the bulk solution into the pores. The process was repeated for 360 cycles to achieve a total deposition time of 1 hr. After deposition, the films are soaked in THF for 2 hours and washed thoroughly 5 times and dried in a desiccator for 16 hr. Cross-sectional scanning electron microscopy images, which can be found in the article Wang 2025, may show that the EPoN-derived PI-2.7% Ph ultrathin film conformally coats the high aspect-ratio micron-sized pores.

One drop (20 μL) of pure 1H,1H,2H,2H-perfluorodecanethiol (PFDT) was applied on top of EPoN-derived PI-xPh films. The film with PFDT was exposed to 365-nm UV with an intensity of 27 W $cm^2$ from the top for 90 s using a UV lamp. The functionalized film was washed with DMF and rinsed with chloroform 3 times each and blow-dried with air.

Example 4—Two-Component Electrodeposition of Polyether Networks as Ultrathin Polymer Dielectric Separator and Electrolyte Coating on 3-D Micro-Architected Electrodes Example polymers, compositions, methods, and apparatuses including electrodeposition of a conformal thin film on a conductive substrate have been described in an article by Zhaoyi Zheng et al., entitled, "Cathodic electrodeposition of polymer networks as ultrathin films on 3-D micro-architected electrodes." RSC Applied Polymers. September 2024. 2(6):1139-1146. The article includes Supplemental Materials available online at: https://www.rsc.org/suppdata/d4/lp/d4lp00180j/d4lp00180j1.pdf. The entire teachings of the article and Supplemental Materials are incorporated herein by reference.

Electrochemical deposition approaches may be promising for the fabrication of uniform thin films on conducting materials regardless of the substrate architecture due to the surface confinement of the charge transfer and subsequent chemical reaction. Meanwhile, electrodeposition approaches are solution based and, therefore, more accessible, scalable, and adaptive compared to vapor-based methods. Electropolymerization of (semi)conducting polymers and electrochemically initiated polymerization of vinylic monomers such as acrylates have been reported on various non-planar electrodes. However, both methods may fail at fabricating conformal and uniform thin films due to mass transfer effects and their non-self-limiting nature: electropolymerization yields conductive coatings that grow fastest in areas with the least mass transfer restrictions (pore entrances), while electrochemically initiated polymerization may confine initiation to a surface and chain growth continues in bulk solution causing random material deposition and pore blockage. Truly self-limiting and, therefore, conformal electropolymerization has only been achieved in electrochemically mediated crosslinking reactions of molecules such as phenol and ortho-phenylene diamine to yield ultrathin (<50 nm) dense molecular networks as uniform coatings. The enabling design criteria for this conformal electrodeposition approach include (1) a charge-transfer event that is necessary for each crosslinking reaction and (2) the formation of electronically insulating coatings that eventually become impermeable to the monomers.

Such design criteria may be applied to pre-synthesized polymers in a polymer coating paradigm: end-group assisted electrodeposition of polymer networks (EPoN). This approach decouples the polymer network functionality from its electrodeposition chemistry, mitigates overgrowth at easily accessible surfaces due to a self-limiting mechanism, and prevents unwanted polymerization and material formation in the bulk solution. The iteration of EPoN reported herein utilizes a pre-synthesized polymeric extender of arbitrary functionality with two electrochemically active groups at its chain ends. Upon surface-confined electrochemical reduction, this end group yields an activated species that undergoes a coupling reaction with a multifunctional crosslinker as a second complementary component. This electrochemically mediated coupling reaction of polymeric extender and multifunctional crosslinker may generate a polymer network exclusively within a nanoscale vicinity of the electrode surface. The electrochemically generated polymer network deposits onto an electrode surface by adhesion due to its insolubility and precipitation. A two-component cathodic EPoN may be demonstrated with electrodeposition of a poly(ethylene glycol) (PEG) network on porous 3-D carbon electrodes and copper foams.

Figure 34A:
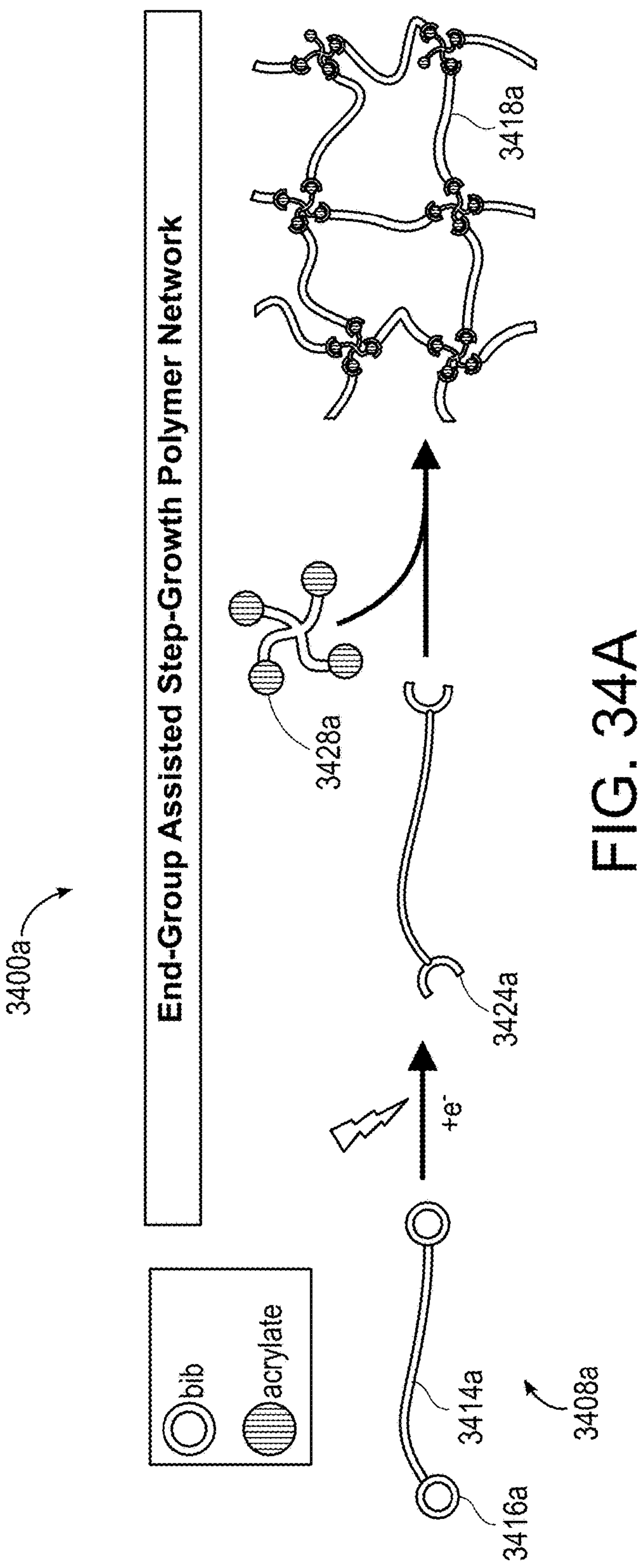
FIGS. 34A and 34B illustrate an example embodiment of a mechanism of an end-group assisted two-component electrodeposition of polymer networks.
Figure 34B:
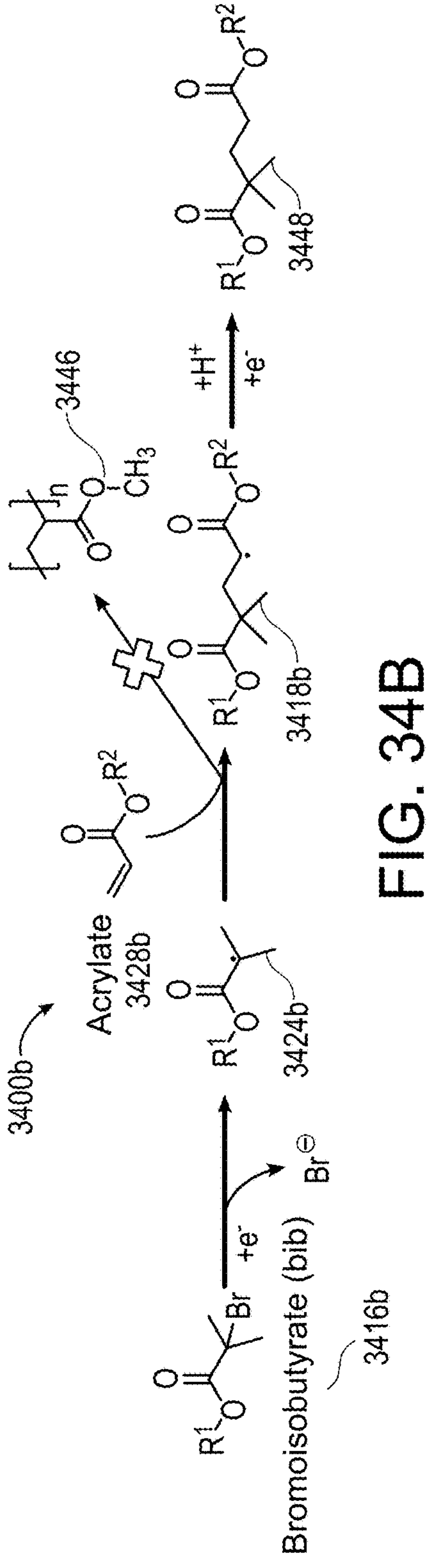

FIGS. 34A and 34B illustrate an example embodiment of a mechanism of an end-group assisted two-component electrodeposition of polymer networks. The mechanism may be similar to the paradigm described herein with reference to FIG. 10C. FIG. 34A illustrates a schematic 3400*a* wherein a polymer 3408*a* comprising a polymer backbone 3418*a* and an electrochemically active crosslinker group 3416*a*, indicated as a bib, may be activated via oxidative or reductive processes. The activated crosslinker group 3424*a* may crosslink to a complementary crosslinker or complementary molecule 3428*a* to form a polymer network 3418*a* that may be deposited on a conductive substrate. FIG. 34B illustrates an example chemical reaction 3400*b* following the schematic of FIG. 34A. An electrochemically active end group, e.g., bromoisobutyrate 3416*b*, which serve as the bib of FIG. 34A, may be reduced to form a reactive radical 3424*b*. The reactive radical 3424*b* may couple or crosslink to a complementary molecule, e.g. acrylate 3428*b*, which may form a polymer network 3418*b*. As illustrated, crosslinked bromoisobutyrate and acrylate may be a radical or anion that may be quenched 3448. Alternatively, a coupled product of the reactive radical 3424*b* and the acrylate 3428*b* may initiate radical/anionic polymerization of 4A, which may to an uncontrolled chain reaction that may produce a coating 3446 with non-uniform composition.

Methods

The platinum wire (diam. 0.25 mm, 99.9% trace metals basis) for the counter electrode and the chemicals decamethylferrocene ("DmFc", 97%), eutectic indium-gallium ("eGaln", gallium 75.5%, indium 24.5%), pentaerythritol tetraacrylate, silver perchlorate (anhydrous), α-bromoisobutyryl bromide, triethylamine, dimethyl formamide ("DMF", degassed with three freeze-pump-thaw cycles before use), and toluene may be used. Acetonitrile (anhydrous), tetraethylammonium p-toluenesulfonate, and poly(ethylene glycol) (Mw=1500 g/mol, hydroxy terminated) may additionally be used as solvents in a deposition solution.

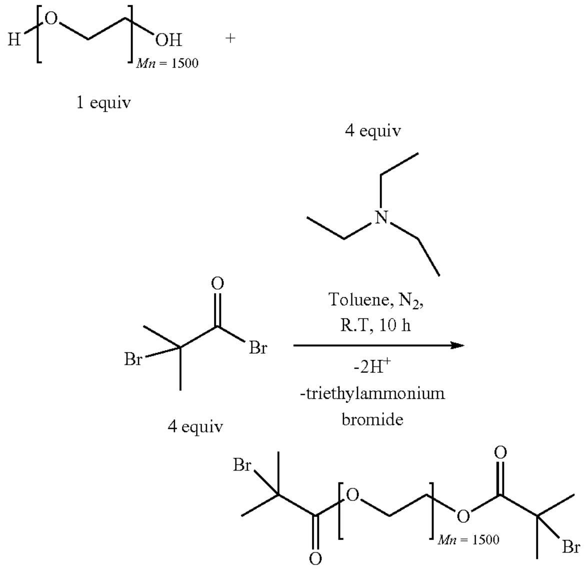

Poly(ethylene glycol) (Mw=1500 g/mol, 15 g, 10 mmol) was added to a 500 mL one-neck flask equipped with magnetic stir bar and transferred to a nitrogen glove box. Anhydrous toluene (300 mL) was added into the flask and the mixture was left to stir for 5 mins. Subsequently, triethylamine (4 eq.) was added to the solution through a rubber septum via a syringe and the mixture was placed in an ice bath outside the glovebox. α-bromoisobutyryl bromide (4 eq.) was added dropwise via the syringe through the septum. Upon complete addition, the mixture was left to stir at 0° C. for 30 minutes and then at ambient temperature for 10 hours. The resulting mixture was filtered to remove the triethyl ammonium bromide and precipitated in hexane. The solid white product was separated from the hexane by centrifugation and redissolved in chloroform (50 mL). The solution was washed three times with deionized water and a saturated solution of NaCl. The organic phase was precipitated twice in cold hexane to yield a light yellow solid (14.9 g, 79% yield).

Porous 3-D carbon electrodes were prepared using the non-solvent induced phase inversion of a PAN solution (84 wt % in DMSO, 10.5 wt % PAN, 5.5 wt % water) that was cast at on a DMSO swollen organogel and subsequently immersed in DI-water. After drying the porous 3-D polymer was crosslinked at 250° C. in air and subsequently carbonized at 750° C. for 1 hour. A stainless-steel substrate was attached to the dense side of the 3-D carbon electrode with mixture of carbon black and PVA glue.

Results and Discussion

Surface-confined formation and deposition of a PEG network may be induced with the cathodic electrocoupling reaction between bromoisobutyrate ("bib") and acrylate ("A") as described herein with reference to FIGS. 34A and 34B. The electrochemically reduced bib undergoes a nucleophilic addition to the electron-poor double bond of the acrylate.

Figure 35A:
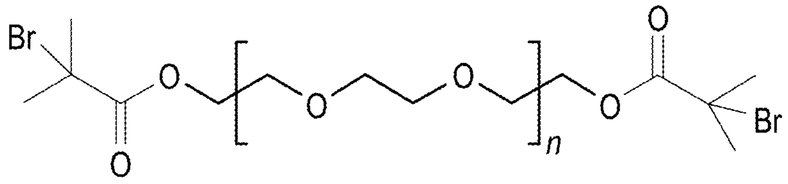
FIGS. 35A and 35B illustrate example chemical structures of a polymer and a complementary crosslinker, according to an example embodiment.
Figure 35B:
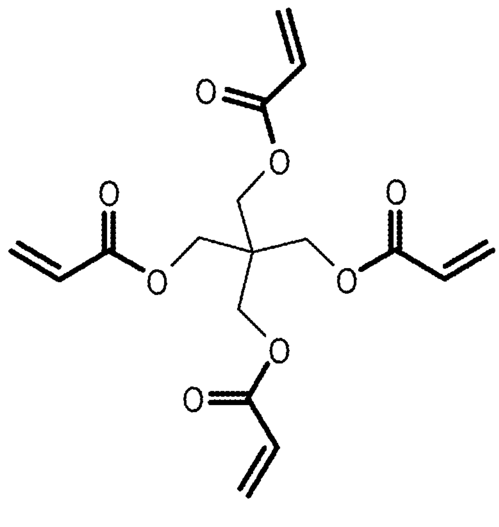

FIGS. 35A and 35B illustrate example chemical structures of a polymer and a complementary crosslinker, according to an example embodiment. To utilize the electrochemically activated coupling reaction described herein, chain ends of a linear PEG molecule, a common polymer electrolyte exhibiting good lithium-ion conductivity, may be function- alized with the electrochemically active bib group to yield difunctional PEG-2bib (FIG. 35 A). For a complementary crosslinker, pentaerythritol tetraacrylate ("4A") (FIG. 35B) with four acrylate groups may be employed.

The 4A crosslinker may couple to a reduced bib to form a crosslinked PEG step-growth network either as a radical or an anion in a nucleophilic addition reaction. The coupled product itself may be a radical or anion that can be quenched by protons, for example. Simultaneously, the coupled product could initiate radical/anionic polymerization of 4A, leading to an uncontrolled chain reaction that may produce a coating with non-uniform composition and crosslink density, as PEG chains may inhomogeneously incorporate into the network. Such a reaction may be prevented by optimizing the deposition conditions to ensure that one-to-one coupling between bib and acrylate is the predominant reaction. It may be noted that growing and depositing of the PEG network may be electronically insulating, which may prevent reduction at the coating-electrolyte interface, and eventually becomes impermeable towards PEG-2bib, preventing the macromer from reaching the electrode surface and stopping its continued reduction and activation. Thus, the deposition is self-limiting and leads to full passivation of the electrode surface towards further growth at a critical point.

Figure 36:
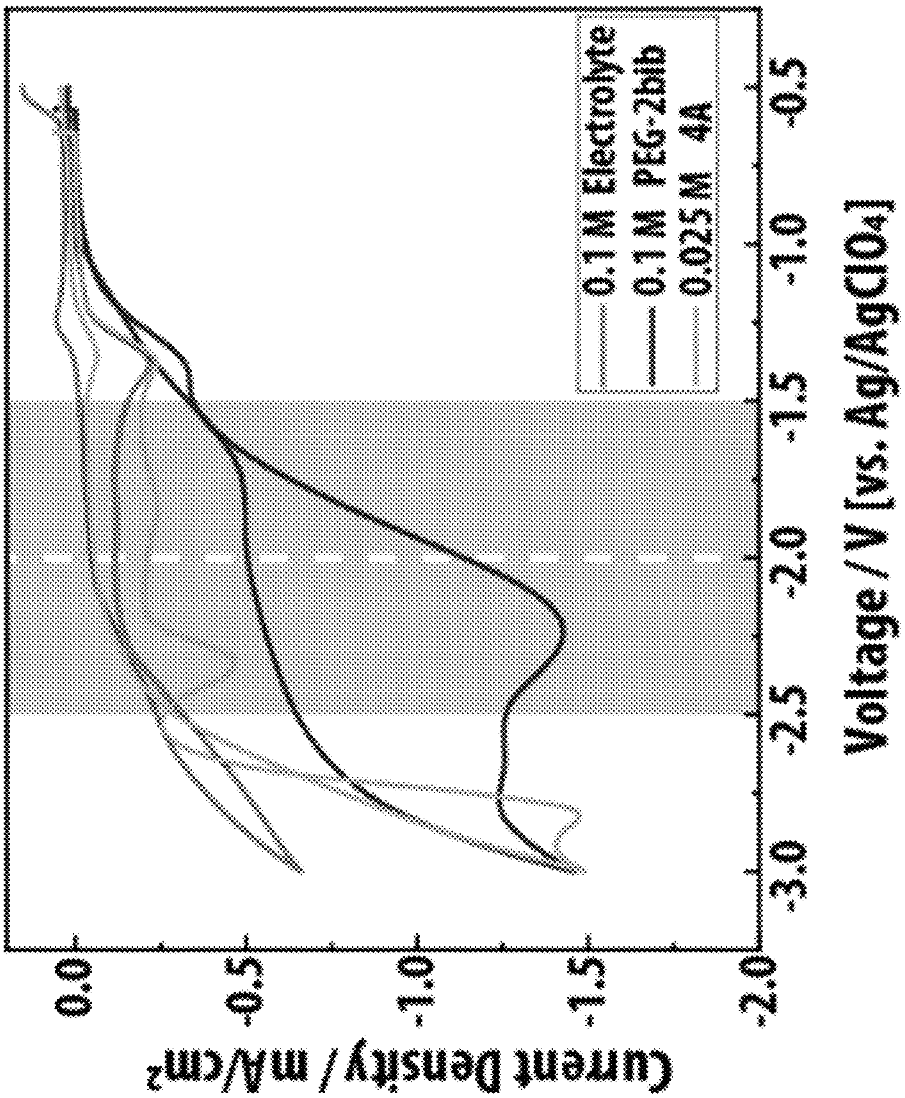
FIG. 36 illustrates a plot of cyclic voltammograms of solutions of PEG-2bib, 4A, and pure electrolyte, according to an example embodiment.

FIG. 36 illustrates a plot of cyclic voltammograms of solutions of PEG-2bib, 4A, and pure electrolyte, according to an example embodiment. The individual CV of PEG-2bib, 4A, and the pure DMF/TEA-Tosylate electrolyte solution are obtained to determine their reduction onset potential and probe the stability of the electrolyte solution. All solutions exhibit a small reduction peak around −1.3 V vs. Ag/AgClO$_4$, which may result from reduction of residual oxygen. The onset potential of the PEG-2bib reduction is identified at −1.1 V and reaches its peak current at −2.2 V vs. Ag/AgClO$_4$. The broad reduction wave indicates an irreversible multi-electron transfer to the bib group, forming butyric radicals and anions under bromide generation (as described herein with reference to FIG. 34B). The crosslinker 4A exhibits cathodic currents at potentials more negative than −2.3 V vs. Ag/AgClO$_4$, associated with acrylate chemisorption, and the onset of its reduction wave is found at −2.6 V vs. Ag/AgClO$_4$, which electrochemically initiates its polymerization. Therefore, the functional bib end-group is selectively reducible at less negative potentials than 4A. This establishes an electrodeposition window between −1.5 V and −2.3 V vs. Ag/AgClO$_4$ for the exclusive reduction of the bib end group without electrochemically initiated acrylic chain-growth polymerization. For an example embodiment, −2.0 V vs. Ag/AgClO$_4$ may be selected to achieve mass-transfer-limited electrodeposition without the electrochemical adsorption and reduction of the acrylate crosslinker.

Potentiostatic electrodeposition with chronoamperometry ("CA") may be employed to coat a (PEG-2bib)$_x$-(4A)$_y$ thin film on the surfaces of a 3-D micro-architected carbon electrode obtained from customized phase-inversion of poly (acrylonitrile) with subsequent carbonization, which is described in an article by Resing et al., entitled, "Architected Low-Tortuosity Electrodes with Tunable Porosity from Nonequilibrium Soft-Matter Processing." Adv. Mat. 2022, 2209694. The entire teachings of the article are incorporated herein by reference.

Figure 37A:
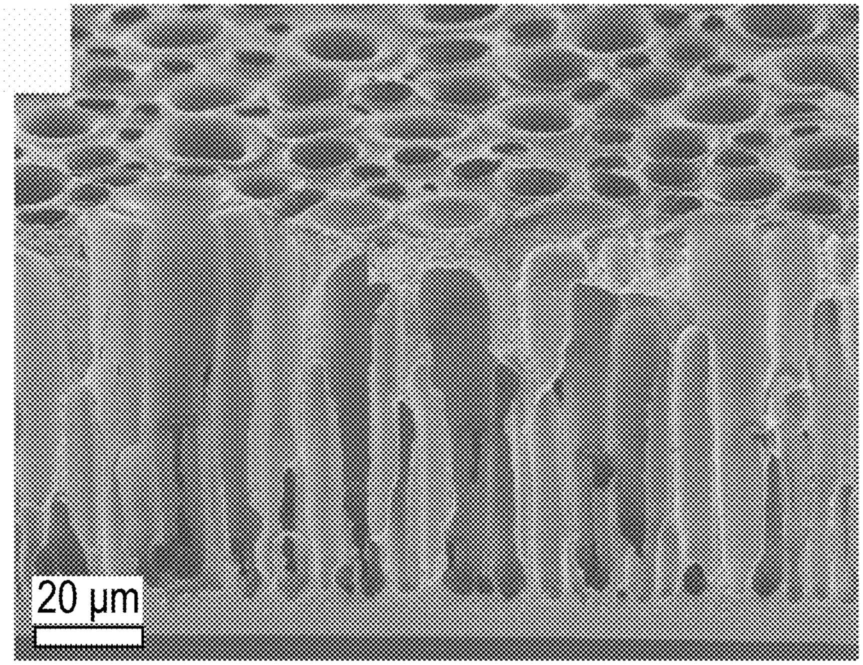
FIG. 37A illustrates an SEM image of a 3-D carbon electrode at approximately 300 to its cross-section showing cylindrical micrometer-scale pores open on one side of the electrode, according to an example embodiment.

FIG. 37A illustrates an SEM image of a 3-D carbon electrode at approximately 30° to its cross-section showing cylindrical micrometer-scale pores open on one side of the electrode, according to an example embodiment. The 3-D carbon electrode of 80 μm thickness exhibits vertical cylindrical pores that are open and accessible on one side and closed on the other, with a pore diameter gradient from 5 to 20 μm towards the open pore entrance.

Figure 37B:
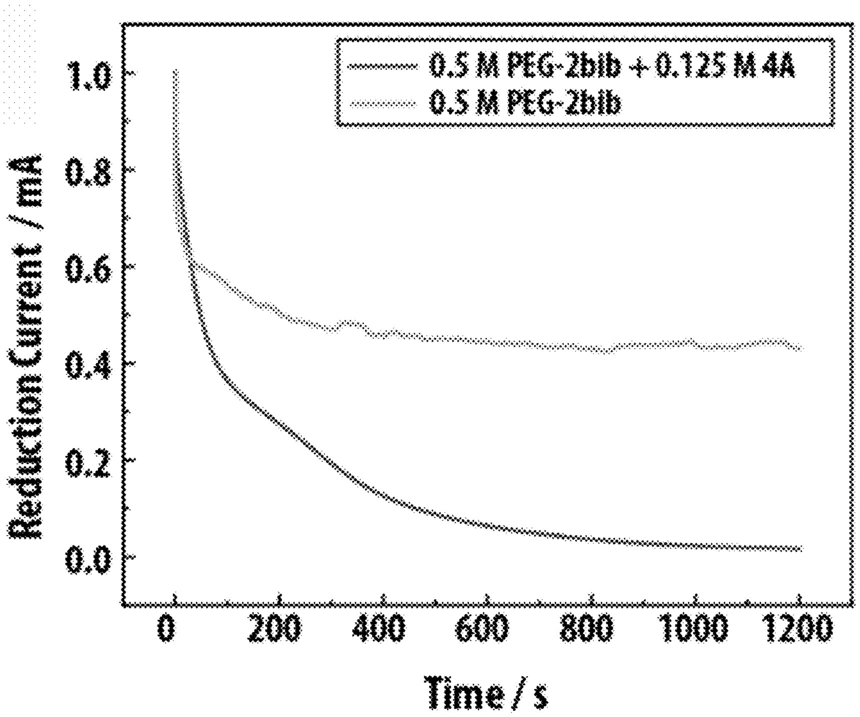
FIG. 37B illustrates chronoamperometry measurements during the application of a constant reducing potential to a 3-D carbon electrode immersed in solutions containing only PEG-2bib and PEG-2bib with 4A, according to an example embodiment.

FIG. 37B illustrates chronoamperometry measurements during the application of a constant reducing potential to a 3-D carbon electrode immersed in solutions containing only PEG-2bib and PEG-2bib with 4A. The 3-D carbon electrode may be similar to the carbon electrode of FIG. 37A and the reducing potential applied may be −2.0 V vs. Ag/AgClO$_4$. During potentiostatic electrodeposition from a solution containing PEG-2bib and 4A at a 2:1 molar ratio of the functional groups (bib:A), the current density continuously decreases to near zero from initially 1 mA cm$^{-2}$ over the course of 20 minutes, demonstrating passivation of the 3-D carbon electrode towards further reduction of the PEG-2bib. In contrast, a solution containing only PEG-2bib without 4A exhibits an initial decrease in current from 1 mA cm$^{-2}$ but reaches a steady state after 200 s at over 0.4 mA cm$^2$, indicating no passivation upon bib reduction in the absence of a complementary crosslinker. The self-passivation nature of this electrodeposition may be attributed to two factors: (1) the depositing polymer network is electrical insulating, preventing electron transfer from the carbon surface to the solution through the coating, and (2) the polymer network increases in density and eventually turns impermeable to the macromer PEG-2bib, preventing its diffusion from the bulk solution to the carbon surface and stopping its electrochemical reduction.

Figure 38A:
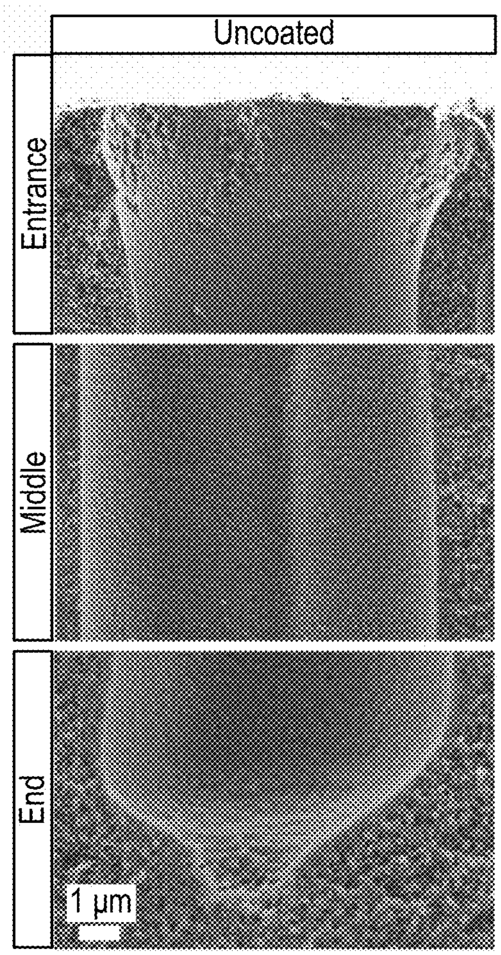
FIGS. 38A and 38B illustrate cross-sectional SEM images at different locations along an uncoated and a coated pore, respectively, of a 3-D carbon electrode, according to an example embodiment.
Figure 38B:
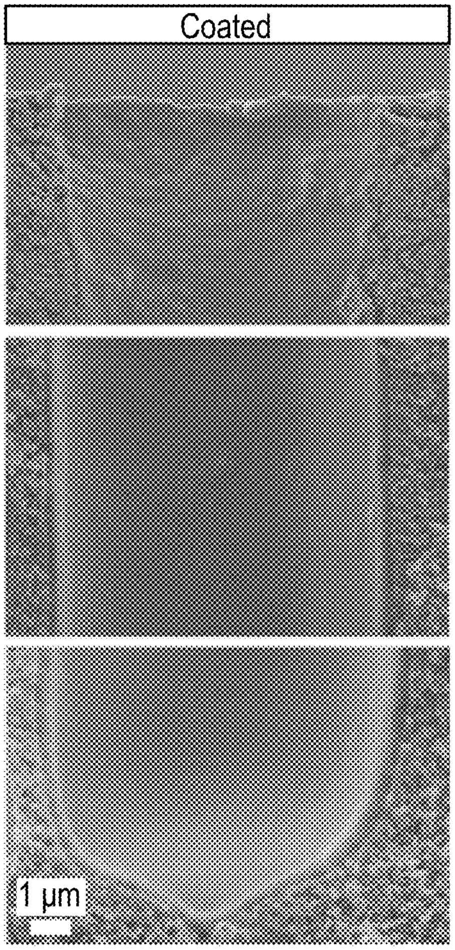

FIGS. 38A and 38B illustrate cross-sectional SEM images at different locations along an uncoated and a coated pore, respectively, of a 3-D carbon electrode, according to an example embodiment. The 3-D carbon electrode may be similar to the carbon electrode described herein with reference to FIG. 37A. The cross-sectional SEM images may be useful for evaluating the conformality and topography of the electrodeposited PEG network thin film. FIGS. 38A and 38B illustrate different regions (entrance, middle, end) of an 80 μm long pore.

Figure 38C:
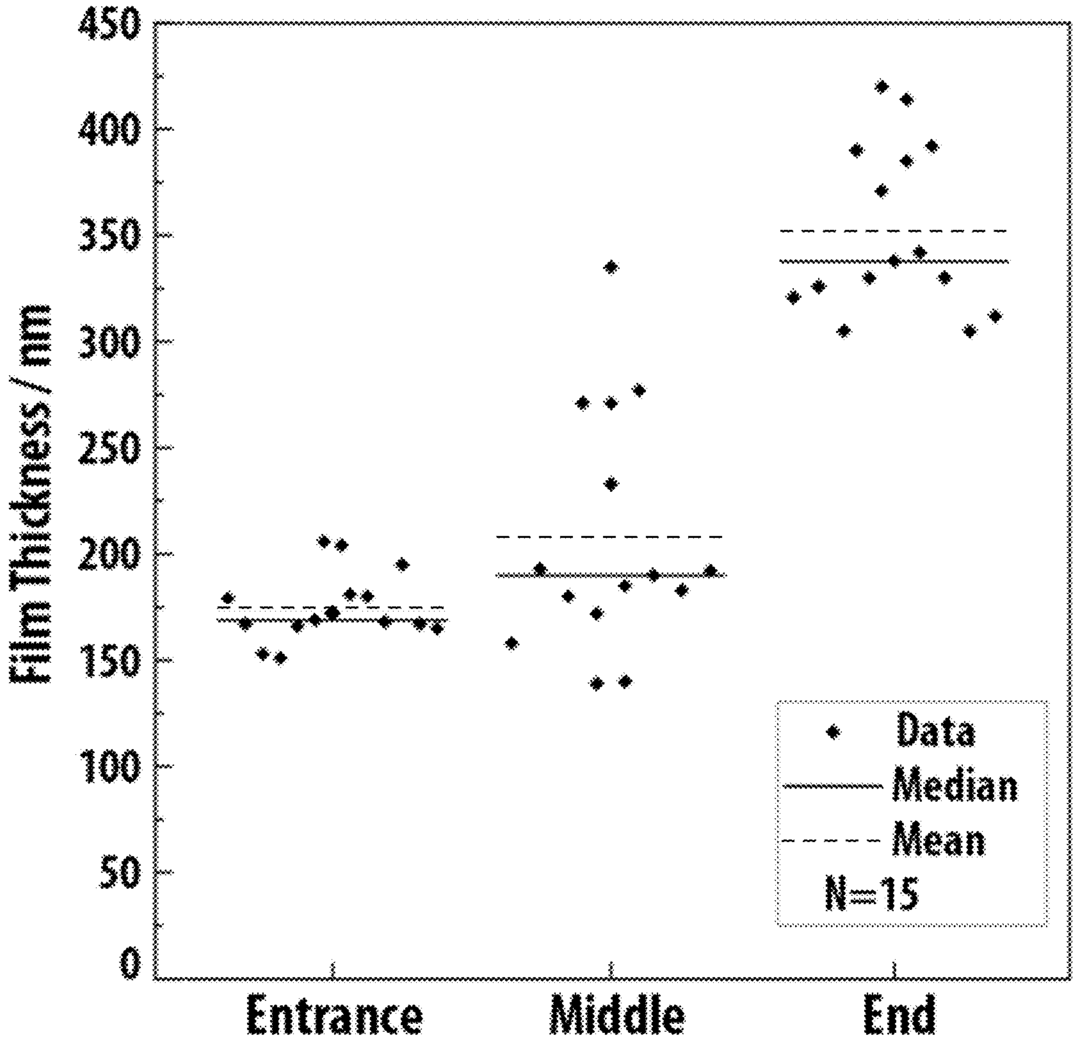
FIG. 38C illustrates a plot of distributions of EPoN-derived coating thickness measured at the three different locations of pores similar to the pore of FIGS. 38A and 38B.

FIG. 38C illustrates a plot of distributions of EPoN-derived coating thickness measured at the three different locations of pores similar to the pore of FIGS. 38A and 38B. Thicknesses may be measured for the coating formed from PEG-2bib and 4A using SEM images. The plot of FIG. 38C includes measurements for 15 pores at each of the three locations (entrance, middle, end). It may be noted that an average thickness of the PEG network film at the entrance and middle of the pores is relatively uniform at 175-200 nm, and increases to 350 nm at the pore end, while exhibiting a fairly narrow pore-to-pore variance at the pore entrances and ends.

This coating thickness distribution may be opposite to traditional deposition techniques, which may exhibit overgrowth at the pore entrance and undergrowth deeper into the pore. Speculatively, this result may stem from a balance between the bib-A coupling kinetics and the diffusion of the reduced PEG-2bib within the confinement of the pore, leading to an initially denser and thinner coating at the pore entrance compared to deeper into the pore. The pores in the 3-D carbon electrode may not be perfectly uniform in diameter or aspect ratio, and the "middle" of the electrode may not an equivalent spot for each pore, likely leading to larger variations in thickness measurements at that nominal spot over the many measured pores summarized in FIG. 38C.

Figure 39:
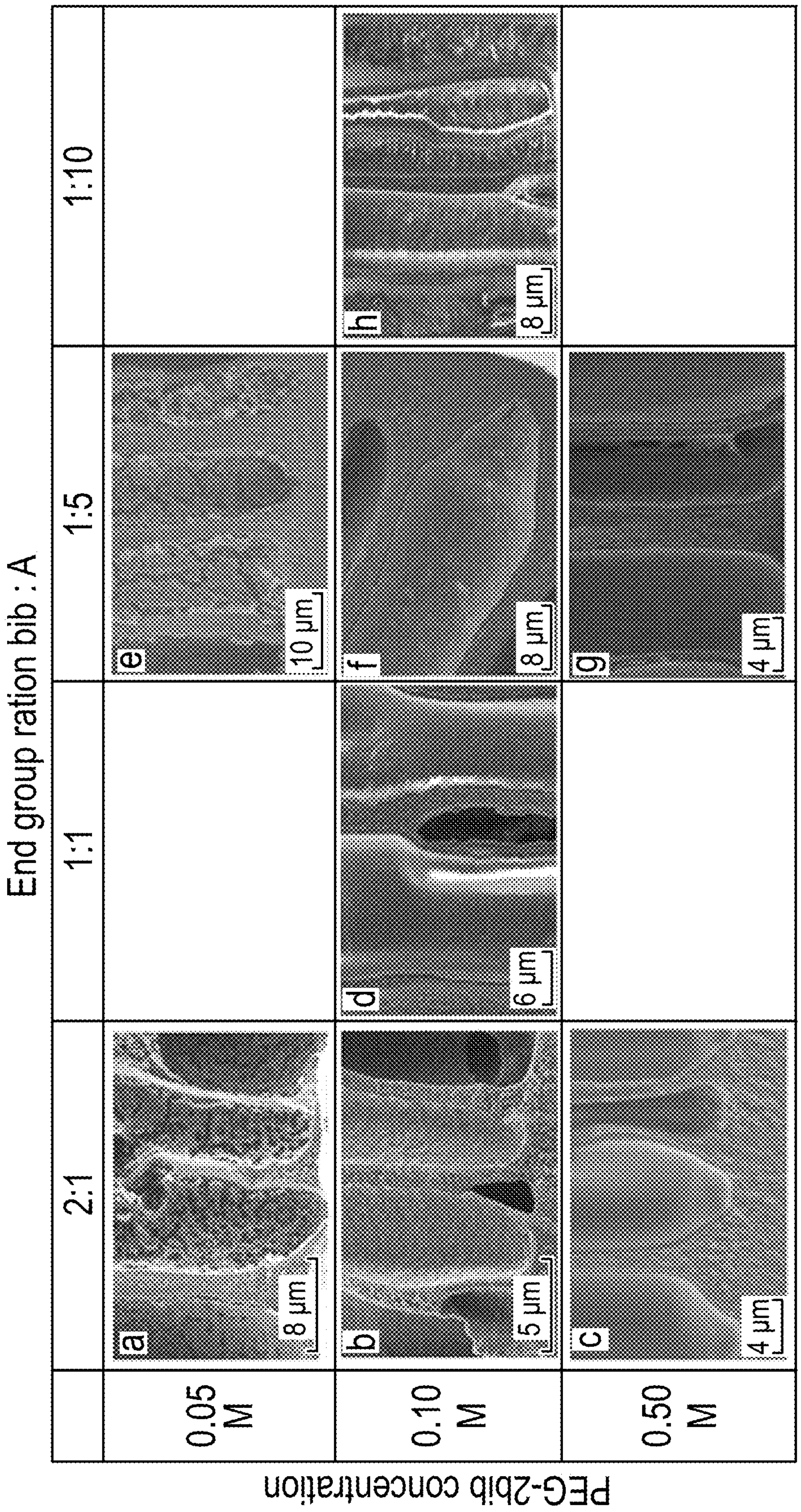
FIG. 39 illustrates cross-sectional SEM images of $(PEG\text{-}2bib)_x\text{-}(4A)_y$ films electrodeposited from different PEG-2bib concentration and bib:A end group ratios, according to an example embodiment.

FIG. 39 illustrates cross-sectional SEM images of (PEG-2bib)$_x$-(4A)$_y$ films electrodeposited from different PEG-2bib concentration and bib:A end group ratios, according to an example embodiment. Varying the polymer concentration and end-group ratio (bib:A) may have a substantial effect on the topography of the EPoN-derived coatings: films formed at lower concentrations may be thinner and non-uniform, and become porous at bib concentrations below 0.1 M, potentially due to insufficient crosslinking at low concentrations, which may to cracking of the coating during post-deposition drying and deswelling. Higher relative content of 4A may also lead to less homogeneous coatings, which may likely be due to an increased contribution of bib-initiated radical chain-growth polymerization of 4A.

Having established a proof-of-concept for EPoN to achieve conformal submicron coatings on 3-D electrodes, the conformal thin films may be evaluated for defects, permeability, composition, and electronic properties. The molecular permeability and coverage of the films may be deduced from electrochemical signals of probe molecules dissolved in solution and in contact with the electrodes before and after polymer network electrodeposition. Decamethyl ferrocene (DmFc) and polyaniline (PANI, Mw=20 kg mol-1) may be used as electrochemical probe molecules. Since PANI is an order of magnitude larger than the polymeric PEG-2bib extender, one may expect a defect-free film to block its electrochemical activity, while the small-molecule DmFc may permeate through the PEG network.

Figure 40A:
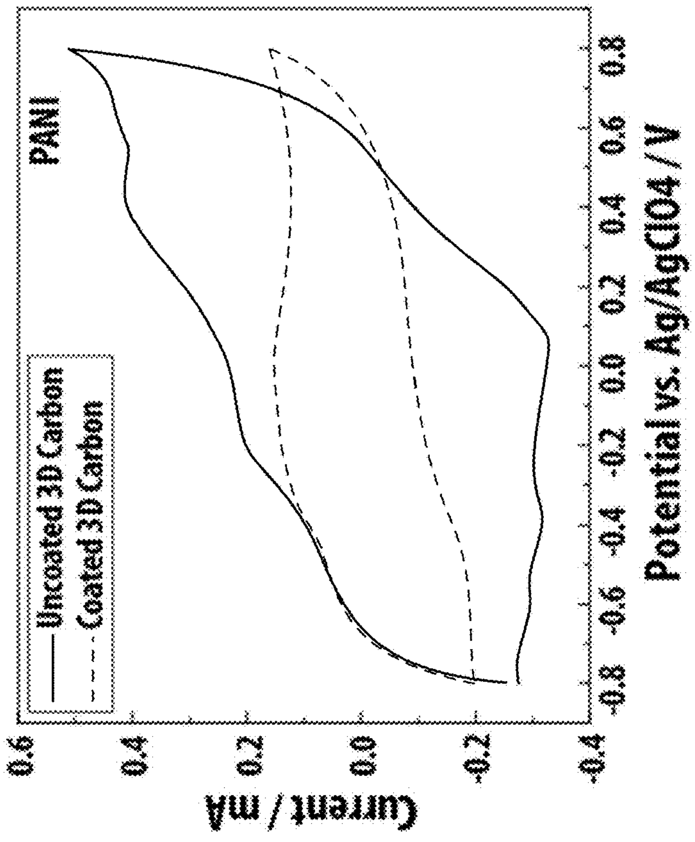
FIGS. 40A and 40B illustrate plots of cyclic voltammetry measurements of solutions comprising PANI and DmFc, respectively, before and after electrodeposition of a conformal thin film on a 3-D carbon electrode, according to an example embodiment.
Figure 40B:
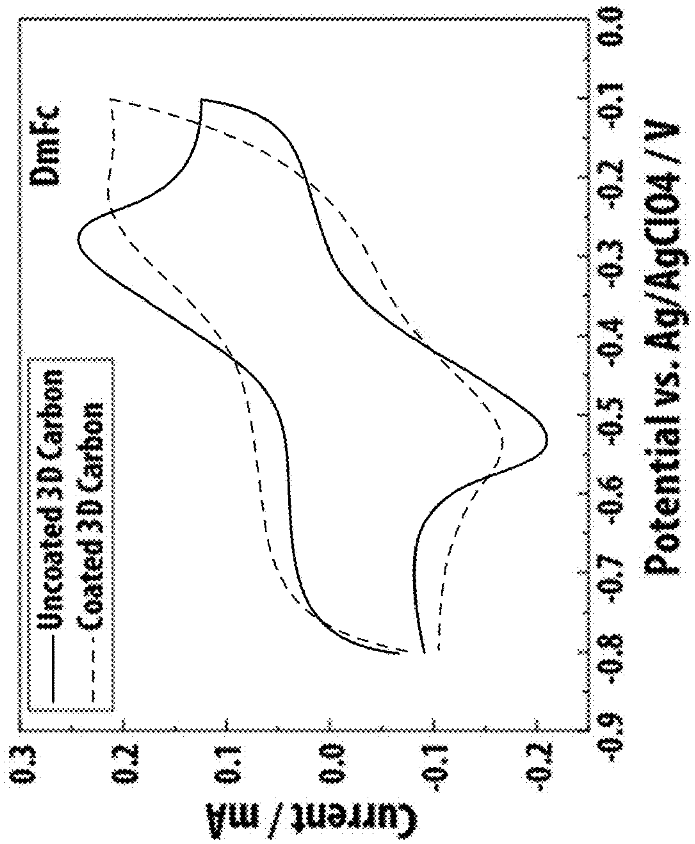

FIGS. 40A and 40B illustrate plots of cyclic voltammetry measurements of solutions comprising PANI and DmFc, respectively, before and after electrodeposition of a conformal thin film on a 3-D carbon electrode, according to an example embodiment. The thin film may be formed using PEG-2bib and 4A, as described herein. Reversible oxidation and reduction peaks of PANI may be observed and diminish after polymer network electrodeposition on the 3-D carbon electrode and double-layer capacitance dominates the CV. The absence of the PANI redox peaks above 0 V after coating of the carbon electrode suggests an absence of physical defects above a few nanometers in size at a quantity within the electrochemical detection limit, and that the mesh size of the polymer film is smaller than the size of the PANI molecules. The redox peaks for DmFc remain for the 3-D carbon electrode coated with the PEG networks with a larger peak splitting and slightly lower peak current, indicating permeability of the electrodeposited polymer network to DmFc with an additional resistance of DmFc diffusion through a polymeric coating.

Figure 40C:
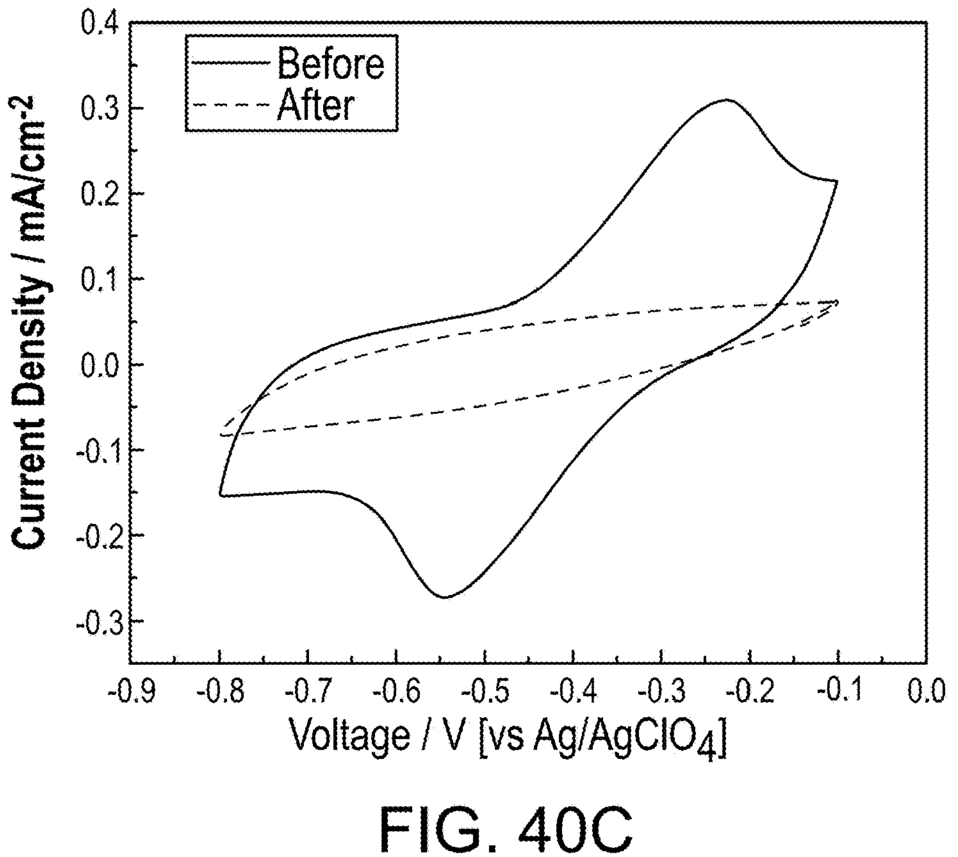
FIG. 40C illustrates a plot of cyclic voltammetry measurements of solutions comprising DmFc before and after electrodeposition of a conformal thin film comprising 4A on a 3-D carbon electrode, according to an example embodiment.

FIG. 40C illustrates a plot of cyclic voltammetry measurements of solutions comprising DmFc before and after electrodeposition of a conformal thin film comprising 4A on a 3-D carbon electrode, according to an example embodiment. Retention of DmFc electrochemistry, as illustrated in FIG. 40B, may further demonstrate that the polymer network film consists of a crosslinked PEG network rather than a purely electropolymerized poly(4A) coating, which exhibits no DmFc redox peaks when intentionally and exclusively electrochemically initiated polymerization of 4A, as illustrated in FIG. 40C, is performed at −2.75 V vs. Ag/AgClO4.

Chemical composition of polymer network coatings may be assessed by ATR-FTIR spectroscopy on planar gold electrodes.

Figure 41A:
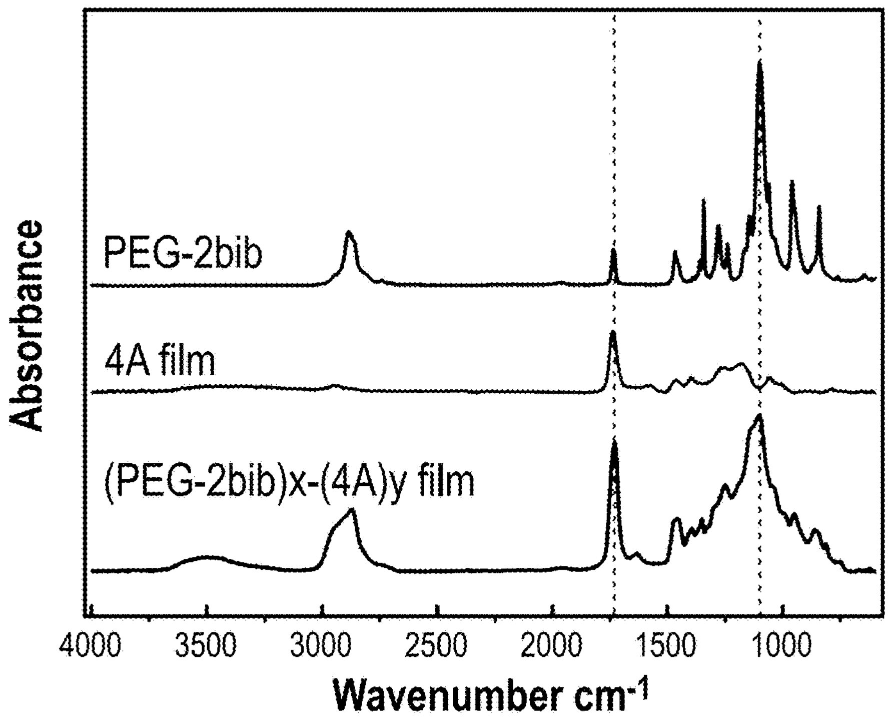
FIG. 41A illustrates a plot of stacked ATR-FTIR spectra of PEG-2bib (top), an electropolymerized 4A film (middle), and an EPoN-derived $(PEG\text{-}2bib)_x\text{-}(4A)_y$ film (bottom), according to an example embodiment.

FIG. 41A illustrates a plot of stacked ATR-FTIR spectra of PEG-2bib (top), an electropolymerized 4A film (middle), and an EPoN-derived $(PEG\text{-}2bib)_x\text{-}(4A)_y$ film (bottom), according to an example embodiment. A presence of a strong absorption band at 1100 $cm^{-1}$ related to C—O stretching of the ether group, which is abundant in the PEG chain but not in 4A, may confirm electrodeposition of PEG macromers and its incorporation into the polymer network thin film. The material obtained from the electrochemically initiated polymerization of 4A exhibits a strong absorbance band at 1730 $cm^{-1}$, related to its four carbonyl groups. The absorbance at 1730 $cm^{-1}$ is stronger for the $(PEG\text{-}2bib)_x\text{-}(4A)_y$ than for the PEG-2bib starting material, which may confirm co-deposition of 4A and PEG-2bib.

Figure 41B:
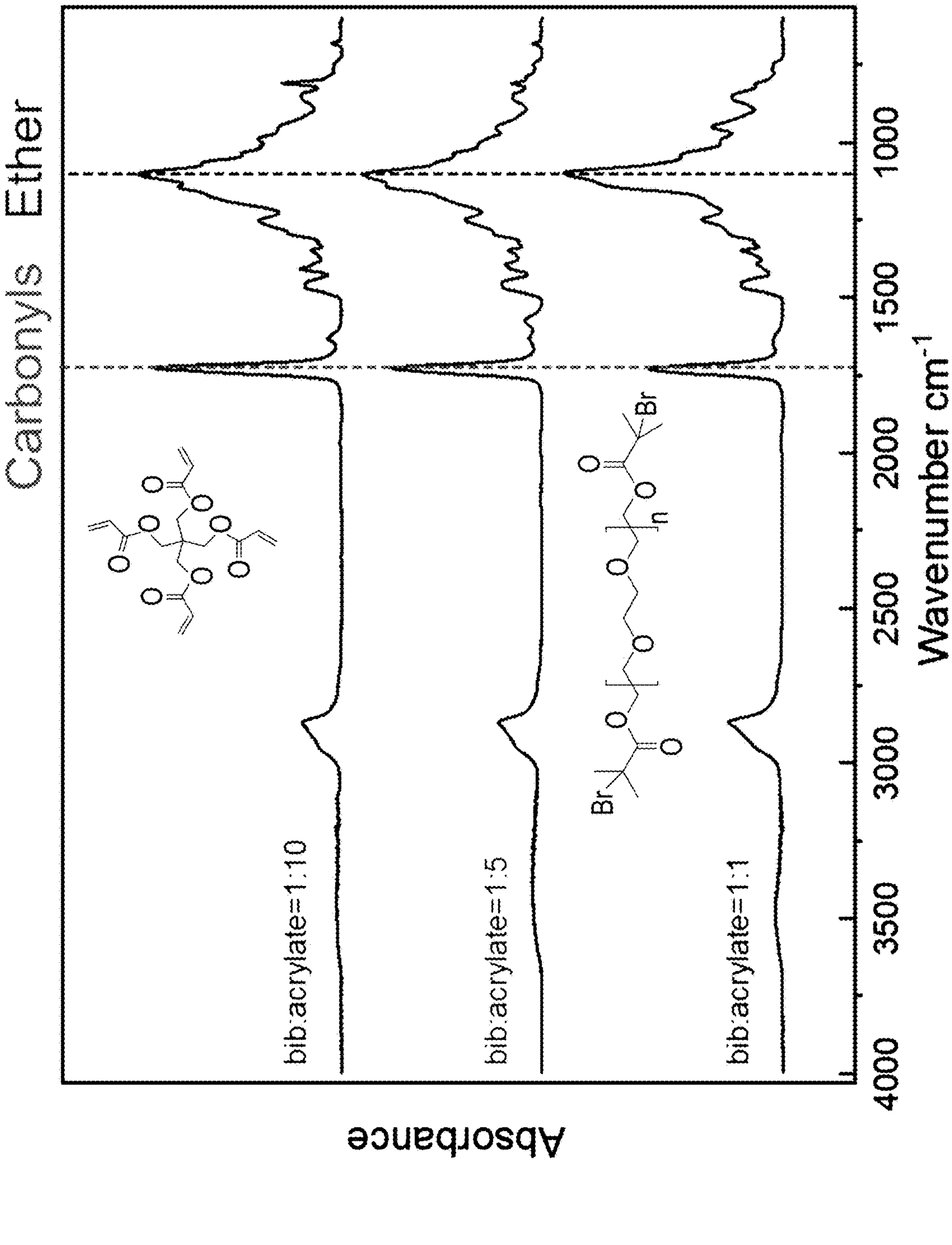
FIG. 41B illustrates a plot of stacked ATR-FTIR spectra of polymer films electrodeposited at different end group ratio, according to example embodiments.

FIG. 41B illustrates a plot of stacked ATR-FTIR spectra of polymer films electrodeposited at different end group ratio, according to an example embodiment. Higher PEG incorporation may be observed with increased bib:acrylate ratio during EPoN, as determined by comparing the IR absorbance of carbonyl and ether groups in films deposited. The plot of FIG. 41B illustrates bib:acrylate ratios of 1:1 (bottom), 1:5 (middle), and 1:10 (top). Molecular structures illustrate PEG-2bib (bottom) and 4A (top). Further, bib-acrylate coupling reactions, under optimized conditions and end-group ratios, may be the dominant mechanism to form the polymer network coating, as opposed to the electrochemically initiated acrylate chain polymerization.

Solid-state electrochemical impedance spectroscopy (EIS) was carried out on the surface of the coated 3-D carbon using a liquid metal contact to evaluate electronic properties of electrodeposited polymer networks.

Figure 42:
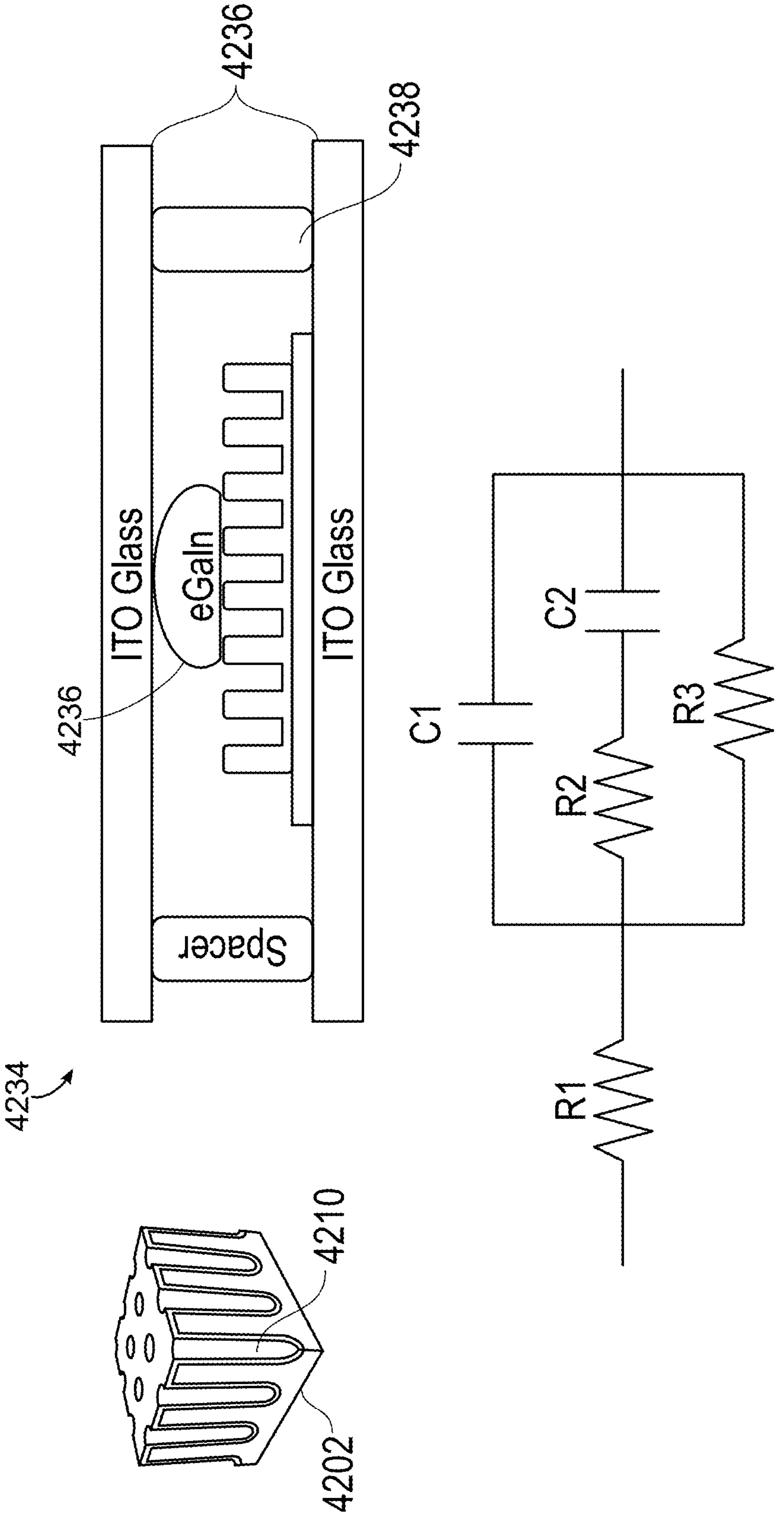
FIG. 42 illustrates schematically an EIS system for measuring electronic properties of electrodeposited polymer networks and an equivalent circuit corresponding thereto.

FIG. 42 illustrates schematically an EIS system 4234 for measuring electronic properties of electrodeposited polymer networks 4210 and an equivalent circuit corresponding thereto, according to an example embodiment. The EIS system 4234 includes a conductor/insulator/conductor architecture. The EIS system 4234 includes a top layer and bottom layer of indium tin oxide (ITO) coated glass 4236 separated by a spacer 4238. A carbon electrode 4202 with a conformal thin film 4210 of $(PEG\text{-}2bib)_x\text{-}(4A)_y$ deposited thereon is placed between the electrodes and in contact with a liquid eutectic indium-gallium (eGaln) 4236 counter electrode. FIG. 42 further illustrates (bottom) an equivalent circuit of for the EIS system described herein. Parameters of the equivalent circuit may include R1=system resistance, R2=ionic resistance, R3=electronic resistance, C1=plate capacitance, C2=double layer capacitance. Example fitted parameters for the equivalent circuit are provided in the article by Zheng.

Figure 43:
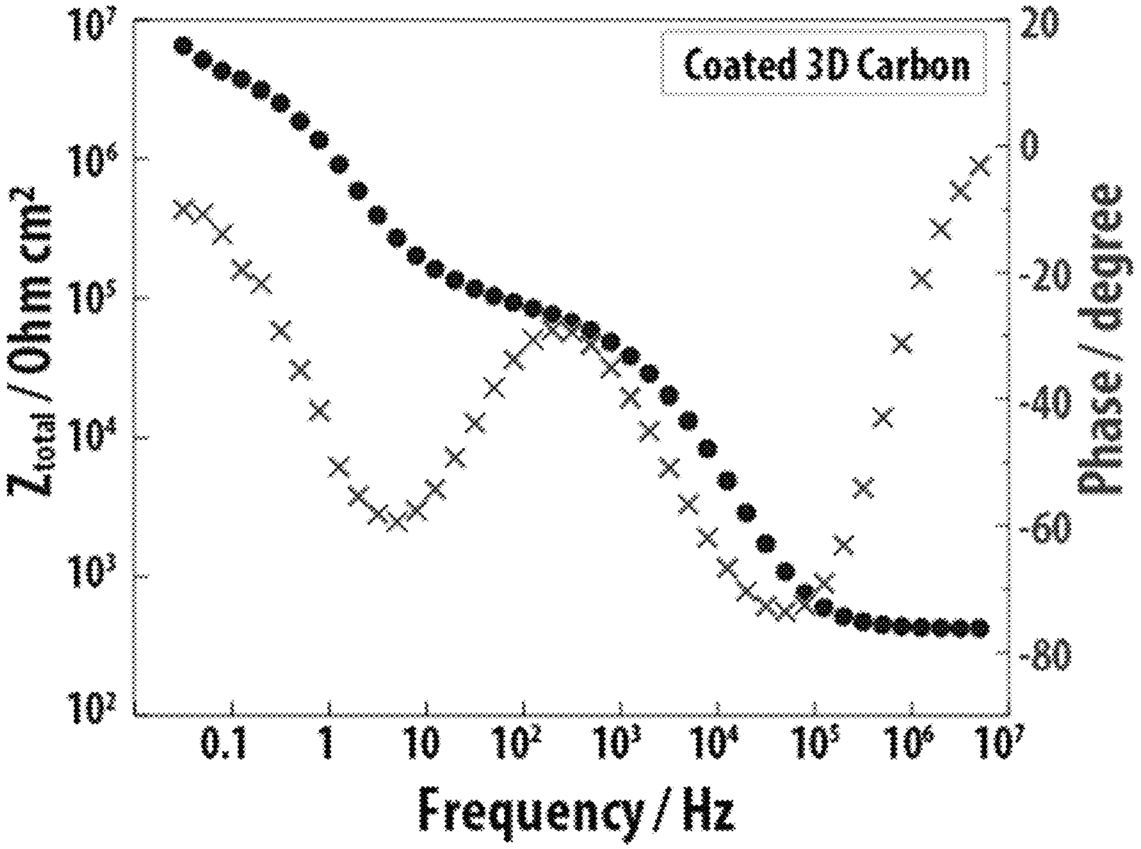
FIG. 43 illustrates a Bode plot of the solid-state EIS on the top surface of a 3-D carbon coated with a $(PEG\text{-}2bib)_x\text{-}(4A)_y$ thin film, according to an example embodiment.

FIG. 43 illustrates a Bode plot of the solid-state EIS on the top surface of a 3-D carbon coated with a $(PEG\text{-}2bib)_x\text{-}(4A)_y$ thin film, according to an example embodiment. The Bode plot shows three plateaus in the total impedance at low, medium, and high frequency, respectively, with corresponding phase shifts close to zero degree, indicating contributions of three ohmic resistances and two capacitive elements: system resistance (R1, high frequency), ionic resistance (R2, medium frequency), and electronic resistance (R3, low frequency), as well as double layer capacitance (C2) due to residual ions within the PEG network and plate capacitance (C1) of the conductor/insulator/conductor architecture. The resistive and capacitive elements correspond to the equivalent circuit of FIG. 42. The fit of the EIS data to the respective equivalent circuit model reveals a high electronic resistance of approximately $10^9$ Ωcm for the electrodeposited submicron PEG network coating, and an ionic resistance two orders of magnitude lower, which may be due to residual electrolyte salt.

To confirm that the EPoN-derived PEG thin films exhibit Li ion-conducting properties, $(PEG\text{-}2bib)_x\text{-}(4A)_y$ thin films are deposited on planar gold electrodes, infused with a controlled amount of lithium bis(trifluoromethane)sulfonimide (LiTFSI) solution, and then dried. The solution is fully imbibed by the film and no excess LiTFSI salt was observed after drying, confirming its incorporation in the thin film.

Figure 44A:
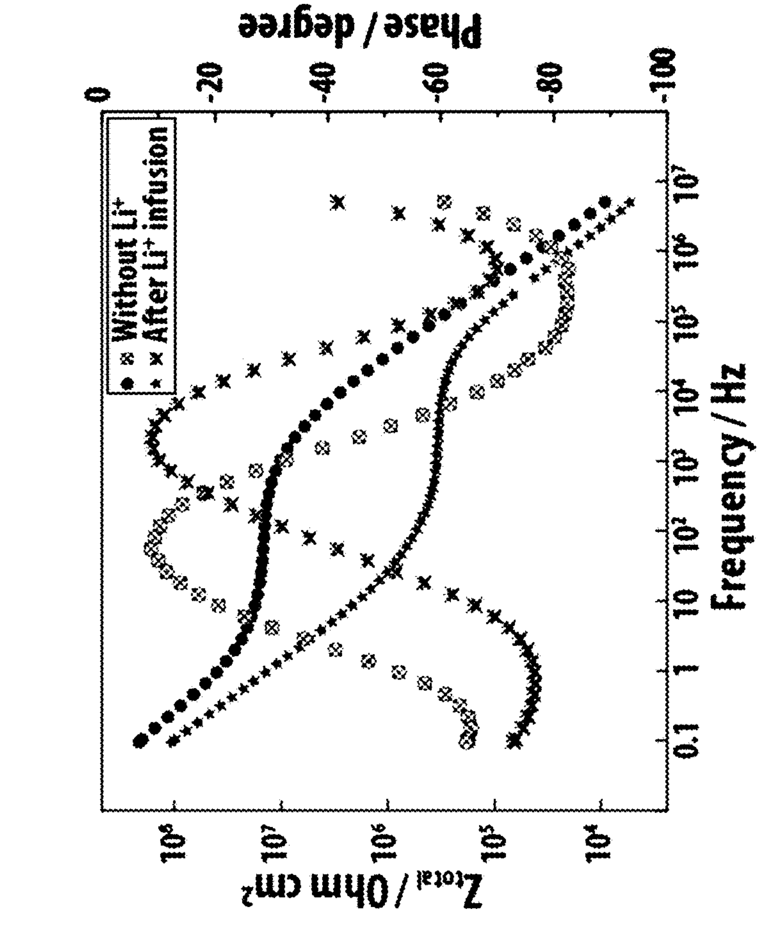
FIGS. 44A and 44B illustrate Bode plots and Nyquist plots, respectively of EIS spectra of $(PEG\text{-}2bib)_x\text{-}(4A)_y$ films on a planar gold substrate before and after lithium infusion, according to an example embodiment.
Figure 44B:
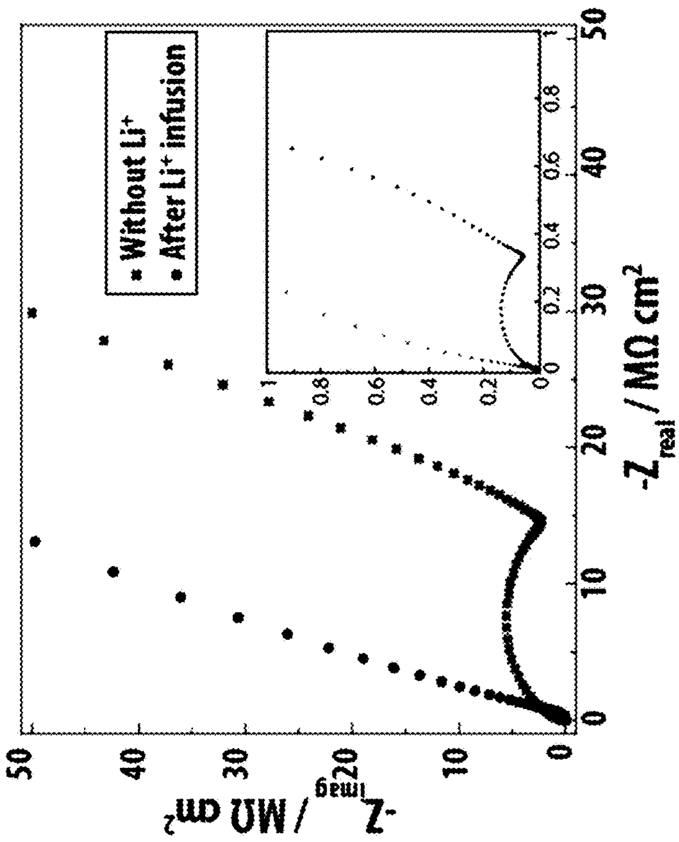

FIGS. 44A and 44B illustrate Bode plots and Nyquist plots, respectively of EIS spectra of $(PEG\text{-}2bib)_x\text{-}(4A)_y$ films on a planar gold substrate before and after lithium infusion, according to an example embodiment. The Bode plots of EIS spectra (FIG. 44A) obtained before and after LiTFSI infusion reveal an impedance plateau at medium frequencies that is almost two orders of magnitude lower with lithium salt present, which may demonstrate successful incorporation of lithium ions and the coating's ionic conductivity. The Nyquist plots (FIG. 44B) show that both pre- and post-infusion films exhibit a half semi-circle at high frequencies, with a sharp rise in the negative imaginary component of the impedance at low frequencies. Notably, the reduced radius of the semi-circle after lithium infusion may indicate an increase in ionic conductivity by lithium infusion.

Because the two-component EPoN reported here utilizes electrochemical reduction, such EPoN approaches may be applicable to non-noble metal substrates. As a proof of concept, PEG networks may be electrodeposited on a porous copper foam following the same method.

Figure 45A:
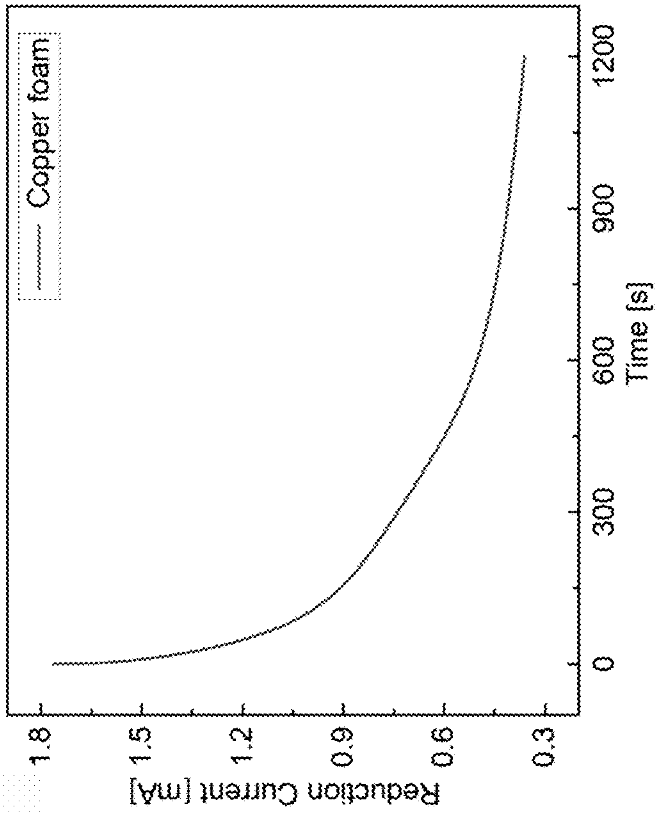
FIG. 45A illustrates chronoamperometry measurements of potentiostatic electrodeposition of PEG-2bib with 4A on copper foam, according to an example embodiment.

FIG. 45A illustrates chronoamperometry measurements of potentiostatic electrodeposition of PEG-2bib with 4A on copper foam, according to an example embodiment. The chronoamperometry measurements may reveal trends similar to the chronoamperometry measurements of FIG. 37B, wherein formation of a conformal thin film via electrodeposition may result in a significant decrease in reduction current, which may be representative of passivation.

Figure 45B:
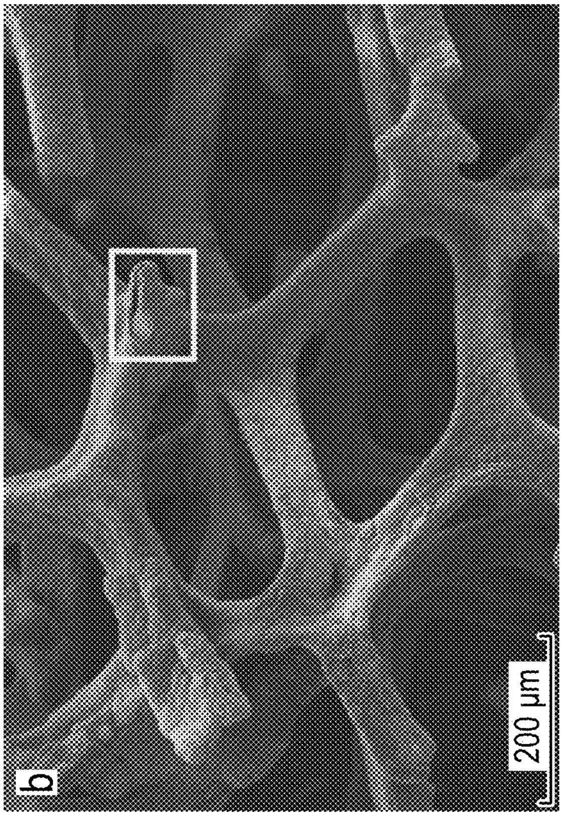
FIGS. 45B-45D illustrate SEM images of a copper foam coated with electrodeposited $(PEG\text{-}2bib)_x\text{-}(4A)_y$, according to an example embodiment.
Figure 45C:
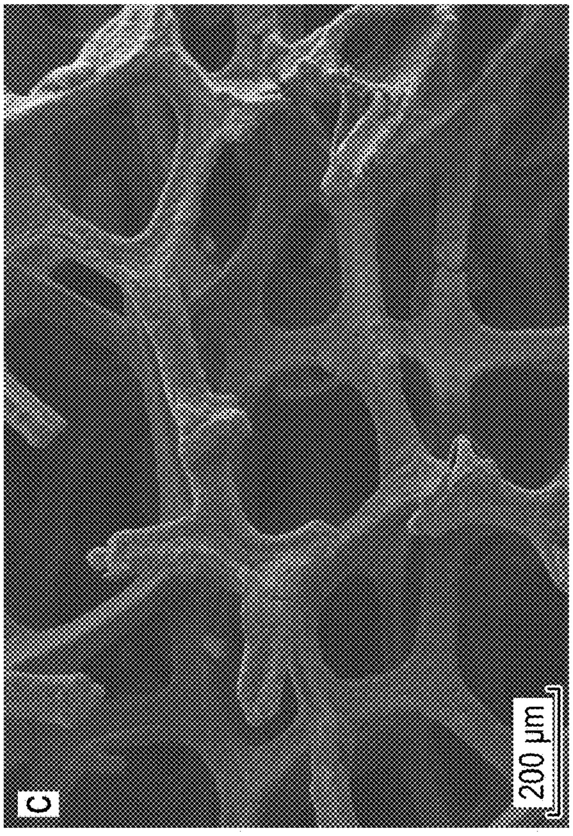
Figure 45D:
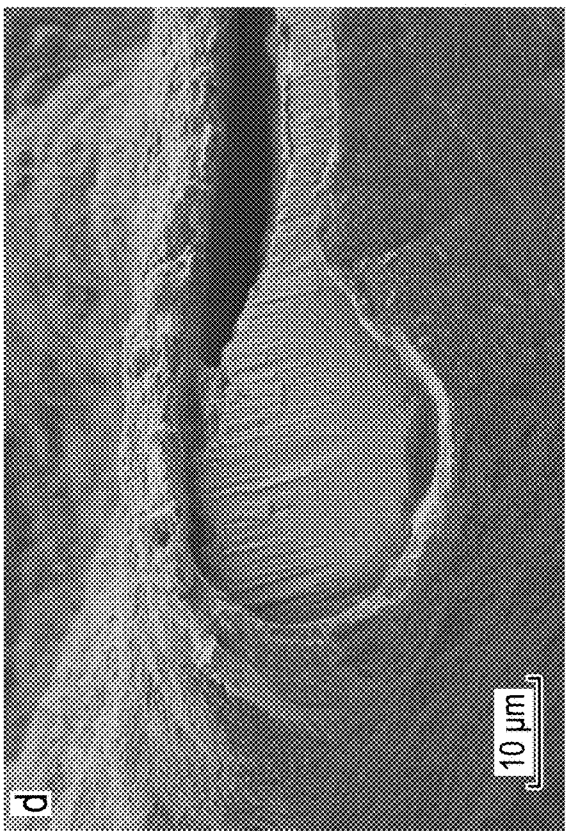

FIGS. 45B-45D illustrate SEM images of a copper foam coated with electrodeposited $(PEG\text{-}2bib)_x\text{-}(4A)_y$, according to an example embodiment. FIG. 45D illustrates a zoomed in image of an area denoted by a box in FIG. 45B. The deposited thin film results in passivation and complete coverage of the copper surface by a conformal polymer network thin film of approximately 1.7 μm in thickness.

Figure 46A:
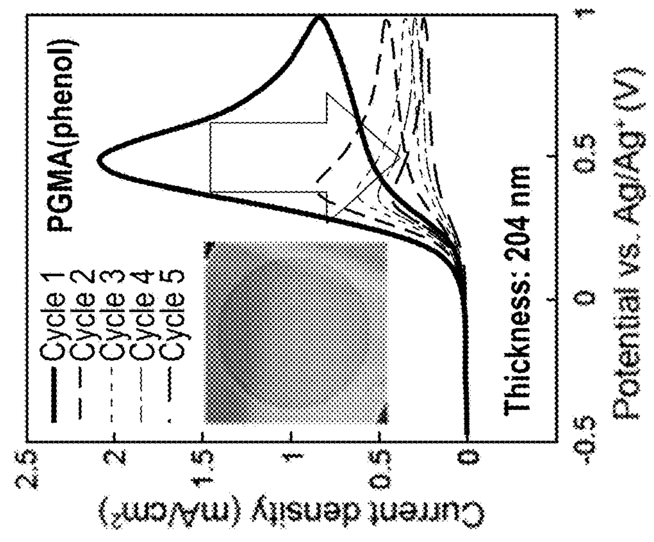
FIGS. 46A-46E illustrate plots of electrochemical measurements during electrodeposition of conformal, chemically modifiable thin films on a conductive substrate, according to an example embodiment.
Figure 46B:
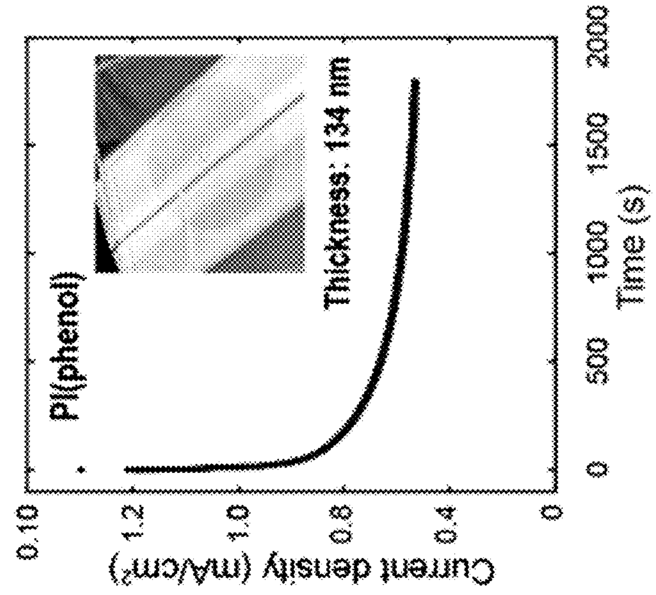
Figure 46C:
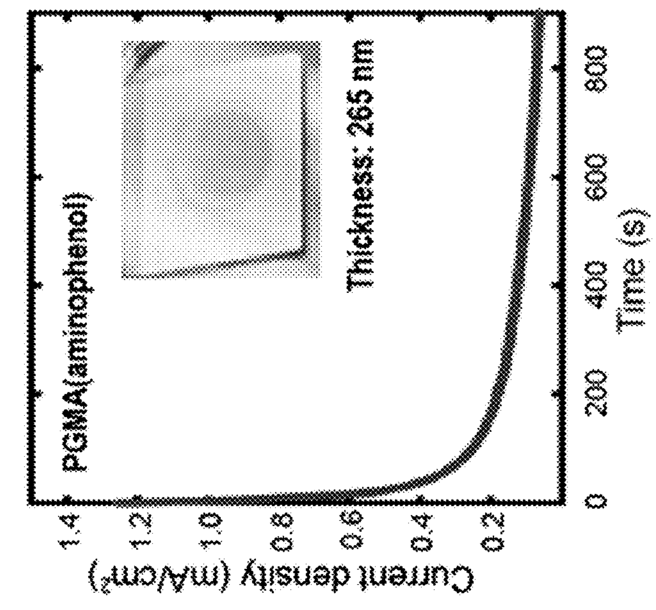
Figure 46D:
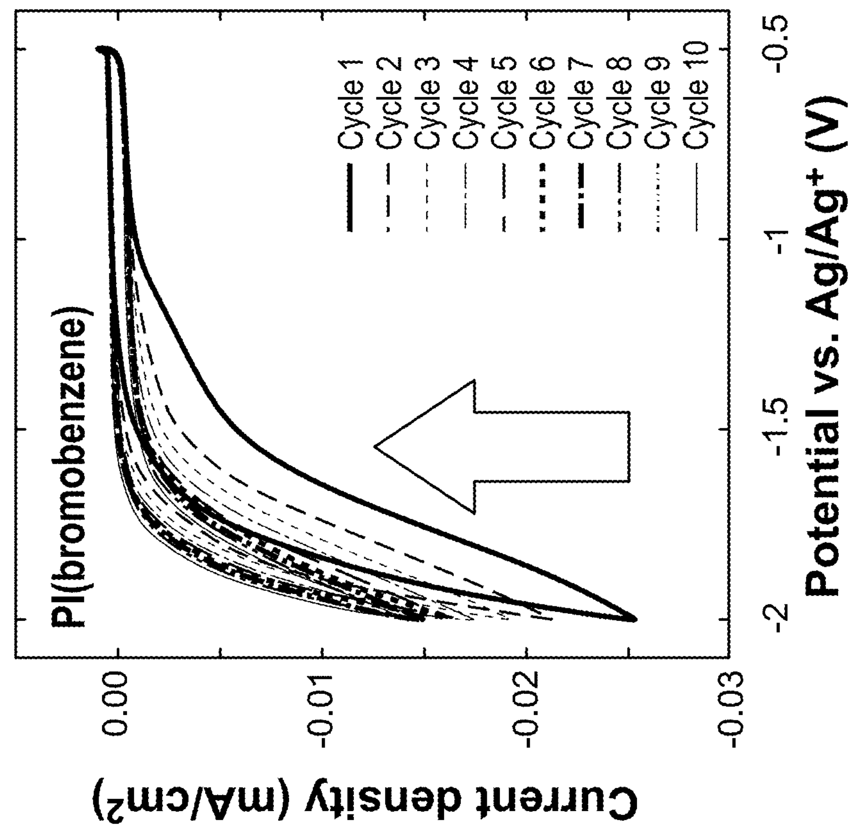
Figure 46E:
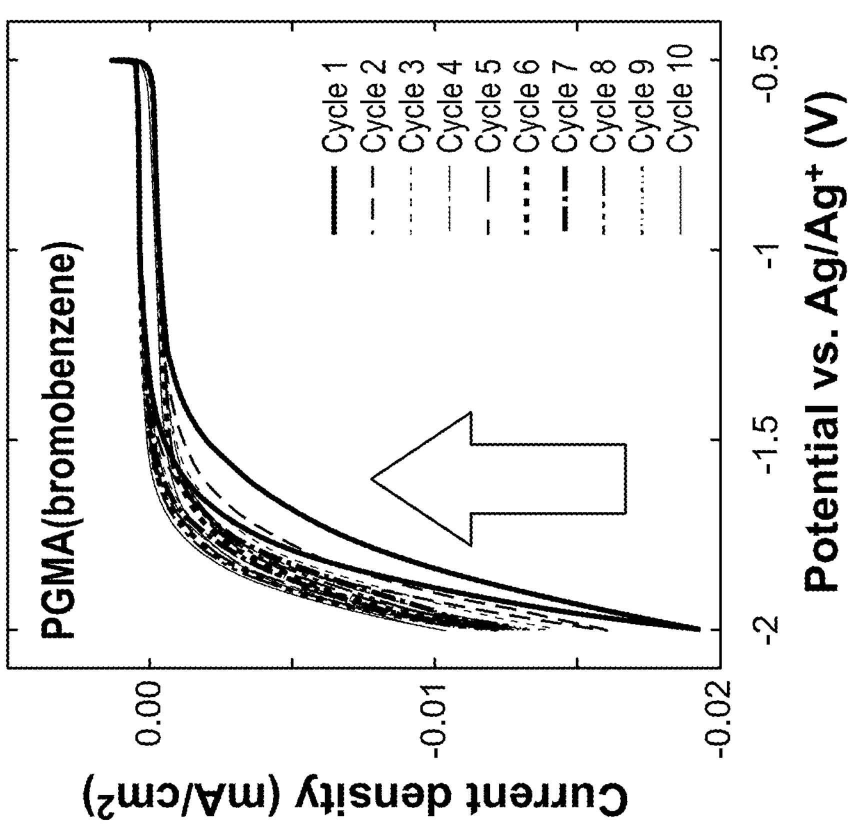

Example 5—Electrodeposition of Reactive Polymethacrylate Copolymers as Ultrathin Chemically Modifiable Coatings FIGS. 46A-46E illustrate plots of electrochemical measurements of conformal, chemically modifiable thin films electrodeposited on a conductive substrate, according to an example embodiment. FIG. 46A illustrates cyclic voltammetry measurements of PGMA(mercaptophenol) oxidatively deposited on a gold electrode. FIG. 46B illustrates chronoamperometry measurements of constant-potential oxidative deposition of PI(mercaptophenol) at 1 V vs. Ag/Ag+ on an ITO-coated electrode. FIG. 46C illustrates chronoamperometry measurements of PGMA-aminophenol by constant potential oxidative deposition at 0.9 V vs. $Ag/Ag^+$ on a gold electrode. FIGS. 46D and 46E illustrate cyclic voltammetry measurements of reductive electrodeposition of PI(bromobenzene) and PGMA(bromobenene), respectively on an ITO-coated electrode. All plots demonstrate gradual passivation of surfaces of the conductive electrodes, which may be indicated by decreases in current over cycling and time or in decreases of current density over time. Upon EPoN of these reactive copolymers, homogeneous thin films may be obtained on planar electrodes, which may be illustrated by insets of FIGS. 46A-46C.

PGMA and PI are reactive polymers that may be deterministically functionalized with the phenolic eX-Linker as co-monomers, or bromobenzene-based eX-Linker. PGMA contains an epoxy side group that may be modified with thiol- or amine-epoxy click chemistry, while PI contains C═C double bonds accessible for thiol-ene click chemistry.

Electrodeposition of Block Copolymers as Nanostructured Thin-Film Coatings

According to another example embodiment, a block copolymer may include one or more blocks functionalized with eX-Linkers to enable their electrodeposition as thin films and coatings. Block copolymers may be of interest for their microphase separation and self-assembly that may lead to ordered nanostructured patterns in thin films and on surfaces, such as hexagonally arranged dot patterns, line patterns, closed packed parallel and perpendicular cylinders, as well as co-continuous three-dimensionally periodic network structures such as the gyroid morphology. The characteristic length scale of these patterns may be on the order of 5-100 nm, which may make them ideal candidates as structured resists for nanolithography.

Figure 47B:
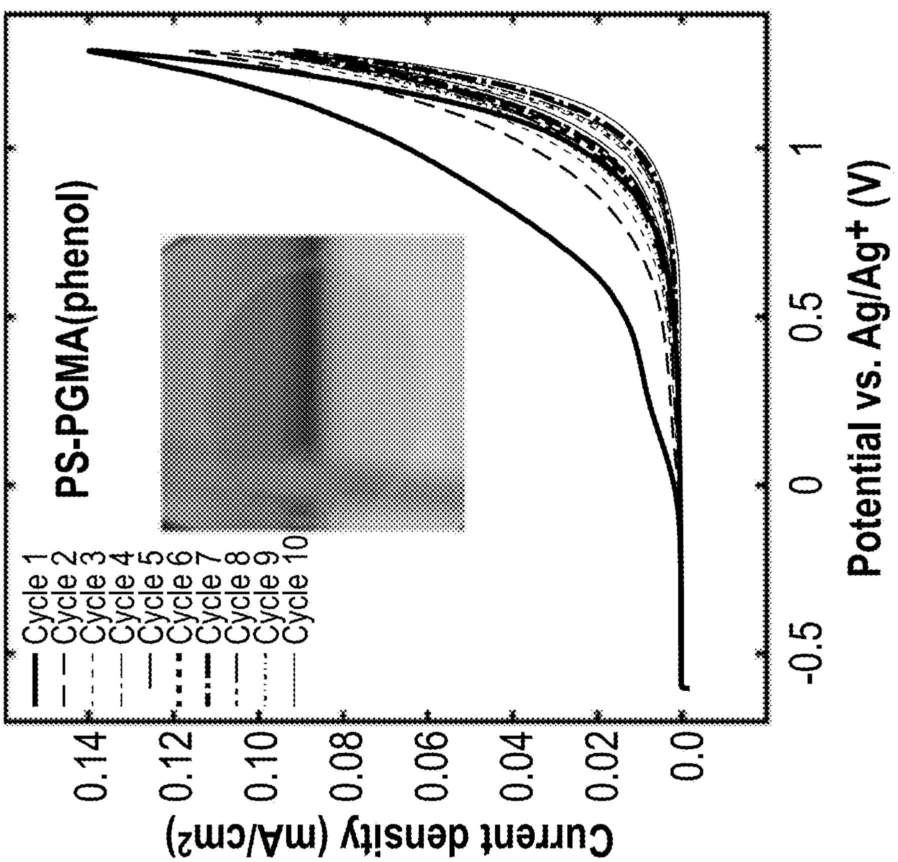
FIG. 47B illustrates cyclic voltammetry measurements of electrodeposition of PS-PGMA(phenol) as a conformal thin film with an inset illustrating a photograph of the electrodeposited film, according to an example embodiment.
Figure 47A:
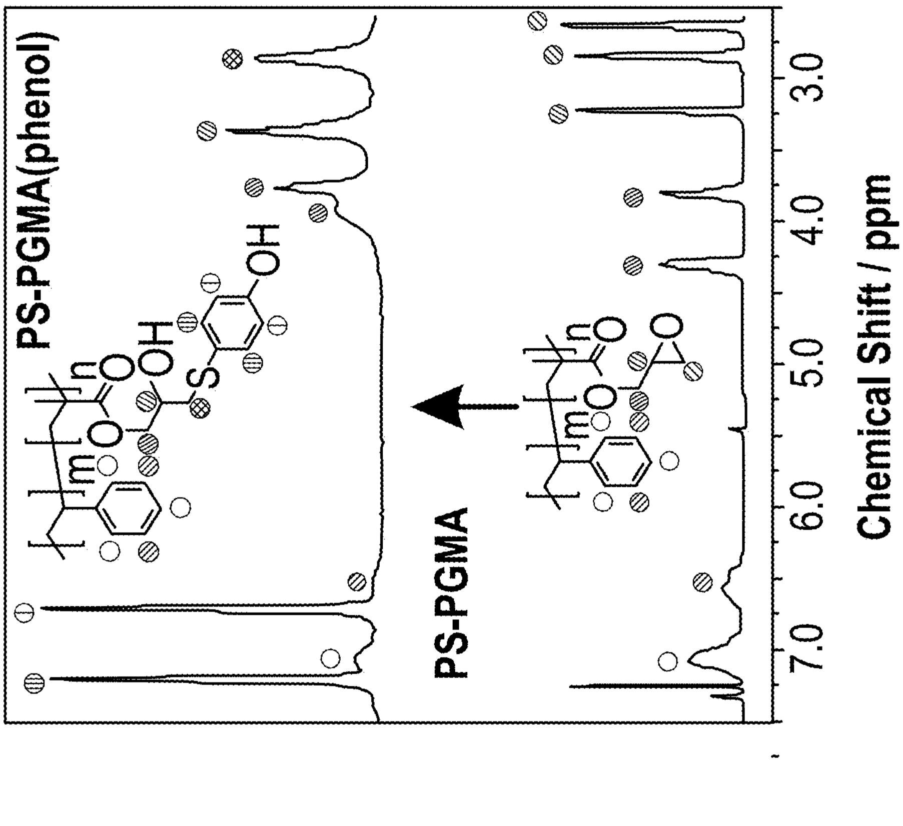
FIG. 47A illustrates proton-nuclear magnetic resonance ($^1$H-NMR) spectra of a poly(styrene-block-glycidyl methacrylate) (PS-PGMA) before (bottom) and after (top) attachment of 4-mercaptophenol to the PGMA block, according to an example embodiment.

FIG. 47A illustrates proton-nuclear magnetic resonance ($^1H$-NMR) spectra of a poly(styrene-block-glycidyl methacrylate) (PS-PGMA) before (bottom) and after (top) attachment of 4-mercaptophenol to the PGMA block, according to an example embodiment. The colored dots in the spectra and chemical drawing relate the respective protons to the NMR peaks. PS-PGMA may be modified with 4-mercaptophenol on a PGMA block to enable electrodeposition of the PS-PGMA as a conformal thin film.

FIG. 47B illustrates cyclic voltammetry measurements of electrodeposition of PS-PGMA(phenol) as a conformal thin film with an inset illustrating a photograph of the electrodeposited film, according to an example embodiment. The CV measurements may indicate surface passivation over cycling (decrease in current) and the formation of a thin film on a gold substrate. The circular shape of the thin film in the inset is imposed by a deposition cell.

Figure 47D:
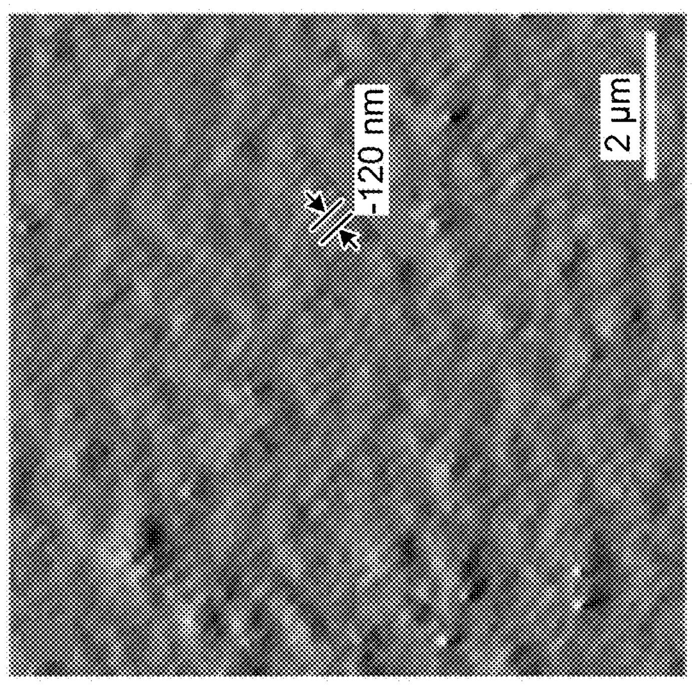
FIG. 47D illustrates an AFM image of an electrodeposited PS-PGMA(phenol) thin film revealing periodic nanopatterns, according to an example embodiment.
Figure 47C:
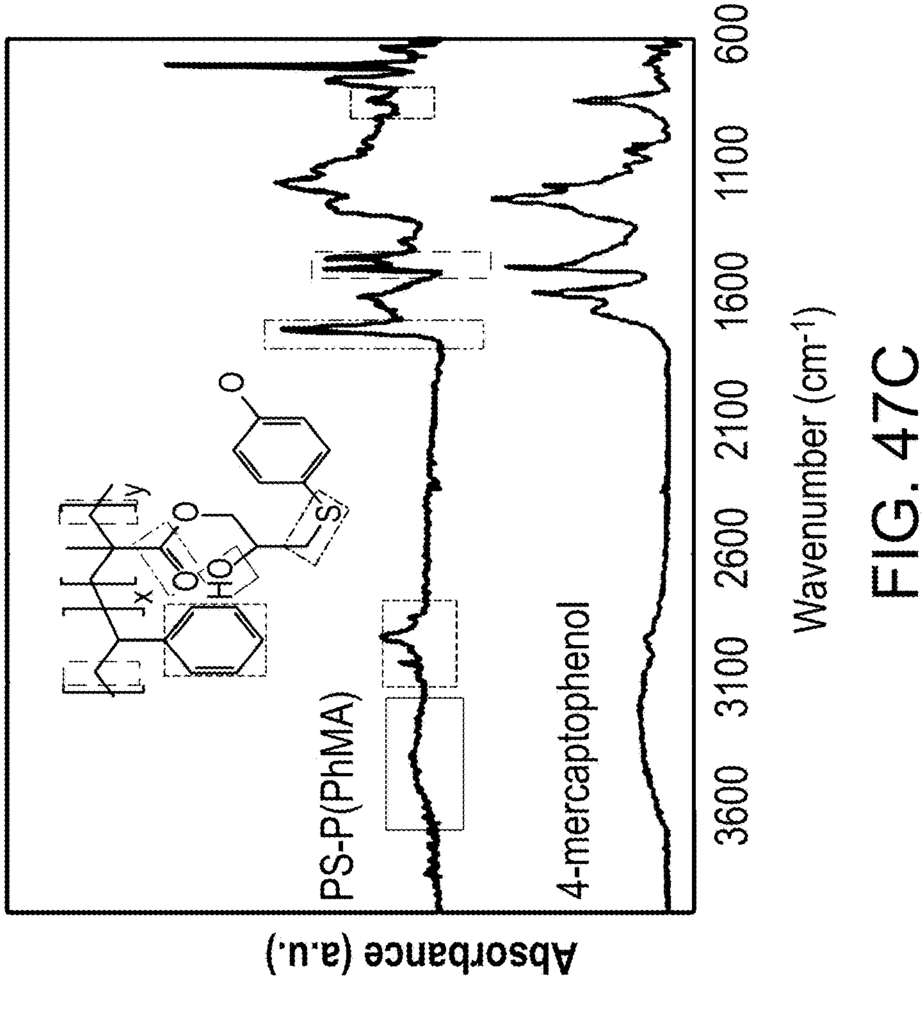
FIG. 47C illustrates ATR_FTIR absorption spectra of electrodeposited thin films from 4-mercaptophenol (bottom) and PS-PGMA(phenol) (top), according to example embodiments.

FIG. 47C illustrates infrared (IR) absorption spectra of electrodeposited thin films from 4-mercaptophenol (bottom) and PS-PGMA(phenol) (top). The PS-PGMA(phenol) thin film may be similar to the films described herein with reference to FIGS. 47A and 47B. The IR absorption spectra may demonstrate deposition of the block copolymer as a thin film. Differences between the spectra of 4-mercaptophenol and of PS-PGMA(phenol) are shaded to correspond to chemical structures of PS-PGMA(phenol). The spectra may demonstrate spectroscopic chemical signatures of both blocks and eX-Linker.

FIG. 47D illustrates an AFM image of an electrodeposited PS-PGMA(phenol) thin film revealing periodic nanopatterns. The AFM images provide evidence of microphase separation between the blocks, as indicated by the arrows.

Figure 48B:
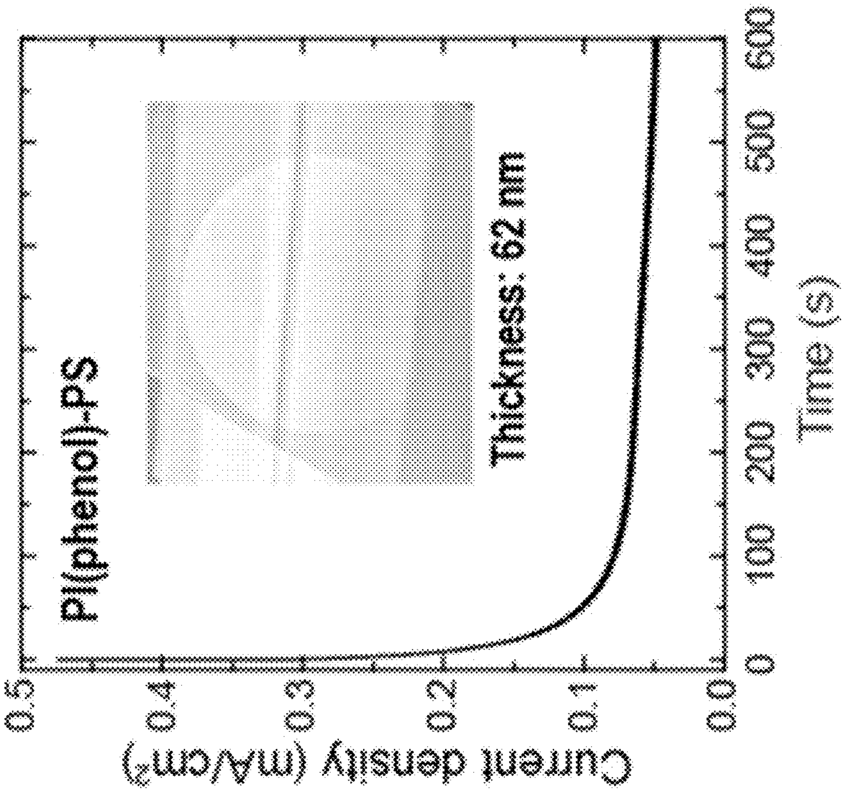
FIG. 48B illustrates a plot of chronoamperometry measurements of electrodeposition at constant potential of the phenol-modified PS-PI(phenol) along with an inset of a corresponding thin film electrodeposited, according to an example embodiment.
Figure 48A:
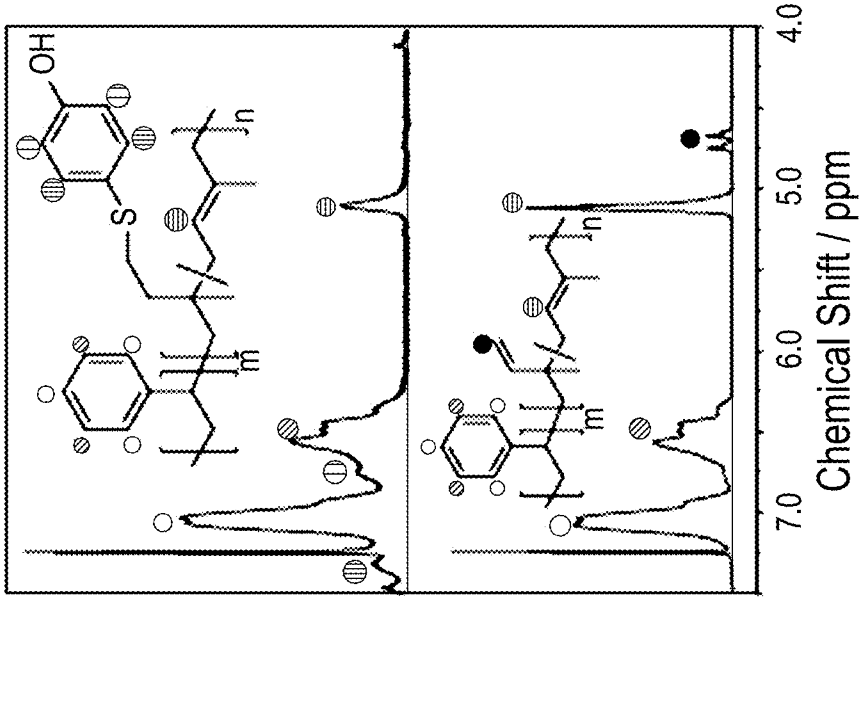
FIG. 48A illustrates $^1$H-NMR spectra of a poly(styrene-block-isoprene) (PS-PI) before (bottom) and after (top) attachment of 4-mercaptophenol to the PGMA block, according to an example embodiment.

FIG. 48A illustrates $^1H$-NMR spectra of a poly(styrene-block-isoprene) (PS-PI) before (bottom) and after (top) attachment of 4-mercaptophenol to the PGMA block, according to an example embodiment. The colored dots in the spectra and chemical drawing relate the respective protons to the NMR peaks. PS-PI may be modified with 4-mercaptophenol on a PI block to enable electrodeposition of the PS-PI as a conformal thin film.

FIG. 48B illustrates a plot of chronoamperometry measurements of electrodeposition at constant potential of the phenol-modified PS-PI(phenol) along with an inset of a corresponding thin film electrodeposited, according to an example embodiment. The plot may indicate surface passivation over time (decrease in current) and the formation of a thin film on an indium-tin oxide substrate.

Electrodeposition of Reactive Polymethacrylate Copolymers as Ultrathin Chemically Modifiable Coatings for Carbon Dioxide Capture on High-Surface-Area Sorbents Since $CO_2$ is present at very low concentrations in air (400-2000 ppm), a fast and efficient sorbent system may require a large surface-to-volume ratio sorbent architecture with low flow resistance. To this end, porous hollow carbon fibers (P-HCF) coated with ultrathin poly(amine) films (<1, 000 nm in thickness) may be developed from electrodeposition of poly(glycidyl methacrylate) followed by amine-functionalization of the coating after deposition.

Figure 49A:
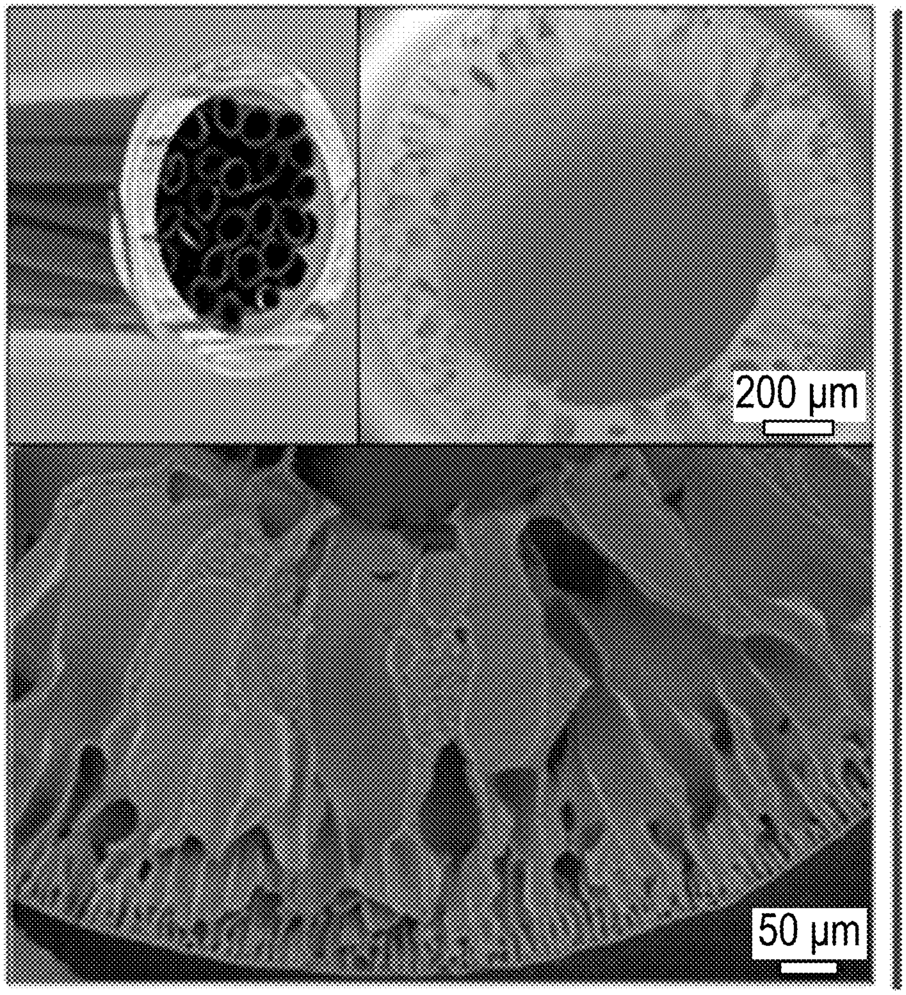
FIG. 49A illustrates photographs (top left) and SEM images (top right, bottom) of porous hollow carbon fibers (P-HCF), according to example embodiment.

FIG. 49A illustrates photographs (top left) and SEM images (top right, bottom) of porous hollow carbon fibers (P-HCF). The fibers at 100 μm-3 mm in diameter may exhibit low-resistance air flow through their open core (0-1.5 mm) and high exposure rates to a large surface area of low-tortuosity, radially aligned, and graded channel pores (1-50 μm) in a fiber shell (50-100s μm). The architecture may optimize mass transport by balancing advection through the core with diffusion in the shell and the sorption kinetics of the solid poly(amine) coating on the interior surface of the porous fiber.

Ultrathin polyamine coatings on porous sorbent material may be chemically selective for sorption of $CO_2$ while allowing for molecular tunability of a composition of the coatings to tailor $CO_2$ binding energies and hydrophilicity. A widespread challenge for porous materials is the fabrication of conformal and uniform thin-film coatings on their large surface area without pore blockage or heterogeneous material deposition. EPoN may be used to fabricate such coatings: modifying poly(glycidyl methacrylate) with small fractions of phenol side groups (<20%) as an electrochemical crosslinker may enable its conformal and uniform oxidative electrodeposition on porous carbon materials (e.g., P-HCF) as coatings with tunable thicknesses of 10 to 100s of nanometers.

Figure 49B:
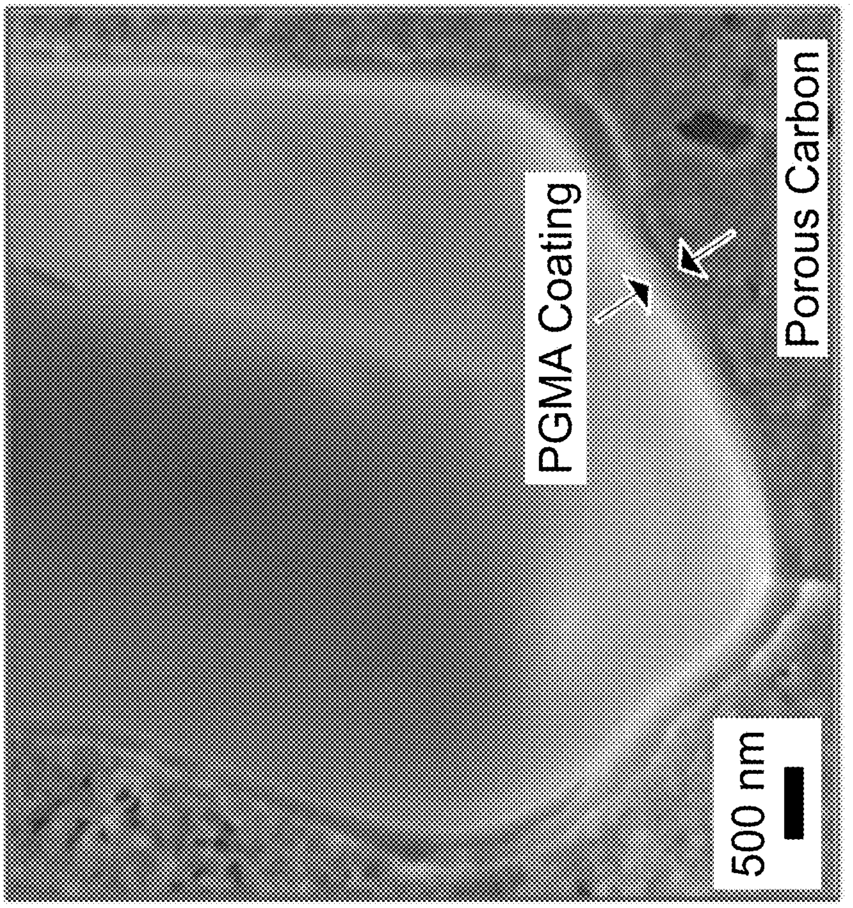
FIG. 49B illustrates an SEM image of a micrometer-sized radial pore with a thin coating of poly(glycidyl methacrylate) (PGMA) thereon, according to an example embodiment.

FIG. 49B illustrates an SEM image of a micrometer-sized radial pore with a thin coating of poly(glycidyl methacrylate) (PGMA) thereon, according to an example embodiment. The arrows indicate positions of the coating and of a carbon substrate on which the coating is formed, respectively. Depositions to form such coatings may be performed at 0.5-1.5 V vs silver/silver perchlorate (0.05 M) either continuous or pulsed from its electrolytic solution containing 50-300 mg/mL polymer in dimethyl formamide with 0.1 M tetrabutylammonium perchlorate electrolyte and one to two times excess triethyl amine relative to the phenol content. EPoN may confine polymer network formation to a surface of a substrate and growth of the polymer network is self-limiting due to the electronically insulating property of the coating and its eventual impermeability to the polymer. The combination of these mechanistic attributes may result in conformal and uniform deposition of polymer network thin films. By utilizing phenol-modified poly(glycidyl methacrylate) (PGMA) as a reactive copolymer, P-HCF, as described herein with reference to FIG. 49A, may be coated with PGMA Modification of EPoN-derived coatings with various functional amines or thiols (individually or as mixtures) to tune the coatings' molecular composition may further be demonstrated.

Figure 49C:
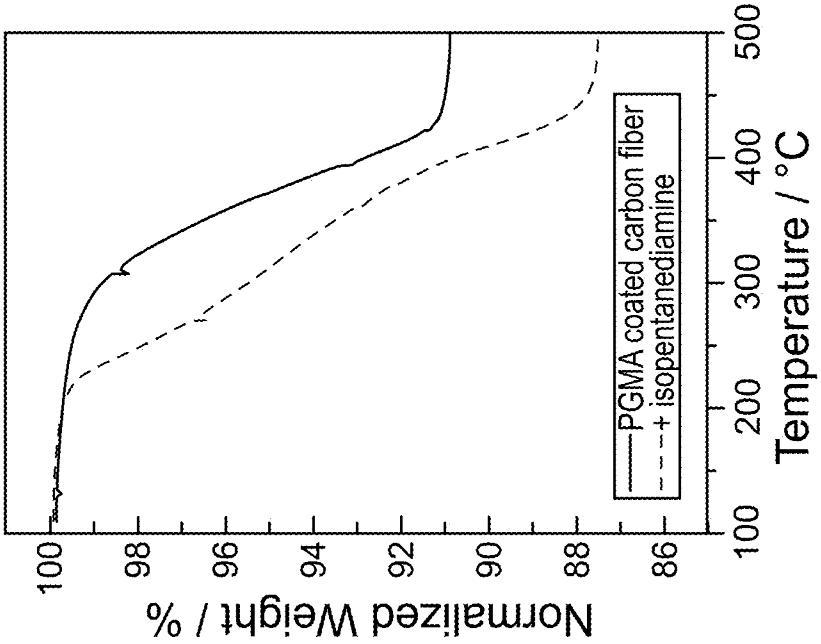
FIG. 49C illustrates a plot of thermogravimetric analysis in nitrogen after coating PGMA on P-HCF (black) and subsequent isopentadiamine-modification of the PGMA coating (blue), according to an example embodiment.

FIG. 49C illustrates a plot of thermogravimetric analysis in nitrogen after coating PGMA on P-HCF (black) and subsequent isopentadiamine-modification of the PGMA coating (blue), according to an example embodiment. The plot may demonstrate successful PGMA conversion to poly (amine) by increases in polymer weight from 8 to 12% (polymer degrades at higher temperatures while carbon is stable, which means that lost weight equals polymer weight corresponding to amines).

Figure 49D:
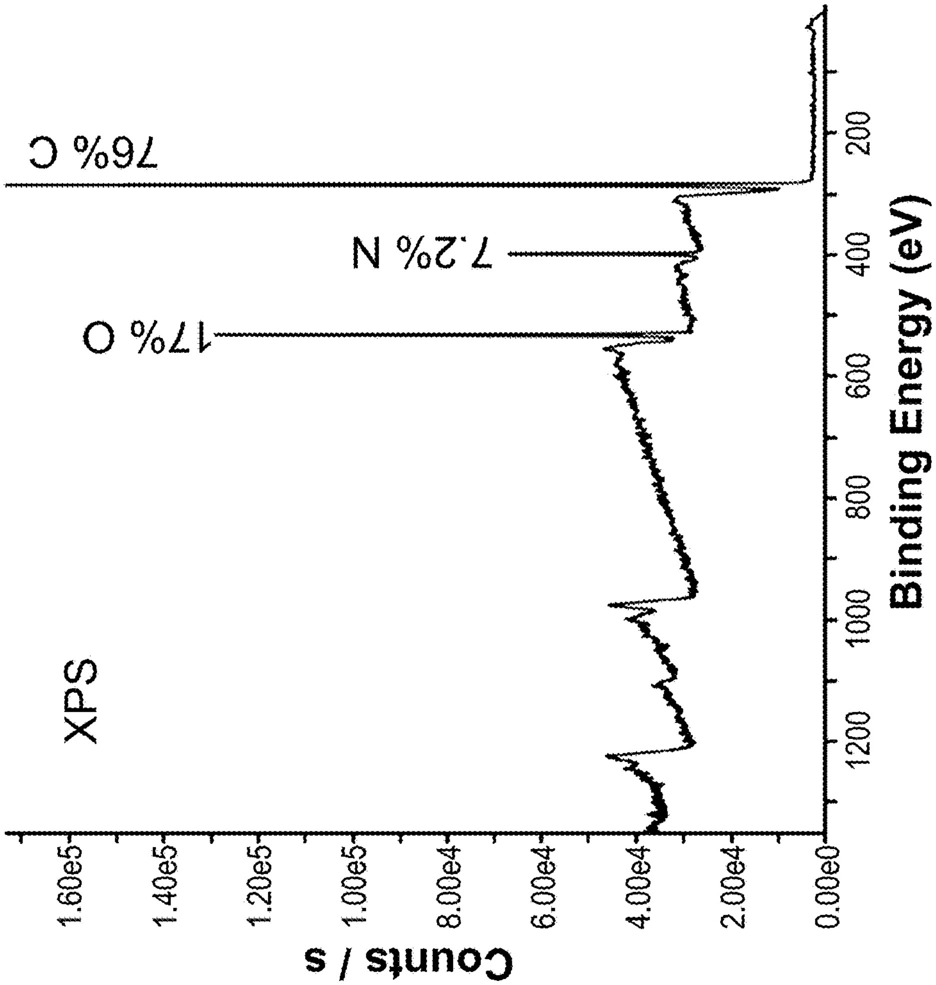
FIG. 49D illustrates an XPS spectrum of isopentanediamine-modified PGMA coating demonstrating successful amine-incorporation into a thin film coating, according to an example embodiment.

FIG. 49D illustrates an XPS spectrum of amine-modified PGMA coating demonstrating successful amine-incorporation into a thin film coating, according to an example embodiment, as represented by a Nitrogen signal.

Figure 49E:
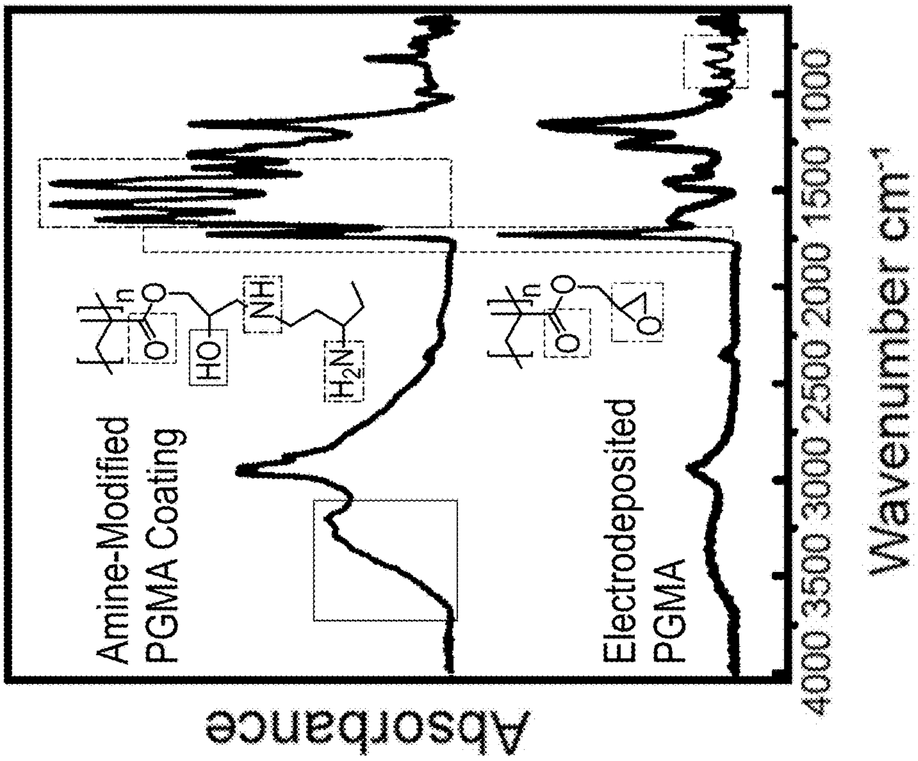
FIG. 49E illustrates FTIR spectra of an electrodeposited PGMA coating (bottom) and the same coating after modification with isopentanediamine (top), according to an example embodiment.

FIG. 49E illustrates FTIR spectra of an electrodeposited PGMA coating (bottom) and the same coating after modification with isopentanediamine (top), according to an example embodiment, with insets representing molecular structures of corresponding molecules. The spectra may indicate successful conversion of PGMA coating to a poly (amine) coating. Shaded regions correlate elements of the FTIR spectra to structural components of the coatings. Electrodeposition of reactive copolymers such as PGMA may present a useful paradigm for fabricating modularly functional ultrathin coatings with a large degree of molecular and compositional tunability that can be endowed to the thin films after deposition.

Figure 49F:
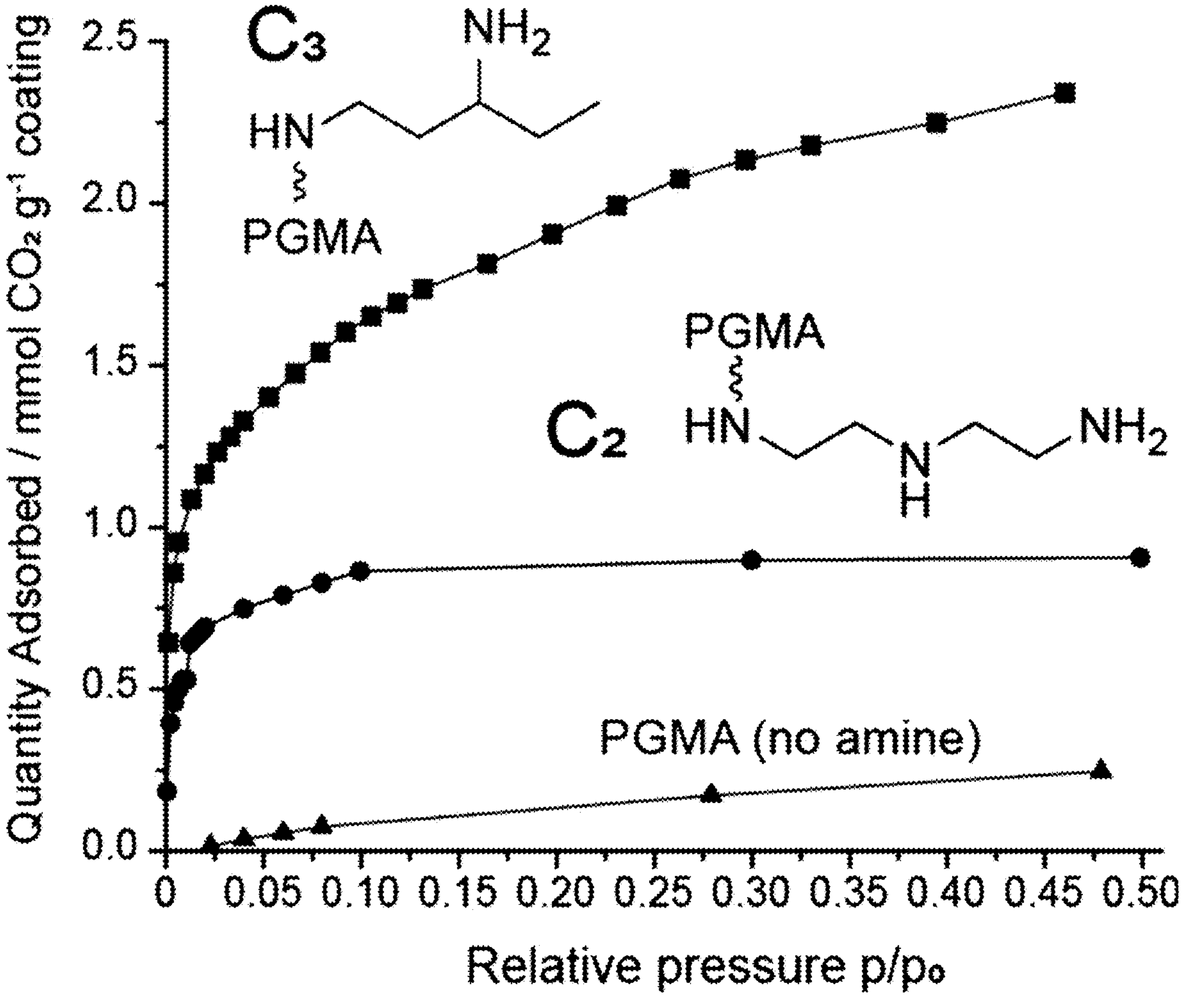
FIG. 49F illustrates plots of adsorption isotherms of carbon dioxide at room temperature on PGMA-coated P-HCF (bottom), diethylenetriamine modified PGMA-coated P-HCF (middle), and isopentanediamine modified PGMA-coated P-HCF (top), according to an example embodiment.

FIG. 49F illustrates plots of adsorption isotherms of carbon dioxide at room temperature on PGMA-coated P-HCF (bottom), diethylenetriamine modified PGMA-coated P-HCF (middle), and isopentanediamine modified PGMA-coated P-HCF (top), according to an example embodiment. Chemical structures indicate modifications present on a PGMA polymer backbone.

Correlations between polyamine coating compositions, sorption capacity, and amine efficiency using $CO_2$ adsorption isotherms on PGMA-coated P-HCFs functionalized with a systematic set of amine side groups may be identified based on the plot of adsorption isotherms. For example, amine groups with a three methylene spacer, as in isopentyldiamine ($C_3$-separated diamine), may exhibit close to quantitative amine efficiency at high $CO_2$ partial pressures and achieved a capacity of 1 mmol $CO_2$ per gram of coating at 1000 ppm $CO_2$, while common two methylene spacer, as found in diethylenetriamine ($C_2$-separated triamine), may saturate prematurely and exhibit low amine efficiency. This phenomenon may be due to insufficient accessibility to $C_2$-separated triamine coating upon initial $CO_2$ sorption and a resulting crosslinking and blocking of a surface layer. This may also be a potential reason for which current poly (ethylene imine)-based sorbents require coatings with thicknesses of less than 5 nm, which may decrease material efficiency on a system scale. On the contrary, $C_3$-separated poly(amine) coating may exhibit $CO_2$ accessibility to an entire coating with near-quantitative amine efficiency, which may allow for sorbent coating thicknesses of 100*s* of nanometers yielding high sorbent utilization and overall material efficiency.

Other Reactive poly(methacrylate)s

The epoxy functionality of the glycidyl side group in PGMA may be chemically modifiable with amines, thiols, alcohols, and other nucleophilic functionalities. Orthogonal to this glycidyl side group, carbon-carbon double bonds may be functionalized with thiol radicals through the so-called thiol-ene reaction.

According to an example embodiment, poly(glycidyl methacrylate-co-allyl methacrylate) (P(GMA-AMA)) copolymers may be synthesized and functionalized with phenol side groups on a portion, for example, 5%, of GMA monomers.

Figure 50A:
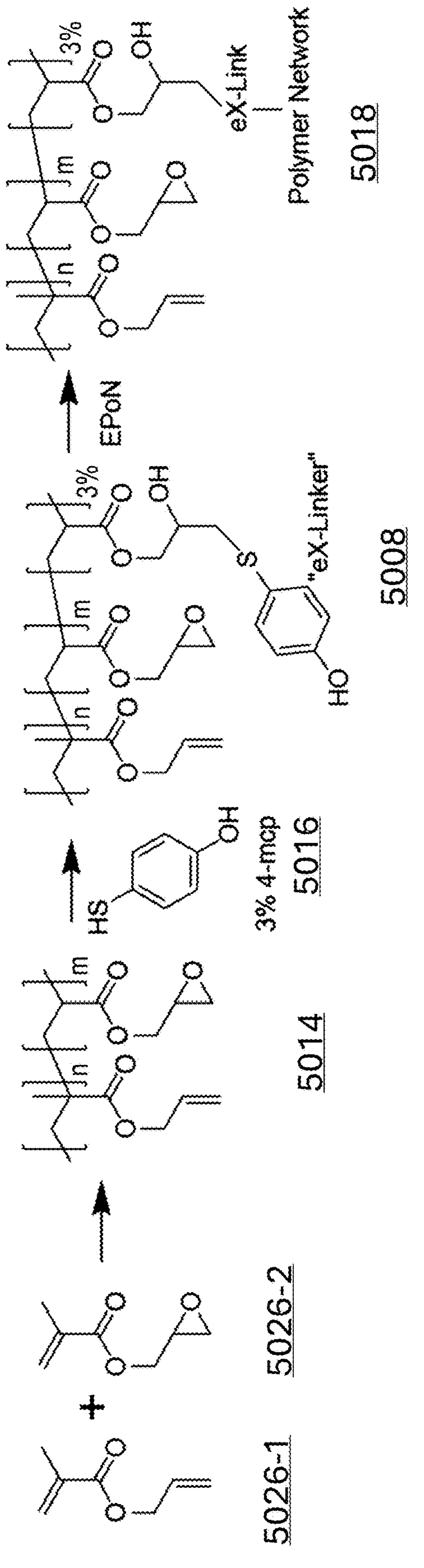
FIG. 50A illustrates an example chemical schematic of copolymerization of glycidyl methacrylate (GMA) and allyl methacrylate (AMA) and subsequent attachment of mercaptophenol as the electrochemical crosslinker (eX-Linker) followed by its electrodeposition, according to an example embodiment.

FIG. 50A illustrates an example chemical schematic of copolymerization of glycidyl methacrylate (GMA) 5026-2 and allyl methacrylate (AMA) 5026-1 to form a random copolymer 5014, which may form a polymer backbone, and subsequent attachment of mercaptophenol 5016 as the electrochemical crosslinker (eX-Linker), according to an example embodiment. The polymer 5008 comprising the polymer backbone 5014 and the mercaptoethanol 5016 coupled thereto may be electrodeposited as a polymer network 5018, which may be a conformal thin film.

Figure 50B:
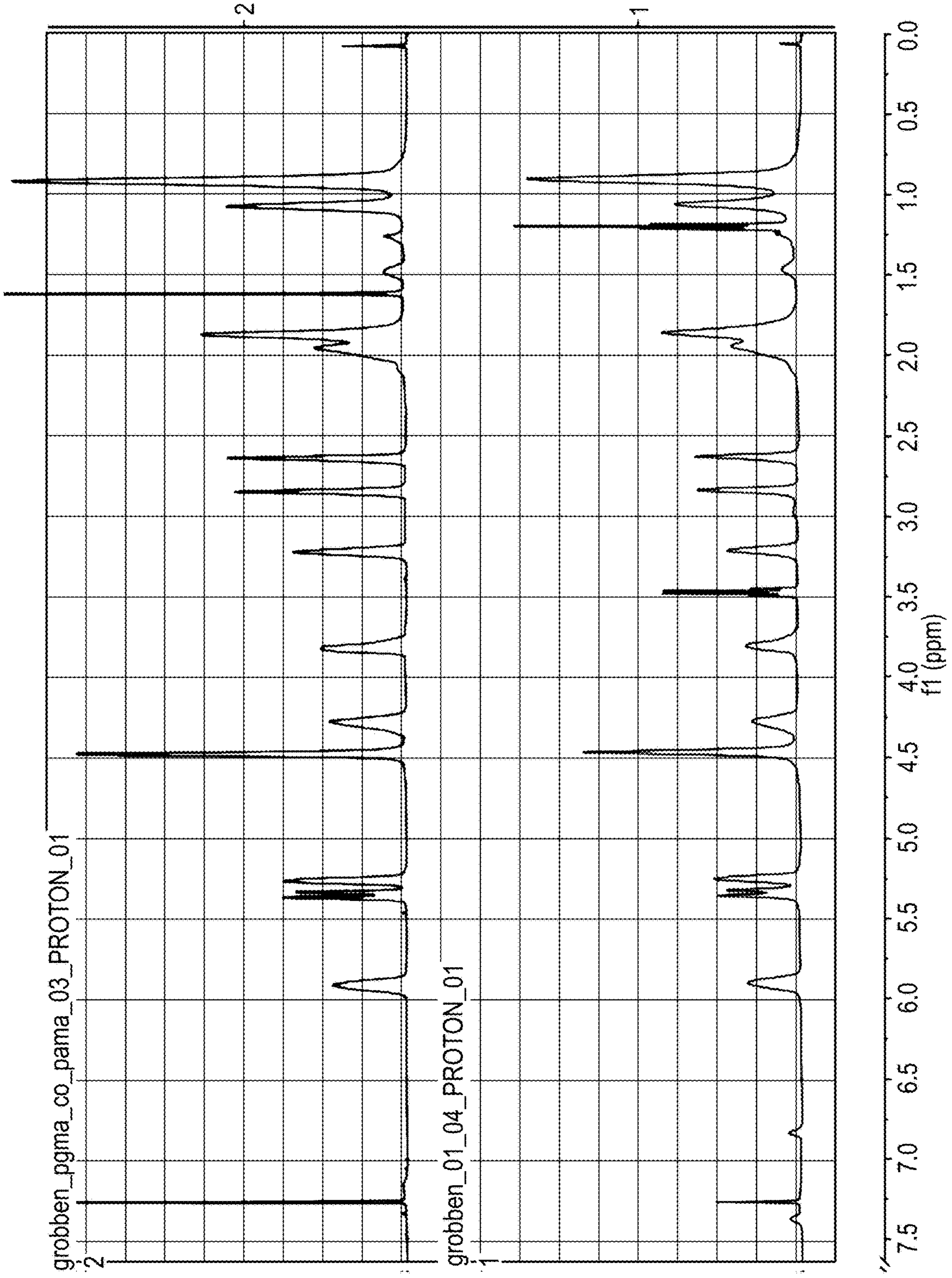
FIG. 50B illustrates $^1$H-NMR spectra of P(GMA-AMA) copolymer at equal monomer fractions before (top) and after (bottom) attachment of mercaptophenol side groups to 5% of the GMA monomers, according to an example embodiment.

FIG. 50B illustrates $^{1}$H-NMR spectra of P(GMA-AMA) copolymer at equal monomer fractions before (top) and after (bottom) attachment of phenol side groups to 5% of the GMA monomers, according to an example embodiment. The peaks in the range of 4.5-6 ppm may be associated with the protons of the allyl side group of the AMA monomer in the copolymer, while the peaks in the range of 2.5-4.4 ppm may be associated with the protons on the glycidyl side group of the GMA monomer in the copolymer. After mercaptophenol addition to 5% of the GMA monomers in the copolymer, two new peaks in the range of 6.8-7.4 ppm appear in the $^{1}$H-NMR spectrum (bottom of FIG. 50B), which may be associated with the aromatic protons of the attached mercaptophenol side group. The corresponding decrease of the peak-area ratios between GMA and AMA in the ranges stated above may further indicate the successful addition of mercaptophenol to the GMA monomers in the P(GMA-AMA) copolymer.

Figure 50C:
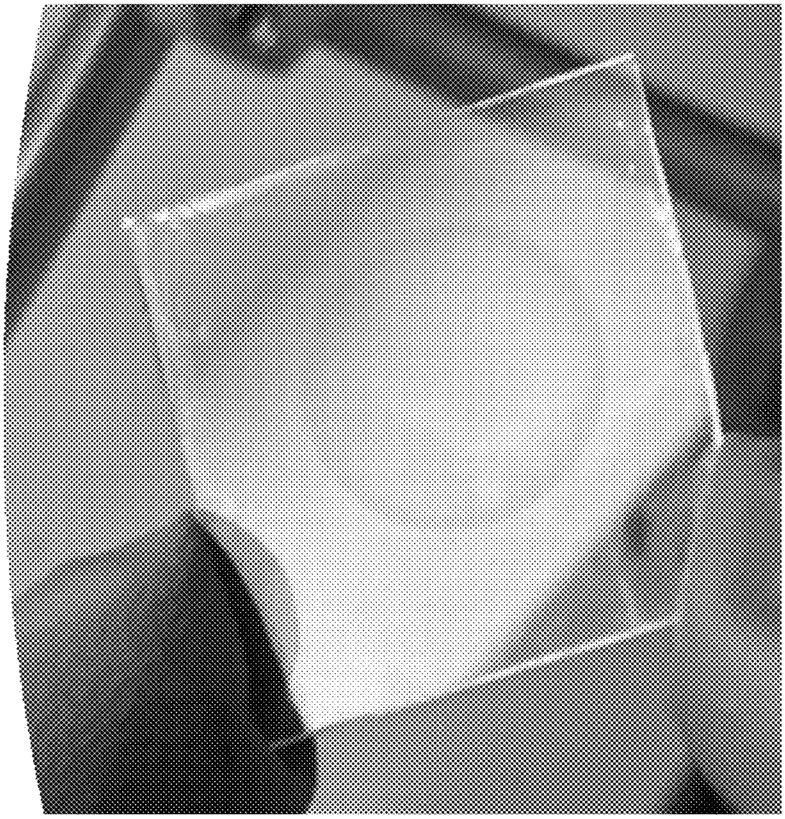
FIG. 50C illustrates a photograph of an electrodeposited P(AMA-GMA) coating, according to an example embodiment.

FIG. 50C illustrates a photograph of an electrodeposited P(AMA-GMA) coating, according to an example embodiment. The coating may be deposited on indium-tin-oxide-coated glass (dark circle) with a thickness of approximately 300 nm when deposited at 1.5 V vs silver wire from an electrolytic solution containing 100 mg/mL polymer in dimethyl formamide with 0.1 M tetrabutylammonium perchlorate electrolyte and triethyl amine stochiometric to the phenol content.

Figure 50D:
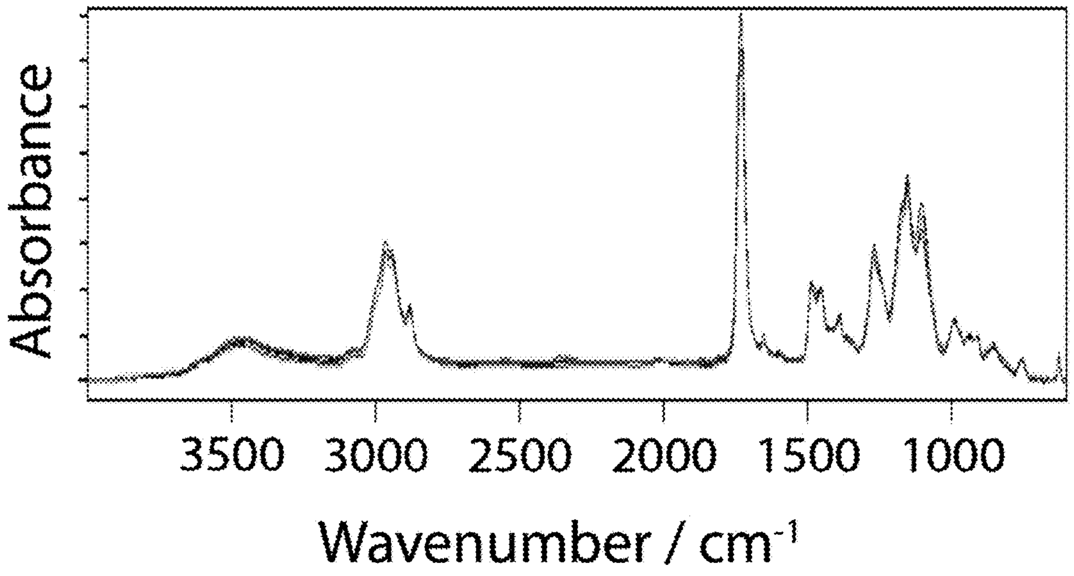
FIG. 50D illustrates plots of ATR_FTIR absorption spectroscopy patterns of the electrodeposited P(GMA-AMA) coating of FIG. 50C.

FIG. 50D illustrates plots of FTIR absorption spectroscopy patterns of the electrodeposited P(GMA-AMA) coating of FIG. 50C. The plots indicate measurements taken at 4 different positions of the film and overlapping patterns may indicate spatial chemical uniformity of the coating.

Example 6—Electrodeposition of Polyvinyl Polymers with the Reductive Electrochemical Crosslinker Pyridinium According to an example embodiment, electrodeposition of polymer networks (EPoN) may utilize cathodic electrochemical activation of the electrochemically active crosslinker pyridinium as a side group of a poly(vinyl) polymer. For example, poly(4-vinylpyridine) may be chosen as the poly(vinyl) polymer and a controlled fraction between 1% and 100% of its 4-vinylpyridine side groups may be quaternized with methyl iodide in dimethyl formamide, thereby forming a polymer with a controlled fraction of methylpyridinium side groups.

Figure 51:
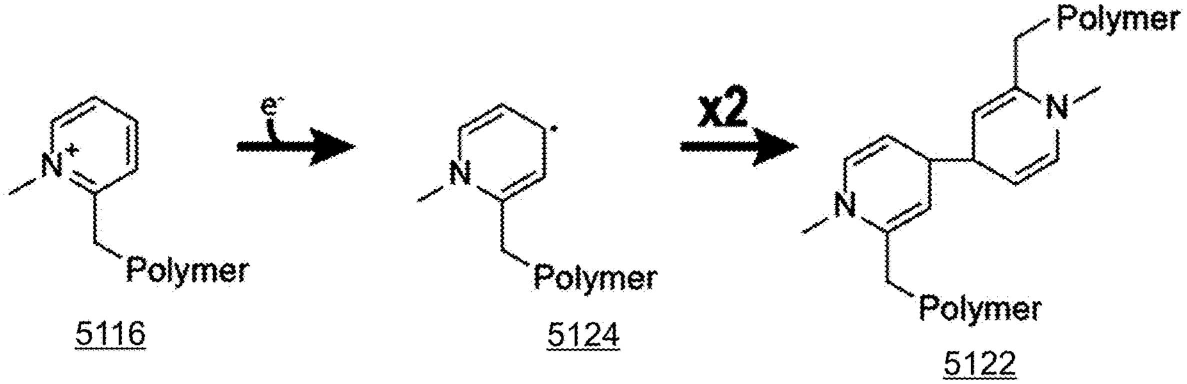
FIG. 51 illustrates an example chemical mechanism of reductive pyridinium coupling for its use as an electrochemically active crosslinker for polymer network electrodeposition, according to an example embodiment.

FIG. 51 illustrates an example chemical mechanism of reductive pyridinium coupling for its use as an electrochemically active crosslinker for polymer network electrodeposition, according to an example embodiment. The methylpyridinium side groups 5116 may generate radicals 5124 upon electrochemical one-electron reduction at a cathode. Quickly after forming the methylpyridine radicals 5124, two of the radicals may form a covalent bond to couple, which may create polymer crosslinks 5122.

Continued reduction and coupling of methylpyridinium side groups may lead to formation and deposition of a poly(4-vinylpyridine) network as a thin film: as the polymer network forms, the solubility of the polymer gradually decreases, leading to its deposition on the substrate. For example, when a reductive potential through cyclic voltammetry is applied to the polymer solution, a significant reductive current is observed in the range of −1.6 to −2.0 V vs. Ag/Ag+ (50 mM).

Figure 52A:
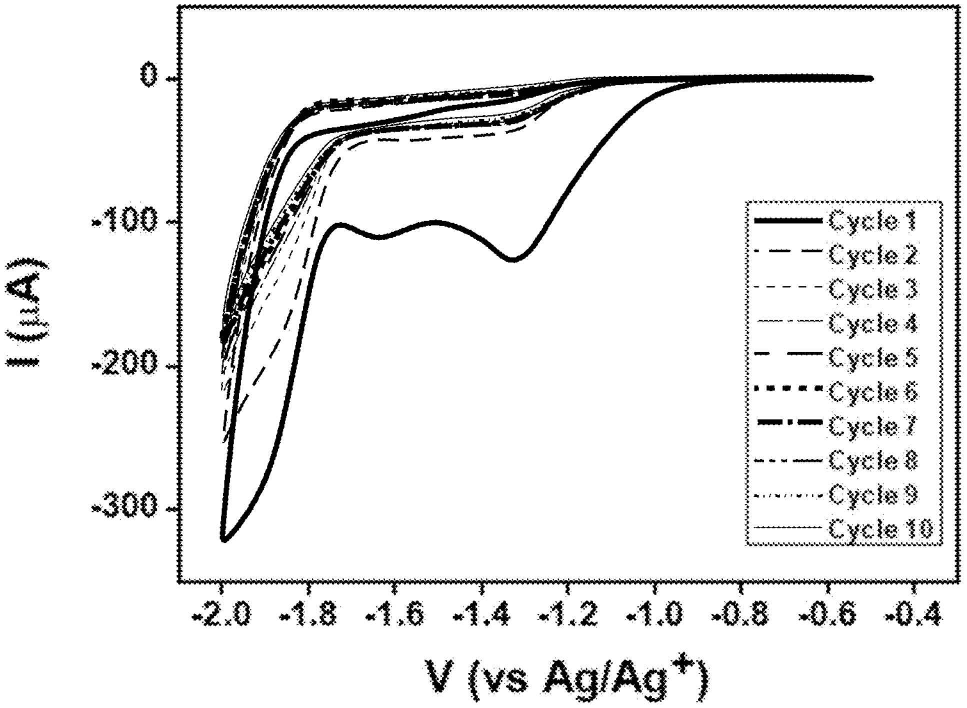
FIG. 52A illustrates plots of cyclic voltammetry measurements of electrodeposition of poly(4-vinylpyridine) with 30% quaternization fraction from a 150 mg/mL polymer solution in dimethylformamide onto an ITO substrate, according to an example embodiment.

FIG. 52A illustrates plots of cyclic voltammetry measurements of electrodeposition of poly(4-vinylpyridine) with 30% quaternization fraction from a 150 mg/mL polymer solution in dimethylformamide onto an ITO substrate, according to an example embodiment. As the number of deposition cycles increases, a deposited polymeric thin film may insulate the electrode, which may cause a significant decrease in the reductive current measured.

Figure 52B:
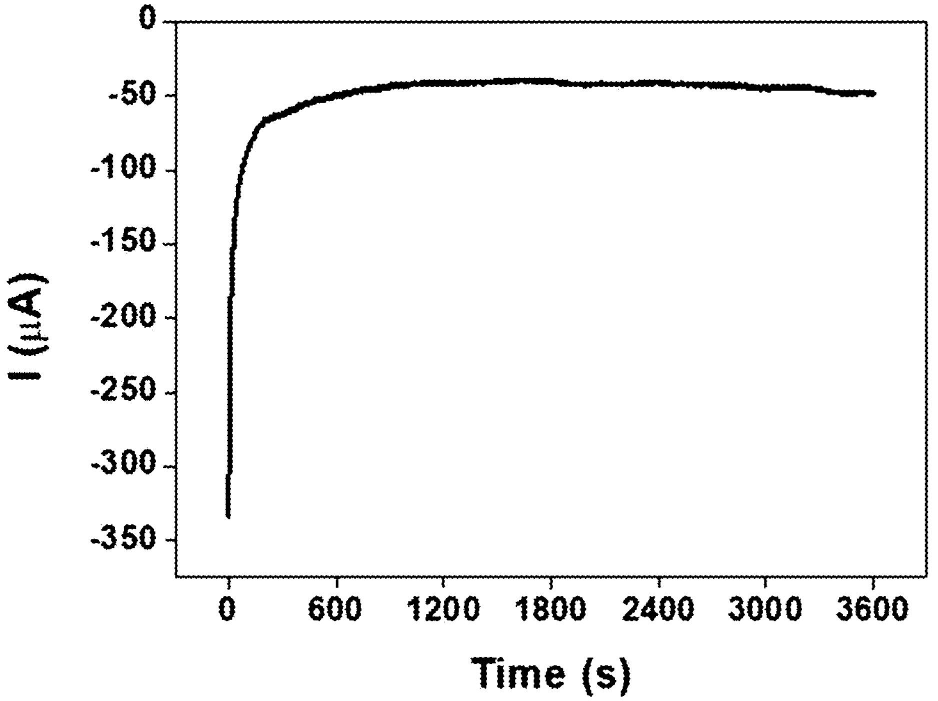
FIG. 52B illustrates a plot of chronoamperometry measurements during the constant reductive electrodeposition of poly(4-vinylpyridine) with 30% quaternization fraction from dimethyl formamide solution.

FIG. 52B illustrates a plot of chronoamperometry measurements during the constant reductive electrodeposition of poly(4-vinylpyridine) with 30% quaternization fraction from dimethyl formamide solution. The electrodeposition may be performed −1.8 V vs. $Ag/Ag^{+}$ (50 mM) for 3600 s. Upon application of a constant reductive, the current decreases substantially over the first 200 seconds, which may stem from film deposition and surface insulation.

Thicknesses of the polymeric films created by electrodeposition of partially quaternized poly(4-vinylpyridine) may be influenced by several parameters such as concentration, deposition time, applied voltage, and the degree of polymer quaternization.

Figure 52C:
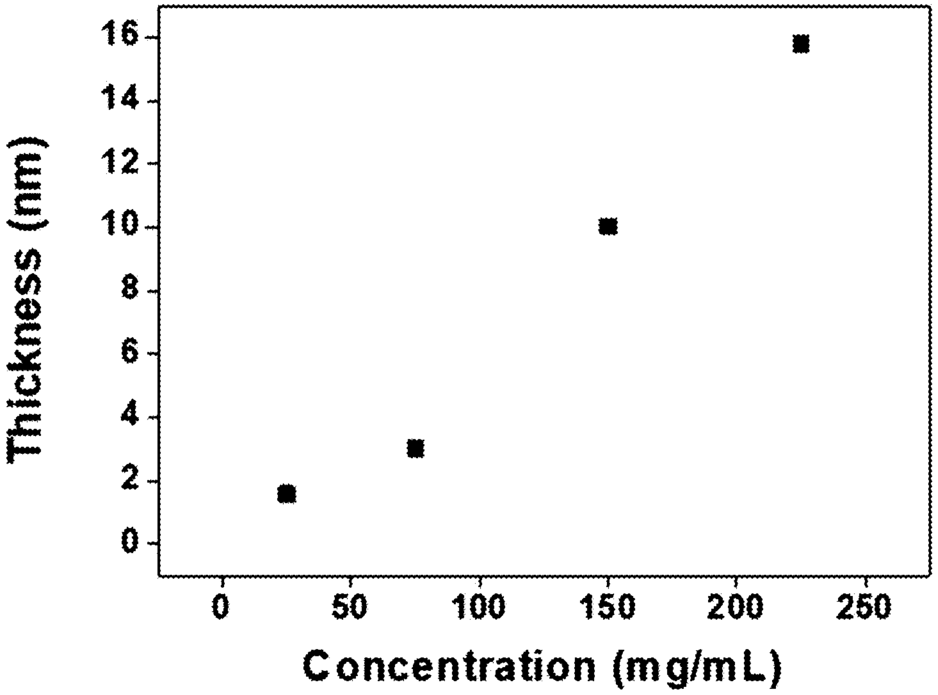
FIG. 52C illustrates a plot of thickness of polymeric films electrodeposited on a substrate of solutions with polymers at different concentrations, according to example embodiments.

FIG. 52C illustrates a plot of thickness of polymeric films electrodeposited on a substrate of solutions with polymers at different concentrations, according to an example embodiment. The solutions may comprise dimethyl formamide and polymers, e.g., poly(4-vinylpyridine), of 30% quaternization degree. An applied voltage of electrodeposition may include −1.8 V vs. $Ag/Ag^{+}$ for 30 minutes. Increasing polymer concentration leads to an increase in the thickness of polymeric film from a few nanometers to 10 s of nanometers.

Figure 52D:
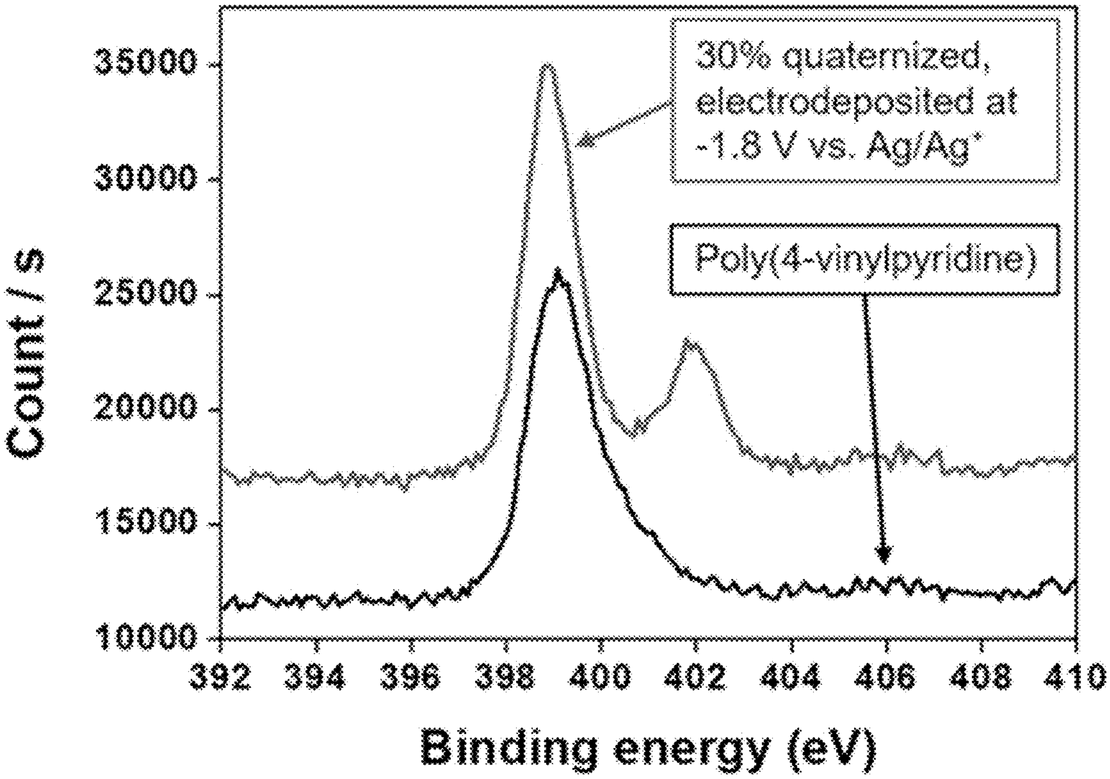
FIG. 52D illustrates XPS spectra at a nitrogen is edge of unmodified poly(4-vinylpyridine) and of a thin film of the same polymer with 30% of the pyridines methylated to methylpyridinium and subsequently electrodeposited at −1.8 V vs. $Ag/Ag^+$ (50 mM) from dimethyl formamide solution, according to an example embodiment.

FIG. 52D illustrates XPS spectra at a nitrogen is edge of unmodified poly(4-vinylpyridine) and of a thin film of the same polymer with 30% of the pyridines methylated to methylpyridinium and subsequently electrodeposited at −1.8 V vs. $Ag/Ag^{+}$ (50 mM) from dimethyl formamide solution, according to an example embodiment. The peak at 402 eV indicates remaining quaternized nitrogen in the electrodeposited thin film. Depending on methylpyridinium fraction in the polymer and deposition conditions (potential, time, polymer concentration), some of the methylpyridiniums may remain in the film without reduction, resulting in a thin copolymer coating with positive methylpyridinium side groups.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A polymer for electrodeposition as a conformal thin film, comprising:

a non-conductive polymer backbone; and plural electrochemically active crosslinker groups covalently attached to the polymer backbone, wherein a crosslinker group of the plural electrochemically active crosslinker groups is configured to, in an electrochemically activated state, couple to another electrochemically activated crosslinker group of the plural electrochemically active crosslinker groups on another polymer.

2. The polymer of claim 1, wherein the non-conductive polymer backbone includes poly(ethylene oxide), poly(propylene oxide), poly(butadiene), poly(glycidyl methacrylate), poly(methacrylate), poly(acrylate), poly(isoprene), poly (styrene), poly(acrylamide), poly(vinyl pyridine), poly(ethylene), poly(propylene), or poly(vinyl alcohol), precursors or derivatives thereof, or a combination thereof.

3. The polymer of claim 1, wherein the non-conductive polymer backbone is a block polymer and includes a hydrogen-bonding block, a hydrophobic block, a thermally responsive block, an ionically conductive block, a charged block, a Zwitter ionic block, or a combination thereof.

4. The polymer of claim 1, wherein the electrochemically active crosslinker groups include phenol, phenolate, amine, pyridinium, bromoisobutyrate, bromo-propionate, phenyl halogenide, phenyl di-halogenide, phenyl tri-halogenide, phenyl diazonium, or acrylate groups, precursors or derivatives thereof, or a combination thereof.

5. The polymer of claim 1, wherein the electrochemically active crosslinker groups are covalently attached to the polymer backbone as end groups, co-monomers, or block segments.

6. The polymer of claim 1, wherein a crosslinker fraction of the electrochemically active crosslinker groups with respect to the polymer backbone is sufficient to enable cross-linking of the polymer upon application of an electrochemical potential to form the conformal thin film.

7. The polymer of claim 6, wherein the crosslinker fraction is between 1% to 50% of the molecular weight of the polymer.

8. The polymer of claim 6, wherein a given crosslinker group of the electrochemically active crosslinker groups is separated from another crosslinker group of the crosslinker groups by a portion of the polymer backbone, the portion being of molecular mass greater than 500 g/mol.

9. A polymer composition comprising:

polymer of claim 1; and a solvent.

10. The polymer composition of claim 9, wherein the solvent of the polymer composition includes acetonitrile, dimethylformamide, tetrahydrofuran, water, or toluene mixtures.

11. The polymer composition of claim 9, further comprising one or more electrolytes, wherein the one or more electrolytes include: cations comprising lithium, sodium, potassium, tetraethylammonium, tetrabutyl ammonium, or tetralkyl ammonium; anions comprising perchlorate, para-toluenesulfonate, hexafluorophosphate, bis(trifluoromethanesulfonyl)imide, chloride, or bromide; or a combination thereof.

12. The polymer composition of claim 9, further comprising a complementary polymer or crosslinker.

13. A polymer for electrodeposition as a conformal thin film, comprising:

a non-conductive polymer backbone; and plural electrochemically active crosslinker groups covalently attached to the polymer backbone, wherein a crosslinker fraction of the electrochemically active crosslinker groups with respect to the polymer backbone is between 1% to 50% of the molecular weight of the polymer.

14. The polymer of claim 13, wherein the non-conductive polymer backbone includes poly(ethylene oxide), poly(propylene oxide), poly(butadiene), poly(glycidyl methacrylate), poly(methacrylate), poly(acrylate), poly(isoprene), poly (styrene), poly(acrylamide), poly(vinyl pyridine), poly(ethylene), poly(propylene), or poly(vinyl alcohol), precursors or derivatives thereof, or a combination thereof.

15. The polymer of claim 13, wherein the non-conductive polymer backbone is a block polymer and includes a hydrogen-bonding block, a hydrophobic block, a thermally responsive block, an ionically conductive block, a charged block, a Zwitter ionic block, or a combination thereof.

16. The polymer of claim 13, wherein the electrochemically active crosslinker groups include phenol, phenolate, amine, pyridinium, bromoisobutyrate, bromo-propionate, phenyl halogenide, phenyl di-halogenide, phenyl tri-halogenide, phenyl diazonium, or acrylate groups, precursors or derivatives thereof, or a combination thereof.

17. The polymer of claim 13, wherein the electrochemically active crosslinker groups are covalently attached to the polymer backbone as end groups, co-monomers, or block segments.

18. The polymer of claim 13, wherein the crosslinker fraction is sufficient to enable cross-linking of the polymer upon application of an electrochemical potential to form the conformal thin film.

19. A polymer composition comprising:

polymer of claim 13; and a solvent including acetonitrile, dimethylformamide, tetrahydrofuran, water, or toluene mixtures.

20. The polymer composition of claim 19, further comprising one or more electrolytes, wherein the one or more electrolytes include: cations comprising lithium, sodium, potassium, tetraethylammonium, tetrabutyl ammonium, or tetralkyl ammonium; anions comprising perchlorate, para-toluenesulfonate, hexafluorophosphate, bis(trifluoromethanesulfonyl)imide, chloride, or bromide; or a combination thereof.

21. The polymer composition of claim 19, further comprising a complementary polymer or crosslinker.

22. A polymer for electrodeposition as a conformal thin film, comprising:

a non-conductive polymer backbone; and plural electrochemically active crosslinker groups covalently attached to the polymer backbone, wherein a given crosslinker group of the electrochemically active crosslinker groups is separated from another crosslinker group of the crosslinker groups by a portion of the polymer backbone, the portion being of molecular mass greater than 500 g/mol.

23. The polymer of claim 22, wherein the non-conductive polymer backbone includes poly(ethylene oxide), poly(propylene oxide), poly(butadiene), poly(glycidyl methacrylate), poly(methacrylate), poly(acrylate), poly(isoprene), poly (styrene), poly(acrylamide), poly(vinyl pyridine), poly(ethylene), poly(propylene), or poly(vinyl alcohol), precursors or derivatives thereof, or a combination thereof.

24. The polymer of claim 22, wherein the non-conductive polymer backbone is a block polymer and includes a hydrogen-bonding block, a hydrophobic block, a thermally responsive block, an ionically conductive block, a charged block, a Zwitter ionic block, or a combination thereof.

25. The polymer of claim 22, wherein the electrochemically active crosslinker groups include phenol, phenolate, amine, pyridinium, bromoisobutyrate, bromo-propionate, phenyl halogenide, phenyl di-halogenide, phenyl tri-halogenide, phenyl diazonium, or acrylate groups, precursors or derivatives thereof, or a combination thereof.

26. The polymer of claim 22, wherein the electrochemically active crosslinker groups are covalently attached to the polymer backbone as end groups, co-monomers, or block segments.

27. The polymer of claim 22, wherein a crosslinker fraction of the electrochemically active crosslinker groups with respect to the polymer backbone is sufficient to enable cross-linking of the polymer upon application of an electrochemical potential to form the conformal thin film.

28. A polymer composition comprising:

polymer of claim 22; and a solvent including acetonitrile, dimethylformamide, tetrahydrofuran, water, or toluene mixtures.

29. The polymer composition of claim 28, further comprising one or more electrolytes, wherein the one or more electrolytes include: cations comprising lithium, sodium, potassium, tetraethylammonium, tetrabutyl ammonium, or tetralkyl ammonium; anions comprising perchlorate, paratoluenesulfonate, hexafluorophosphate, bis(trifluoromethanesulfonyl)imide, chloride, or bromide; or a combination thereof.

30. The polymer composition of claim 28, further comprising a complementary polymer or crosslinker.

* * * * *